US012630404B2

(12) United States Patent
McKinney et al.

(10) Patent No.: US 12,630,404 B2
(45) Date of Patent: May 19, 2026

(54) ELEVATING PLATFORM TOE SPACE

(71) Applicant: Altec Industries, Inc., Saint Joseph, MO (US)

(72) Inventors: Ryan J. McKinney, Parkville, MO (US); Jace Hegg, St. Joseph, MO (US); Kyle E. Hoffmann, Saint Joseph, MO (US); Brad Harju, St. Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 1197 days.

(21) Appl. No.: 17/323,605

(22) Filed: May 18, 2021

(65) Prior Publication Data

US 2021/0269296 A1 Sep. 2, 2021

Related U.S. Application Data

(63) Continuation of application No. 16/046,526, filed on Jul. 26, 2018, now Pat. No. 11,014,795.

(60) Provisional application No. 62/538,334, filed on Jul. 28, 2017.

(51) Int. Cl.
*B66F 11/04* (2006.01)

(52) U.S. Cl.
CPC .................................. *B66F 11/044* (2013.01)

(58) Field of Classification Search
CPC .......... B66F 11/00; B66F 11/04; B66F 11/044
USPC .......................................................... 182/222
See application file for complete search history.

(56) References Cited

U.S. PATENT DOCUMENTS 3,396,814 A * 8/1968 Garnett ................. B66F 11/046 182/2.11
3,404,751 A * 10/1968 Nosworthy ........... B66F 11/044 182/228.5
3,414,079 A 12/1968 Wacht et al.
3,625,305 A * 12/1971 Mueller ................ B66F 11/044 182/2.4
3,695,390 A * 10/1972 Leigh .................... B66F 11/046 182/2.11
3,917,026 A * 11/1975 Hedges ................. B66F 11/044 182/2.1
4,763,758 A * 8/1988 Moody ................. B66F 11/044 182/2.1
4,883,145 A * 11/1989 Deltatto ................ B66F 11/044 182/2.4
6,207,277 B1 * 3/2001 Shieh ..................... H01B 7/292 428/401
6,464,037 B2 * 10/2002 Baldas .................. B66F 11/044 182/2.1
9,287,024 B2 * 3/2016 Pelletier ................. H01B 17/56
10,338,107 B1 * 7/2019 Beck ...................... B66F 17/006
10,846,880 B1 * 11/2020 Peterson ............... B66F 11/046

(Continued)

*Primary Examiner* — Daniel P Cahn
*Assistant Examiner* — Shiref M Mekhaeil
(74) *Attorney, Agent, or Firm* — Erise IP, P.A.

(57) ABSTRACT

A toe space module for elevating platforms, wherein the module wraps around the edges and bottom of the platform in order to transform tension stress into shear and compression stresses. Also, a platform with a toe space module attached, and method for manufacturing the platform and toe space module. Also, a combination toe space module and step, a platform with the combination toe space module and step, and methods for manufacturing the platform with the combination toe space module and step.

20 Claims, 126 Drawing Sheets

(56) References Cited

U.S. PATENT DOCUMENTS

| | | | | |
|---|---|---|---|---|
| 2010/0012624 | A1* | 1/2010 | Akesson | H01H 33/121<br>218/154 |
| 2013/0256024 | A1* | 10/2013 | Roberts | B66F 17/006<br>174/5 SB |
| 2014/0305681 | A1* | 10/2014 | Pelletier | B66F 11/04<br>174/138 R |
| 2019/0031480 | A1 | 1/2019 | McKinney et al. | |
| 2019/0135603 | A1* | 5/2019 | Bilic | H02G 1/02 |

* cited by examiner

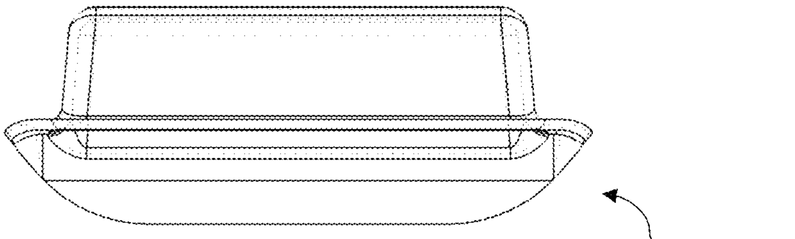
FIG. 4A
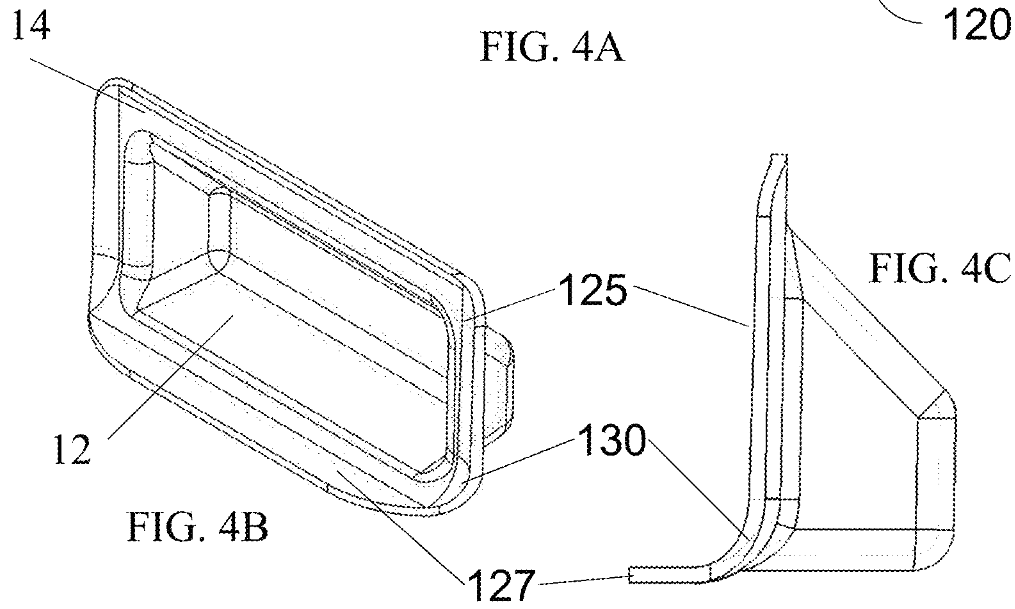
FIG. 4B
FIG. 4C
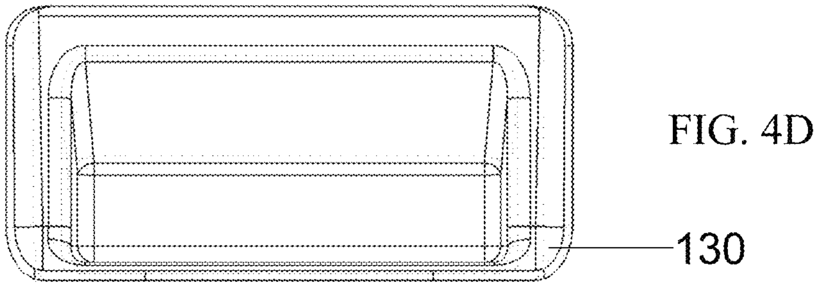
FIG. 4D

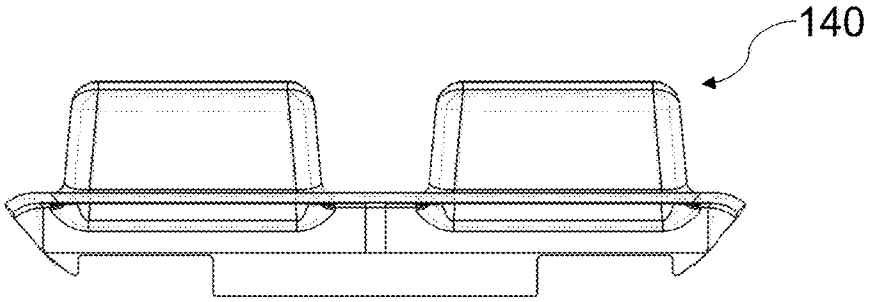
FIG. 8A
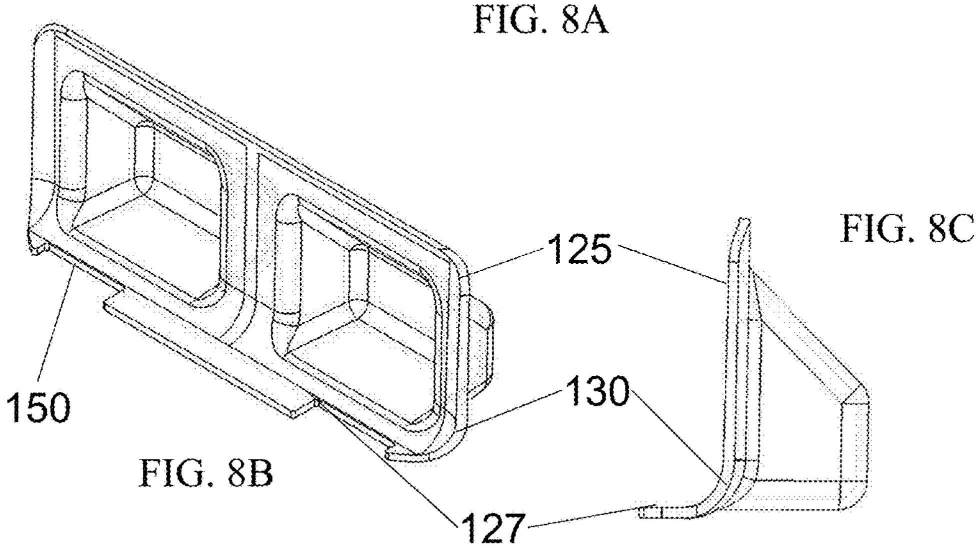
FIG. 8C
FIG. 8B
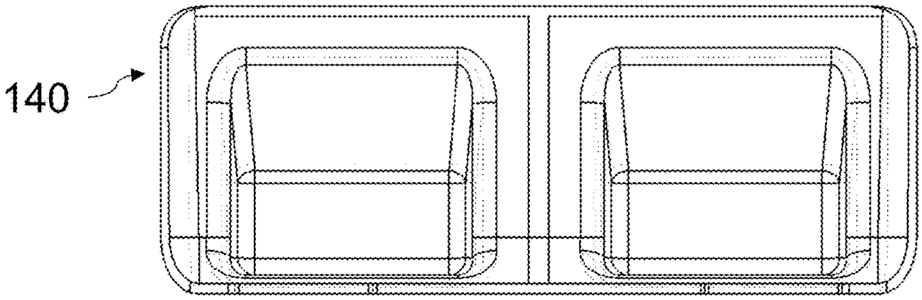
FIG. 8D

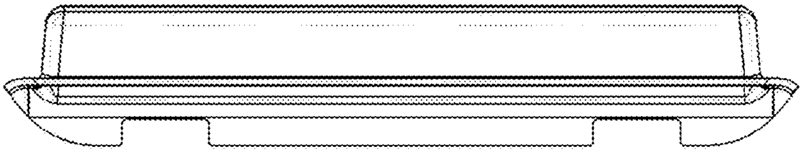
FIG. 12A
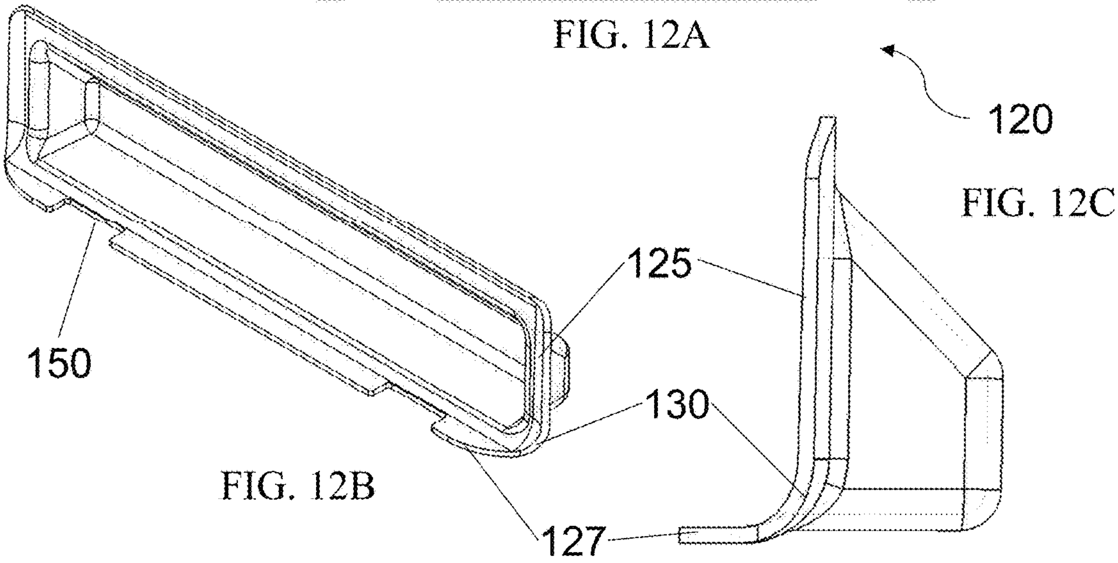
FIG. 12C
FIG. 12B
FIG. 12D

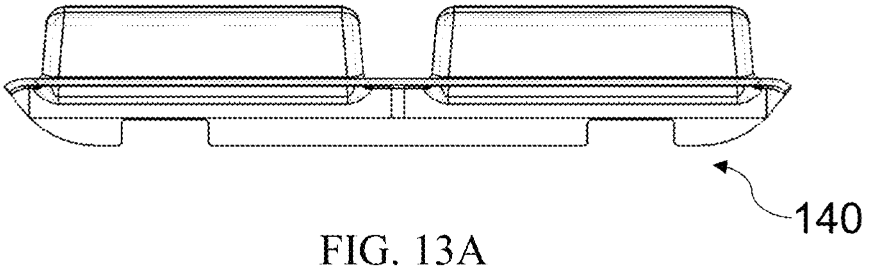
FIG. 13A
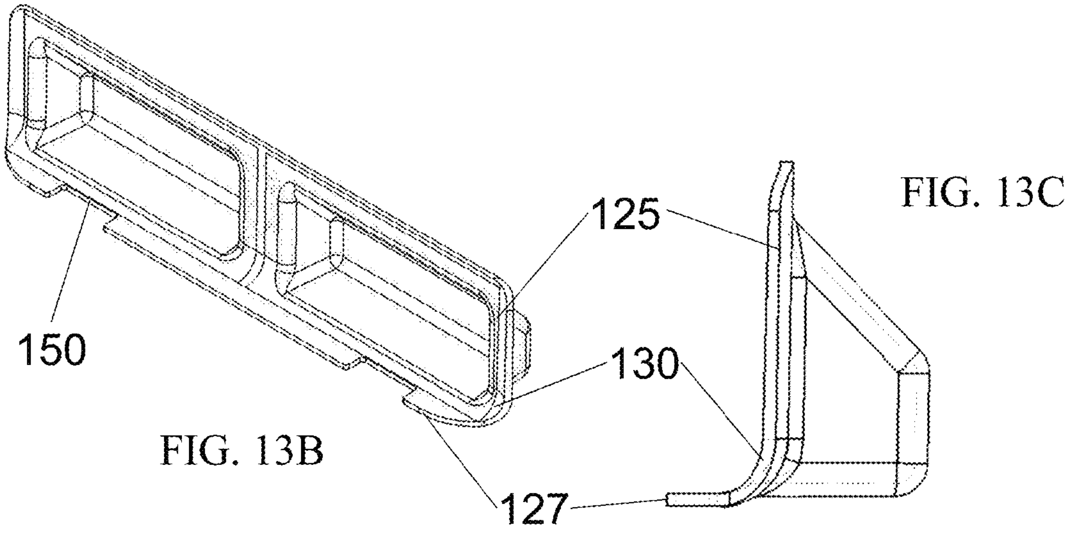
FIG. 13B
FIG. 13C
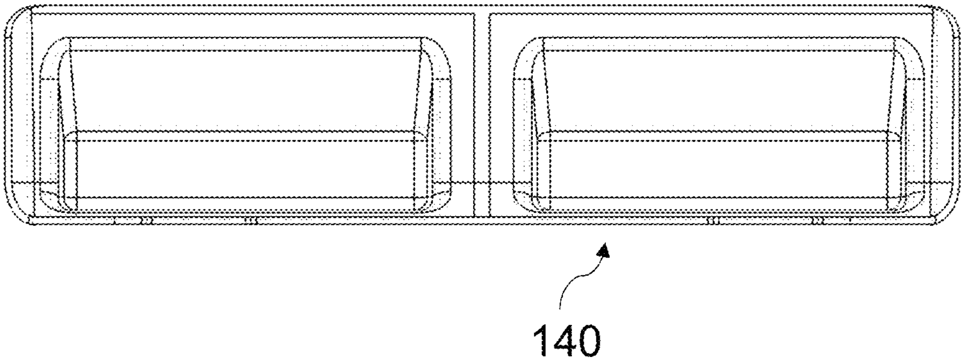
FIG. 13D

| Rev | Material | Radius to Platform (inches) | Bond distance (inches) | Side Radius (inches) | Thickness (inches) | Step width (inches) | Step height (inches) | Interior Stress Maximum (psi) | Exterior Stress Maximum (psi) |
|---|---|---|---|---|---|---|---|---|---|
| 01 | Polycarbonate | 0.50 | 1.5 | 0.5 | 0.25 | 3.000 | 4.175 | | 8,959 |
| 02 | Polycarbonate | 0.75 | 2.5 | 0.5 | 0.25 | 3.000 | 4.175 | | 8,127 |
| 03 | Polycarbonate | 1.00 | 2.5 | 0.5 | 0.25 | 3.000 | 4.175 | | 7,102 |
| 04 | Polycarbonate | 1.00 | 1.5 | 0.5 | 0.25 | 3.000 | 4.175 | | 7,752 |
| 05 | Polycarbonate | 1.00 | 1.5 | 0.5 | 0.25 | 3.500 | 4.175 | | 9,976 |
| 06 | Polycarbonate | 1.00 | 1.5 | 1.0 | 0.25 | 3.500 | 4.175 | | 9,618 |

FIG. 21

FIG. 23

| Rev | Material | Radius to Platform (inches) | Bond distance (inches) | Side Radius (inches) | Thickness (inches) | Step width (inches) | Step height (inches) | Interior Stress Maximum (psi) | Exterior Stress Maximum (psi) |
|---|---|---|---|---|---|---|---|---|---|
| 07 | Polycarbonate | 1.00 | 1.5 | 1.0 | 0.27 | 3.500 | 4.175 | 10,520 | 7,500 |
| 08 | Polycarbonate | 1.00 | 1.5 | 1.0 | 0.27 | 3.500 | 7.175 | 8,028 | |
| 09 | Polycarbonate | 1.00 | 1.5 | 1.0 | 0.27 | 3.500 | 4.500 | 7,746 | |
| 10 | Polycarbonate | 1.00 | 1.5 | 1.0 | 0.27 | 3.500 | 5.000 | 7,097 | |

ELEVATING PLATFORM TOE SPACE

CROSS REFERENCES TO RELATED APPLICATIONS

This application claims priority from one or more U.S. patent applications: This application is a continuation of U.S. patent application Ser. No. 16/046,526, filed Jul. 26, 2018, which claims priority to and the benefit of U.S. Provisional Patent Application No. 62/538,334 filed Jul. 28, 2017, each of which is incorporated herein by reference in its entirety.

BACKGROUND OF THE INVENTION

1. Field of the Invention

The present invention relates to elevating platforms, and more specifically to elevating platforms used with utility trucks.

2. Description of the Prior Art

It is generally known in the prior art to provide toe spaces for elevating platforms. Toe spaces are provided in elevating platforms for the safety and comfort of the operators. The extra toe space allows the operator to stand closer to the platform wall without leaning. Without toe space, an operator has to lean forward to be as close to the edge as possible, and therefore he is off-balance, which is unsafe. Furthermore, by being able to stand erect and not lean, the operator doesn't put pressure on the lower back.

U.S. Pat. No. 6,464,037 for reconfigurable work platform for aerial work platform system, aerial work platform system using same, and method for reconfiguring a work platform by inventors Jean-Luc Baldas and Jean-Claude Albert; filed Dec. 15, 2000 and issued Oct. 15, 2002, is directed to a reconfigurable work platform for an aerial work platform system includes at least one outwardly tiltable portion on which an occupant of the work platform can lean so as to extend his or her lateral reach. This is useful when the work platform itself cannot be moved closer to a desired location. An aerial work platform system using such a reconfigurable work platform, and a method for reconfiguring a work platform are also contemplated.

U.S. Pat. No. 3,396,814 for power ladder and safety device for workman's basket by inventor Edward V. Garnett; filed Jun. 13, 1966 and issued Aug. 13, 1968, is directed to a line means, such as a cable, having one end connected to a workman's operating support and the opposite end movable with a portion of an extending and retracting device for an outer section of a ladder which is extended and retracted with respect to an inner section, such portion of the extending and retracting device being movable in the opposite direction. A motion opposing device, such as a shock absorber, prevents the workman's support from suddenly tipping, in the event of breakage of the cable. Also, a hollow hand rail forms a guide for a portion of the cable which maintains the workman's support in vertical position. Additional details of the extending and retracting device are also disclosed.

U.S. Pat. No. 3,625,305 for Transport basket and method or producing the same by inventors Otto M Mueller and Melvin R Nordin; filed Jun. 2, 1969 and issued Dec. 7, 1971, is directed to A transport basket for raising personnel or material to elevated positions from a vehicle having an elevatable basket supporting structure thereon. The basket comprises a liner of electrical insulating material and an outer rigid jacket covering the exterior surface of the liner. A method of producing the transport basket involves molding the liner in a rotational mold without a core, removing the liner from the mold, and thereafter covering the exterior surface of the liner with glass fiber impregnated plastic resin.

U.S. Pat. No. 3,414,079 for toe-room aerial bucket with removable liner by inventors Raymond J Wacht and George H Eckels; filed Jun. 27, 1967 and issued Dec. 3, 1968; is directed to an aerial basket having four major sides, each pair of opposed sides being inclined in the same direction to provide two working stations with normal toe room. The opposed sides diverge as the open top of the basket is approached to facilitate the insertion and removal of a polyethylene liner through the top. The liner, when in place, provides a composite bucket assembly of determinable insulation value having the same amount of toe room as is available when the liner is removed.

U.S. Pat. No. 4,883,145 for ergonomic aerial basket by inventor Charles D. Deltatto; filed Jan. 25, 1989 and issued Nov. 28, 1989, is directed to an apparatus that reduces the risk of low-back injury to workers in elevated, partially enclosed, aerial baskets. The preferred embodiment basically comprises a circular well within the floor of the basket that is surrounded by a raised footrest platform adapted to receive on foot of the worker. Between the footrest platform and a base of the well is a cylindrical wall that prohibits forward movement under the footrest platform. In operations, when the worker has to perform manual handling tasks outboard of the basket, one foot is raised out of the well and extended forward onto the footrest platform, while the other foot remains below and behind the raised foot, on the base of the well. The worker has thereby adopted a forward leaning posture instead of a forward bending posture. Consequently, the worker retains the optimal curvature of the spine, while achieving a biomechanical advantage that reduces the work demand on the lower back.

U.S. Pat. No. 3,917,026 for aerial platform utility enclosure assembly by inventor Melvin R Hedges, filed Jan. 16, 1975 and issued Nov. 4, 1975; is directed to a modular three-part preformed lightweight synthetic resin panel assembly comprising an aerial platform utility enclosure designed to be installed upon the outer structural surfaces of the frame members of an otherwise unenclosed aerial platform cage, wherein each respective panel member of the utility enclosure has an outwardly extending integrally molded tool and equipment storage compartment, with one such compartment being further provided with interiorly affixed laterally positioned rib panels to support transparent plastic accessory and parts drawers, wherein also the utility enclosure design is such that, when installed, there is no reduction in the available preexisting aerial platform operator/worker occupancy space.

U.S. Pat. No. 3,404,751 for an aerial bucket step by inventor Bernard F. Nosworthy; filed Dec. 5, 1966 and issued Oct. 8, 1968; is directed to a demountable step for an aerial bucket comprising a longitudinally extending panel having an angled lid portion at the upper end thereof and a transversely extending step portion at the lower end thereof, said step being adapted for application to an aerial bucket with the flanged lip portion engaging the bucket top edge to facilitate entrance to or egress from the bucket.

SUMMARY OF THE INVENTION

The present invention relates to toe spaces for elevating platforms.

It is an object of this invention to provide toe spaces for elevating platforms.

In one embodiment, the present invention is a toe space module for elevating platforms.

In another embodiment, the present invention is a platform with a toe space module attached.

In yet another embodiment, the present invention is a method for manufacturing a platform with a toe space module.

In an alternative embodiment, the present invention is a combination toe space module and step as described herein.

In another alternative embodiment, the present invention is a platform with a combination toe space module and step as described herein.

In yet another embodiment, the present invention is a method for manufacturing a platform with a combination toe space module and step as described herein.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIGS. 4A-D illustrate an example 22.05 inch width toe space module according to the present invention. FIG. 4A is a top perspective view; FIG. 4B is a rear perspective view; FIG. 4C is a side perspective view; FIG. 4D is a front view.

FIG. 5A is a top perspective view; FIG. 5B is a rear perspective view; FIG. 5C is a side perspective view; FIG. 5D is a front view.

FIG. 6A is a top perspective view; FIG. 6B is a rear perspective view; FIG. 6C is a side perspective view; FIG. 6D is a front view.

FIG. 7A is a top perspective view; FIG. 7B is a rear perspective view; FIG. 7C is a side perspective view; FIG. 7D is a front view.

FIGS. 8A-D illustrate an example 27.88 inch width split front toe space module according to the present invention. FIG. 8A is a top perspective view; FIG. 8B is a rear perspective view; FIG. 8C is a side perspective view; FIG. 8D is a front view.

FIGS. 12A-D illustrate an example 45.99 inch width toe space module according to the present invention. FIG. 12A is a top perspective view; FIG. 12B is a rear perspective view;

FIG. 12C is a side perspective view; FIG. 12D is a front view.

FIGS. 13A-D illustrate an example 45.99 inch width split toe space module according to the present invention. FIG. 13A is a top perspective view; FIG. 13B is a rear perspective view;

FIG. 13C is a side perspective view; FIG. 13D is a front view.

FIG. 15A is a top perspective view; FIG. 15B is a rear perspective view; FIG. 15C is a side perspective view; FIG. 15D is a front view.

FIG. 16A is a side view; FIG. 16B is a perspective view from the side of the full-wrap toe space.

FIG. 17A is a top perspective view; FIG. 17B is a rear perspective view; FIG. 17C is a side perspective view; FIG. 17D is a front view.

FIG. 18A is a top perspective view; FIG. 18B is a rear perspective view; FIG. 18C is a side perspective view; FIG. 18D is a front view.

FIG. 19A is a perspective cross-sectional view of the module and platform. FIG. 19B is a side cross-sectional view of the module and platform.

FIG. 20A is a top perspective view; FIG. 20B is a rear perspective view; FIG. 20C is a side perspective view; FIG. 20D is a front view.

FIG. 21 illustrates the results of a tension stress test for a series of designs according to the present invention.

FIG. 23 illustrates the results of a tension stress test for another series of designs according to the present invention.

FIG. 26A is a top perspective view; FIG. 26B is a rear perspective view;

FIG. 26C is a side perspective view; FIG. 26D is a front view.

DETAILED DESCRIPTION

Figure 1:
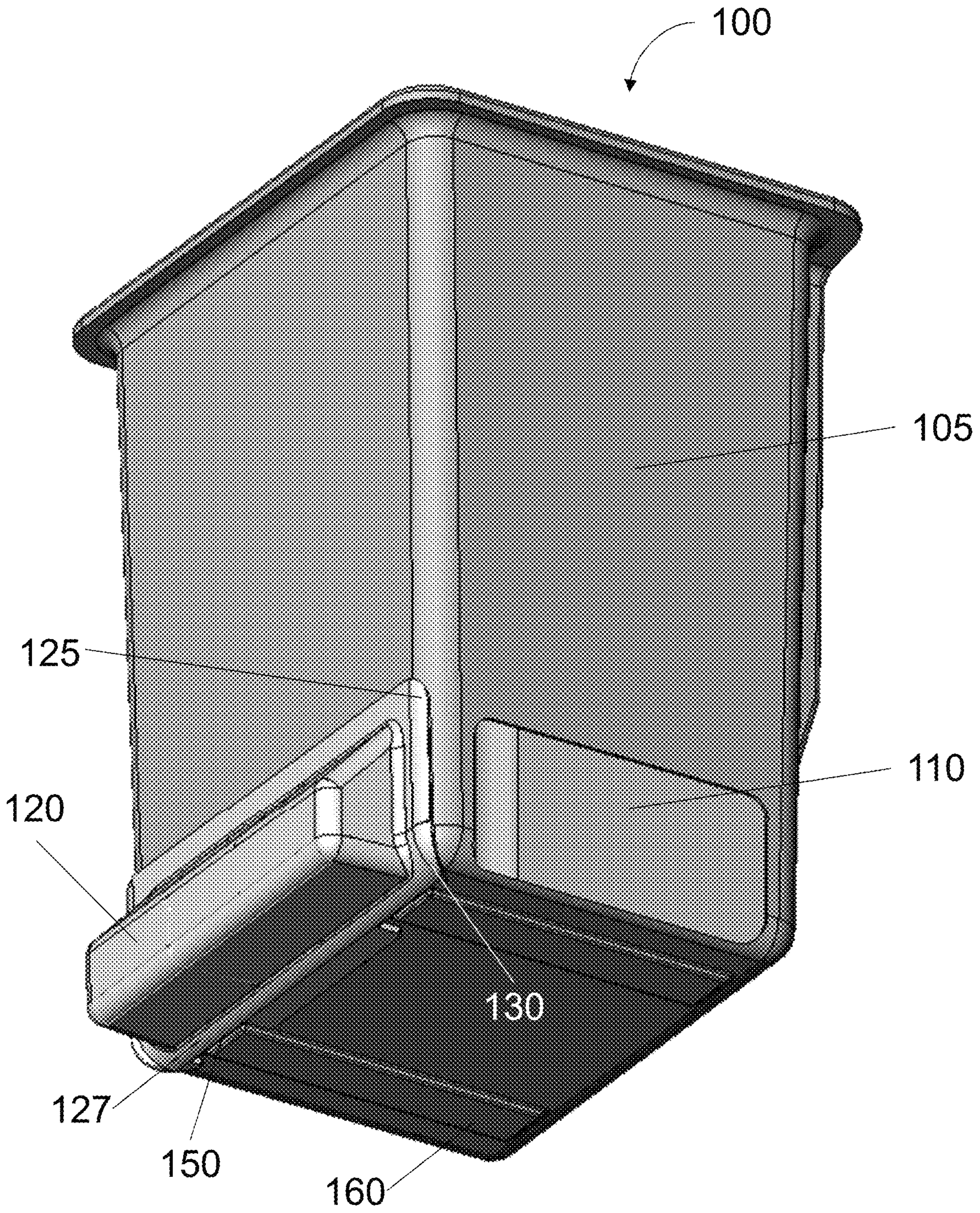
FIG. 1 illustrates a bottom perspective view of an elevating platform with a toe space module and a cutout according to the present invention.

The present invention is generally directed to a toe space module for elevating platforms.

In one embodiment, the present invention is a whole toe space module.

In another embodiment, the present invention is a split toe space module.

In yet another embodiment, the present invention is a platform with a toe space module.

For convenience, the terms "toe space" and "toe pod" are used interchangeably throughout the present specification.

As previously discussed, toe spaces are provided in elevating platforms for the safety and comfort of the operators. The extra toe space allows the operator to stand closer to the platform wall without leaning. Without toe space, an operator has to lean forward to be as close to the edge as possible, and therefore he is off-balance, which is unsafe. Furthermore, by being able to stand erect and not lean, the operator doesn't put pressure on the lower back.

Low back pain is an extremely common disorder that affects 8 out of every 10 people at some point in their lives. In fact, 26% of adults in North America report some form of low back pain every three months. More often than not, this pain is a result of damage and irritation to the joints, muscles, and ligaments in the low back.

The intervertebral discs are soft tissue structures separating the vertebrae that make up your spine. The outer layer of the disc is composed of tough connective tissue, but the internal component to the disc (called the nucleus pulposus) is more jelly-like. When a disc injury happens, the outer layer of that disc can become torn, and the inner layer can subsequently protrude outside of the disc. The most common direction this protrusion occurs is backwards and to the side. The damaged disc itself can cause pain, but more importantly, this protrusion can cause pain via putting pressure on the nerve roots branching from your spinal cord. Symptoms of a disc herniation include pain with coughing or sneezing, electric or burning pain traveling down your leg, and pain aggravation with leaning forward. With a disc problem, activities need to be much more limited. Specifically, leaning forward should be avoided at all costs. When a person leans forward, they squeeze the front of the intervertebral discs which causes the nucleus pulposus to travel even further outside of the disc. Therefore, avoiding bending forward at the low back is of the utmost importance.

Prior art toe spaces are formed by integrating the toe space into the platform mold. For fiberglass platforms and toe spaces, this is typically performed using a chop-spray process. This method of manufacturing requires two-part molds and is open-molded, which requires hand lay-up. This process results in heavier platforms with unsightly seams and rough chop surfaces. In particular, the seams must be reworked before putting the platform with the toe space into service, adding to the cost of the platform. Furthermore, the chop-spray process is inconsistent, emits a high level of VOCs, creates heavy parts, and leaves a rough, visually unappealing surface finish.

A modular toe space as described herein solves these problems because it allows the toe space and the platform to be manufactured separately while using optimum manufacturing methods for both components. The toe space and the platform are made out of reinforced thermosets, unreinforced thermosets, reinforced thermoplastics, and/or unreinforced thermoplastics using methods such as thermoforming (including twin sheet thermoforming), injection molding, casting such as low pressure casting, vacuum forming, compression molding, light resin transfer molding, resin transfer molding, vacuum infusion, hand layup, 3D printing, and squish molding, by way of example and not limitation. The platform and toe space module are then joined in a secondary process. The platform can be made via a variety of manufacturing methods, including those referenced above, which eliminate rework that is otherwise required to remove the mold seam that is created in open molded toe space platforms that are manufactured with multi-piece molds. The advanced manufacturing processes referenced above reduce the variability in thickness of the platform and the modular toe space. Alternatively, the platform and/or the toe space are manufactured out of fiberglass. The thickness within a toe space module is substantially uniform, between about 0.18 inches and 0.28 inches, or within 0.10 inches. The thickness from module to module is also highly uniform, which allows the thickness to be reduced, thus simultaneously providing increased reliability and less waste. The uniformity also results in the platform and the modular toe space of the present invention weighing significantly less than a prior art platform with toe space with similar or identical dimensions. For example, 1.5-man and 2-man platforms according to the present invention are approximately 40 and 55 lbs. lighter, respectively, than similar open-molded platforms. Existing platforms can also be retrofitted with the modular toe pod of the present invention, an option which is not possible with the prior art.

The material of the platform and modular toe pods of the present invention are also stronger and more impact resistant than platforms with toe pods formed via chop-spray. The stronger material, along with the greater reliability due to uniformity of thickness, in turn provide for increased safety for the operator of the platform assembly. The advanced manufacturing techniques used to create the modular toe pods of the present invention provide the ability to create larger and deeper toe pods as well as toe pods with more consistent dimensions compared to prior art toe pods.

The advanced manufacturing technique also provides for a greater ability to dielectrically rate the toe pod compared to traditional toe spaces. In one embodiment, the toe pod is insulating and has a dielectric rating of 70 kV. Alternatively, the toe pod is insulating and has a dielectric rating of 50 kV. Preferably, the dielectric rating of 50 kV conforms to ANSI 92.2 Section 5.4.2.5 published in 2015, which is hereby incorporated by reference in its entirety. This standard requires the following test for a dielectric rating of 50 kV: "Platform liners used for insulation shall be tested in a conductive liquid. The liquid level around both the inner and outer surfaces of the liner shall be within 6 inches (152 mm) of the top of the liner. The liner shall withstand a minimum of 50 kV ac for 1 minute without breakdown through the material."

In yet another embodiment, the toe pod includes an insulating liner.

The toe pod and platform are formed from corrosion resistant materials and/or impact resistant materials in another embodiment of the present invention. In one embodiment, the thermoset material and/or thermoplastic material is corrosion resistant and/or impact resistant. The thermoset material and/or thermoplastic material is reinforced or unreinforced.

Additionally, the platform and toe pod of the present invention have a more visually appealing smooth appearance compared to the rough finish of platforms with toe pods manufactured via chop-spray. This smoother finish allows for better and more uniform contact area between the platform and the module, thereby insuring more uniform adhesion between the module and the platform.

Other advantages of more advanced processes over open-molding include decreased lead times and inventories and improved process control and supply chain sustainability.

In general, by transitioning from open molding to more advanced processes, the platform and toe space module become higher quality, safer, lighter, better looking, and more easily manufactured.

None of the prior art discloses a platform with modular toe spaces as described herein.

Prior art methods of attaching components to cutouts in elevating platforms result in components that can release over time along their edges and corners from the platform. The present invention overcomes these and other problems with the prior art by creating an attachable toe module that does not release along the edges and corners.

Referring now to the drawings in general, the illustrations are for the purpose of describing a preferred embodiment of the invention and are not intended to limit the invention thereto.

The present invention provides for an attachable toe space module for an elevating platform, the module having tabs along the sides, bottoms and corners that wrap around the platform sidewall, which convert tension stress into shear stress and/or compression stress along the edges, thereby preventing release of the tabs from the platform. The present invention also provides for a platform with attached toe space modules.

A platform with a toe space module, generally described as 100 in FIG. 1, includes a platform 105 which includes at least one cutout 110, to which a toe space module 120 is then attached. The toe space module 120 includes a side tab 125 that wraps at least partially around the edge or surface between a first side and a second side of the platform, a bottom corner tab 130 that wraps at least partially around a corner of the platform or a surface between a first side of the platform, a second side of the platform, and a bottom of the platform, and a bottom tab 127 that wraps around an edge of the platform or a surface between a first side of the platform and a bottom of the platform. In one embodiment, the edges and/or corners of the platform are rounded. FIG. 1 also illustrates notches 150 along the bottom to accommodate support ribs 160 in the platform floor.

Figure 2:
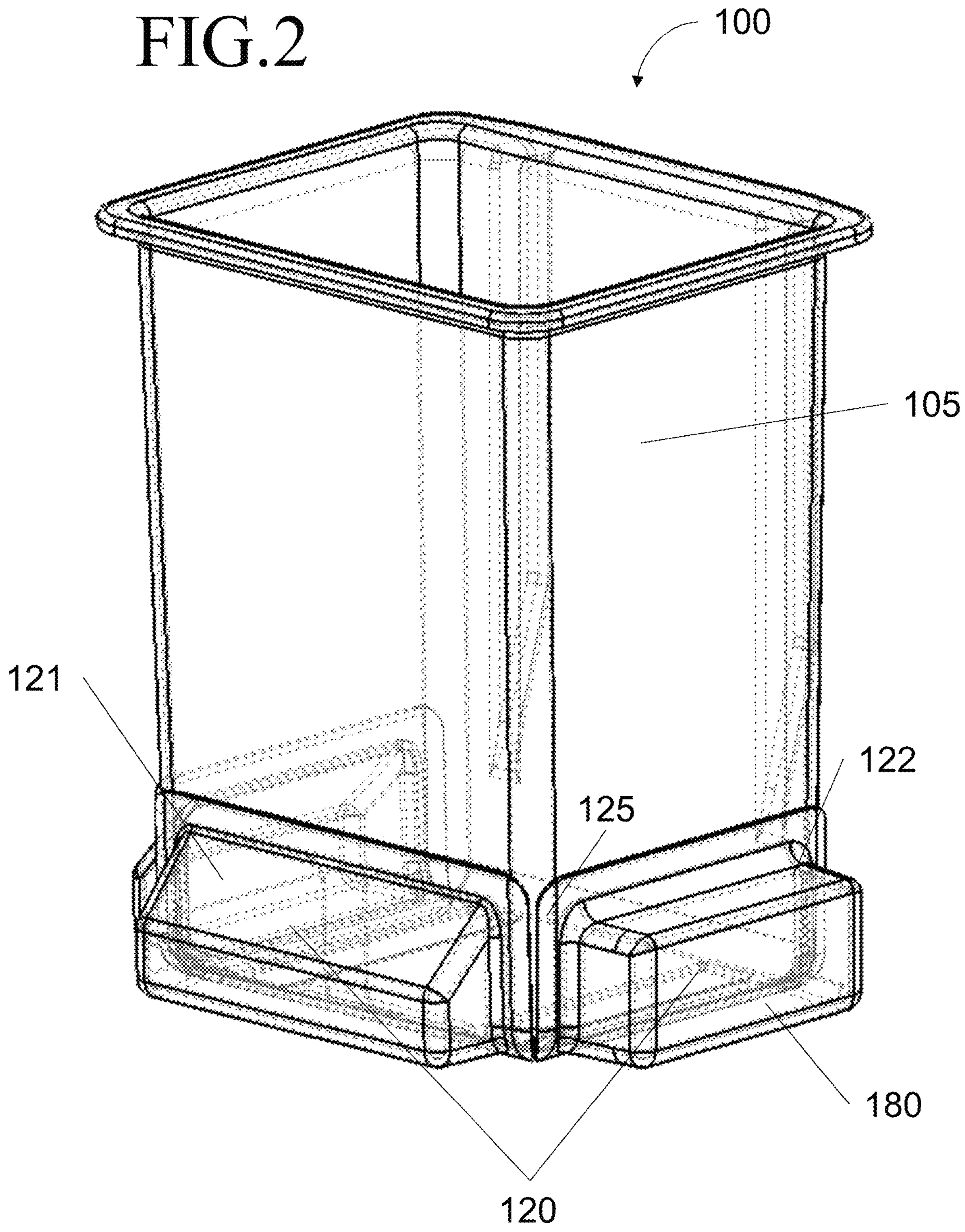
FIG. 2 illustrates a transparent perspective view of another elevating platform with toe space modules according to the present inventions
Figure 3:
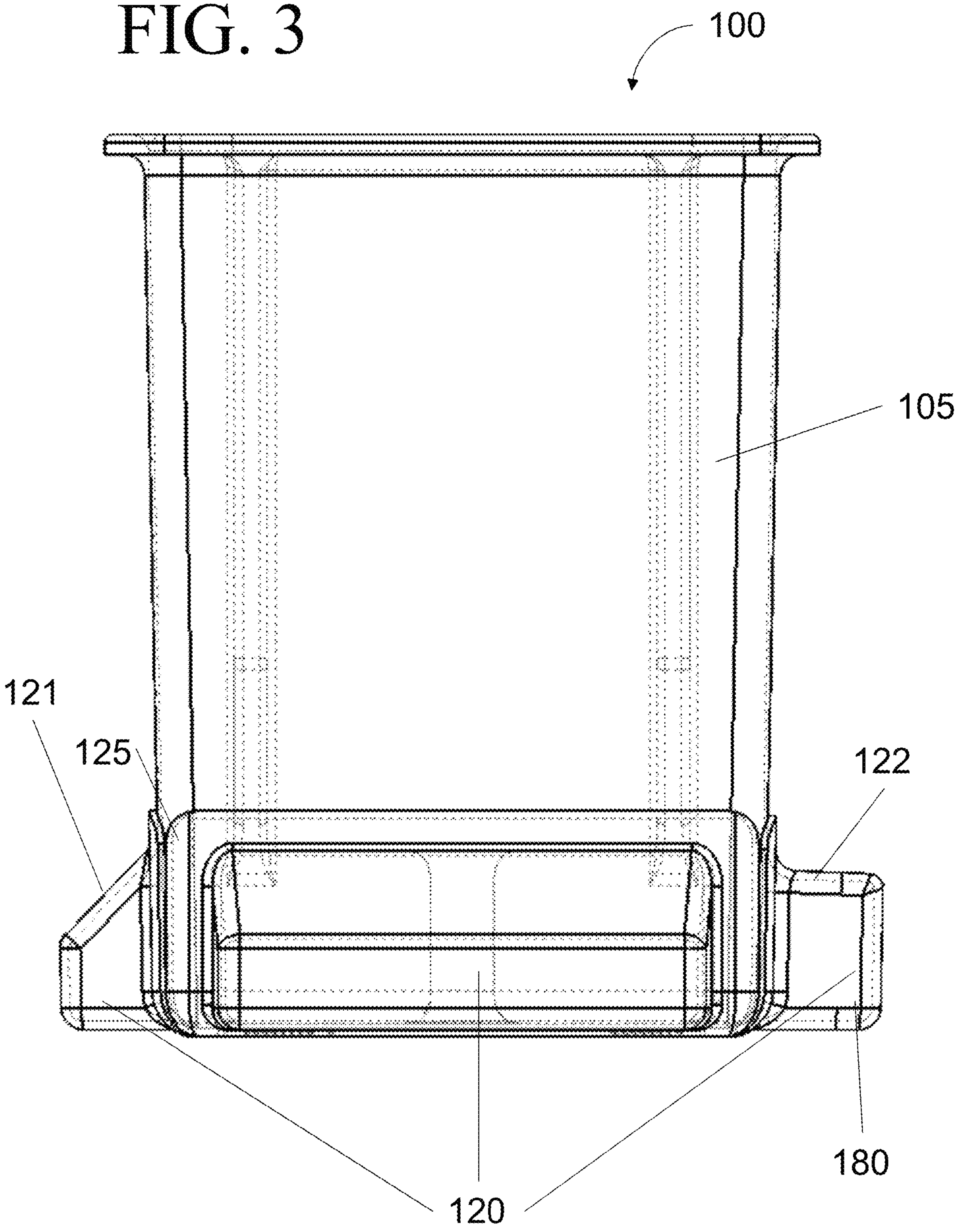
FIG. 3 illustrates a transparent side view of the elevating platform of FIG. 2.
Figure 5A:
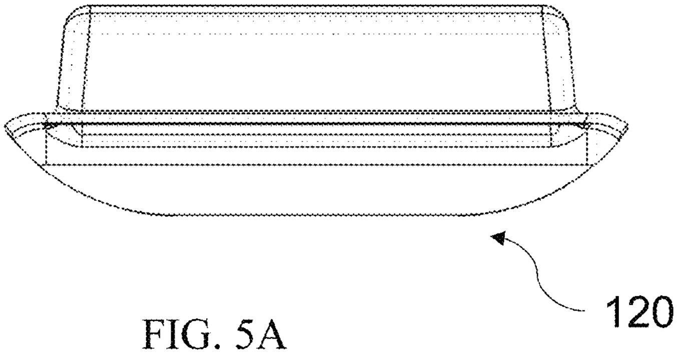
FIGS. 5A-D illustrate an example 24.4 inch width toe space module according to the present invention.
Figure 5B:
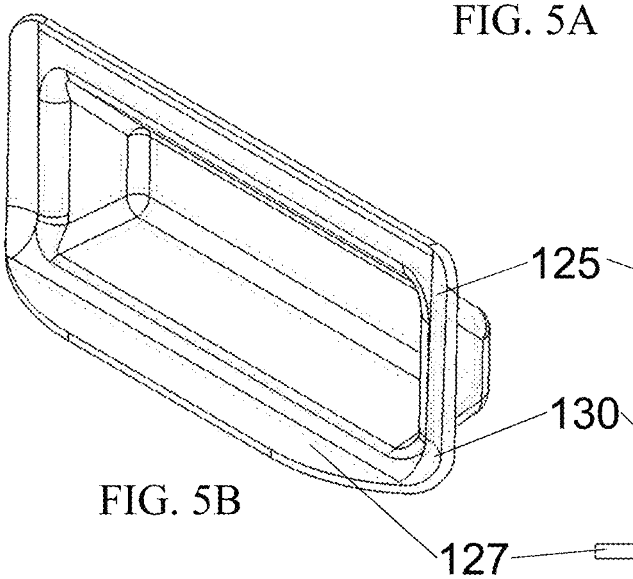
Figure 5C:
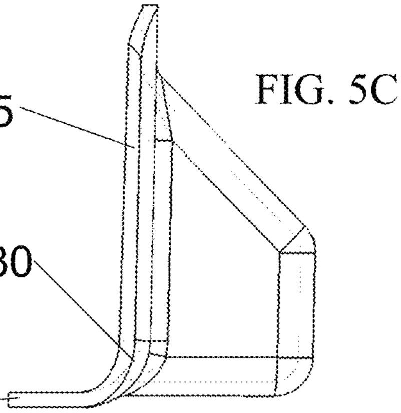
Figure 5D:
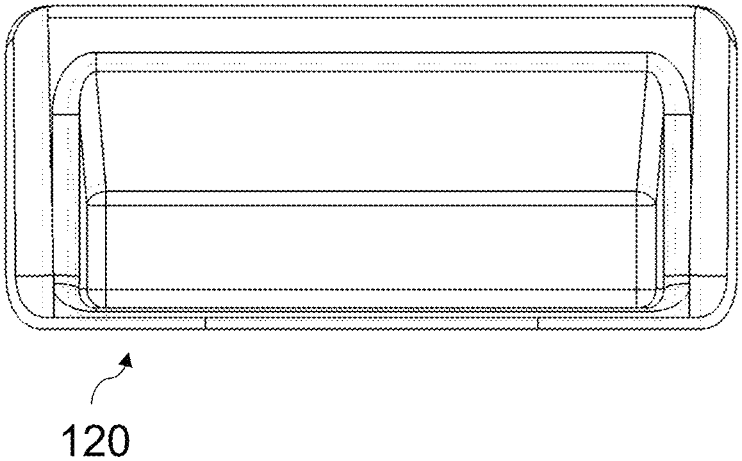
Figure 6A:
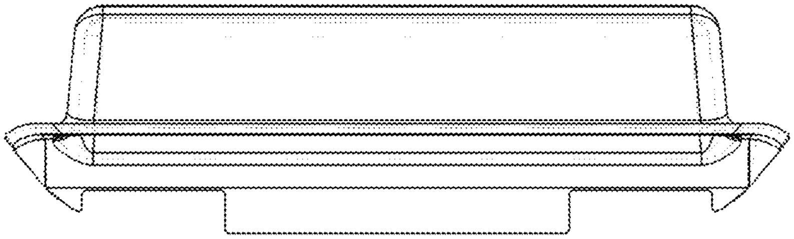
FIGS. 6A-D illustrate an example 27.88 inch width toe space module according to the present invention.
Figure 6B:
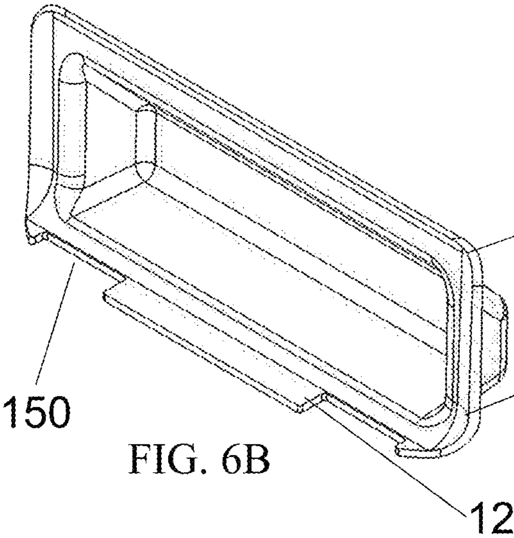
Figure 6C:
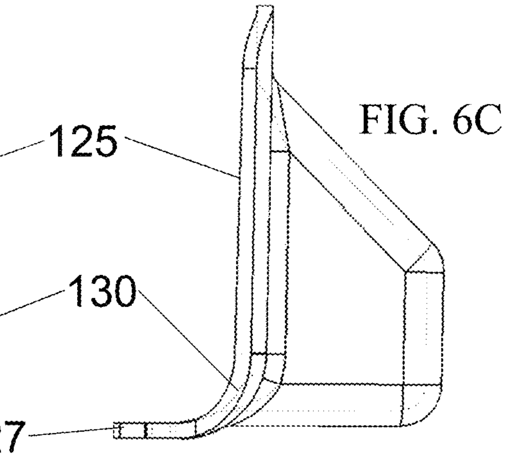
Figure 6D:
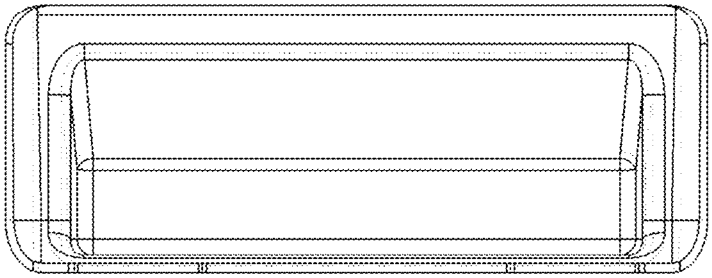
Figure 7A:
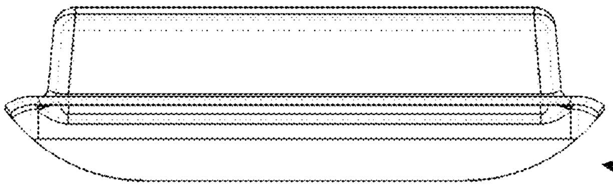
FIGS. 7A-D illustrate an example 28.4 inch width toe space module according to the present invention.
Figure 7B:
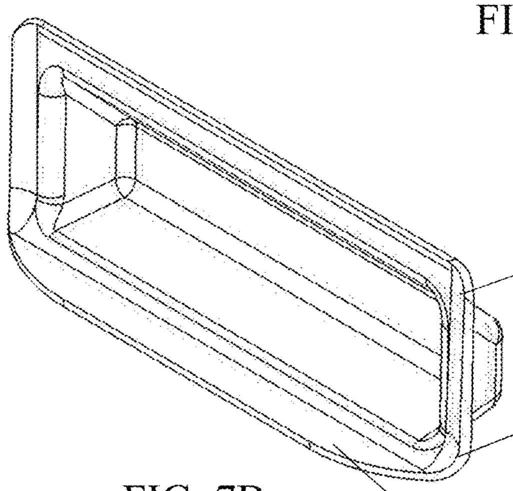
Figure 7C:
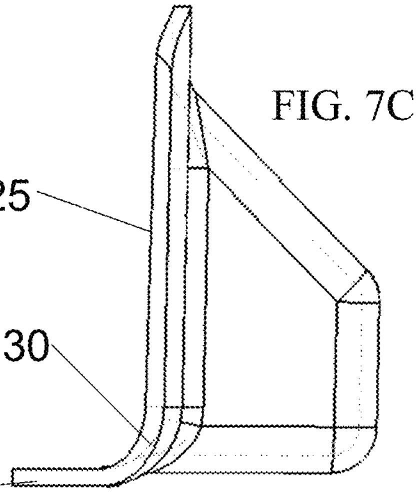
Figure 7D:
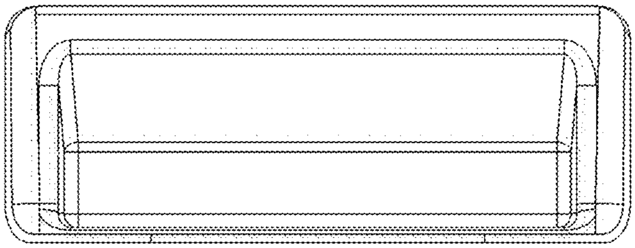

FIG. 2 illustrates a transparent perspective view of a platform with three toe space modules attached. FIG. 3 illustrates a transparent side view of the platform of FIG. 2. The toe space modules have an internal height of preferably between at least about 3 inches and about 6.5 inches and an internal depth of between about 2 inches and 6 inches, and more specifically between about 4 inches and about 5 inches, in order to accommodate work boots and similar large foot gear and minimize the stress maximum (explained below). In another embodiment, the internal depth of the toe pod is about 2.25 inches. Alternatively, the toe space is used as storage space for equipment.

Advantageously, the side tab 125 wraps at least partially around the edge or surface between a first side and a second side of the platform. Furthermore, the bottom corner tabs 130 wrap at least partially around a corner of the platform or a surface between a first side of the platform, a second side of the platform, and a bottom of the platform. A bottom tab 127 wraps around an edge of the platform or a surface between a first side of the platform and a bottom of the platform. The bottom corner tab 130, bottom tab 127, and side tab 125 convert tension stress into shear stress and/or compression stress.

In one embodiment, the toe space module is attached to the platform with adhesive. An exemplary adhesive is a two-component methacrylate adhesive.

The top of the module is sloped 121 to discourage use as a step and to prevent buildup of material. Alternatively, the module has a horizontal top surface 122 and serves as a step, if so designed and approved. Various width toe space modules are used for different size platforms. FIGS. 4A-7D show four example toe space modules: 22.05 inch, 24.4 inch, 27.88 inch and 28.4 inch width. These are designed for standard platforms which accommodate 1 or 2 operators, larger platforms which accommodate 1 operator (commonly referred to as 1.5 man platforms), and platforms specially designed for the telecom industry (commonly referred to as splicer platforms). The present invention also includes toe pod modules for platforms that are D-shaped or substantially D-shaped, V-shaped or substantially V-shaped, U-shaped or substantially U-shaped, curved, rounded, oval shaped, pentagonal or substantially pentagonal, hexagonal or substantially hexagonal, heptagonal or substantially heptagonal, octagonal or substantially octagonal, or any shape with any number of sides. Toe space modules are also D-shaped or substantially D-shaped, V-shaped or substantially V-shaped, U-shaped or substantially U-shaped, curved, rounded, oval shaped, pentagonal or substantially pentagonal, hexagonal or substantially hexagonal, heptagonal or substantially heptagonal, octagonal or substantially octagonal, or any shape with any number of sides according to the present invention.

As shown in FIG. 4B, the toe space modules include a recess 12 that provides space for user's feet, and a flange 14 that is used to attach or adhere the module to the platform. The recess includes a bottom, a top, and one or more sides in one embodiment. The recess in FIG. 4B includes a bottom, a slanted top, and three sides.

FIGS. 37A-E illustrate several views of a curved toe space module 370 operable to attach to a curved platform or substantially D-shaped platform. The curved toe space module is preferably integrally formed as one piece. Alternatively, the curved toe space module includes two or more sections which are separately formed and joined together. FIGS. 37F-K illustrate several views of a curved toe space module 370 attached to a curved wall of a D-shaped platform 376. The D-shaped platform 376 includes a wall and a substantially curved side which runs from one end of the wall to the other end of the wall. The curved toe space module 370 wraps around at least a portion of the bottom of the D-shaped platform thereby converting tension stress into shear stress and/or compression stress.

FIGS. 38A-E illustrate a curved toe space module with an extended curve 380 that attaches to a curved wall of a D-shaped platform. The curved toe space module with an extended curve is preferably integrally formed as one piece. Alternatively, the curved toe space module with an extended curve includes two or more sections which are separately formed and joined together. FIGS. 38F-I illustrate several views of a curved toe space module 380 attached to a curved wall of a D-shaped platform 376. The curved toe space module 380 wraps around at least a portion of the bottom of the D-shaped platform and substantially or completely around the D-shaped or curved portion of the platform, thereby converting tension stress into shear stress and/or compression stress.

FIGS. 39A-F illustrate a corner toe space module 390 that attaches to a corner 395 of a platform 396. The corner toe space module 390 includes a first section 392 attached to a second section 394. The first section and section are integrally formed as one section in one embodiment. Alternatively, the first section and second section are separately formed and joined together. FIGS. 39G-39K illustrate several views of a corner toe space module 390 attached to a corner 395 of a platform 396. The corner toe space module 390 wraps around at least a portion of the bottom 393 of the platform 396 and substantially or completely around two walls or panels of the platform, thereby converting tension stress into shear stress and/or compression stress.

The flange and/or tabs of the flange wrap around the platform sidewall, thereby converting tension stress into shear stress and/or compression stress. The flange is continuous around the edge of the module in one embodiment. Alternatively, the flange is discontinous around the module. In one embodiment, the flange includes integrated tabs. Alternatively, the flange includes tabs which are not integrated. Furthermore, the bottom corner tabs 130 also provide for conversion of tension stress into shear stress and/or compression stress. As shown in FIGS. 1-8D, the module includes side tabs 125 and a bottom tab 127. The bottom tab is configured to matingly contact the bottom edge and bottom of the platform in one embodiment. Alternatively, the bottom tab is configured to matingly contact a surface between one side and a bottom of the platform. In one embodiment, the bottom tab is curved. Thus, the toe space module provides a continuous tab along the sides, corners and the bottom that converts tension stress to shear stress and/or compression stress along the entire side and bottom perimeter.

In one embodiment, the flange and the toe space module are integrally formed. Alternatively, the flange and the toe space module are not integrally formed but are instead joined by chemical bonding, physical bonding, welding including metal welding and/or plastic welding such as hot gas welding, ultrasonic welding, spin welding, vibration welding, contact welding, laser welding, hot plate welding, etc., magnetism, vacuum, and/or mechanical fastening. Advantageously, the flange is operable to be attached to the toe space module permanently or non-permanently. Methods of non-permanent attachment include mechanical interlocking, mechanical fasteners, magnetism, and reversible adhesives such as adhesives operable to be reversed via radiation such as microwaves.

This continuous coverage by the tabs closes and/or seals the cutout. According to ANSI A92.2-2015 Section 4.9.5.1, platforms for use with insulating liners shall not have drain holes or access openings. Therefore, the platform cutout must be sealed if the platform includes an insulating liner. Preferably, the platform toe space module is fixed to platforms the same way regardless of whether the platform incorporates an insulating liner; therefore, in preferred embodiments, the platform cutout is closed and/or sealed by the tabs of the toe space module.

FIGS. 4A-7D provide illustrations of the tabs in greater detail. The tabs wrap around the corners of the platform, at the bottom and sides. In a preferred embodiment, the side tabs wrap partly around the corner. More preferably, the side tabs 125 wrap slightly less than halfway around the corner so that another toe space module can be attached on the adjacent wall of the platform (FIG. 2). In one embodiment, the tabs of adjacent toe pods converge at the bottom of the platform and are closer to each other at the bottom of the platform than they are at the top of the toe pods due to the draft angle of the platform walls. In one embodiment, the tabs of the toe pods are trimmed to be perfectly vertical or substantially vertical for ease of manufacture which results in a larger gap at the top as the platform walls slope outward from bottom to top. In an alternative embodiment, the tabs of the toe pods are trimmed to maintain a consistent gap between adjacent toe pods.

Figure 9:
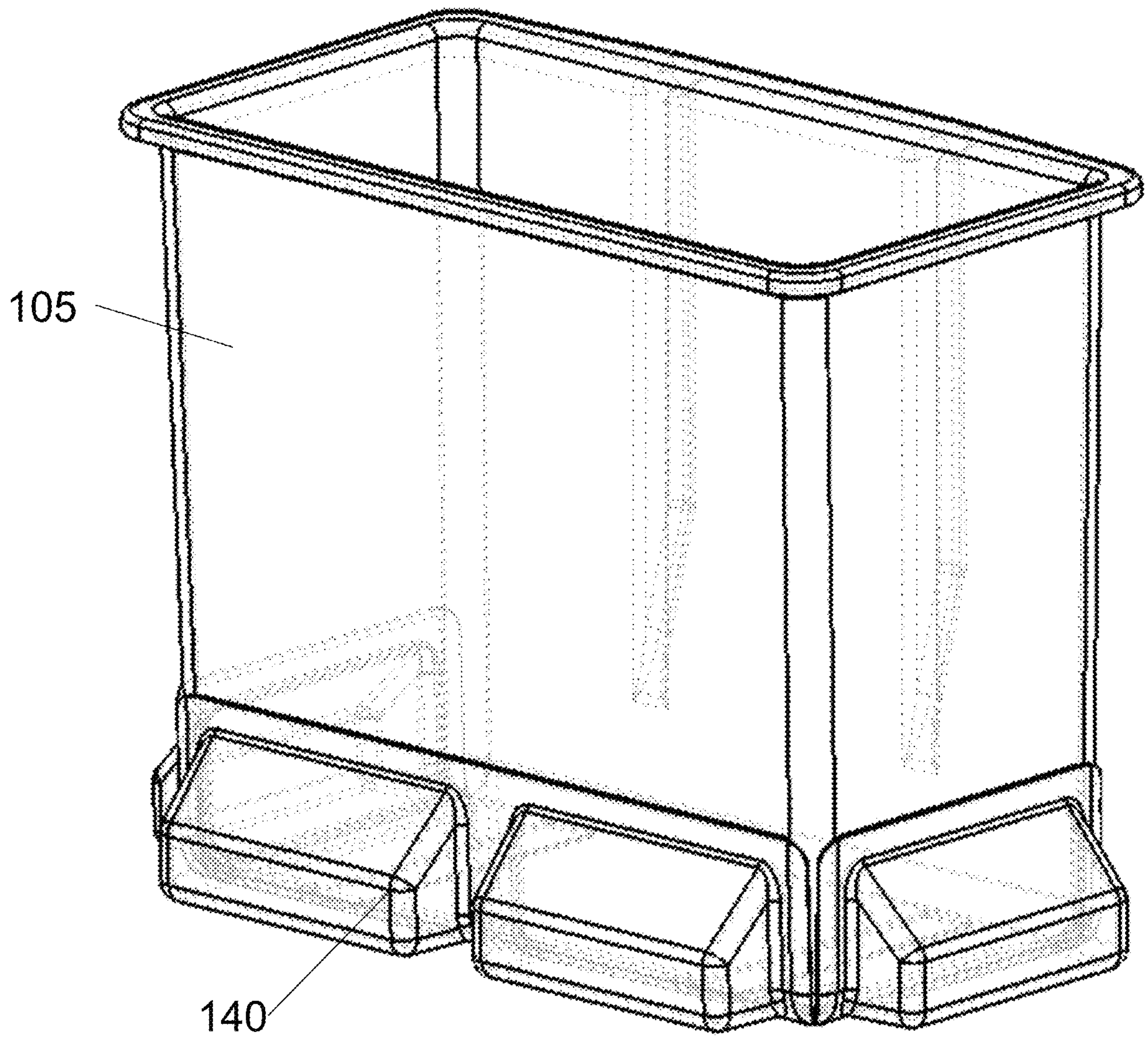
FIG. 9 illustrates a side perspective view of a platform with a split toe space module and a single toe space module according to the present invention.

As shown in FIGS. 1, 6A-D, 8A-D, 12A-D, and 13A-D, in another embodiment the toe space modules include notches 150 along the bottom tabs to accommodate support ribs 160 in the platform floor. In one embodiment, the support ribs 160 are support ribs described in US Patent Publication No. 2017/0355580, published Dec. 14, 2017, which is hereby incorporated by reference in its entirety. Alternatively, the notches for receiving the support ribs are in any orientation (horizontal, vertical, angled at any angle such as 30 degrees, 45 degrees, 60 degrees, 90 degrees, etc.) and are located on any other component of the platform, including the platform sides or walls, the platform edges, the platform For greater width platforms, a split toe space module 140 is provided. FIGS. 8A-D show a split embodiment of the toe space module. In this example, a 27.88 inch width toe space module is divided in the middle via a vertical divider 145, providing two separate toe spaces. Advantageously, the vertical divider 145 provides additional stiffness and an additional surface for attaching the toe space module to the platform. In another alternative, the split toe space module does not include a vertical divider 145. Preferably, the vertical divider 145 splits the toe space module symmetrically. Alternatively, the vertical divider 145 splits the toe space module asymmetrically. FIGS. 30A-E illustrate a front view, isometric view, left side view, right side view, and top view, respectively, of one embodiment of an asymmetrically split toe space module 300. A split module thus provides more support to the platform in the middle than a whole space module, thereby providing a firmer floor. FIG. 9 illustrates a transparent view of a platform 105 with a split module 140 installed along the wider wall and with whole modules along the short walls.

Figure 10:
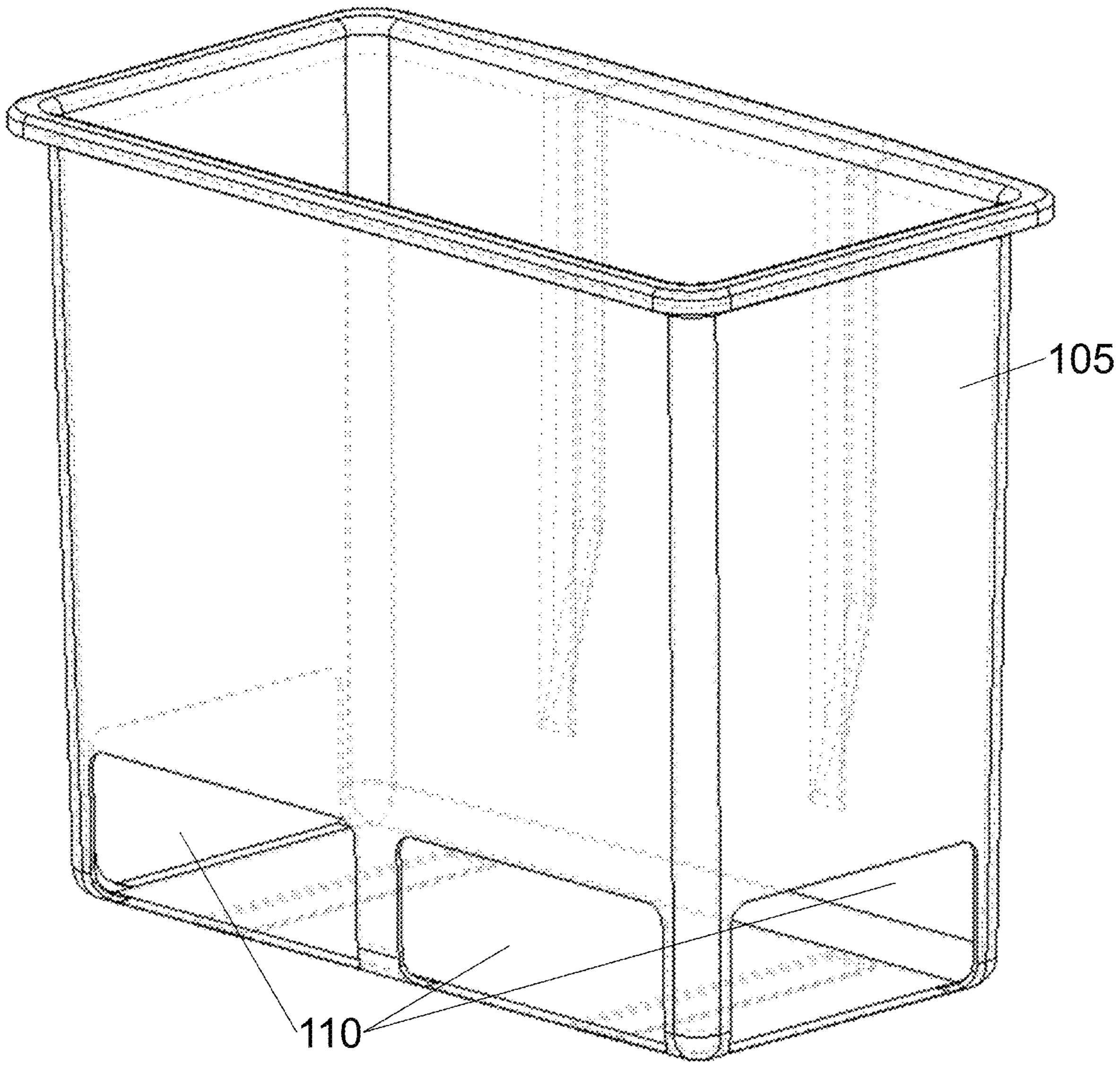
FIG. 10 illustrates a side perspective view of a platform with cutouts for receiving a split toe space module and a single toe space module according to the present invention.
Figure 11:
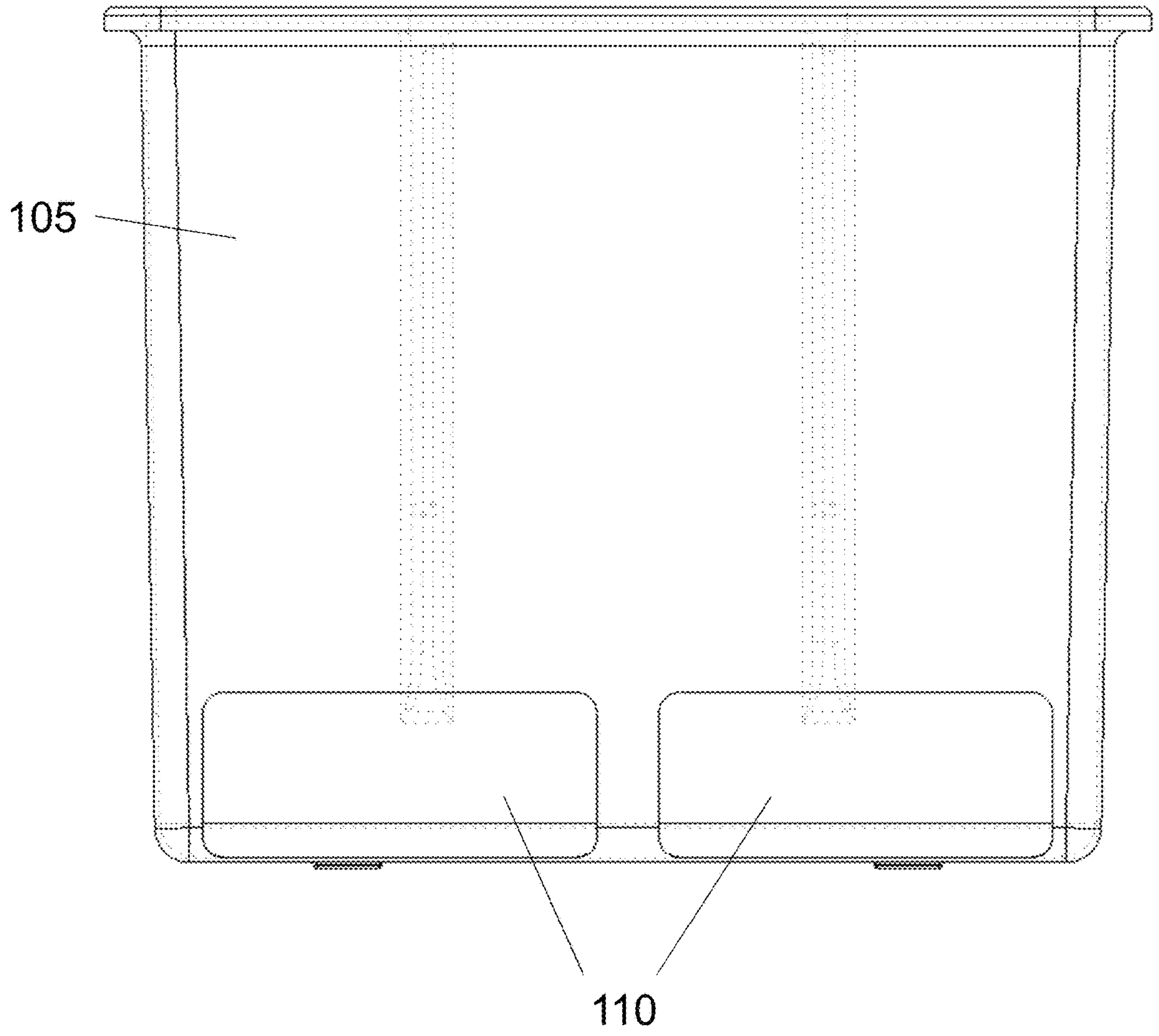
FIG. 11 is a front view of the platform of FIG. 10.
Figure 14:
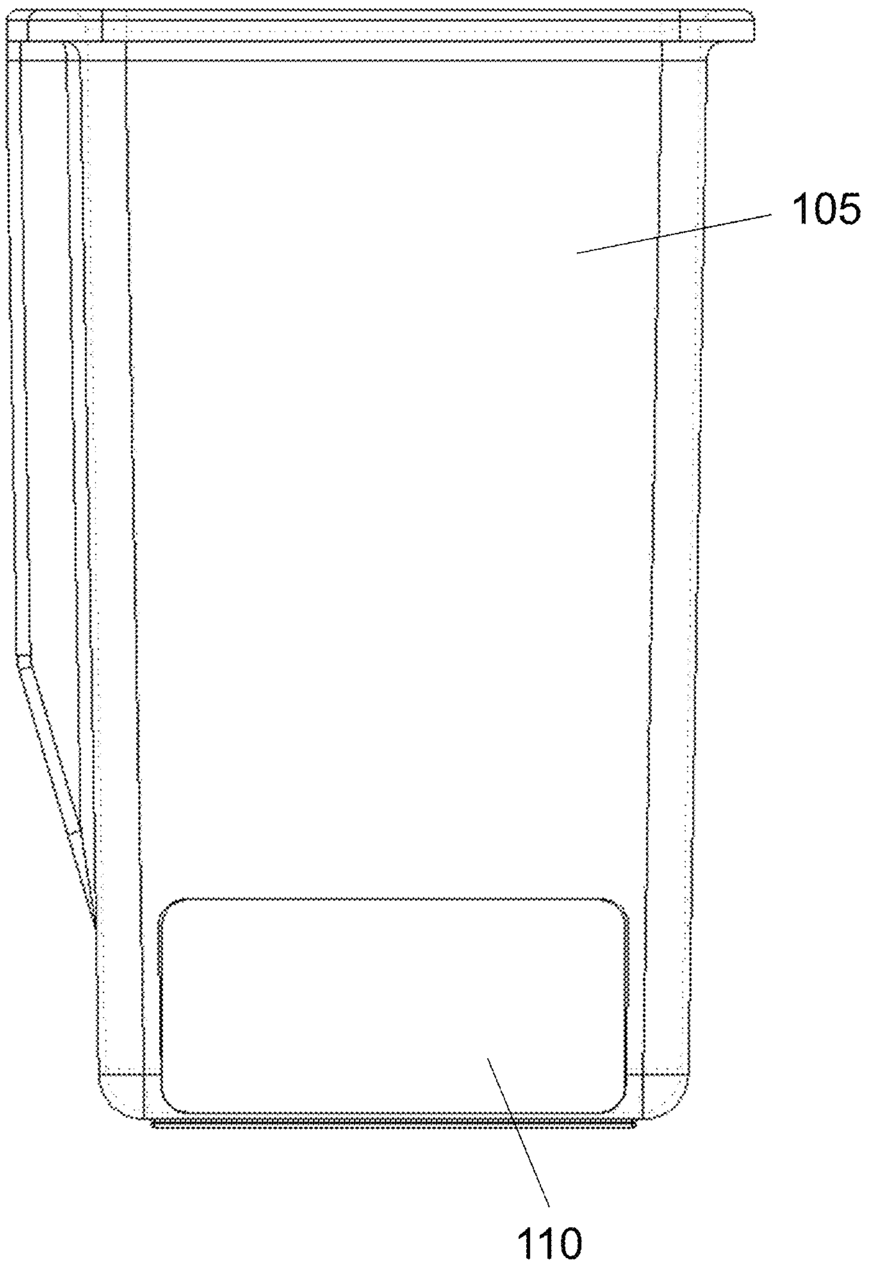
FIG. 14 illustrates a side view of a platform with a cutout for receiving a single toe space module according to the present invention.

FIGS. 10 and 11 illustrate perspective and side views, respectively, of the platform illustrated in FIG. 9 without modules installed, showing the cutouts 110 for receiving the modules.

Figure 15A:
FIGS. 15A-D illustrate a full-wrap toe space module.
Figure 15B:
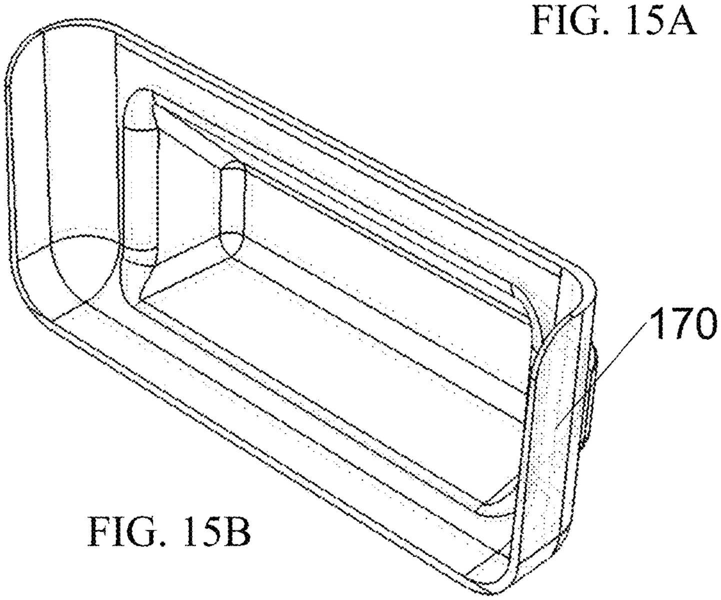
Figure 15C:
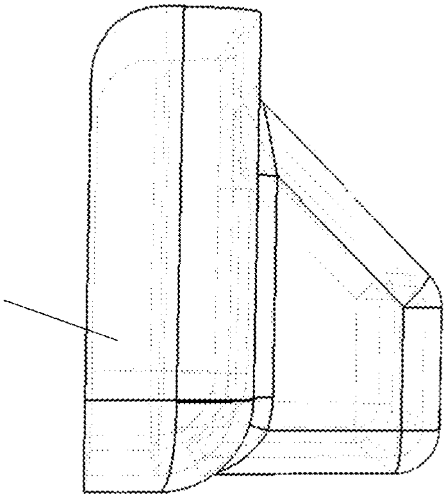
Figure 15D:
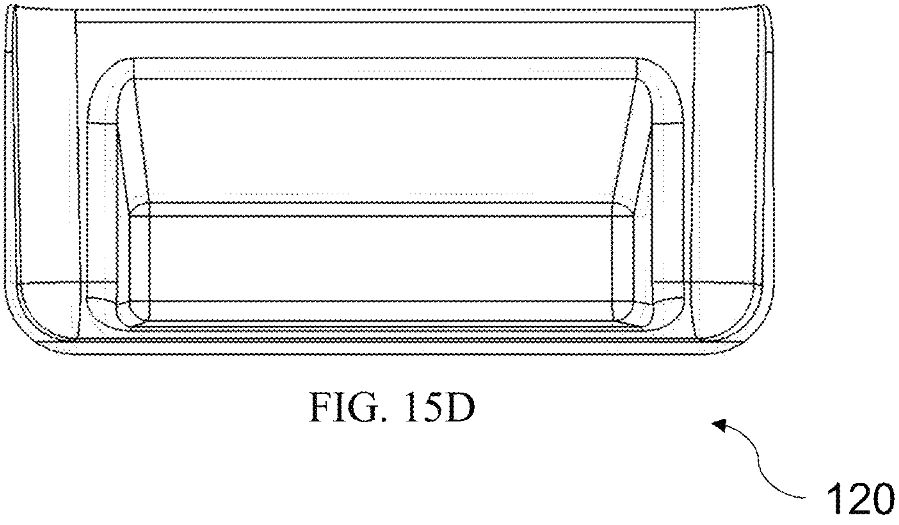

In another embodiment (FIGS. 15A-D), the tabs wrap fully around the adjacent sides and corners, thereby providing more load-bearing surface area that is under compression and shear stress. Full-wrap tabs are defined as those that extend beyond a corner to the adjacent wall. Toe space modules with full-wrap tabs 170 can be seen in FIGS. 15A-D and 16A-B. FIG. 15A is a top perspective view; FIG. 15B is a rear perspective view; FIG. 15C is a side perspective view; FIG. 15D is a front view.

Figure 16A:
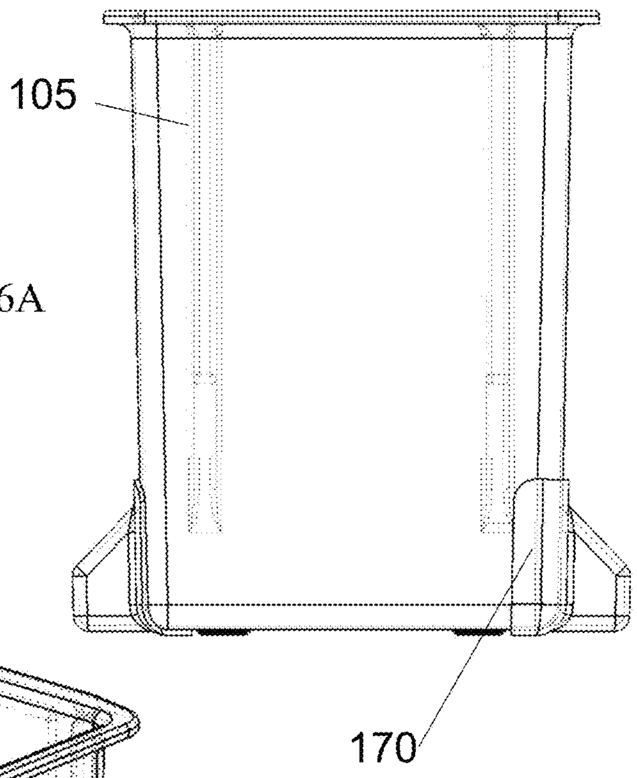
FIGS. 16A-B illustrate a half-wrap toe space module and a full-wrap toe space module installed on a platform.
Figure 16B:
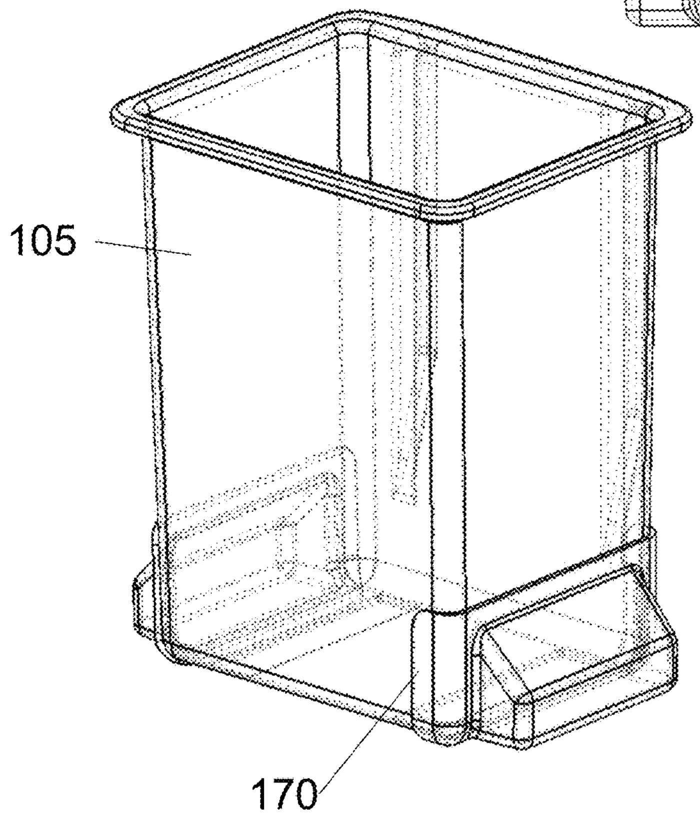

FIGS. 16A-B illustrate a toe space module with full-wrap tabs installed on a platform. FIG. 16A is a side view of the module. FIG. 16B is a perspective view.

Figure 17A:
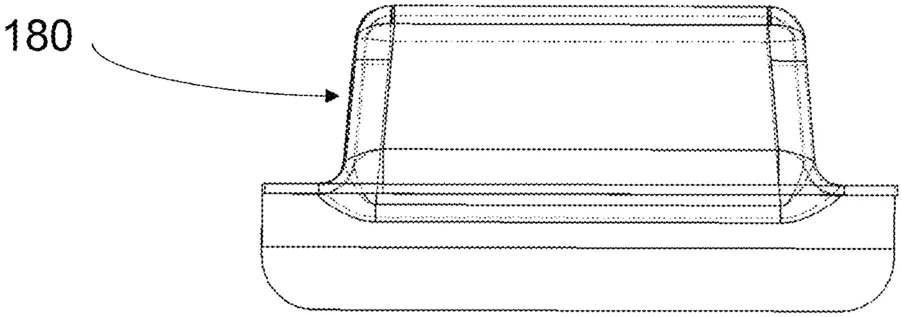
FIGS. 17A-D illustrate a toe space module with no side tabs.
Figure 17B:
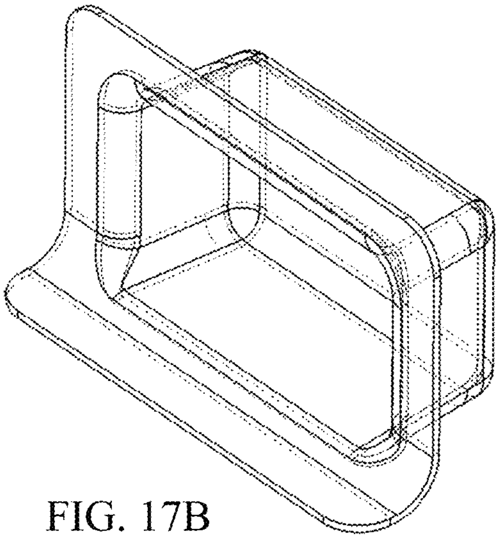
Figure 17C:
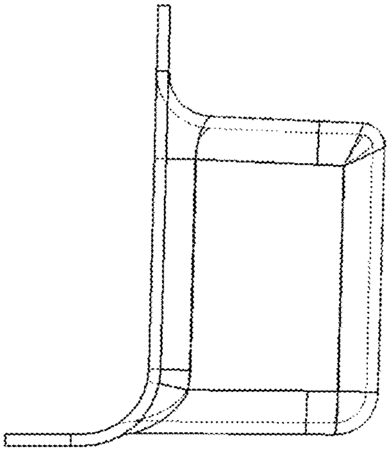
Figure 17D:
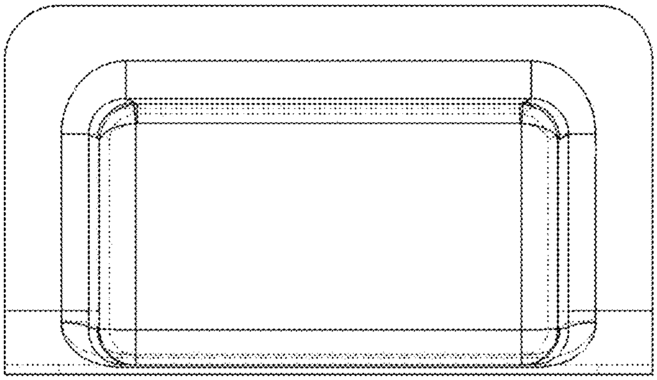
Figure 18A:
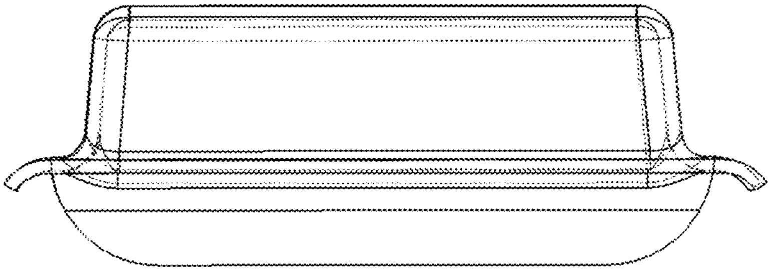
FIGS. 18A-D illustrate a toe space module according to the present invention that inserts from the interior of the platform.
Figure 18B:
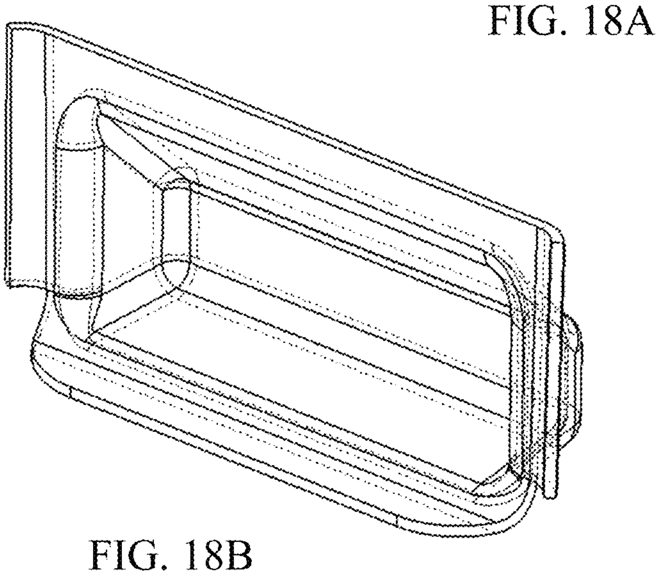
Figure 18C:
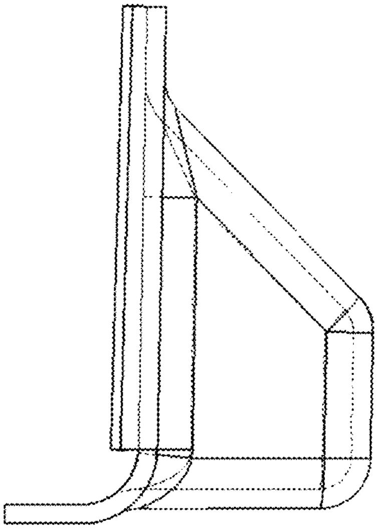
Figure 18D:
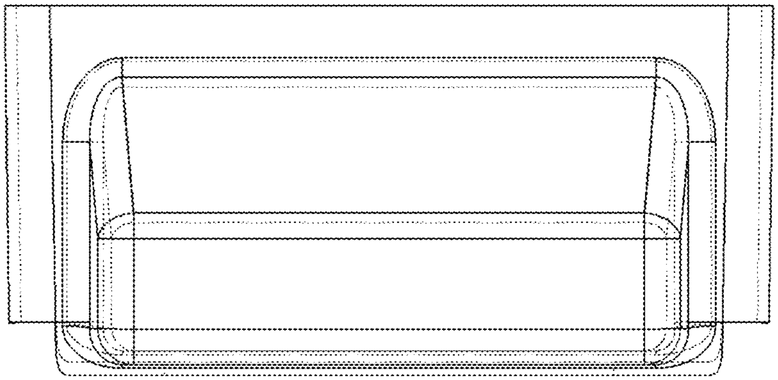

The present invention also provides for toe space modules with no tabs. In certain cases the side tabs are not required, and so are not provided in order to reduce weight and simplify manufacturing. FIGS. 17A-D illustrate a toe space module with no side tabs. FIG. 17A is a top perspective view; FIG. 17B is a rear perspective view; FIG. 17C is a side perspective view; and FIG. 17D is a front view.

Compression Toe Space Module

The present invention provides for a toe space module configured to provide a contact surface between the module and the platform that is under compression when a load is applied, as described in U.S. patent application Ser. No. 15/619,174 filed Jun. 9, 2017 for a Step System of Elevating Platform, which is incorporated herein by reference in its entirety. Advantageously, the toe space module is configured to be inserted from the interior of the platform and/or from the exterior of the platform depending on the structure of the toe space module and the structure of the platform. Inserting the toe space module from the exterior of the platform advantageously provides for ease of installation, as the installer does not need to enter the platform to install the toe space module.

Figure 31A:
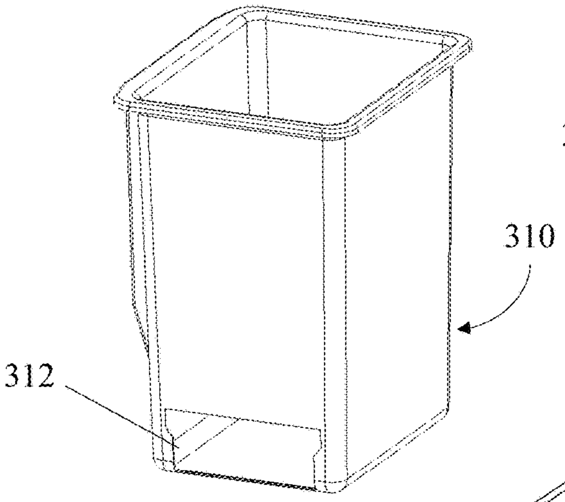
FIG. 31A is a side perspective view of a platform for which a toe space module inserts from the exterior of the platform.
Figure 31B:
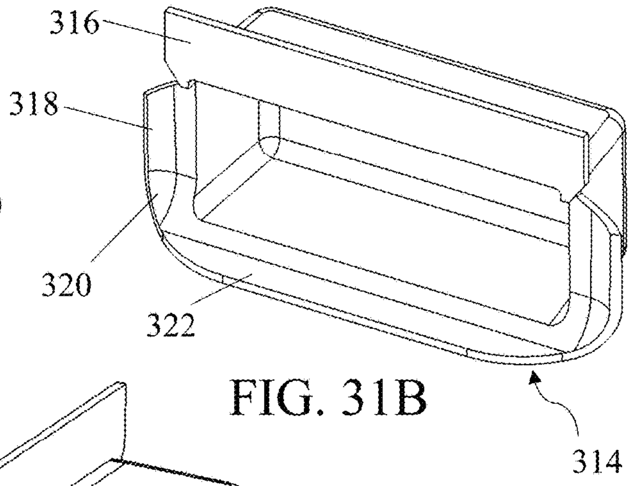
FIG. 31B is a side view of a toe space module that is insertable into the platform illustrated in FIG. 31A.
Figure 31C:
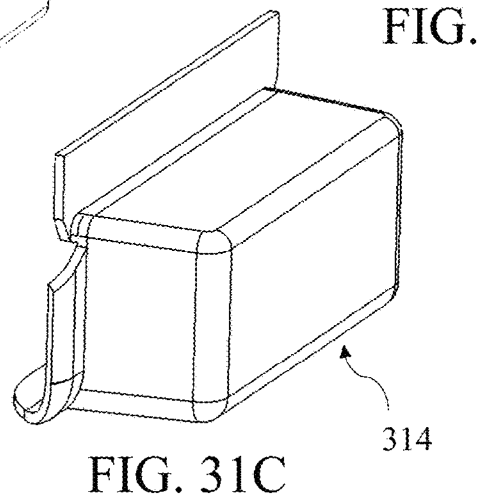
FIG. 31C is a rear view of a toe space module that is insertable into the platform illustrated in FIG. 31A.
Figure 31D:
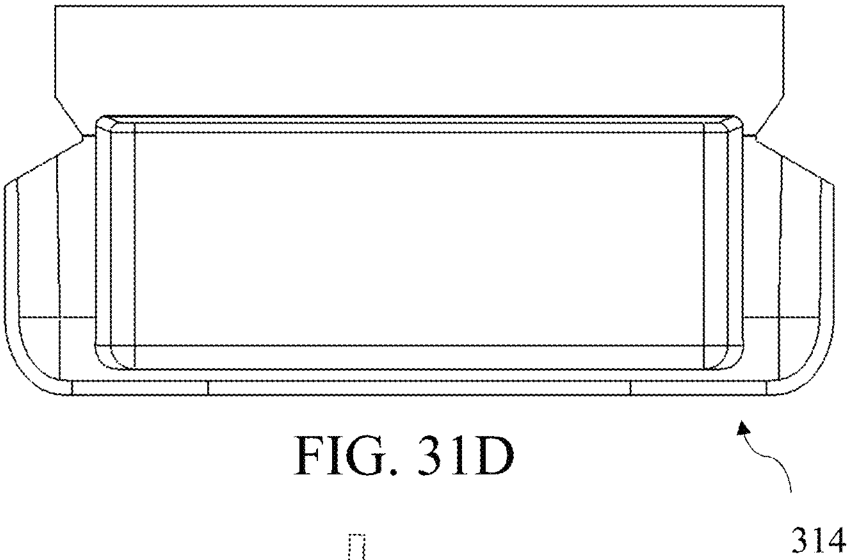
FIG. 31D is a front view of a toe space module that is insertable into the platform illustrated in FIG. 31A.
Figure 31E:
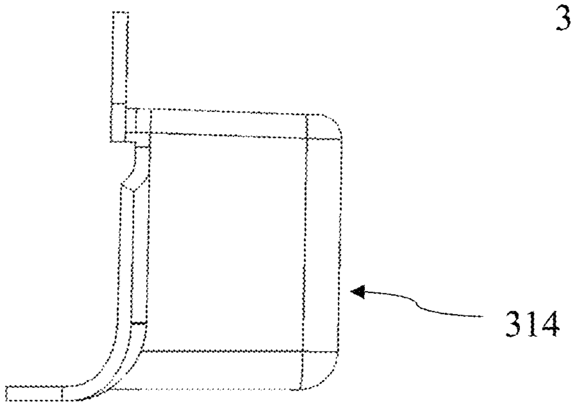
FIG. 31E is a side view of a toe space module that is insertable into the platform illustrated in FIG. 31A
Figure 32:
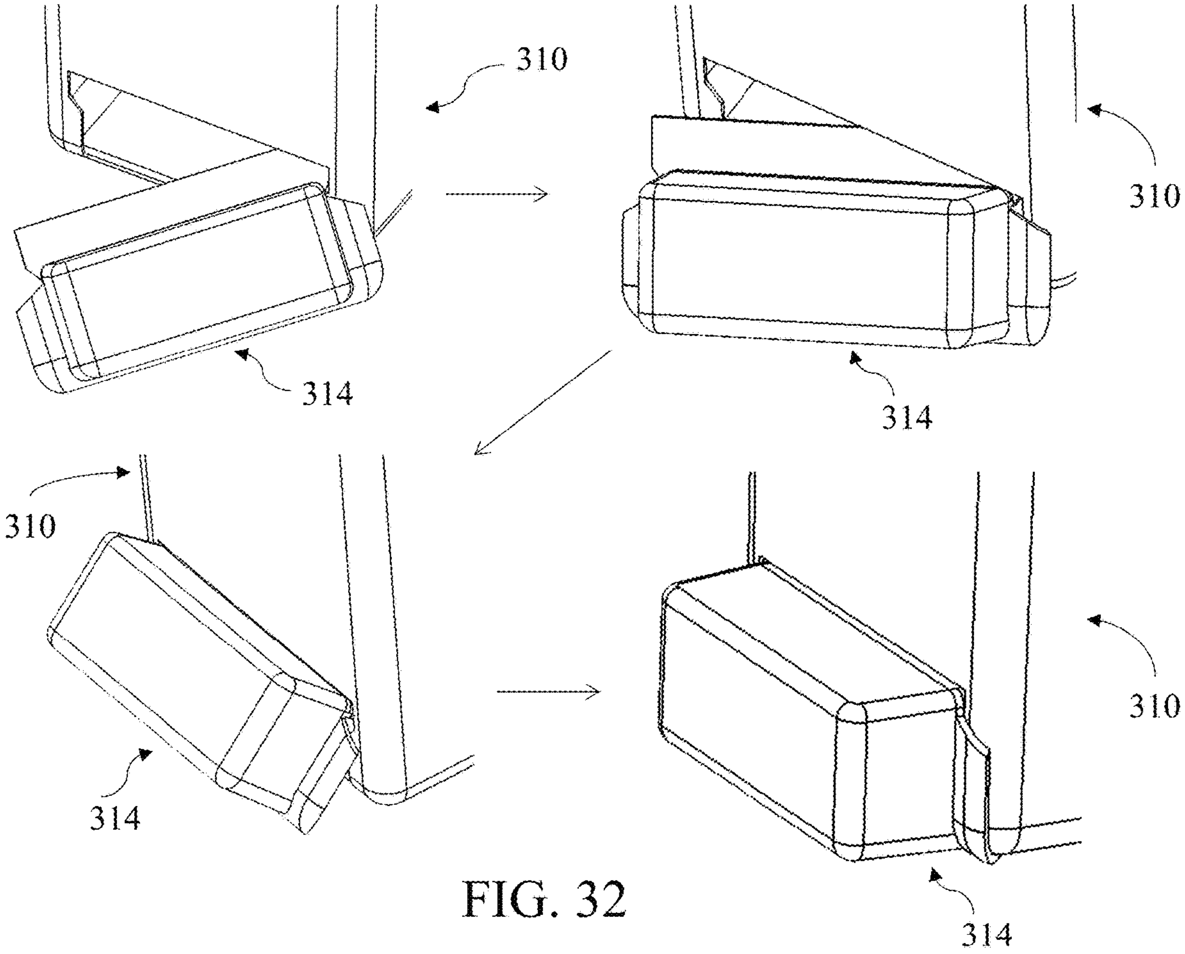
FIG. 32 illustrates an installation process of the toe space module illustrated in FIGS. 31B-31E into the platform illustrated in FIG. 31A.
Figure 33A:
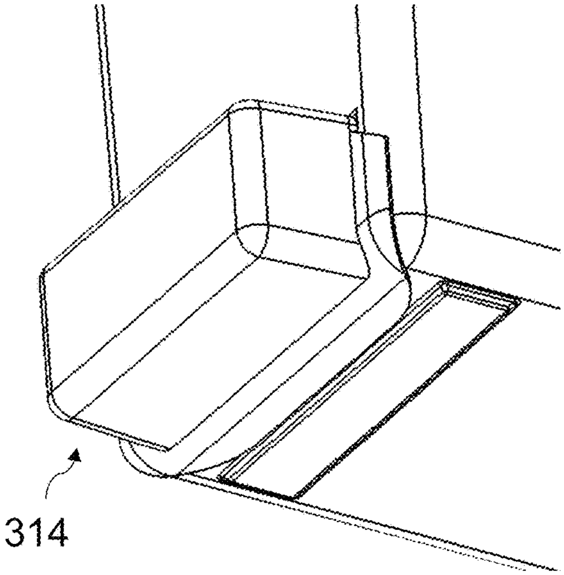
FIG. 33A is a bottom perspective view of the toe space module illustrated in FIGS. 31B-E installed in the platform illustrated in FIG. 31A.
Figure 33B:
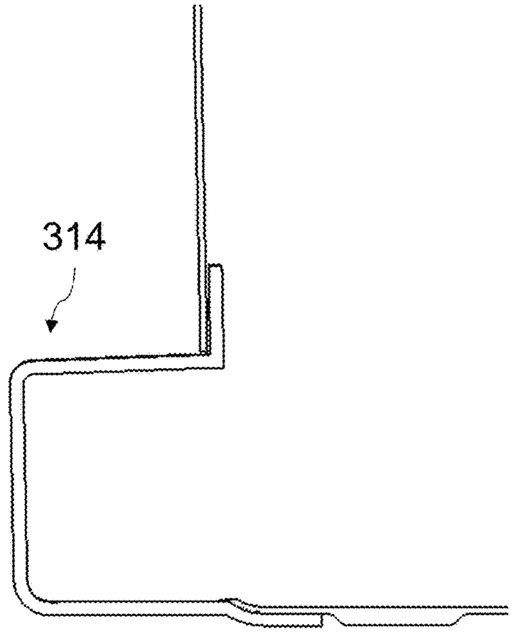
FIG. 33B is a side view of the toe space module illustrated in FIGS. 31B-E installed in the platform illustrated in FIG. 31A.

FIG. 31A illustrates a platform for which a toe space module inserts from the exterior of the platform 310. The platform 310 includes an opening 312 through which the toe space module is inserted. FIGS. 31B-E illustrate the toe space module 314 that is insertable into the platform 310. The toe space module includes a top tab 316, an upper side tab 318, a lower side tab 320, and a bottom tab 322. In an alternative embodiment, the upper side tab 318 and lower side tab 320 are one integrally formed side tab. Similarly, the bottom tab 322 includes multiple components joined together to form the tab or is alternatively integrally formed. The top tab 316 is notched or tapered so as to fit into the opening 312 of the platform 310. FIG. 32 illustrates a process for installing the toe space module 314 into the platform 310. One corner of the toe space module 314 is inserted into the opening 312 of the platform 310 and the toe space module 314 is rotated such that the top portion of the flange or the top tab is inserted into the platform. The bottom portion of the toe space module 314 is then pushed inward so as to cause the bottom portion of the flange or the bottom tab to contact the bottom of the platform and the body of the toe space module to be substantially parallel with the body of the platform. The toe space module is also operable to insert and lock into the platform via methods described in U.S. patent application Ser. No. 15/619,174 filed Jun. 9, 2017 for a Step System of Elevating Platform, which is incorporated herein by reference in its entirety. FIGS. 33A-B show a bottom perspective view and a side view of the assembled toe space module 314 and platform 310.

Figure 34A:
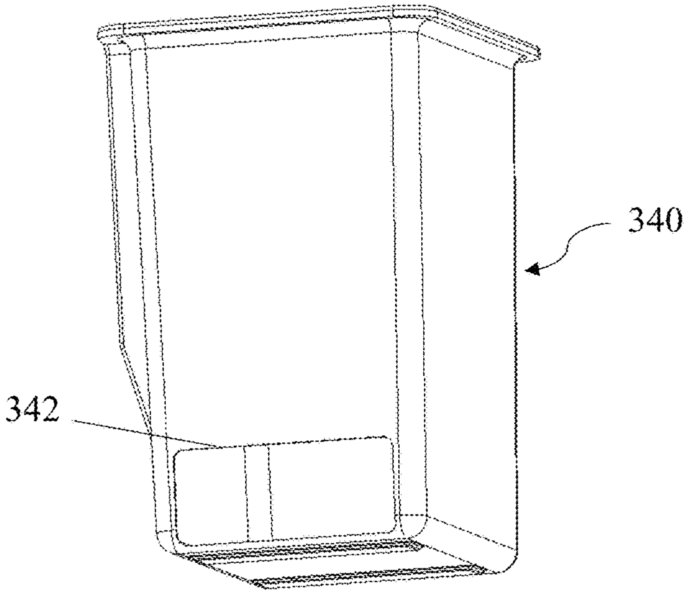
FIG. 34A is a side perspective view of a platform for which a toe space module inserts from the interior of the platform.
Figure 34B:
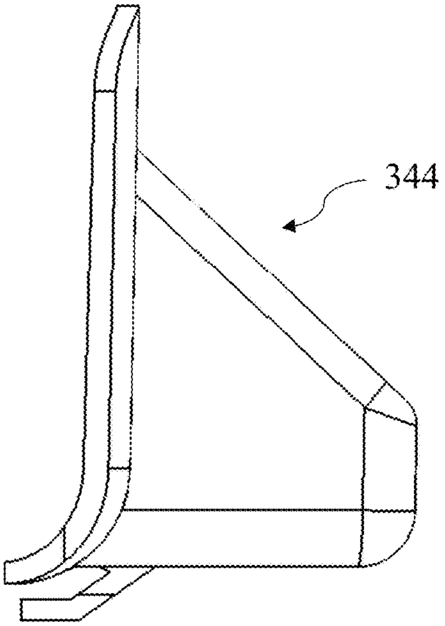
FIG. 34B is a side view of a toe space module that is insertable into the platform illustrated in FIG. 34A.
Figure 34C:
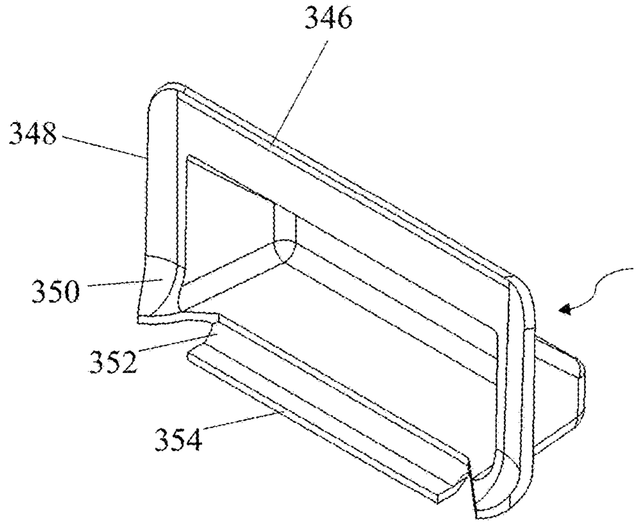
FIG. 34C is a rear perspective view of a toe space module that is insertable into the platform illustrated in FIG. 34A.
Figure 34D:
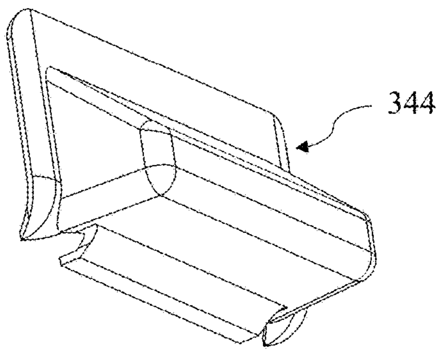
FIG. 34D is a front perspective view of a toe space module that is insertable into the platform illustrated in FIG. 34A.

FIG. 34A illustrates a platform for which a toe space module inserts from the exterior of the platform 340. The platform 340 includes an opening 342 through which the toe space module is inserted. FIGS. 34B-D illustrate the toe space module 344 that is insertable into the platform 340. The toe space module includes a top tab 346, an upper side tab 348, a lower side tab 350, and a bottom tab 352 including a supplemental bottom tab 354. In an alternative embodiment, the upper side tab 348 and lower side tab 350 are one integrally formed side tab. Similarly, the bottom tab 352 and/or supplemental bottom tab 354 include multiple components joined together to form the tab or are alternatively integrally formed. The bottom tab 352 is preferably curved or shaped so as to conform to an edge of the platform or a surface between a wall of the platform and the bottom of the platform. Similarly, the lower side tab 350 and at least a portion of the upper side tab 348 are curved so as to conform to an edge of the platform or a surface between a wall of the platform and the bottom of the platform. Notably, the top tab 346 conforms to an internal surface of the wall of the platform and the bottom tab 352 and/or supplemental bottom tab 354 conform to the bottom of the platform.

Figure 35:
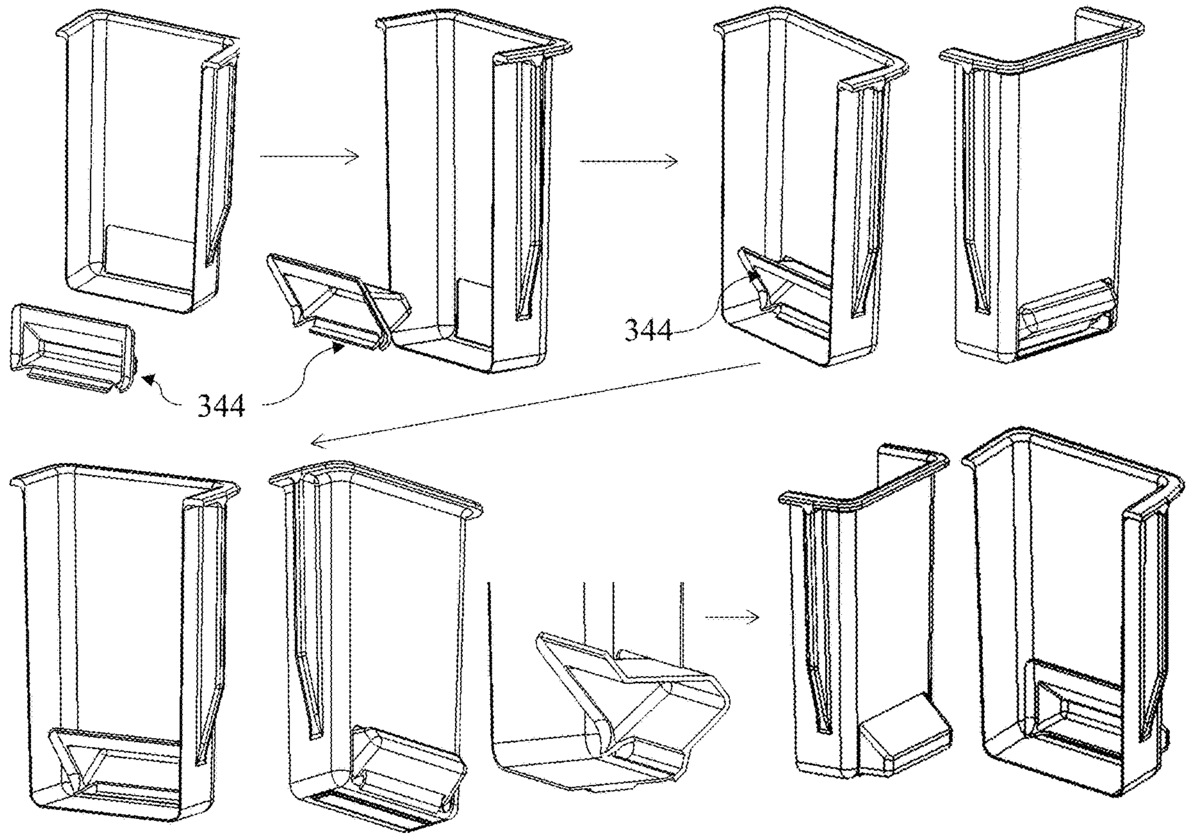
FIG. 35 illustrates the installation process of the toe space module illustrated in FIGS. 34B-34D into the platform illustrated in FIG. 34A.
Figure 36A:
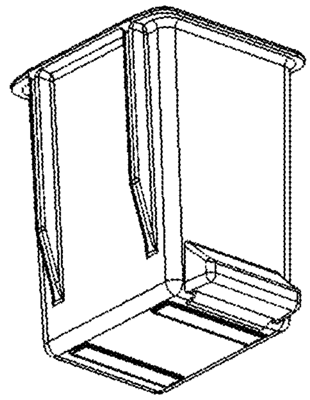
FIG. 36A is a bottom perspective view of the toe space module illustrated in FIGS. 34B-D installed in the platform illustrated in FIG. 34A.
Figure 36B:
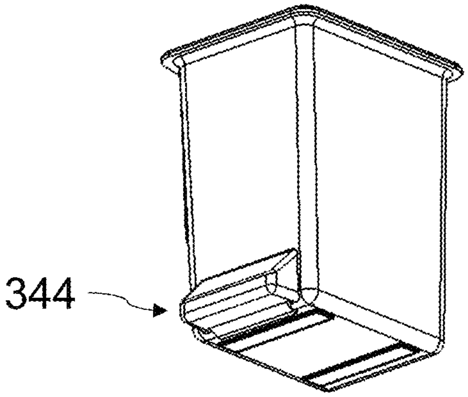
FIG. 36B is another bottom perspective view of the toe space module illustrated in FIGS. 34B-D installed in the platform illustrated in FIG. 34A.
Figure 36C:
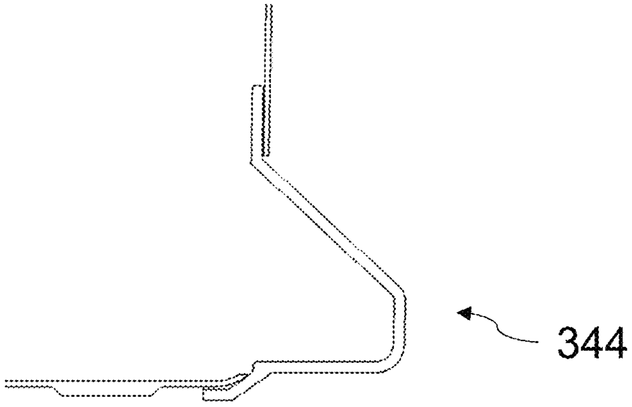
FIG. 36C is a side view of the toe space module illustrated in FIGS. 34B-D installed in the platform illustrated in FIG. 34A.
Figure 36D:
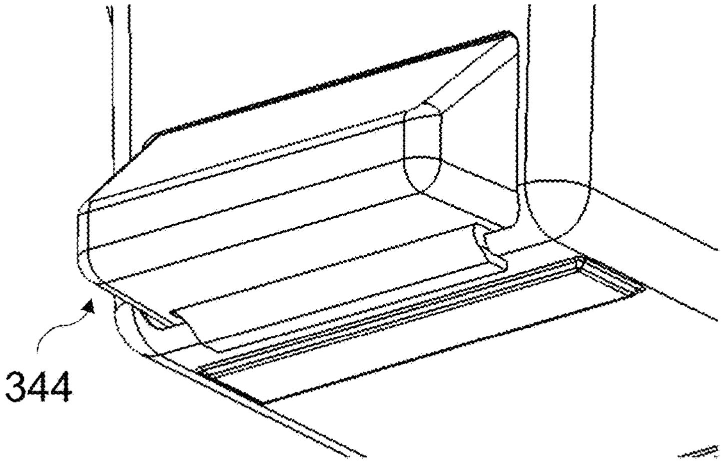
FIG. 36D is a close up bottom perspective view of the toe space module illustrated in FIGS. 34B-D installed in the platform illustrated in FIG. 34A.
Figure 36E:
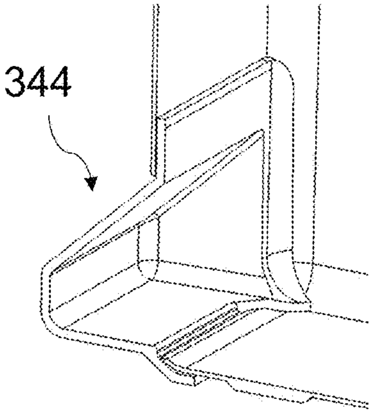
FIG. 36E is another close up bottom perspective view of the toe space module illustrated in FIGS. 34B-D installed in the platform illustrated in FIG. 34A.
Figure 37A:
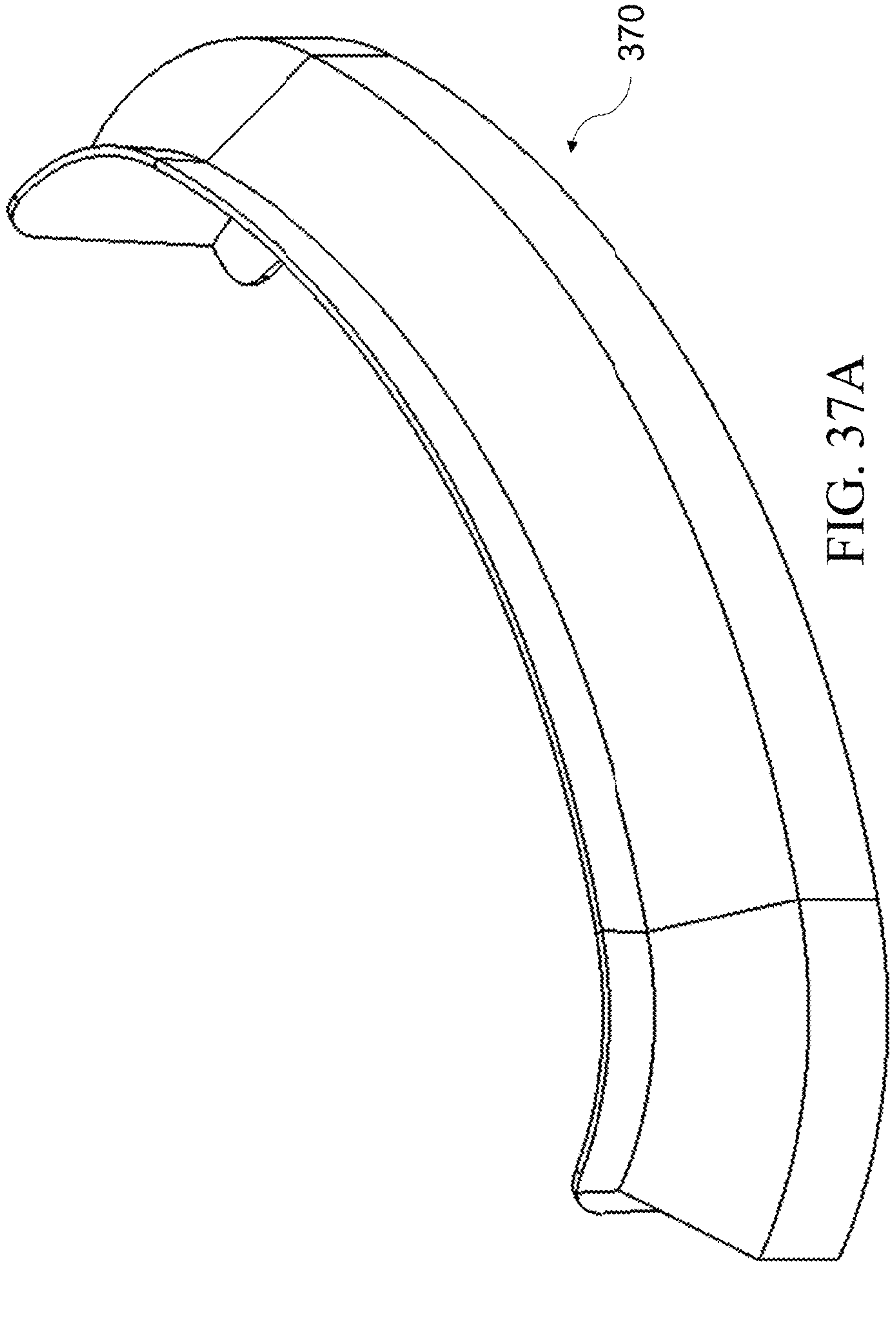
FIG. 37A is a front perspective view of a curved toe space module that attaches to a curved wall of a D-shaped platform.
Figure 37B:
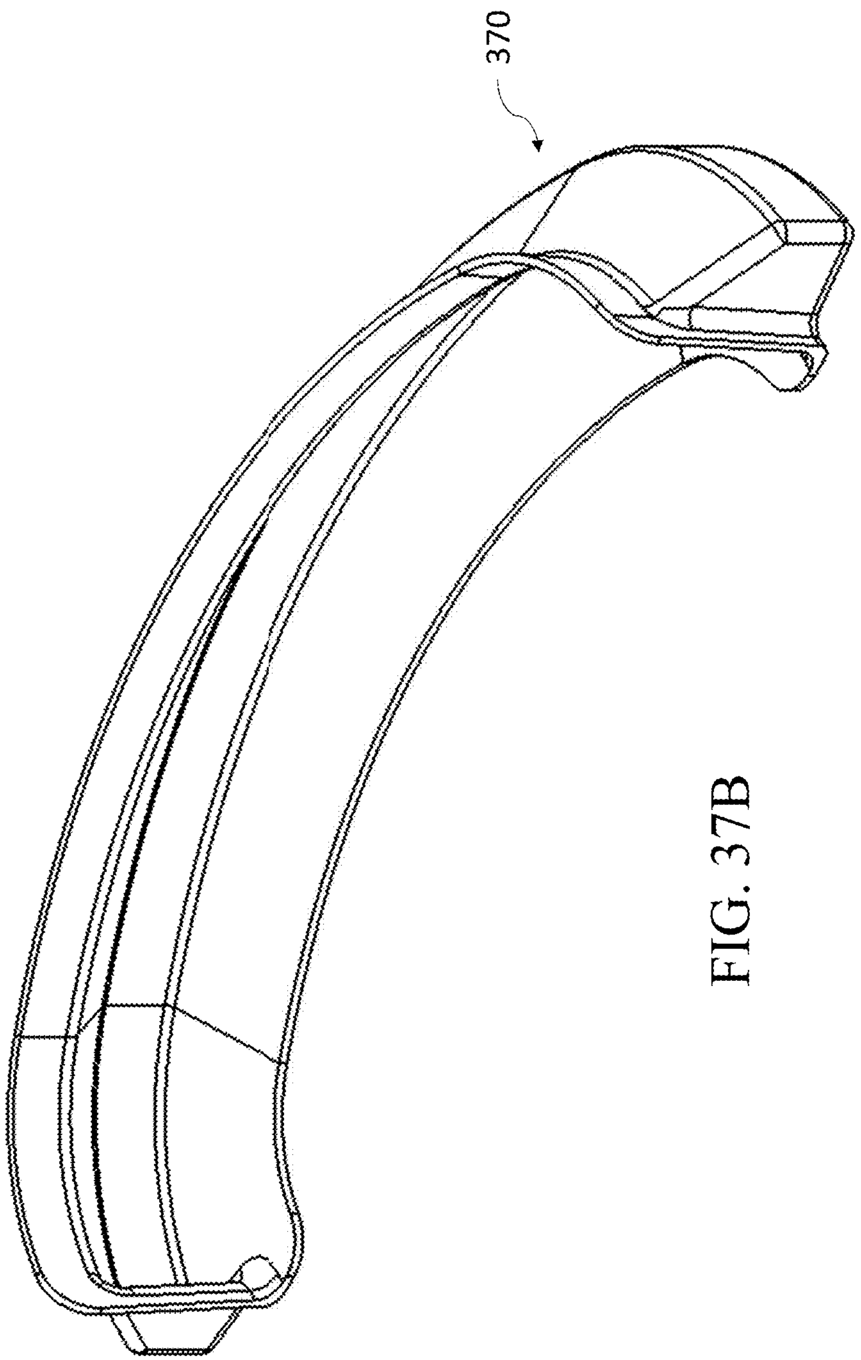
FIG. 37B is a rear perspective view of a curved toe space module that attaches to a curved wall of a D-shaped platform.
Figure 37C:
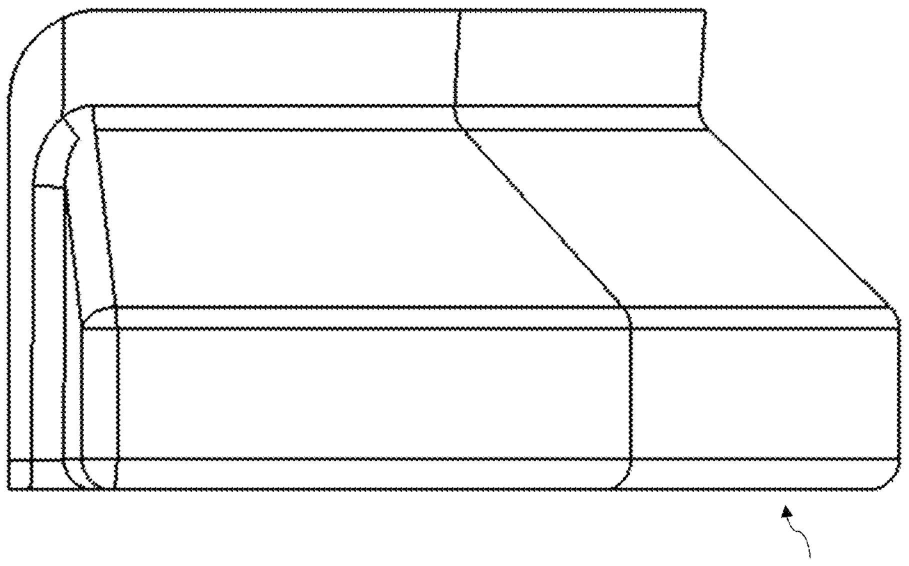
FIG. 37C is a side view of a curved toe space module that attaches to a curved wall of a D-shaped platform.
Figure 37D:
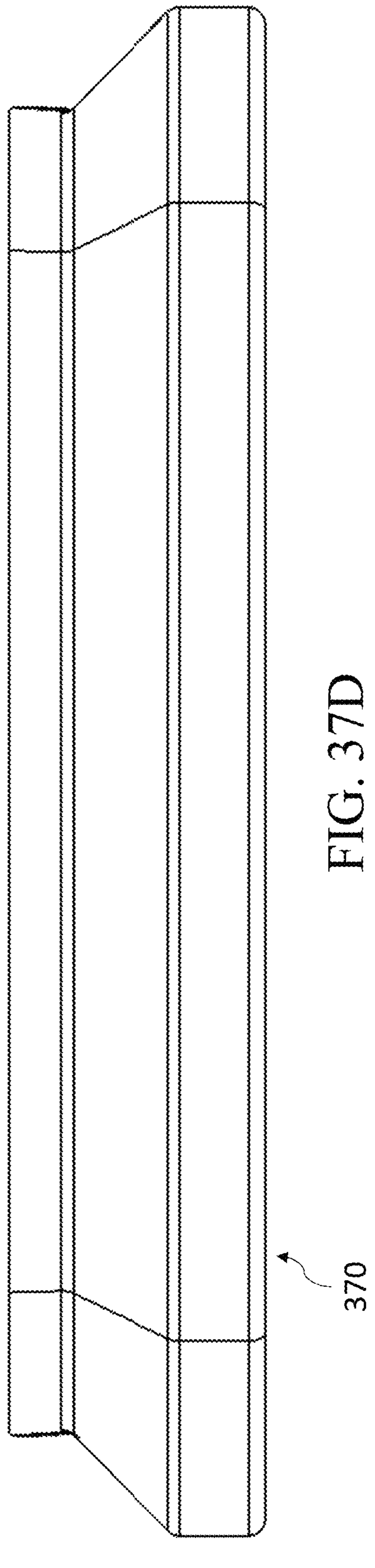
FIG. 37D is a front view of a curved toe space module that attaches to a curved wall of a D-shaped platform.
Figure 37E:
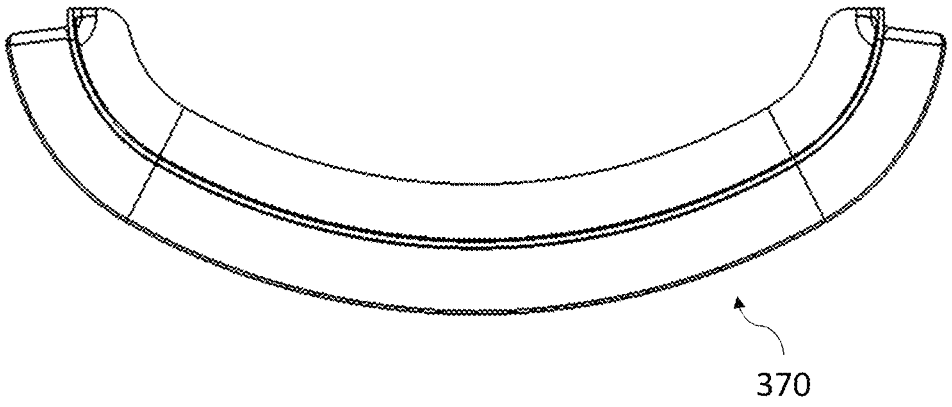
FIG. 37E is a top view of a curved toe space module that attaches to a curved wall of a D-shaped platform.
Figure 37F:
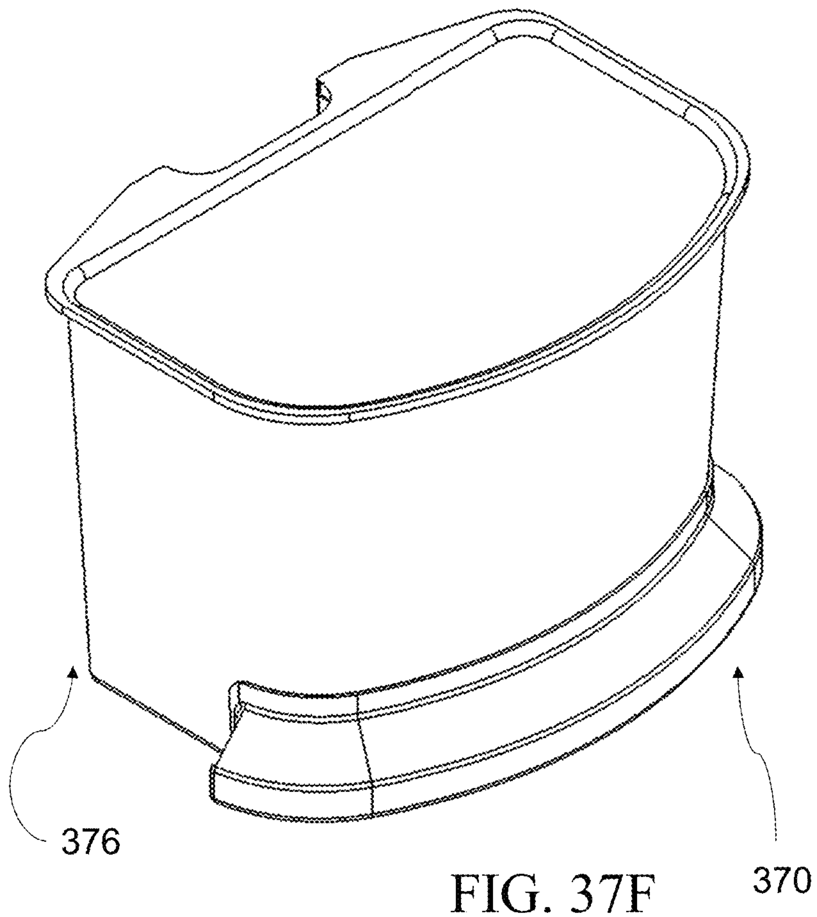
FIG. 37F is a top perspective view of a curved toe space module attached to a curved wall of a D-shaped platform.
Figure 37G:
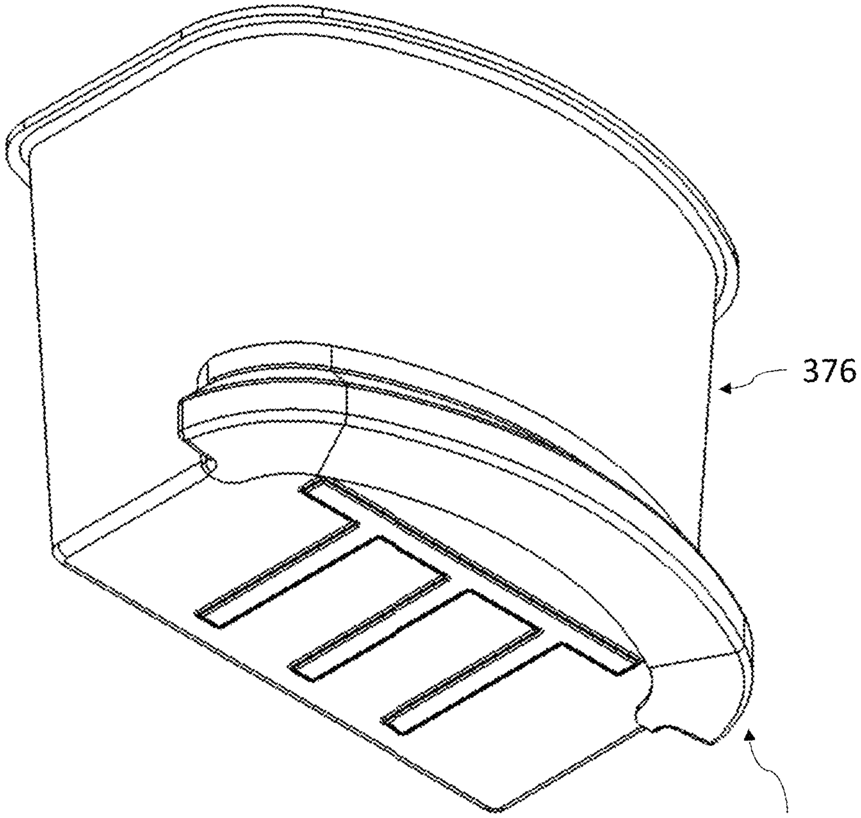
FIG. 37G is a bottom perspective view of a curved toe space module attached to a curved wall of a D-shaped platform.
Figure 37H:
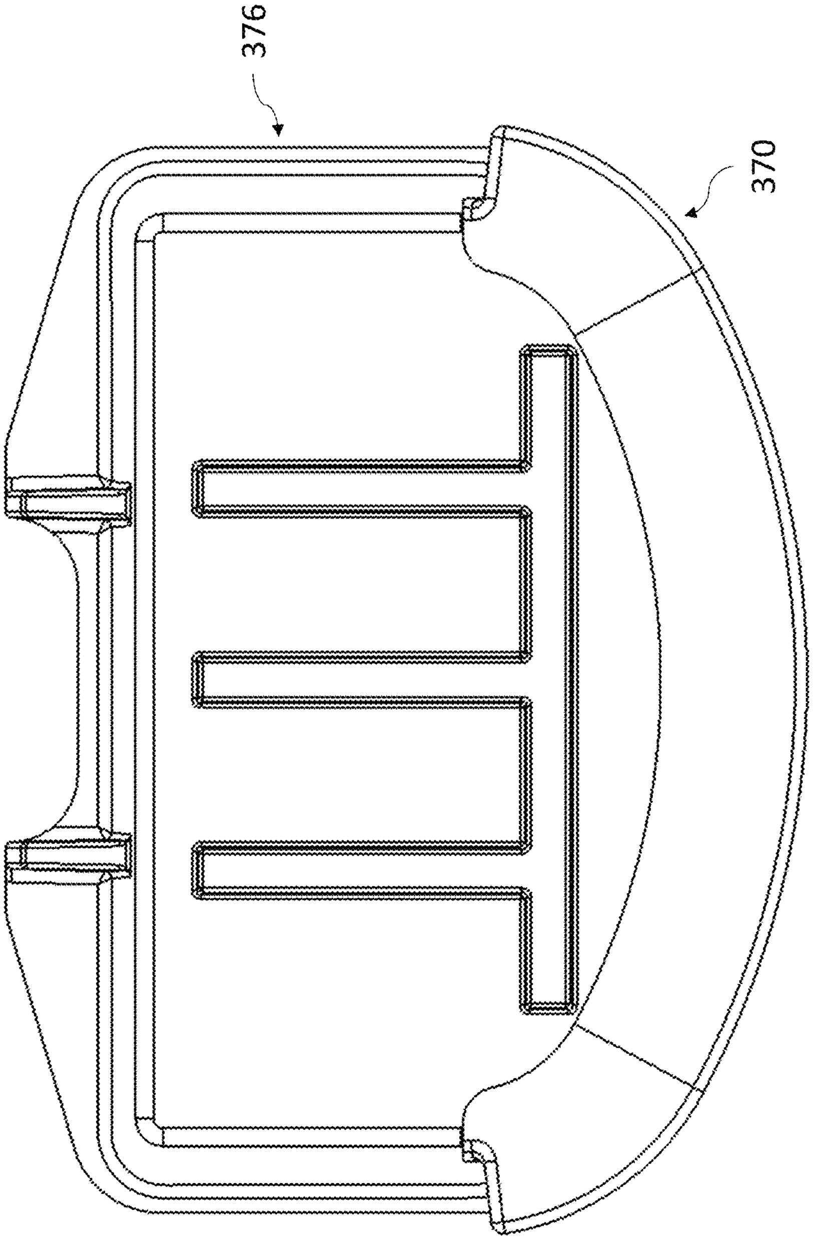
FIG. 37H is a top view of a curved toe space module attached to a curved wall of a D-shaped platform.
Figure 37I:
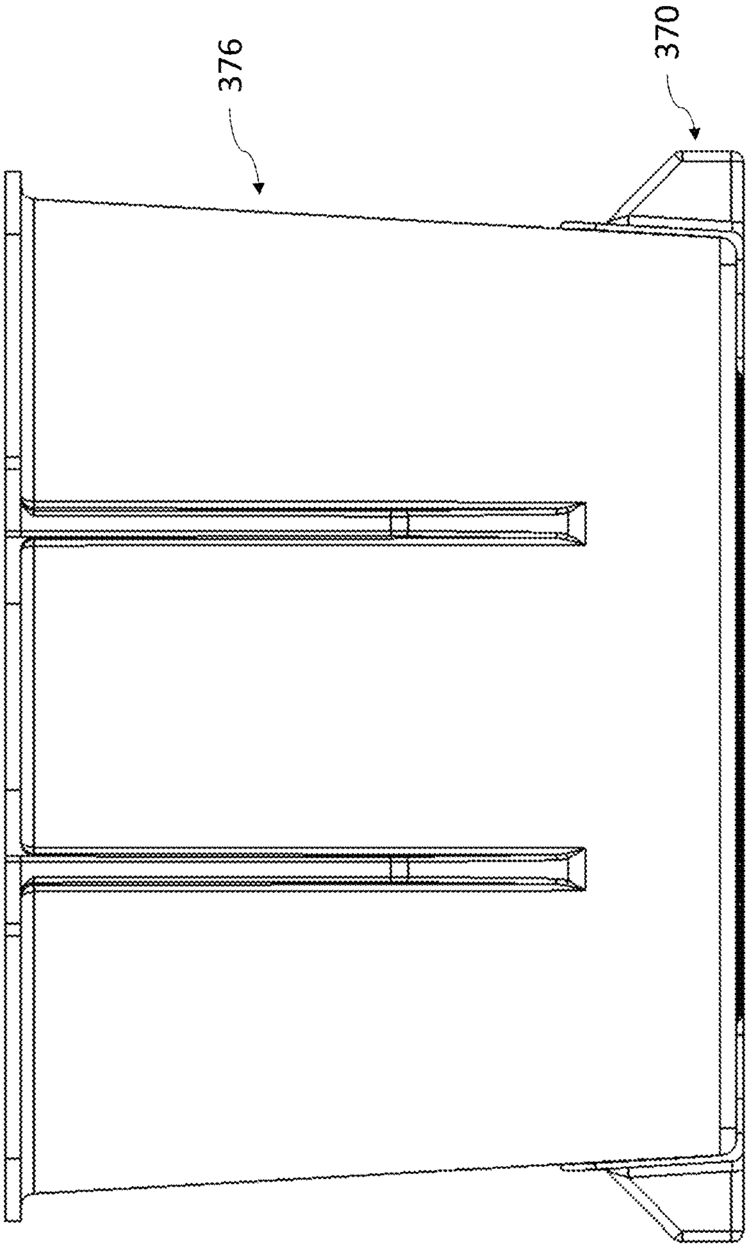
FIG. 37I is a rear view of a curved toe space module attached to a curved wall of a D-shaped platform.
Figure 37J:
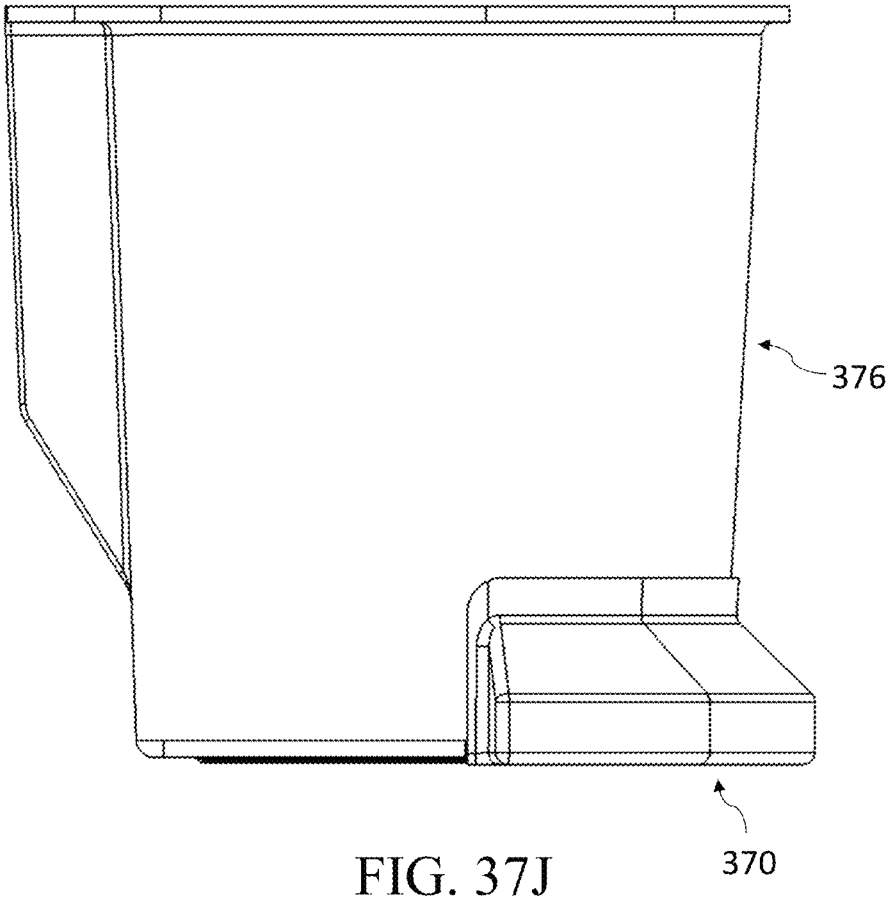
FIG. 37J is a side view of a curved toe space module attached to a curved wall of a D-shaped platform.
Figure 37K:
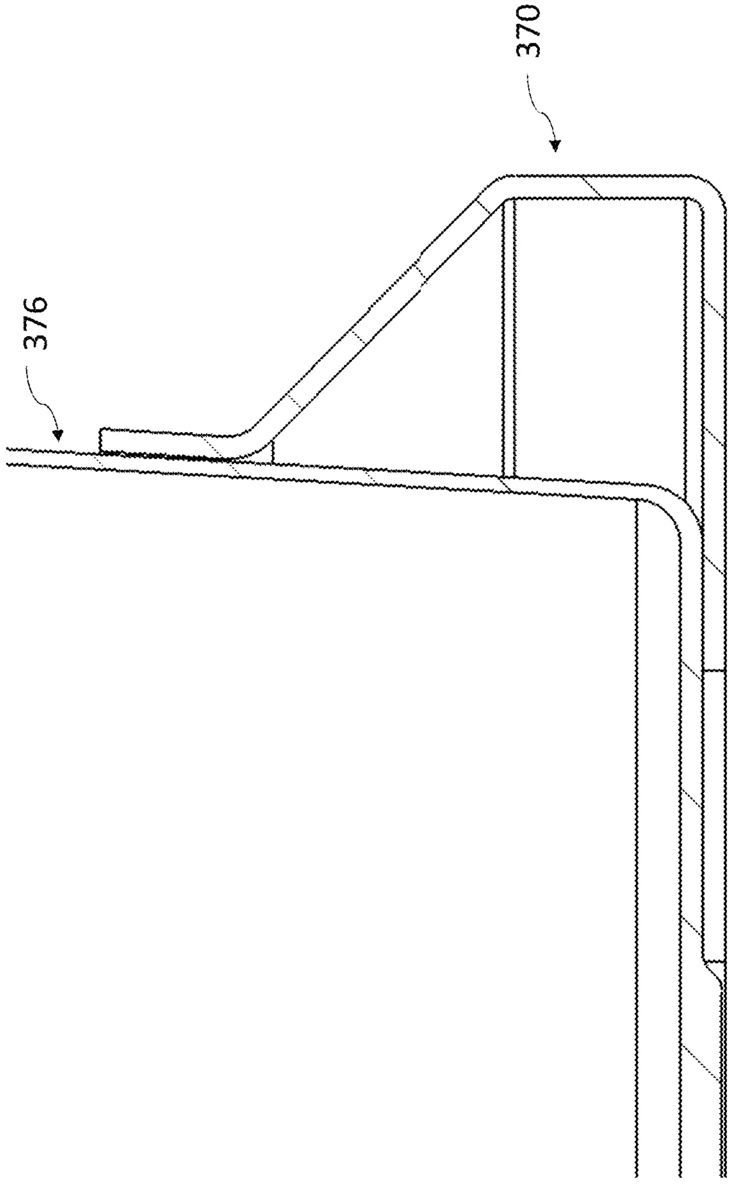
FIG. 37K is a side transparent view of a curved toe space module attached to a curved wall of a D-shaped platform.
Figure 38A:
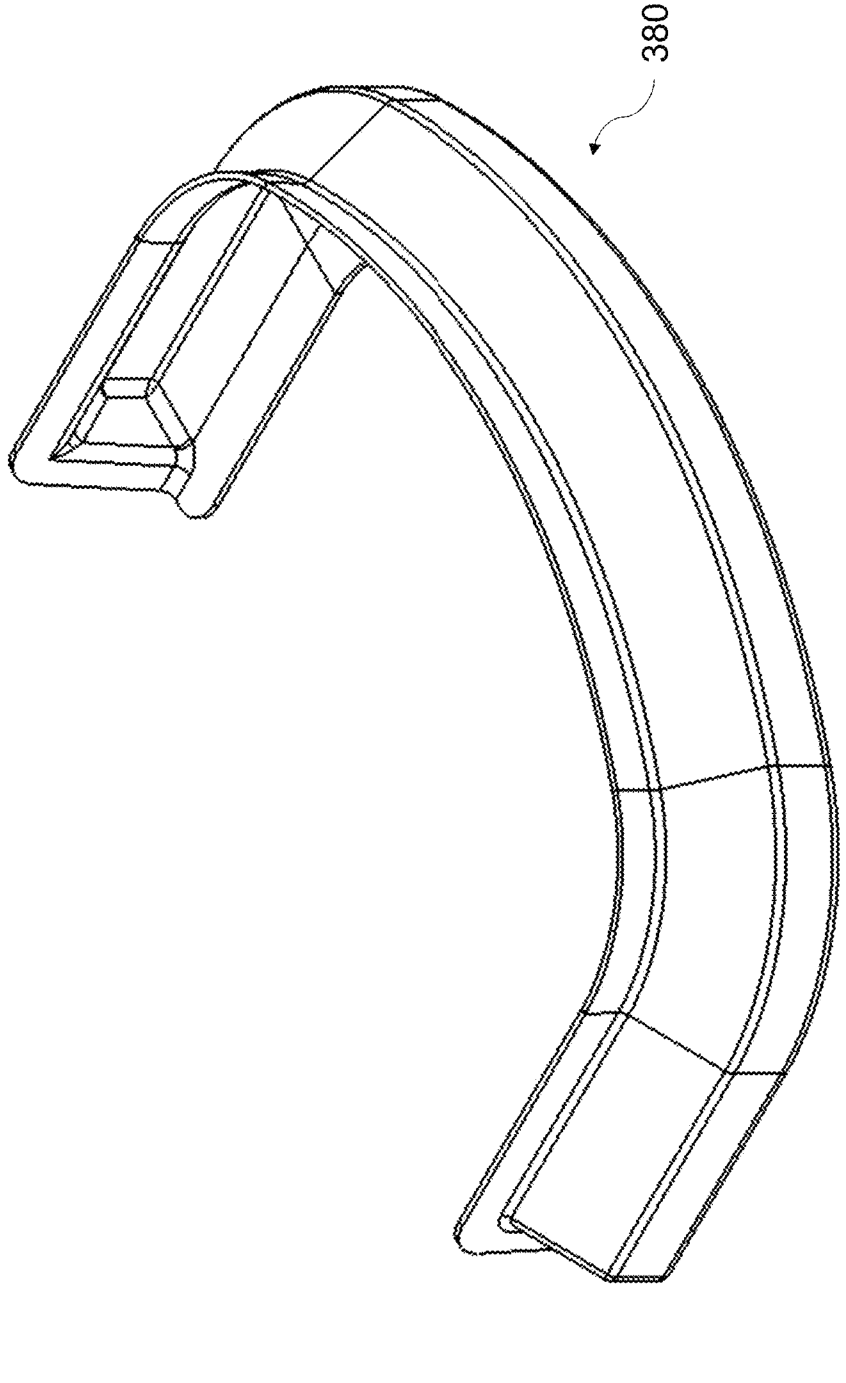
FIG. 38A is a front perspective view of a curved toe space module with an extended curve that attaches to a curved wall of a D-shaped platform.
Figure 38B:
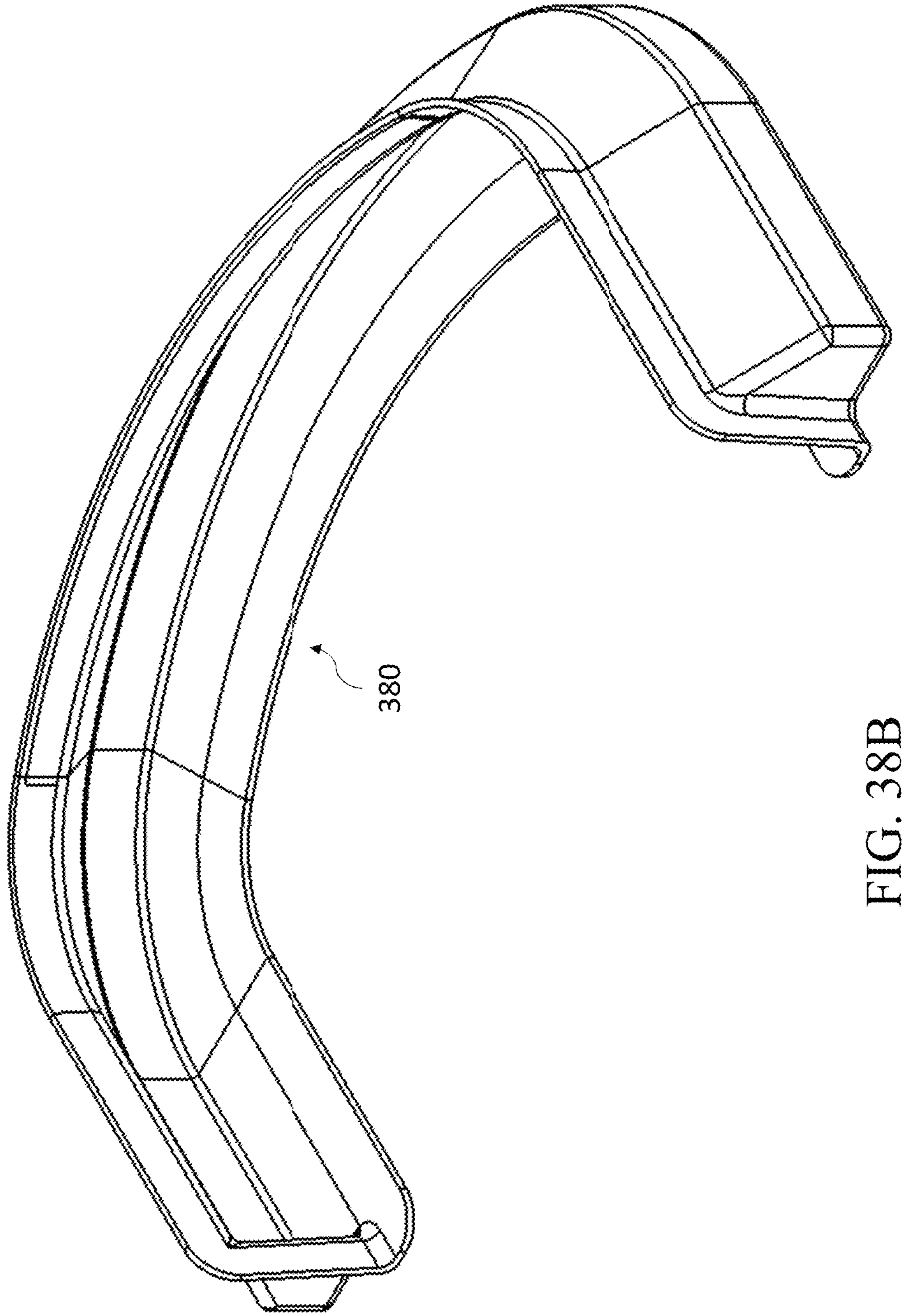
FIG. 38B is a rear perspective view of a curved toe space module with an extended curve that attaches to a curved wall of a D-shaped platform.
Figure 38C:
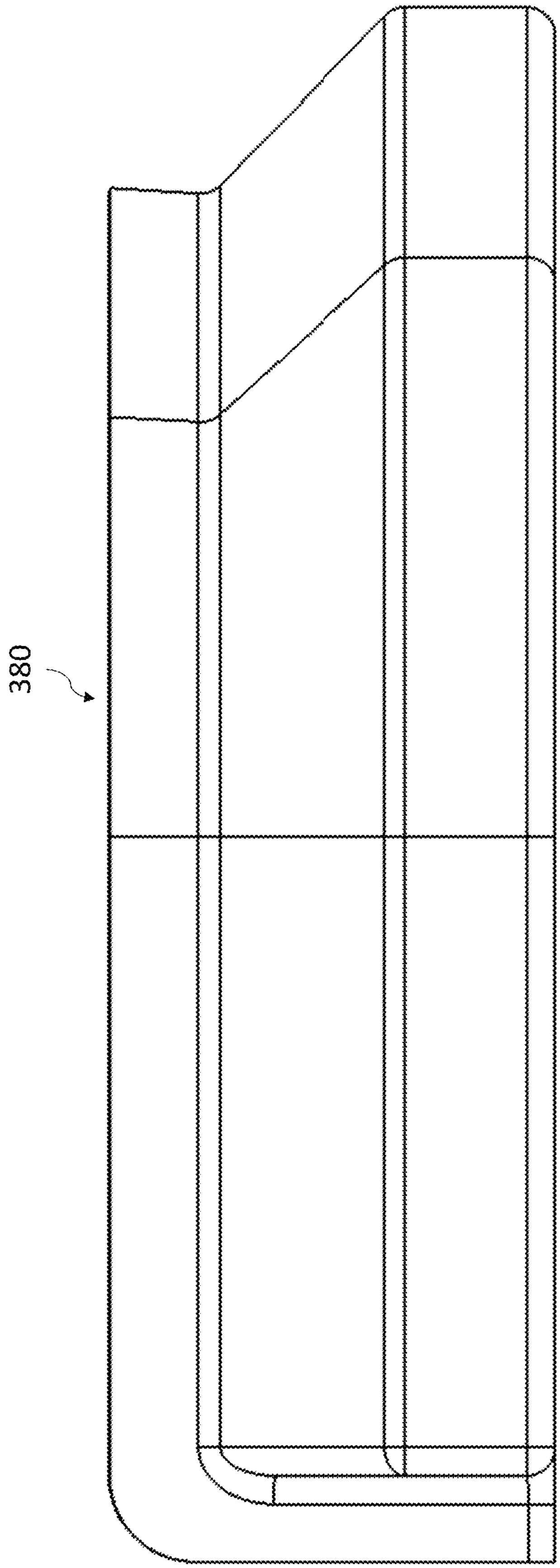
FIG. 38C is a side view of a curved toe space module with an extended curve that attaches to a curved wall of a D-shaped platform.
Figure 38D:
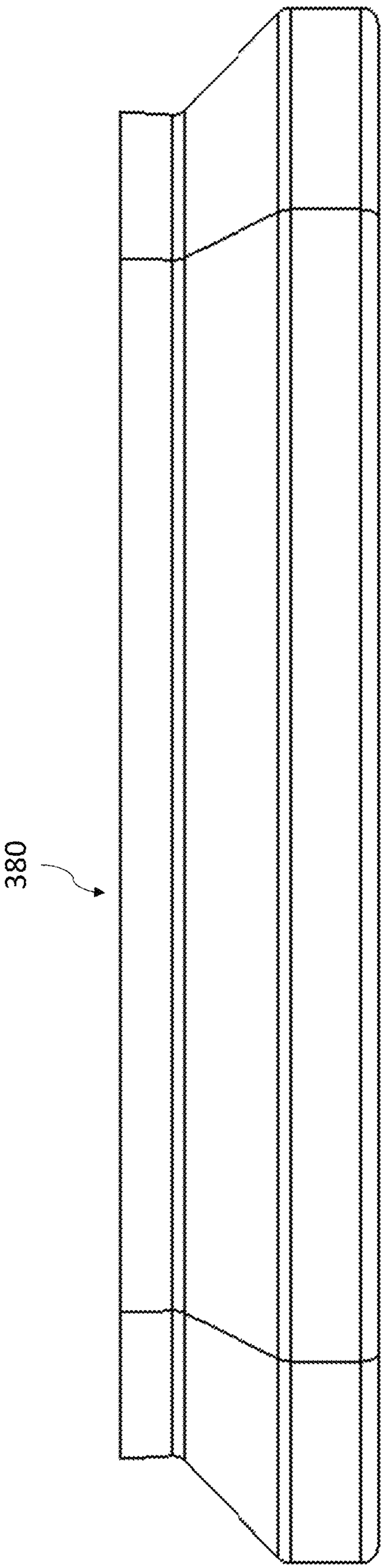
FIG. 38D is a front view of a curved toe space module with an extended curve that attaches to a curved wall of a D-shaped platform.
Figure 38E:
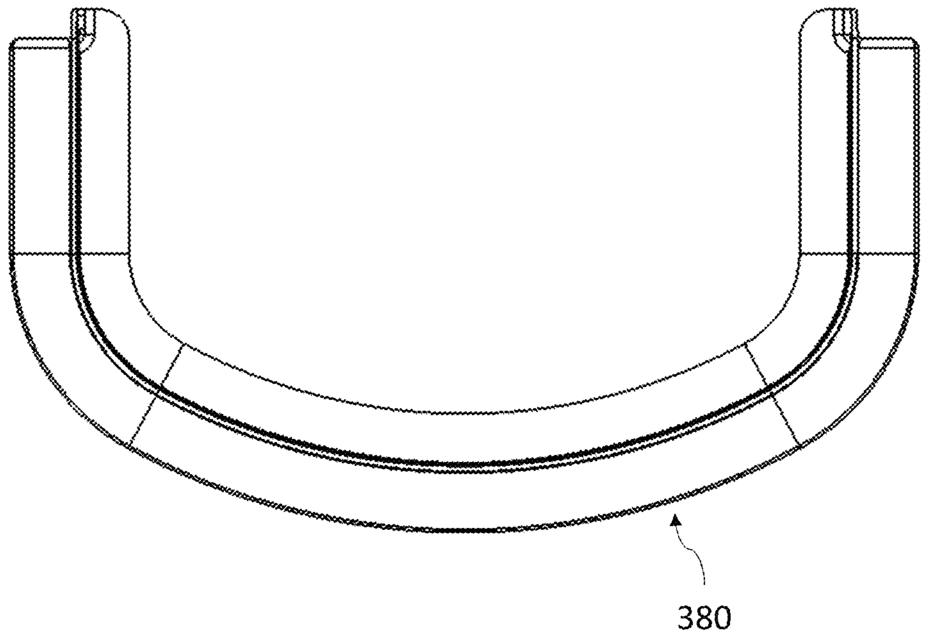
FIG. 38E is a top view of a curved toe space module with an extended curve that attaches to a curved wall of a D-shaped platform.
Figure 38F:
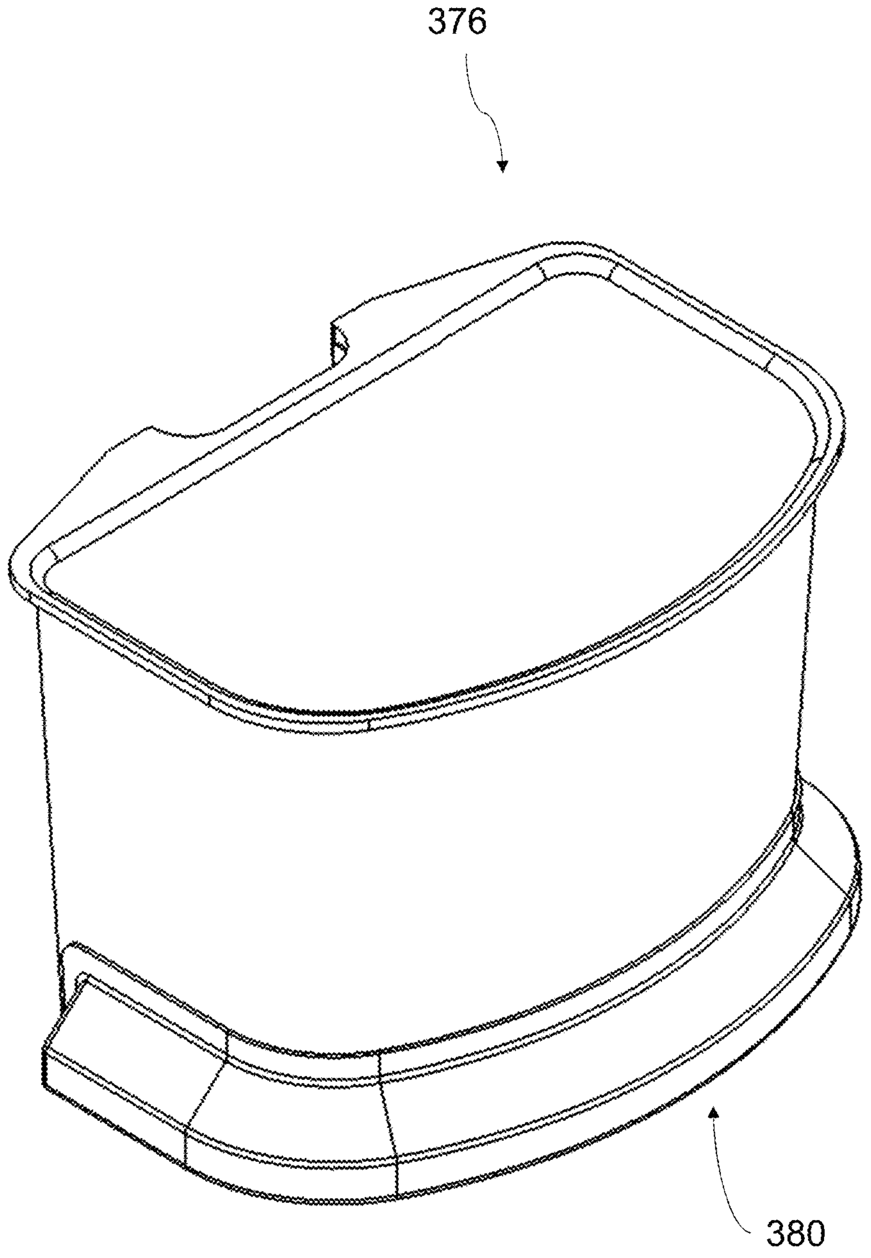
FIG. 38F is a top perspective view of a curved toe space module with an extended curve attached to a curved wall of a D-shaped platform.
Figure 38G:
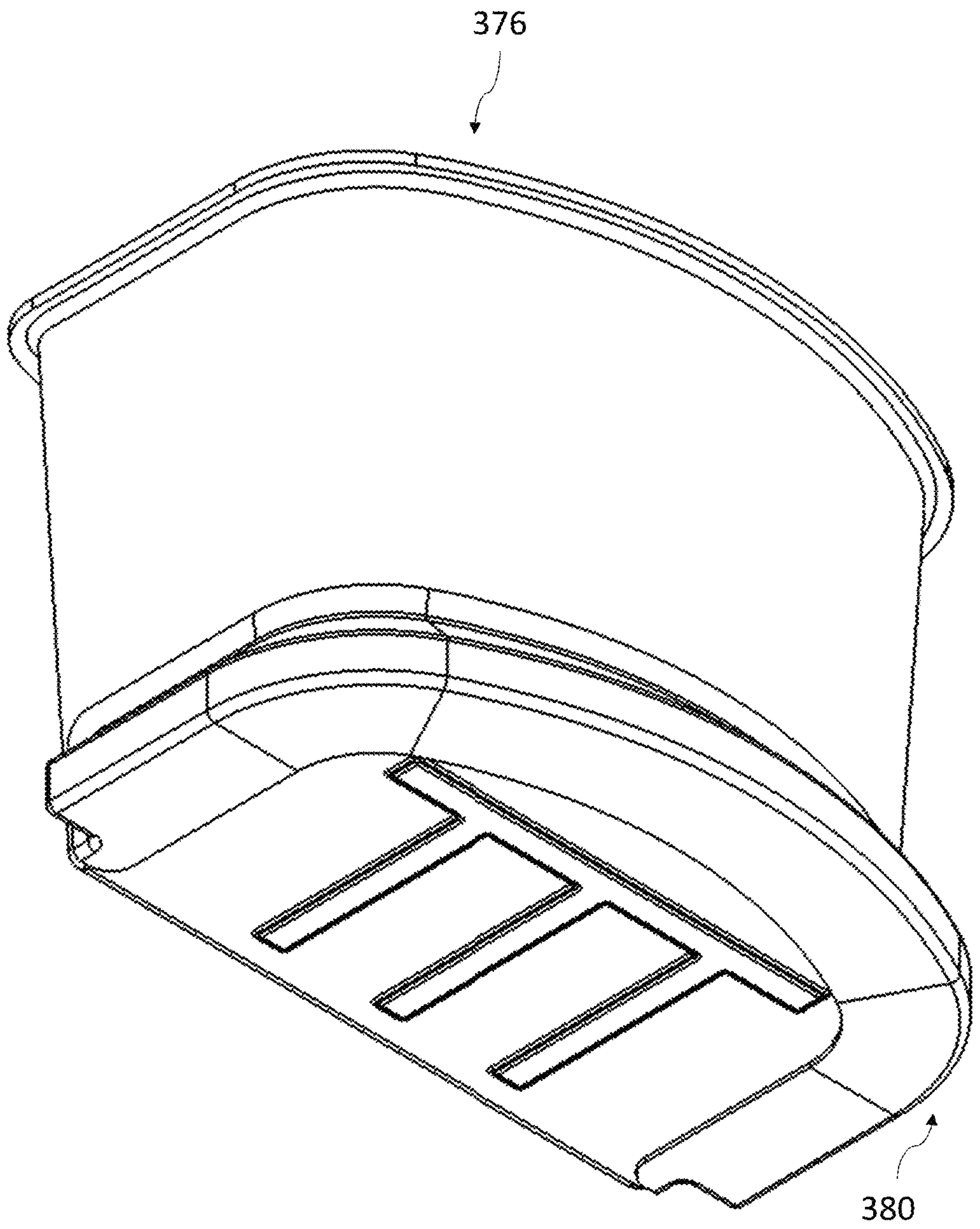
FIG. 38G is a bottom perspective view of a curved toe space module with an extended curve attached to a curved wall of a D-shaped platform.
Figure 38H:
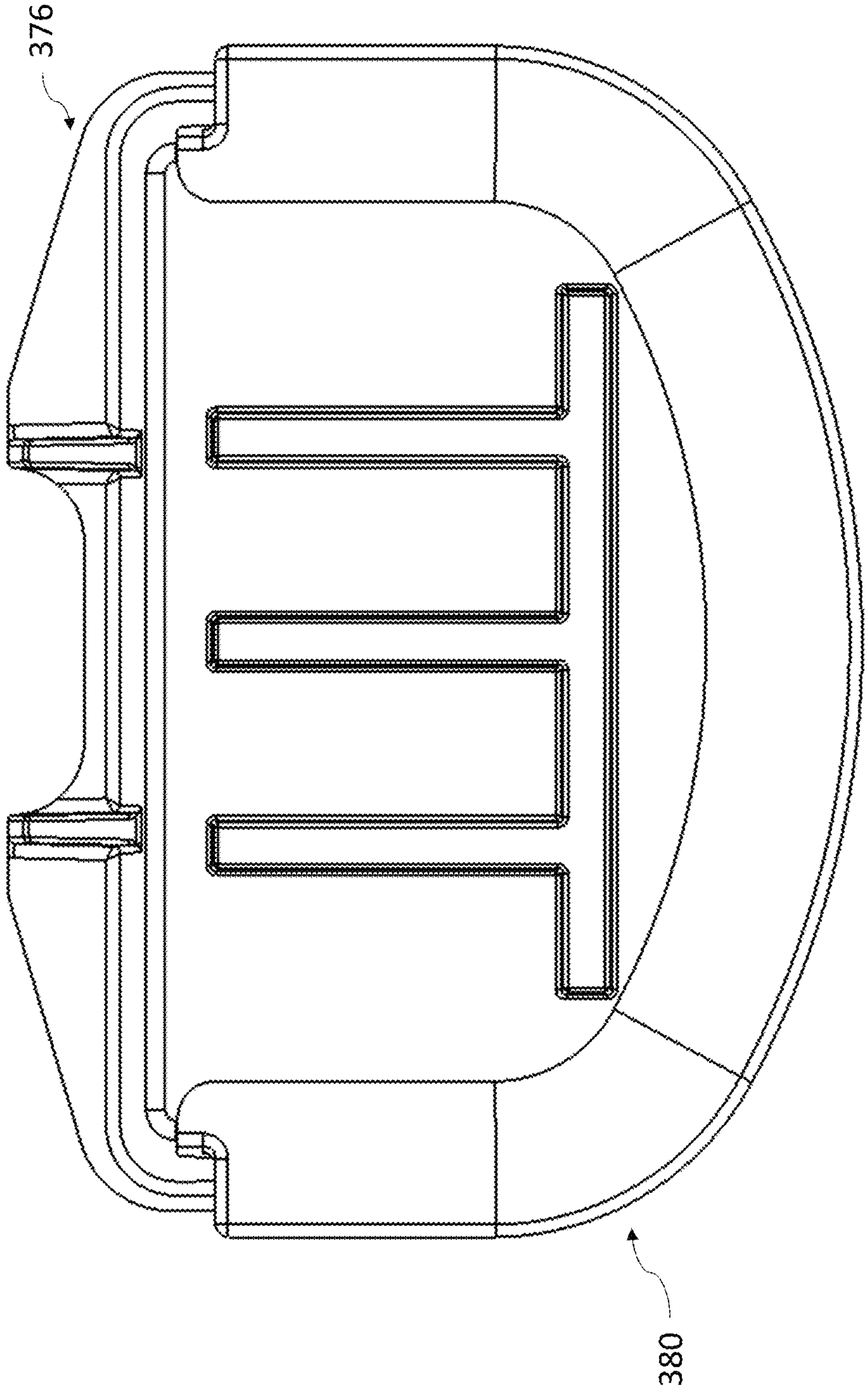
FIG. 38H is a top view of a curved toe space module with an extended curve attached to a curved wall of a D-shaped platform.
Figure 38I:
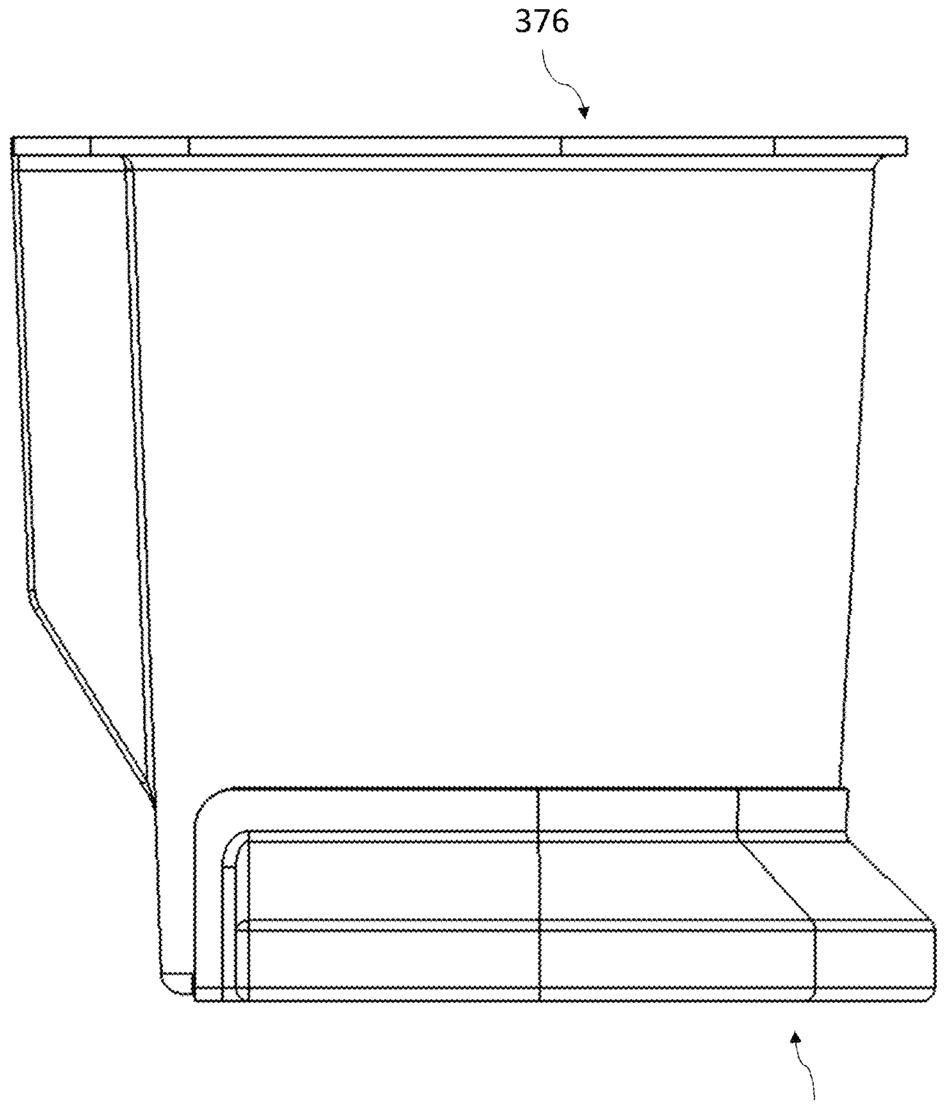
FIG. 38I is a side view of a curved toe space module with an extended curve attached to a curved wall of a D-shaped platform.
Figure 39A:
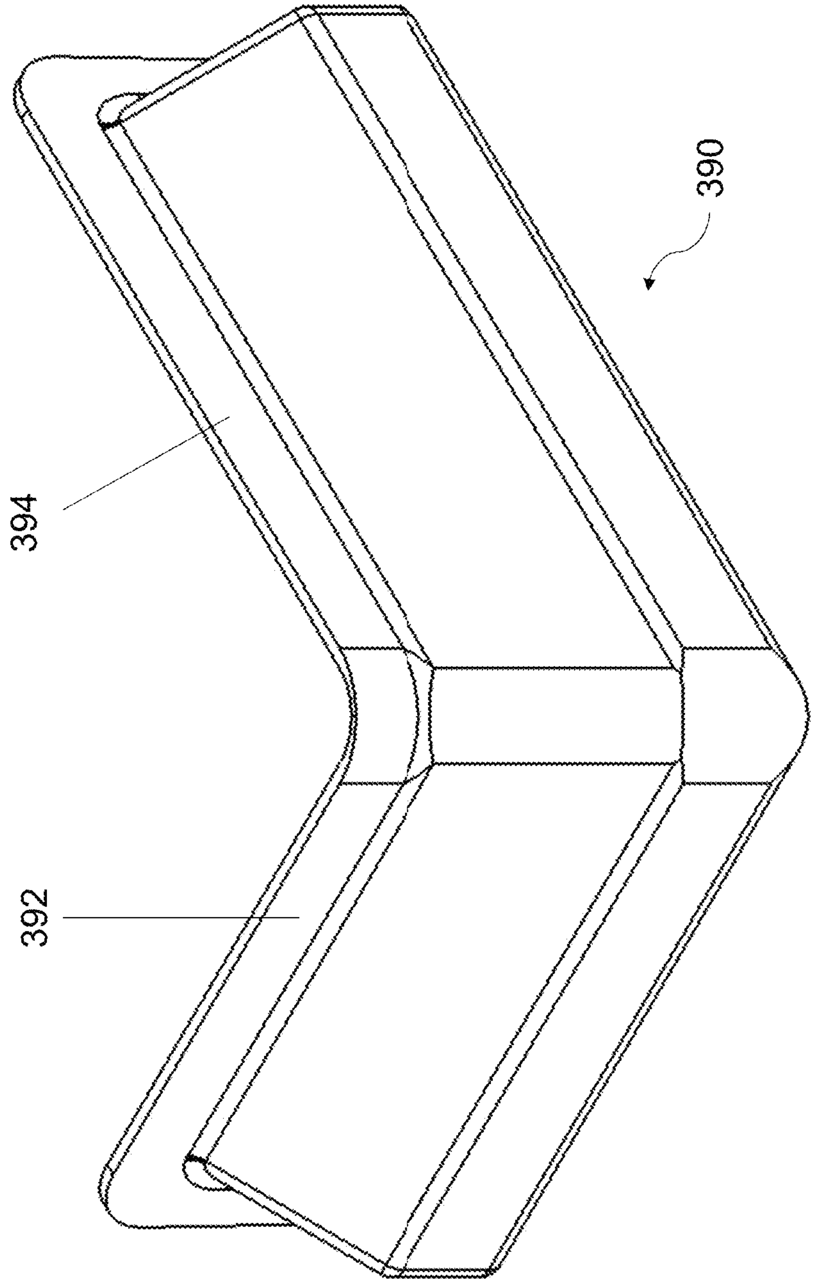
FIG. 39A is a front perspective view of a corner toe space module that attaches to a corner of a platform.
Figure 39B:
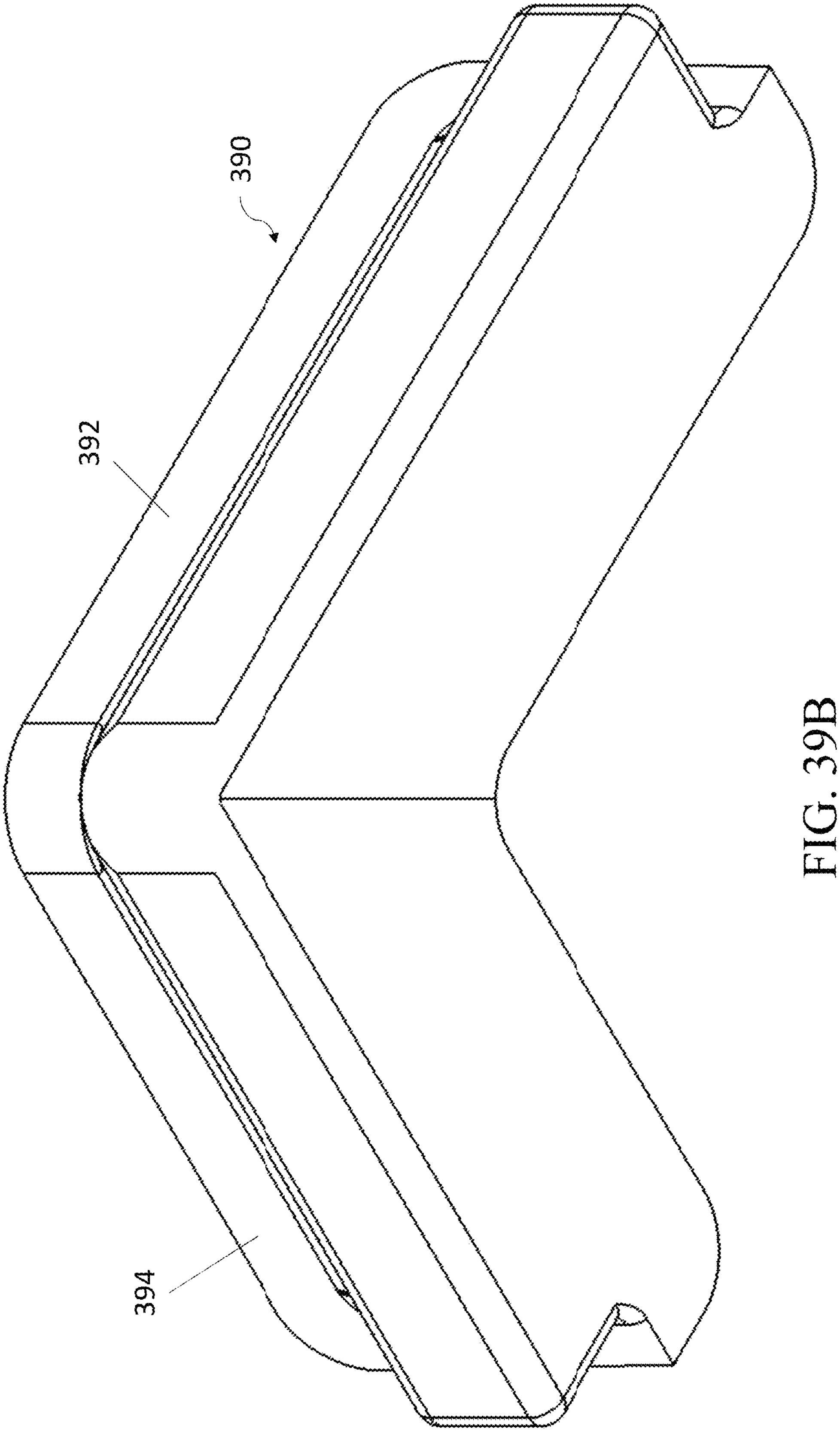
FIG. 39B is a rear perspective view of a corner toe space module that attaches to a corner of a platform.
Figure 39C:
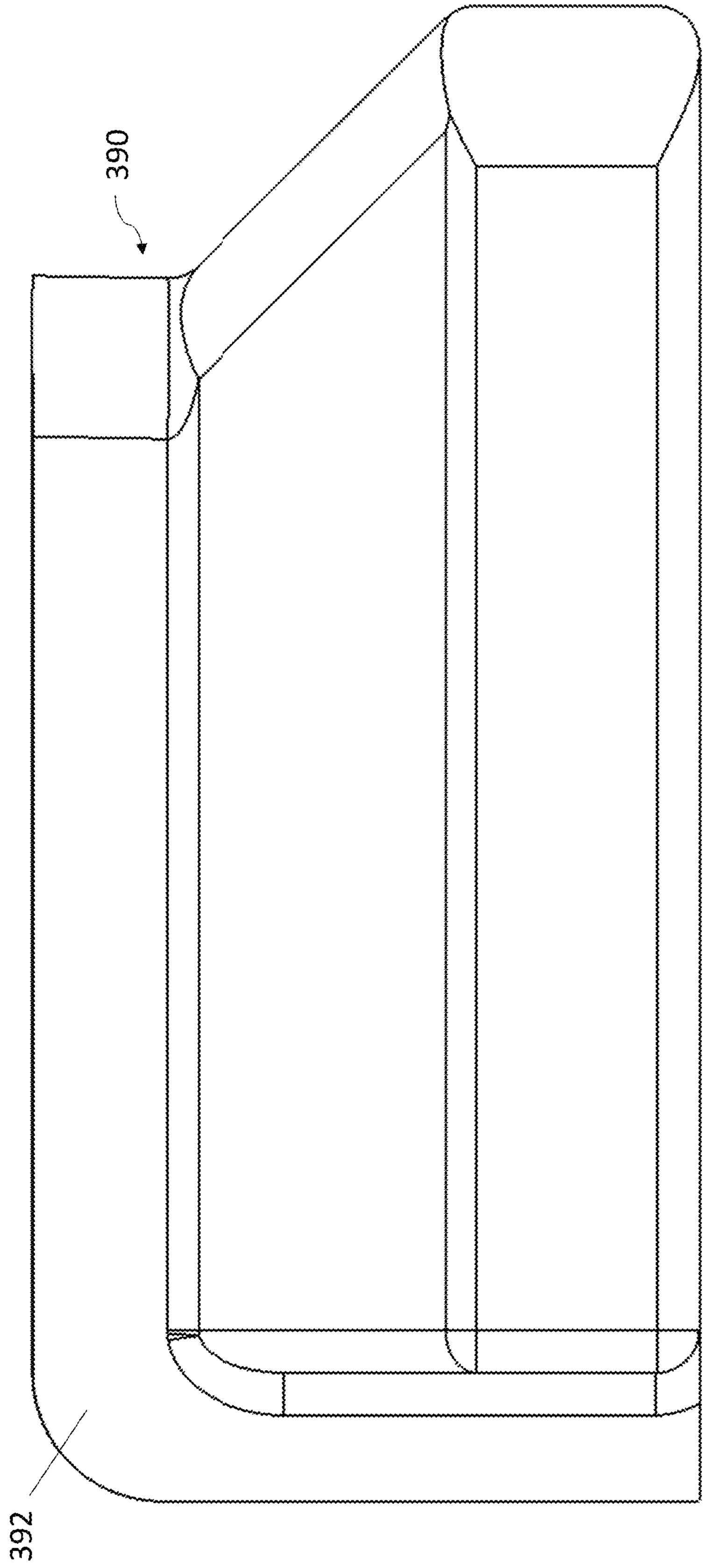
FIG. 39C is a side view of a corner toe space module that attaches to a corner of a platform.
Figure 39D:
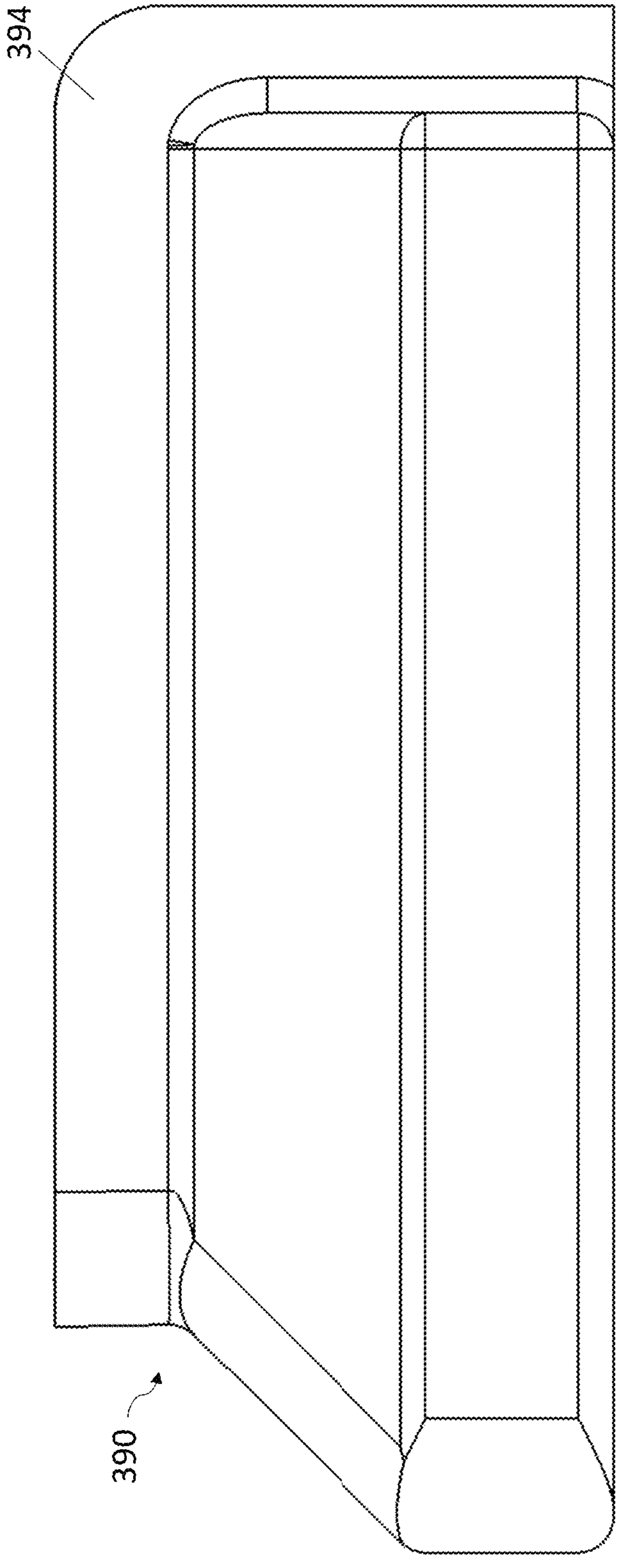
FIG. 39D is another side view of a corner toe space module that attaches to a corner of a platform.
Figure 39E:
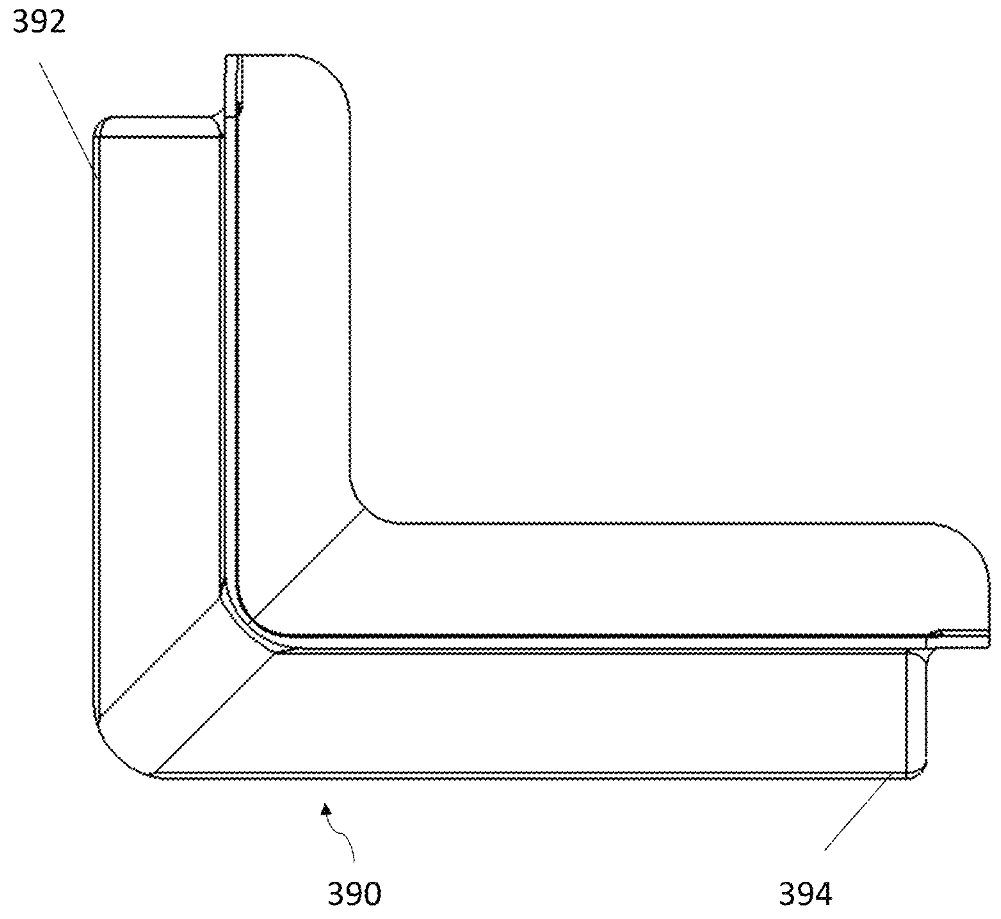
FIG. 39E is a top view of a corner toe space module that attaches to a corner of a platform.
Figure 39F:
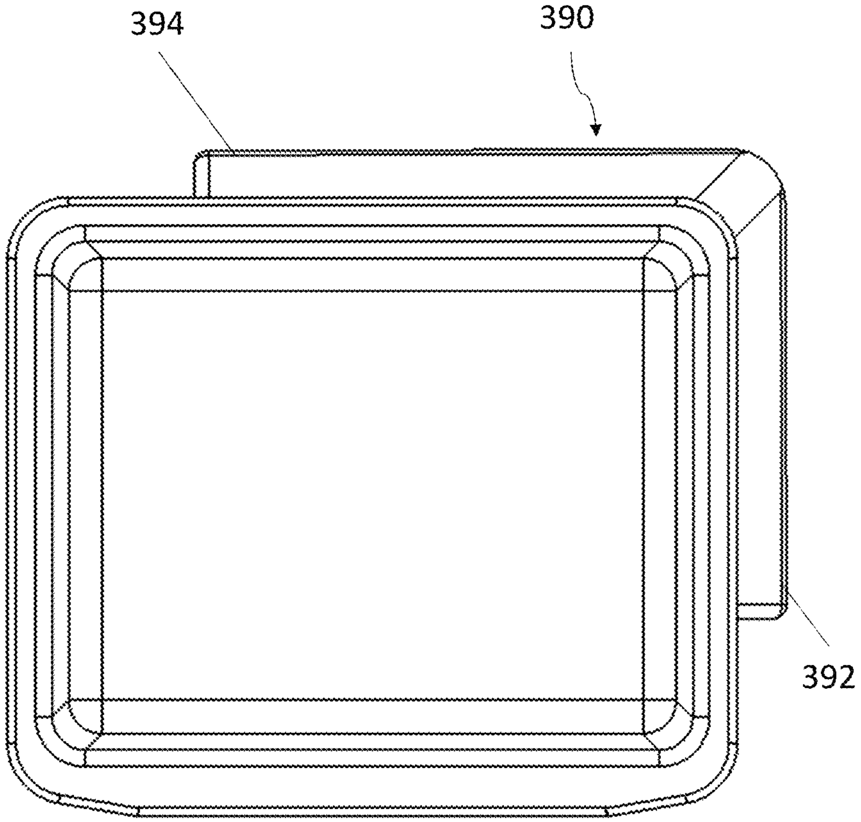
FIG. 39F is an orthogonal side view of a corner toe space module that attaches to a corner of a platform.
Figure 39G:
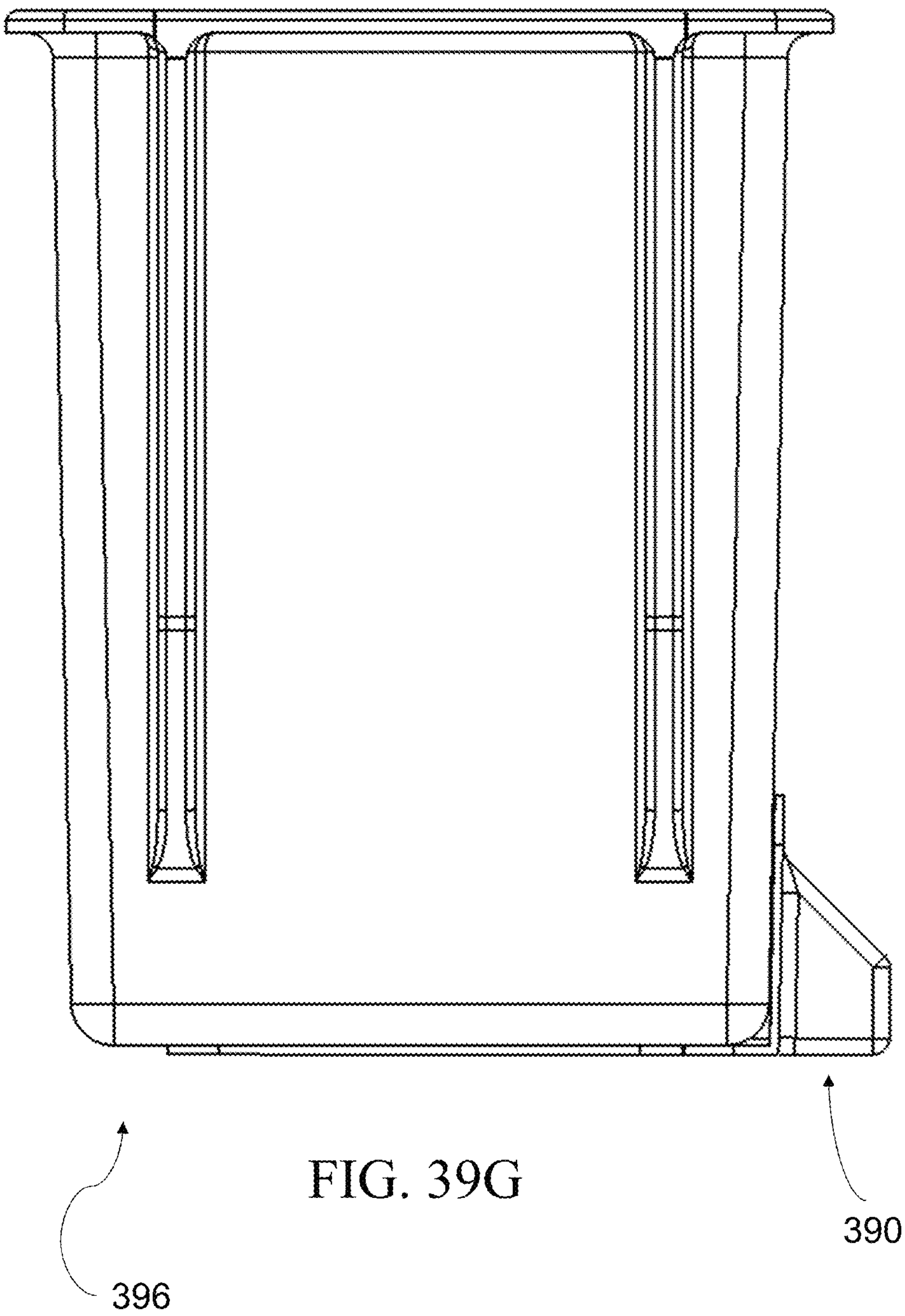
FIG. 39G is a rear view of a corner toe space module attached to a corner of a platform.
Figure 39H:
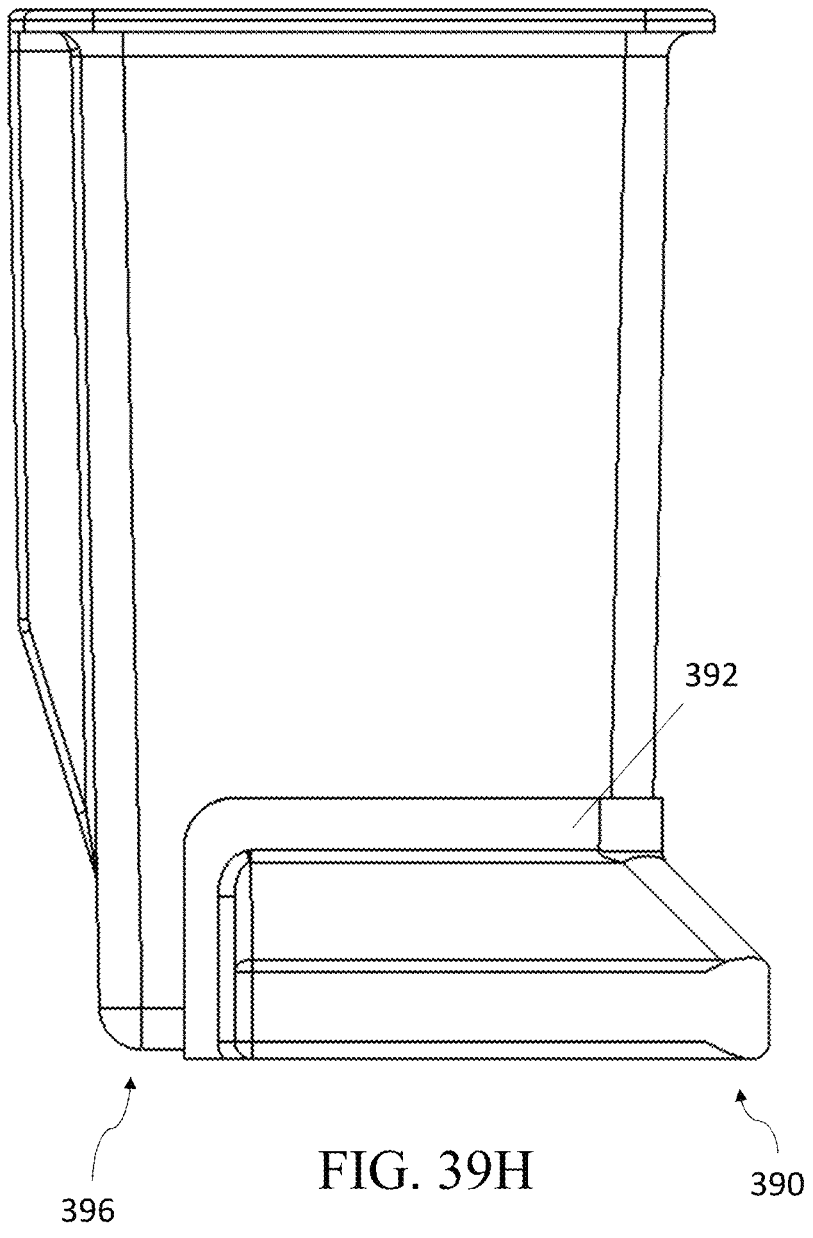
FIG. 39H is a side view of a corner toe space module attached to a corner of a platform.
Figure 39I:
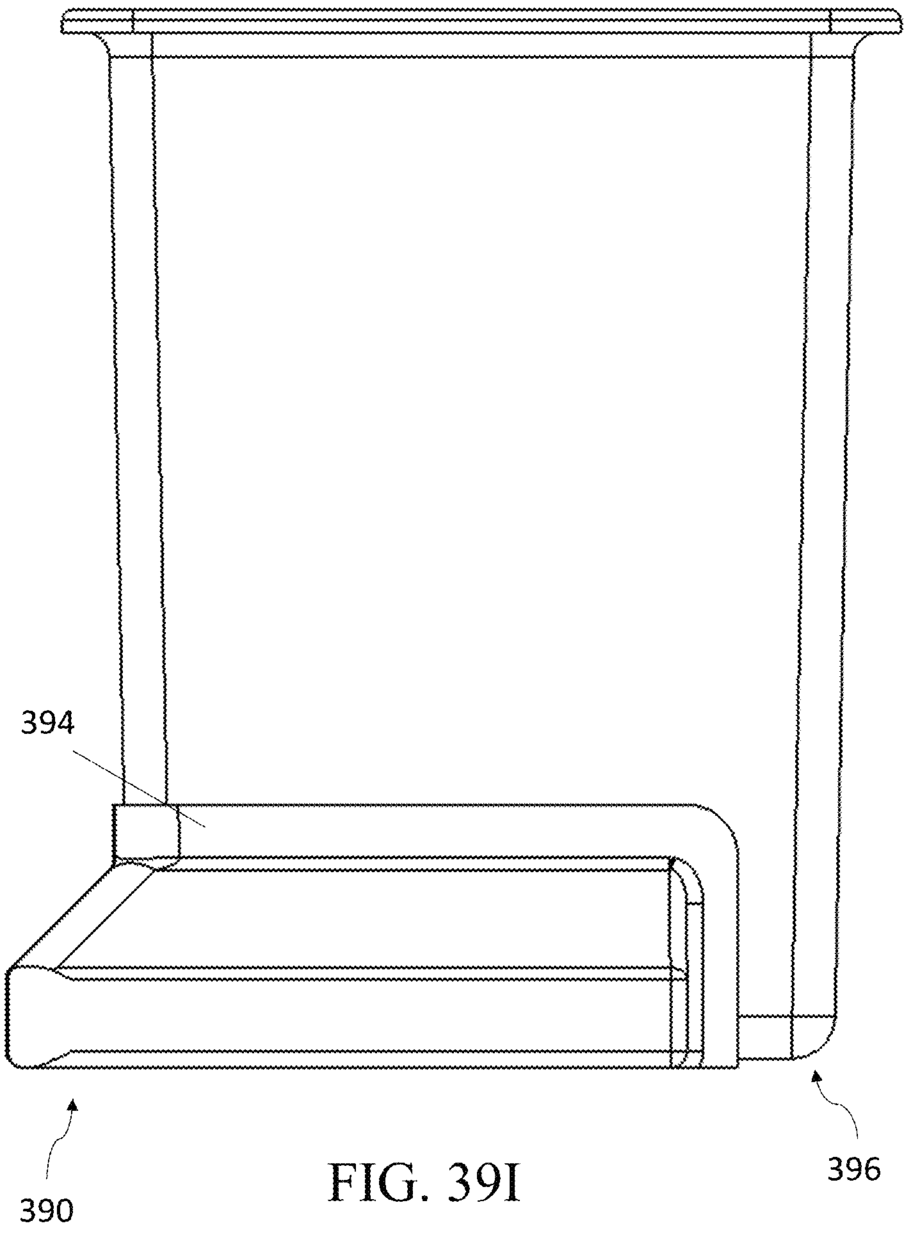
FIG. 39I is another side view of a corner toe space module attached to a corner of a platform.
Figure 39J:
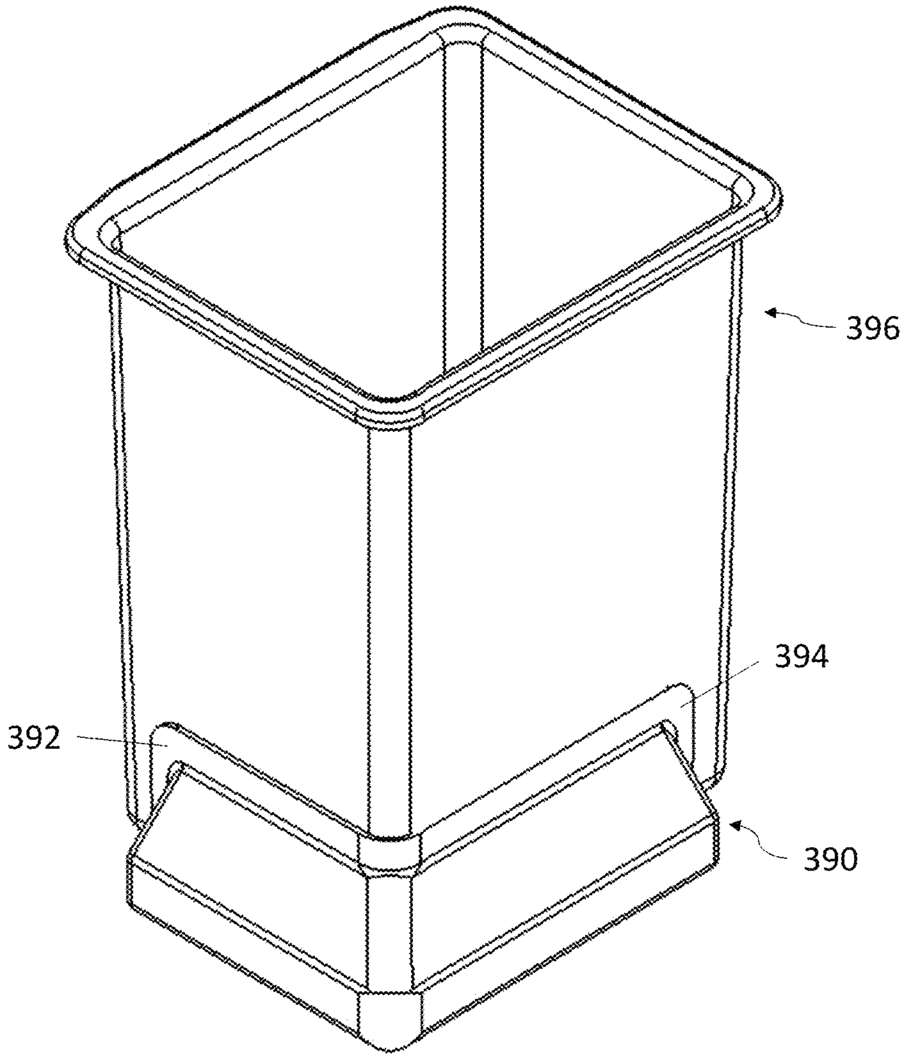
FIG. 39J is a top perspective view of a corner toe space module attached to a corner of a platform.
Figure 39K:
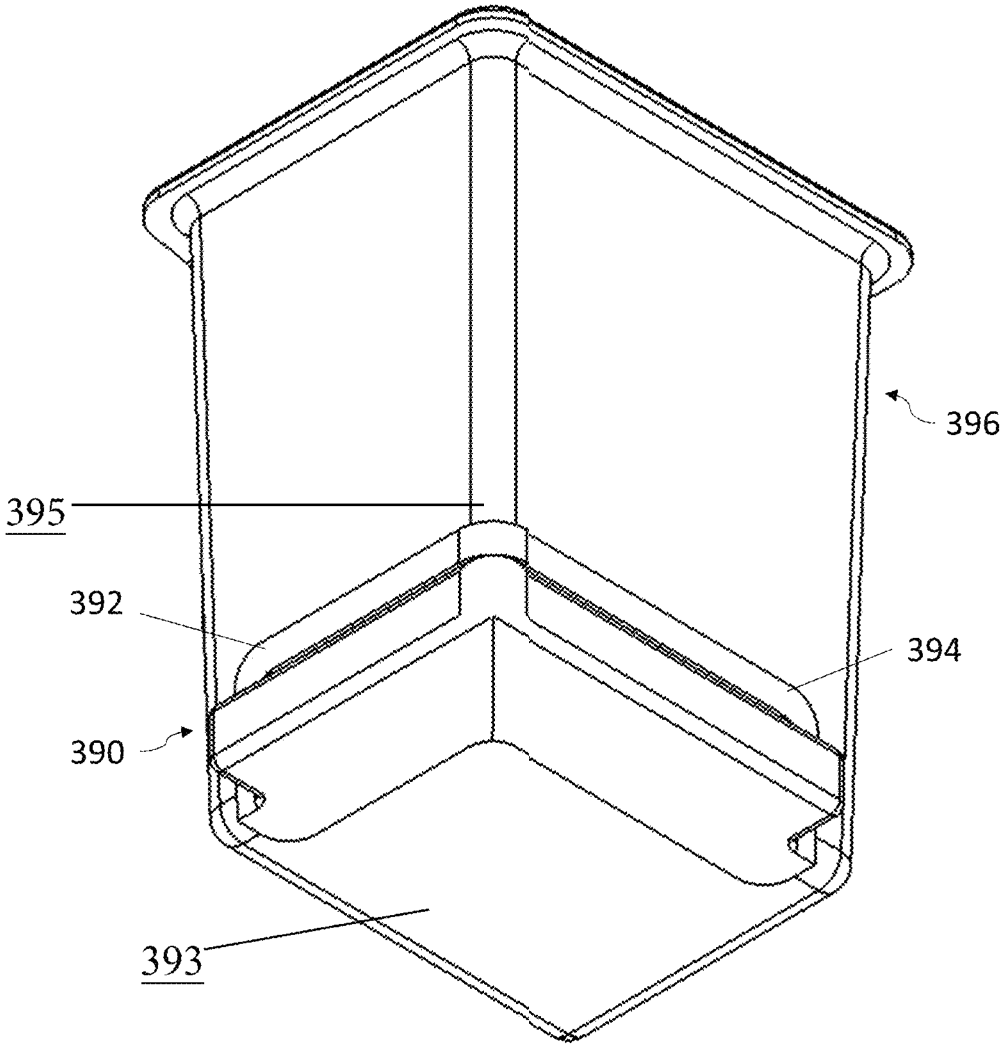
FIG. 39K is a bottom perspective view of a corner toe space module attached to a corner of a platform.
Figure 40A:
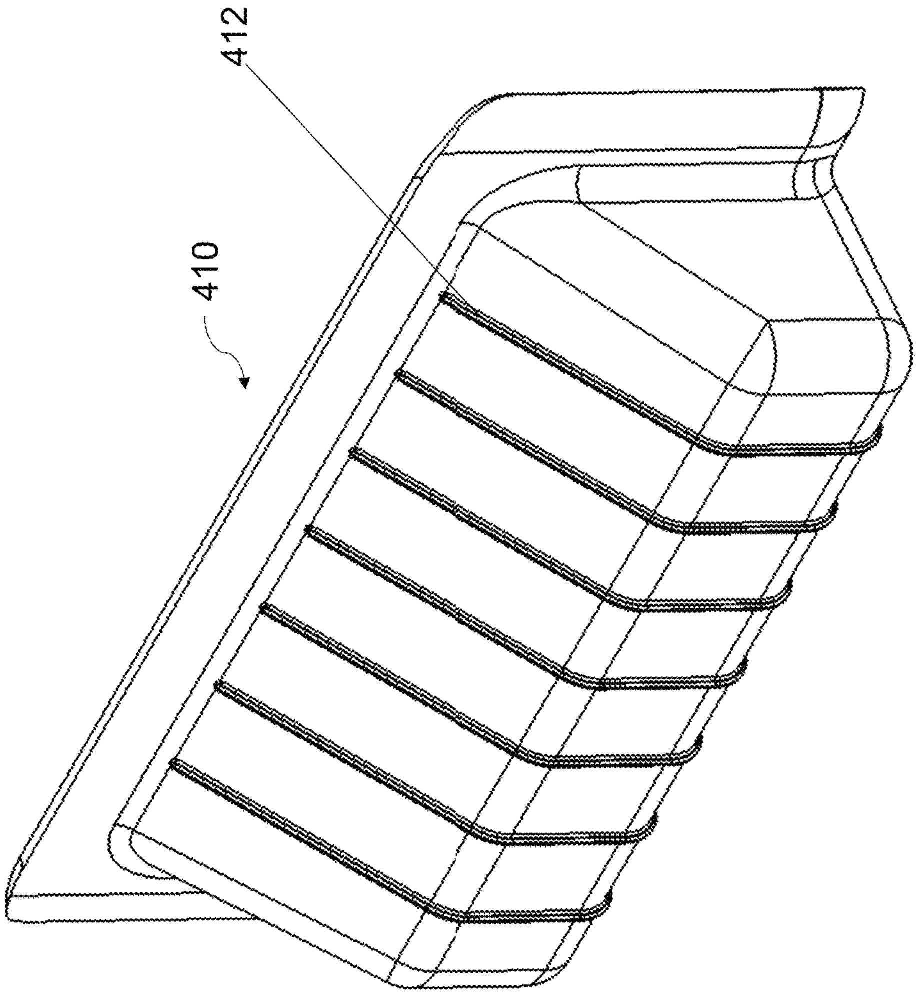
FIG. 40A is a front perspective view of a ribbed toe space module including vertical support ribs.
Figure 40B:
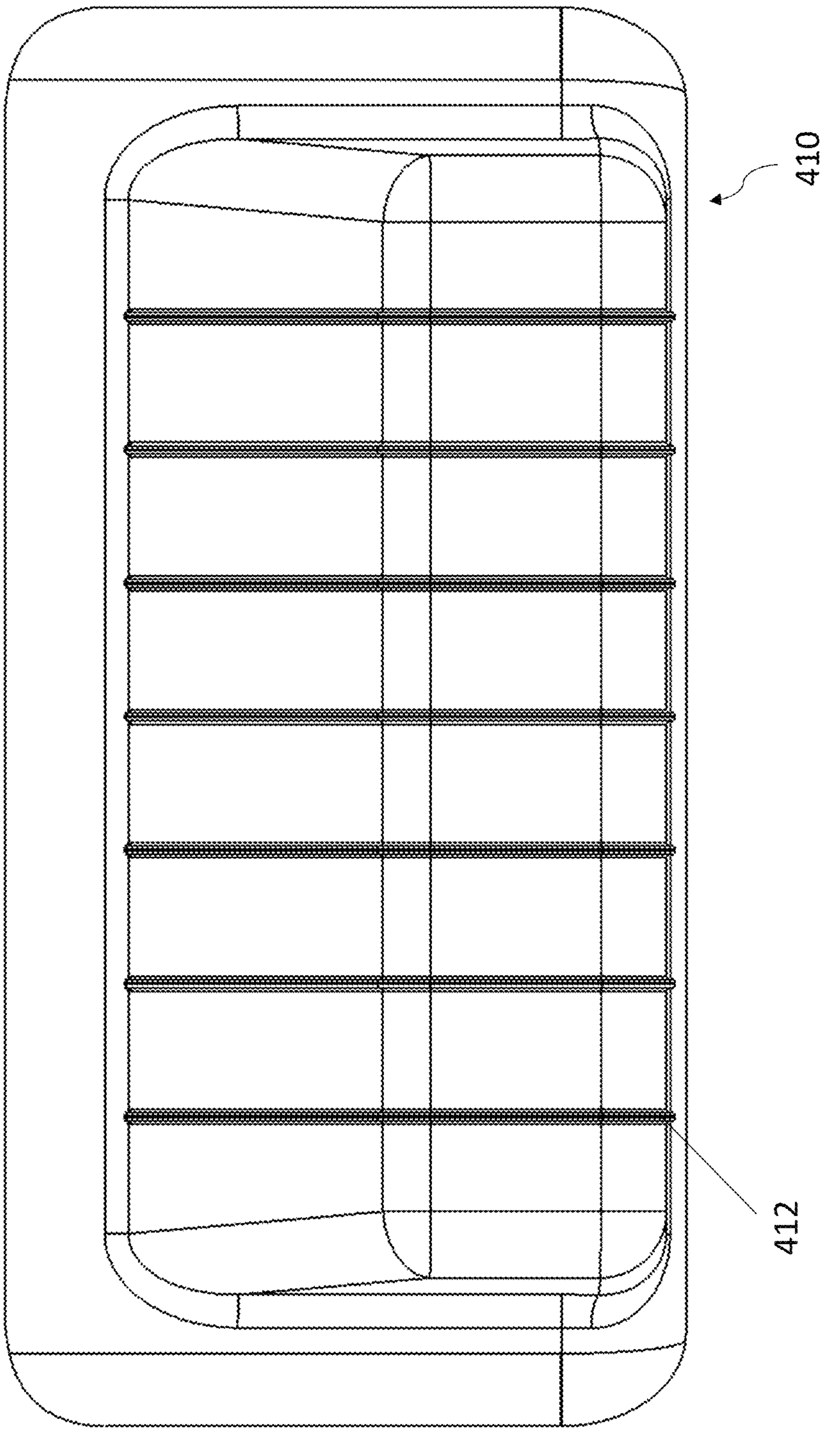
FIG. 40B is a front view of a ribbed toe space module including vertical support ribs.
Figure 40C:
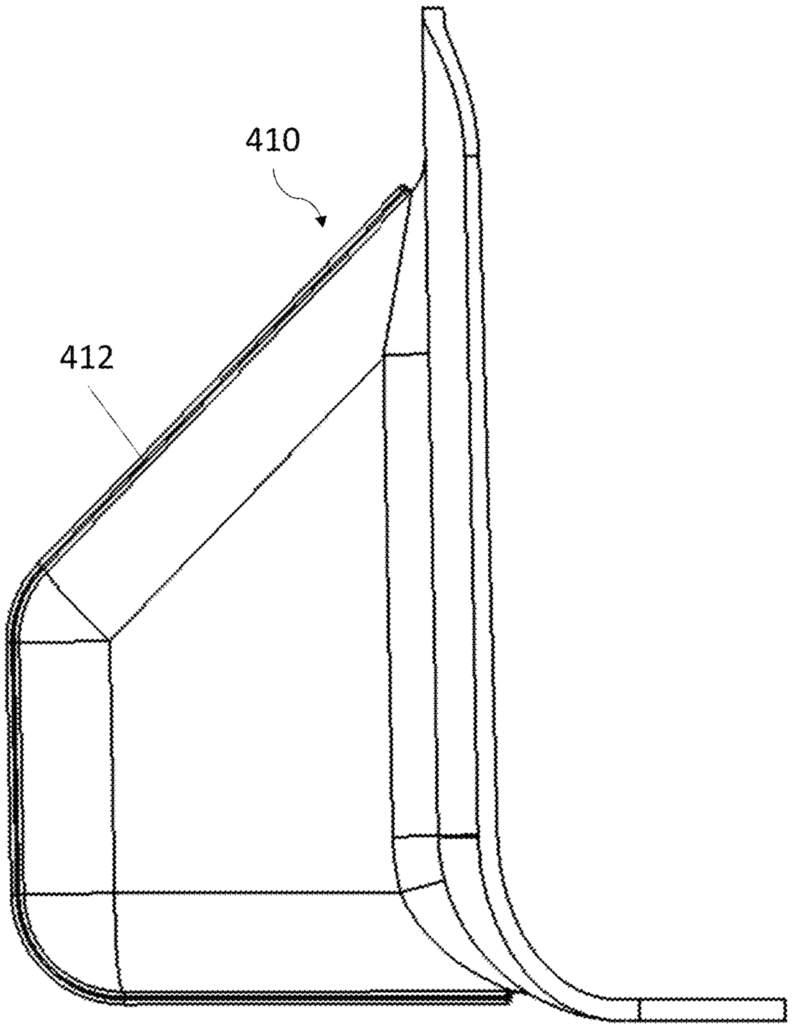
FIG. 40C is a top perspective view of a ribbed toe space module including vertical support ribs.
Figure 40D:
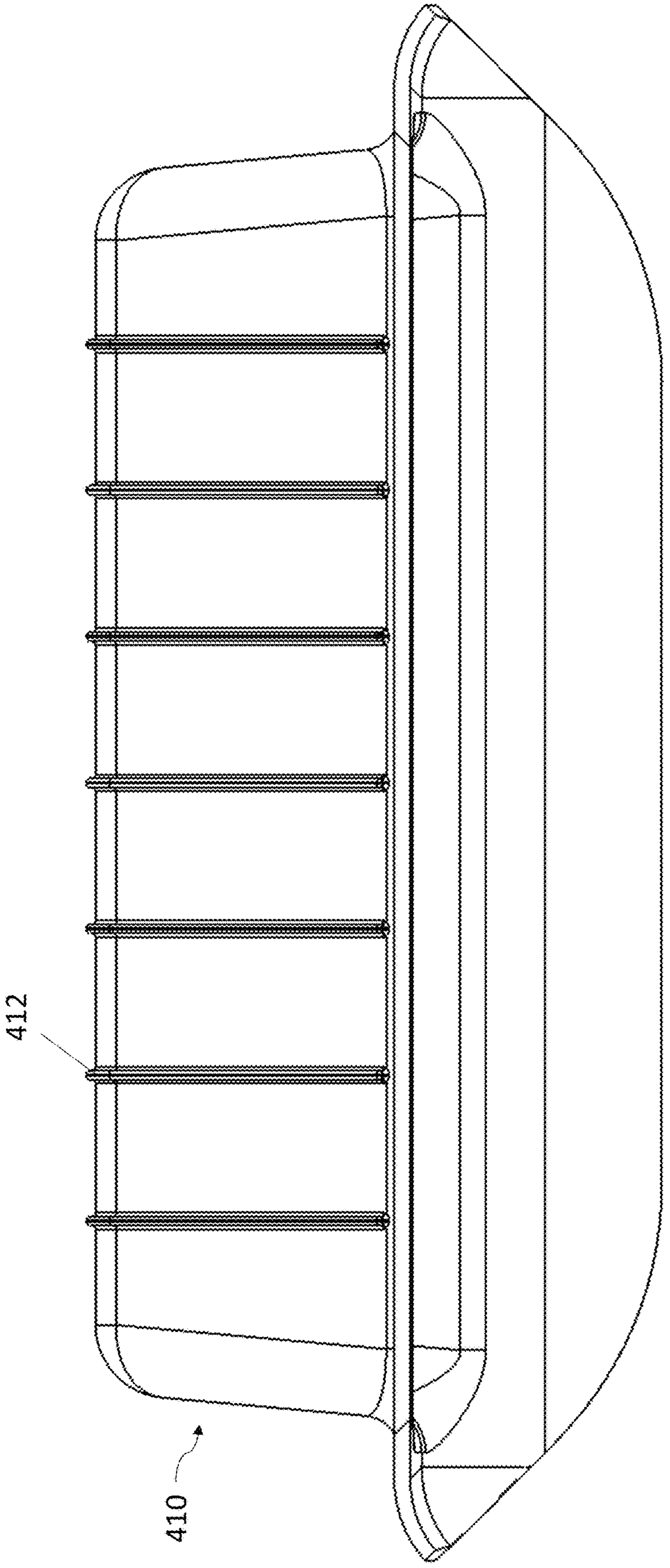
FIG. 40D is a side view of a ribbed toe space module including vertical support ribs.
Figure 40E:
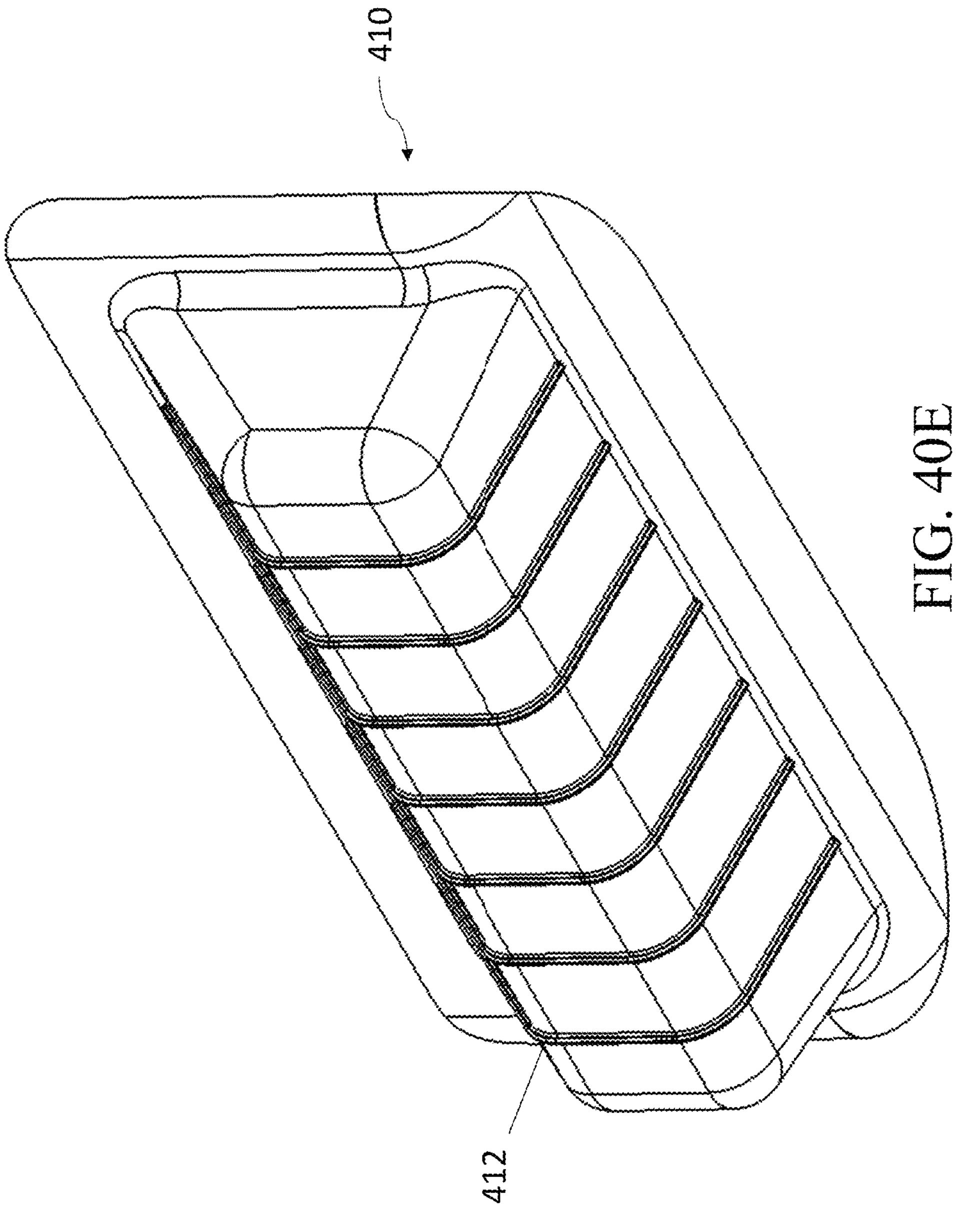
FIG. 40E is a bottom perspective view of a ribbed toe space module including vertical support ribs.
Figure 40F:
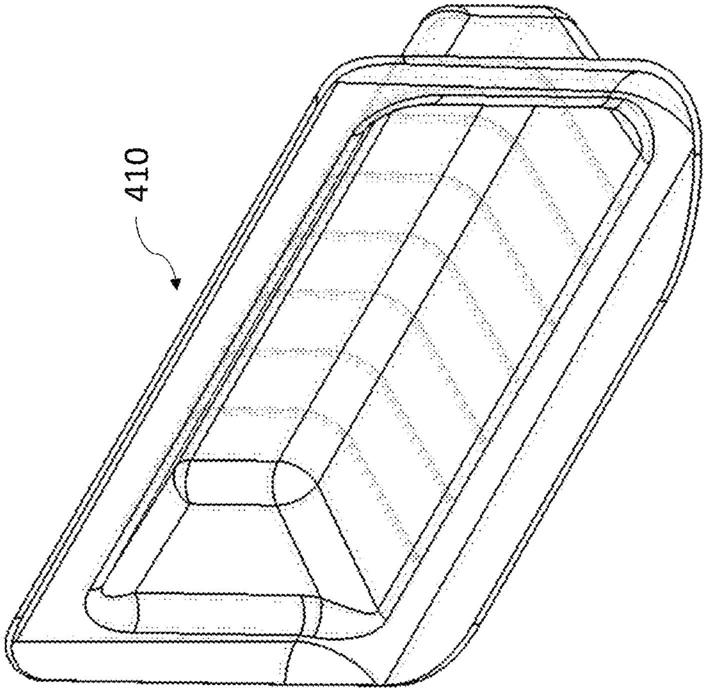
FIG. 40F is a rear perspective view of a ribbed toe space module including vertical support ribs.
Figure 41A:
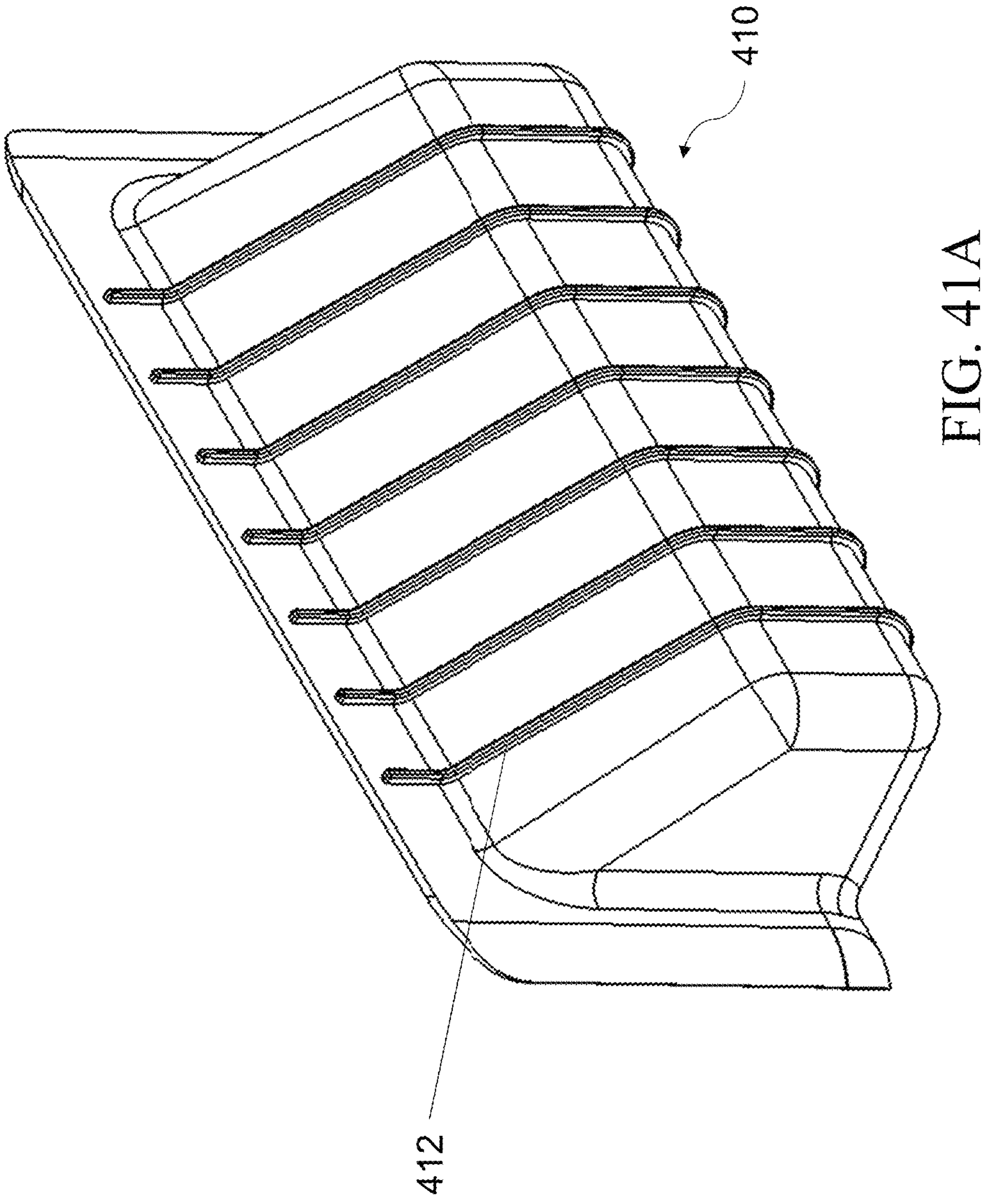
FIG. 41A is a front view of a ribbed toe space module including vertical support ribs which extend into the flange of the toe space module.
Figure 41B:
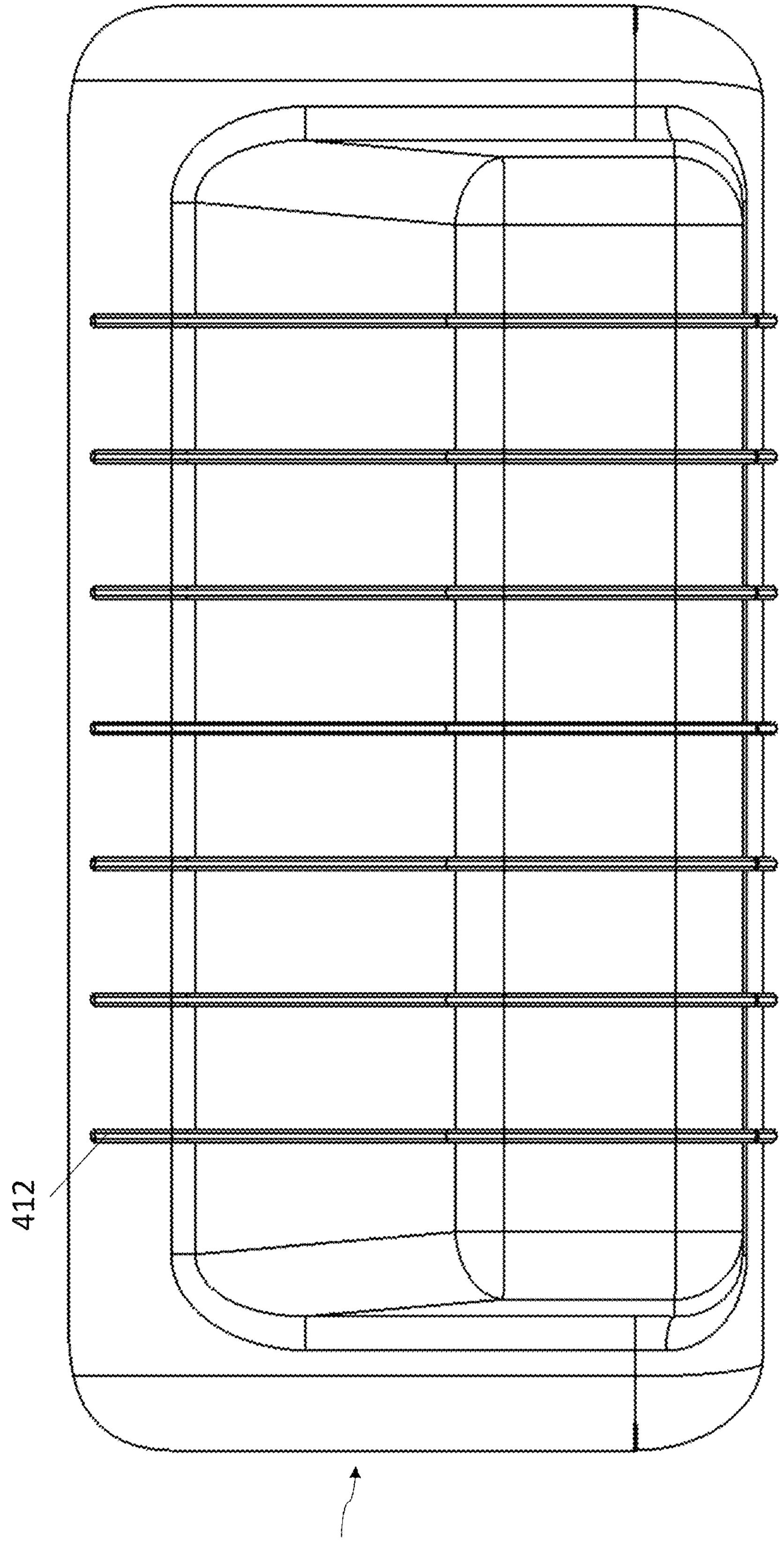
FIG. 41B is a front perspective view of a ribbed toe space module including vertical support ribs which extend into the flange of the toe space module.
Figure 41C:
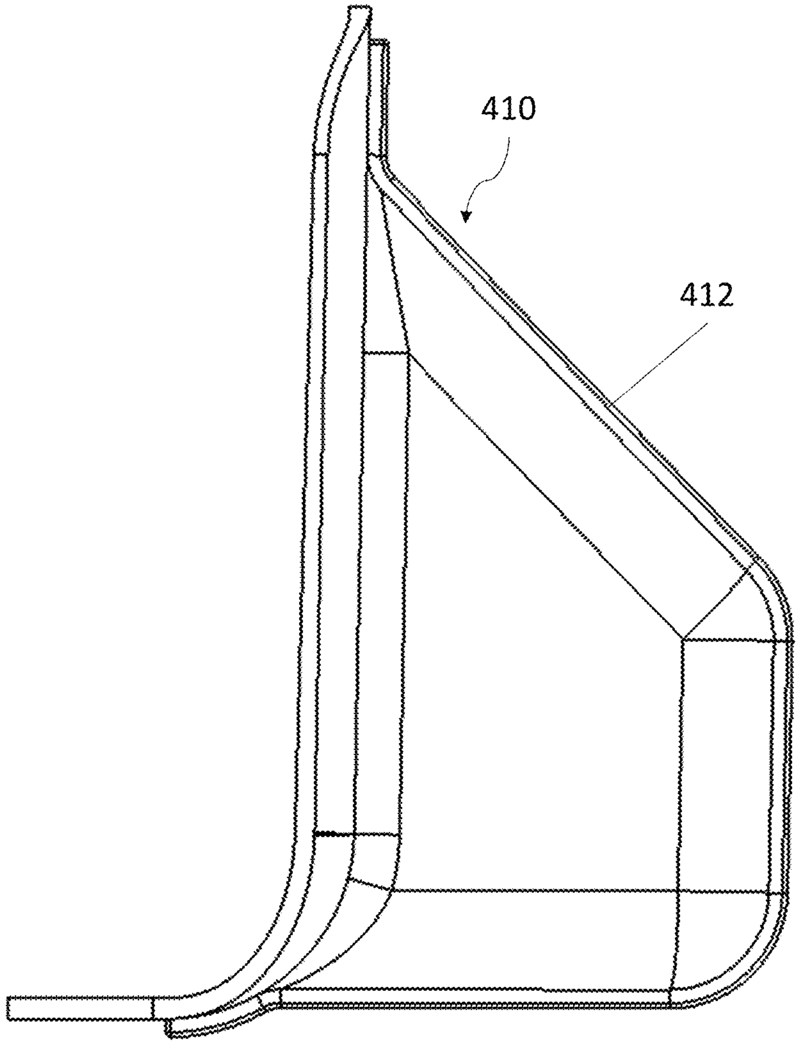
FIG. 41C is a side view of a ribbed toe space module including vertical support ribs which extend into the flange of the toe space module.
Figure 41D:
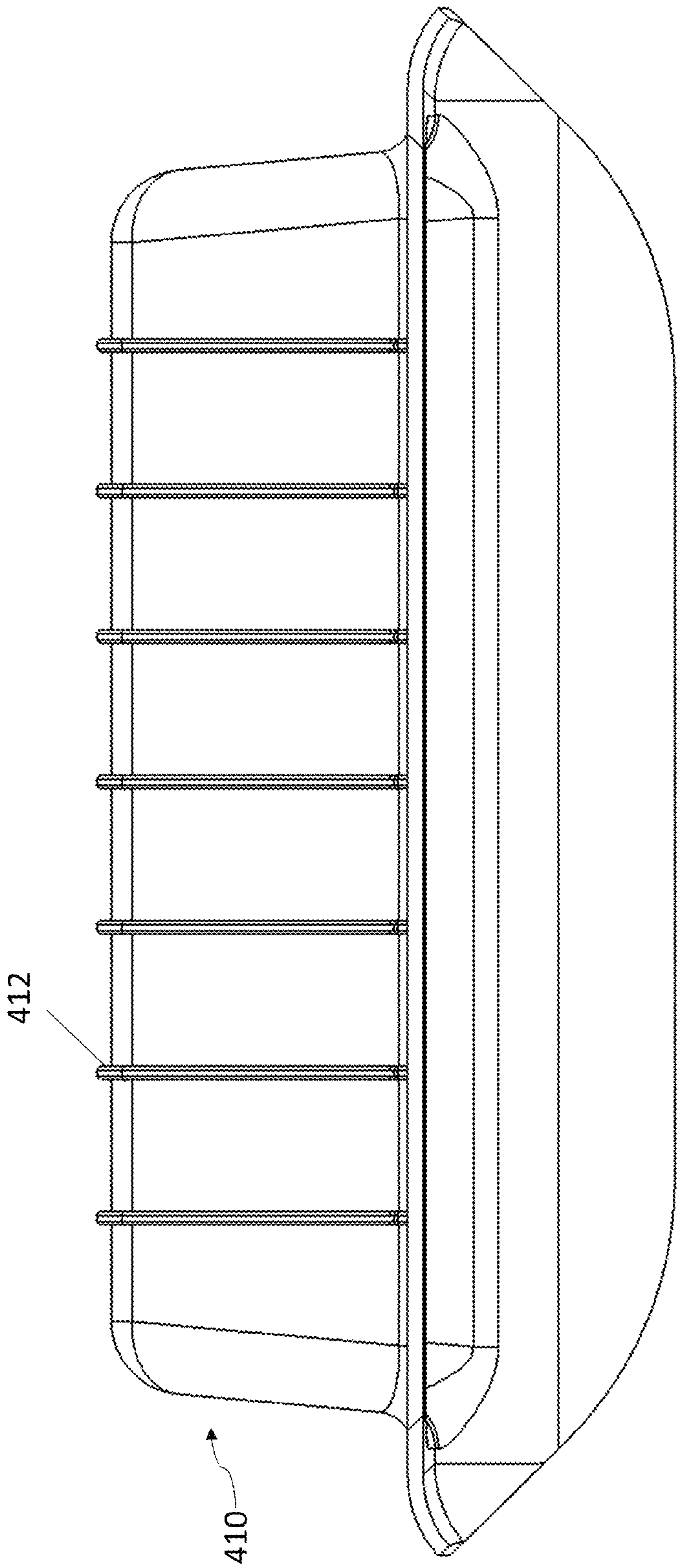
FIG. 41D is a top perspective view of a ribbed toe space module including vertical support ribs which extend into the flange of the toe space module.
Figure 42A:
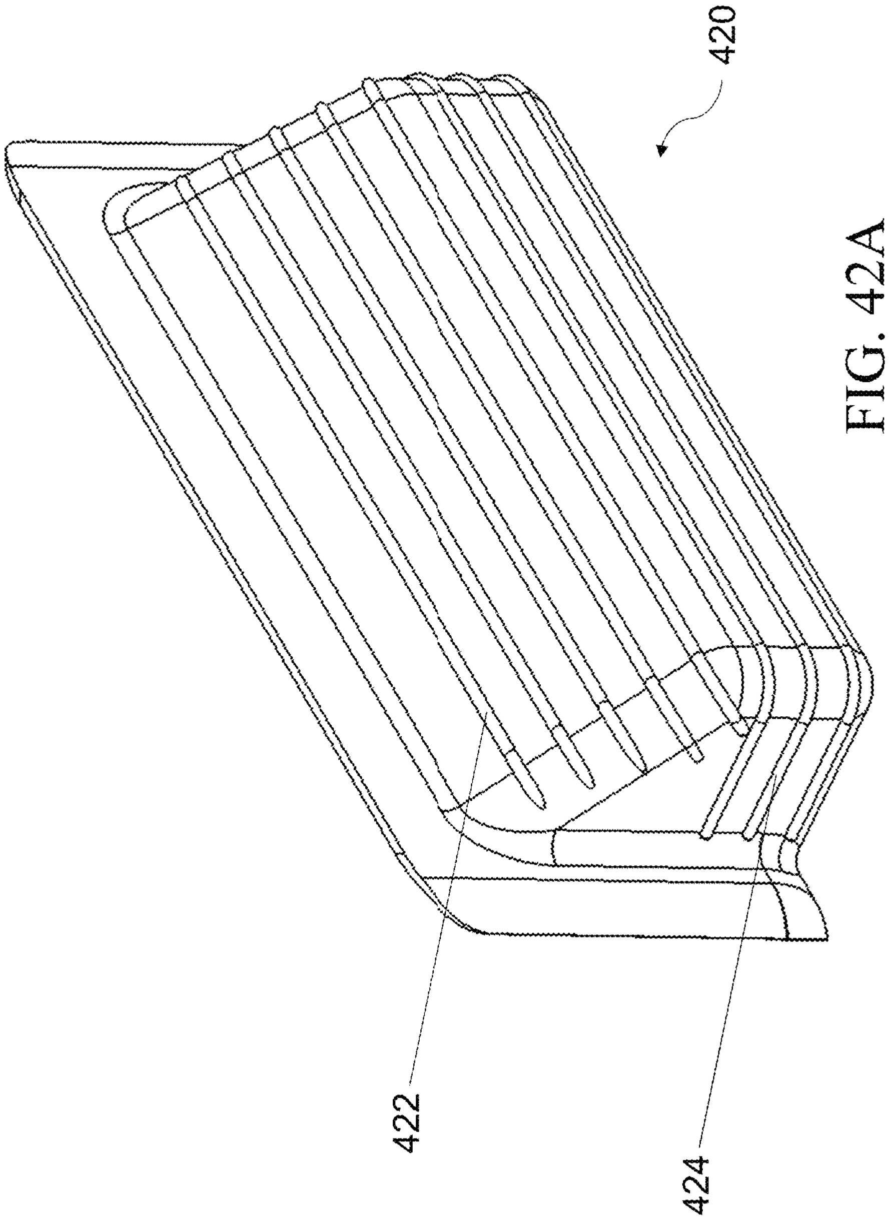
FIG. 42A is a front perspective view of a ribbed toe space module including angled and horizontal support ribs.
Figure 42B:
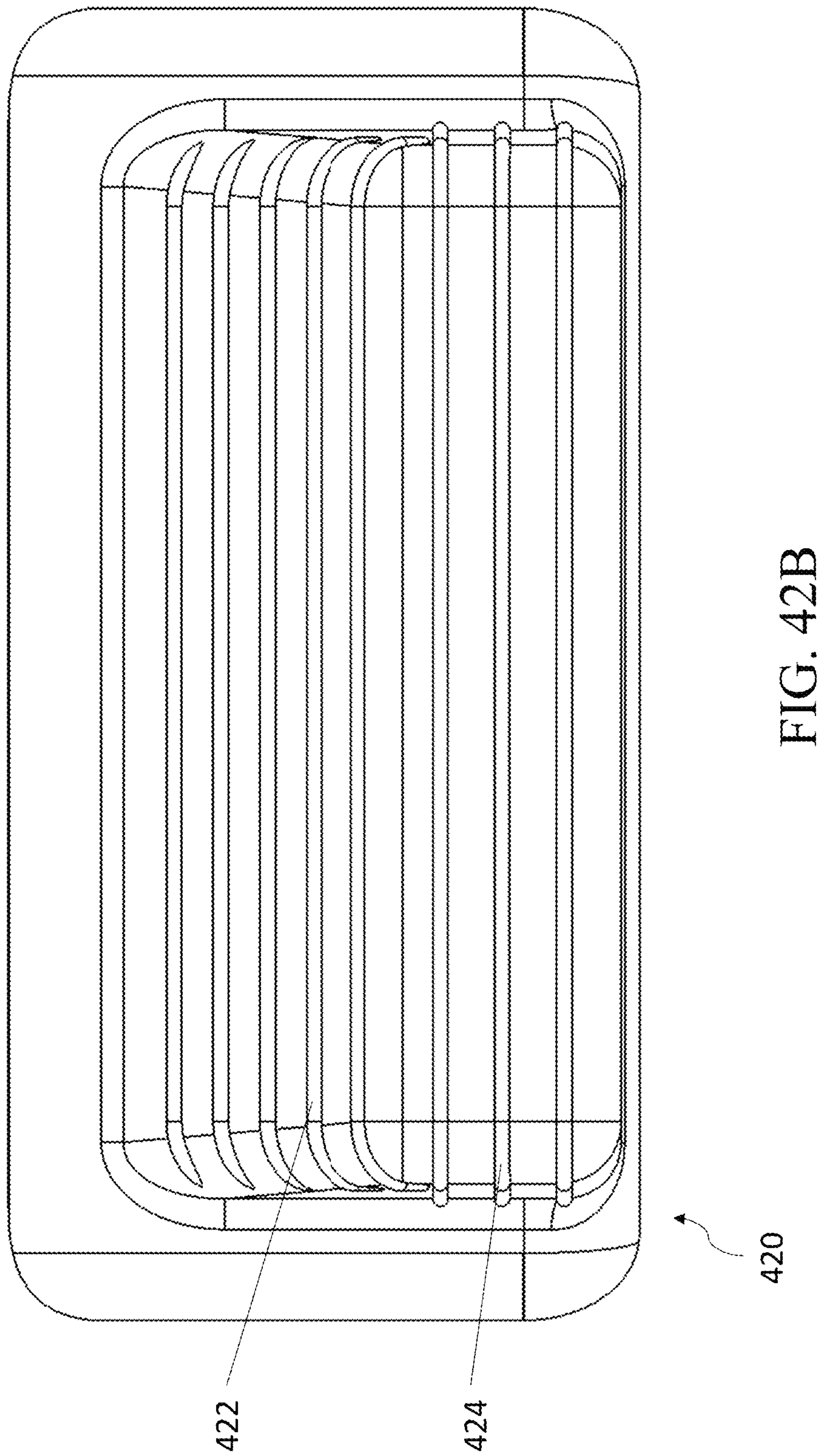
FIG. 42B is a front view of a ribbed toe space module including angled and horizontal support ribs.
Figure 42C:
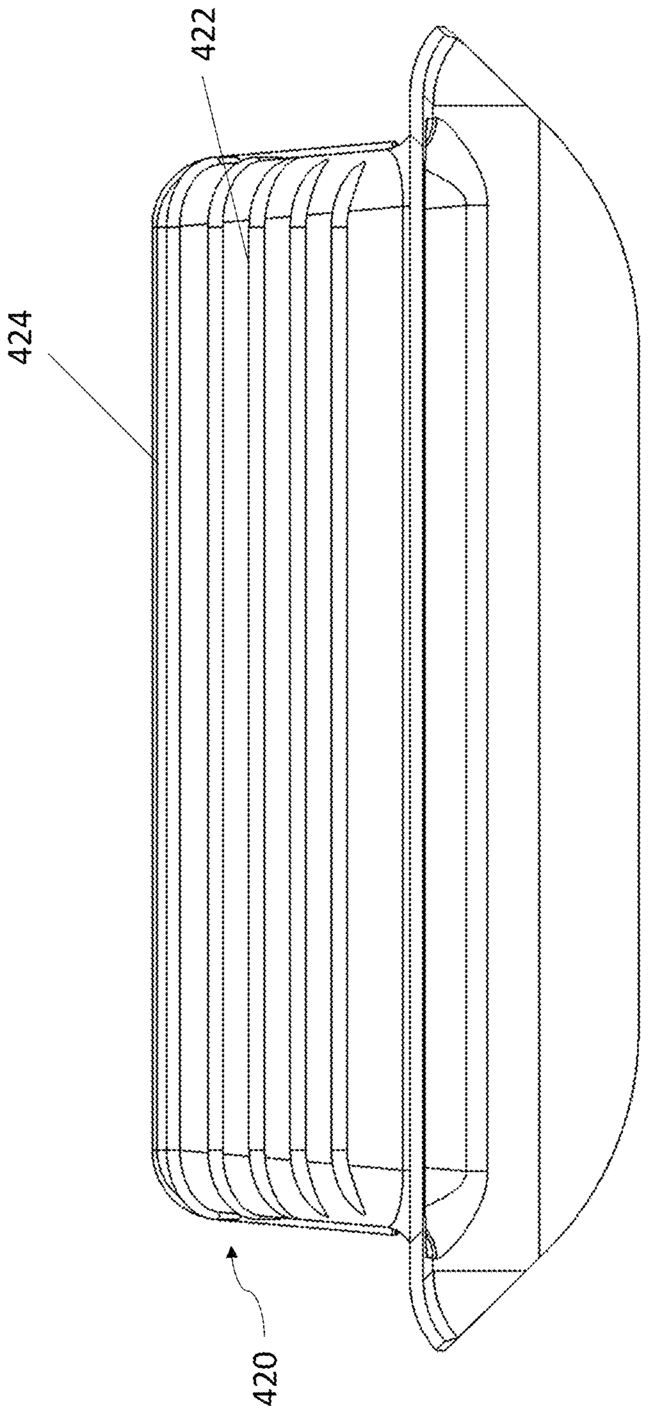
FIG. 42C is a top perspective view of a ribbed toe space module including angled and horizontal support ribs.
Figure 42D:
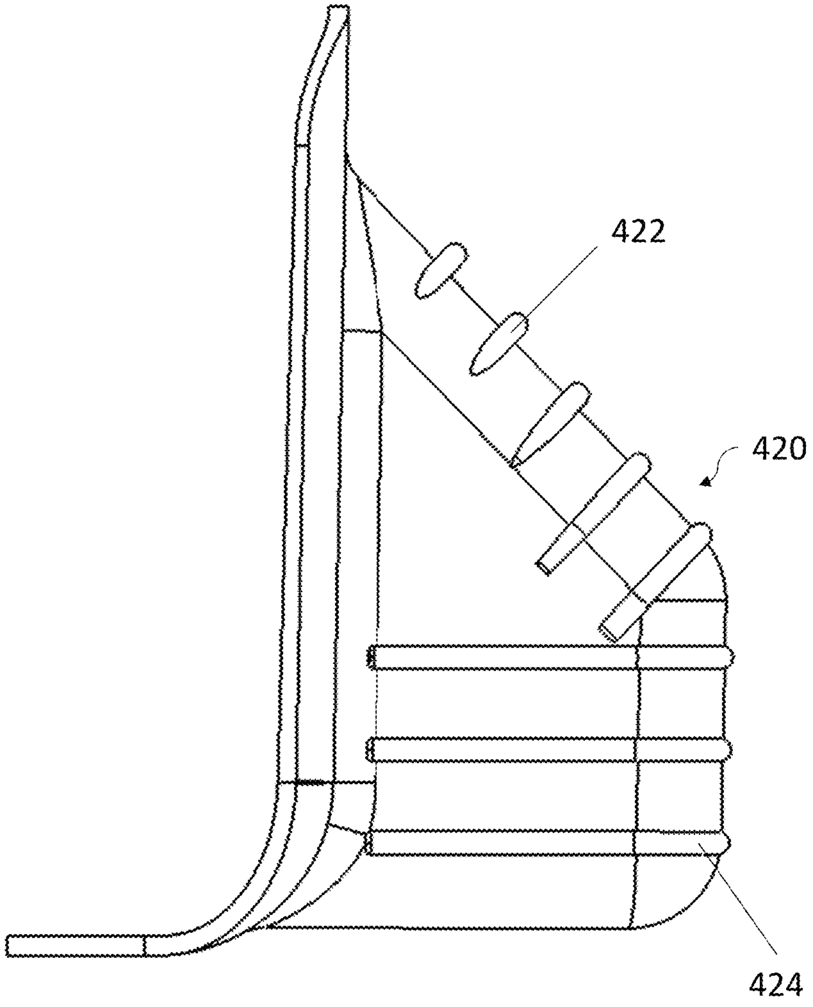
FIG. 42D is a side view of a ribbed toe space module including angled and horizontal support ribs.

FIG. 35 illustrates a process for installing the toe space module 344 into the platform 340. The toe space module 344 is angled upwards and inserted into the opening 342 of the platform 340. The toe space module 344 is then rotated downwards through the opening such that the flange and/or tabs of the toe space module substantially contact the inner surface of the platform 340. FIGS. 36A-C show two bottom perspective views and a side view of the assembled toe space module 344 and platform 340. FIGS. 36D-E show two close up bottom perspective views of the assembled toe space module 344 and platform 340.

The module includes an interior flange zone and an exterior flange zone that provide contact surfaces when the module is inserted into a cutout in the platform sidewall. The exterior flange zone is configured to contact an exterior surface of the platform sidewall when the interior flange zone contacts an inner surface of the sidewall. This places the interior contact areas between the module and the platform under compression when force is applied to the module, and thus reducing or eliminating tension stress in these areas.

Alternatively, the toe space module is attached to the platform via components such as one or more brackets. The brackets are preferably constructed out of the same material as the platform and/or the toe space module. Alternatively, the brackets are constructed out of any material used for construction of the platform and/or the toe space module. The brackets are preferably constructed out of insulating material. Brackets are also constructed out of nylon and/or fiberglass, including pultruded fiberglass, and/or metal, such as steel, alloy steel, iron, brass, aluminum, chrome, and silicon bronze, in other embodiments of the present invention.

Figure 44A:
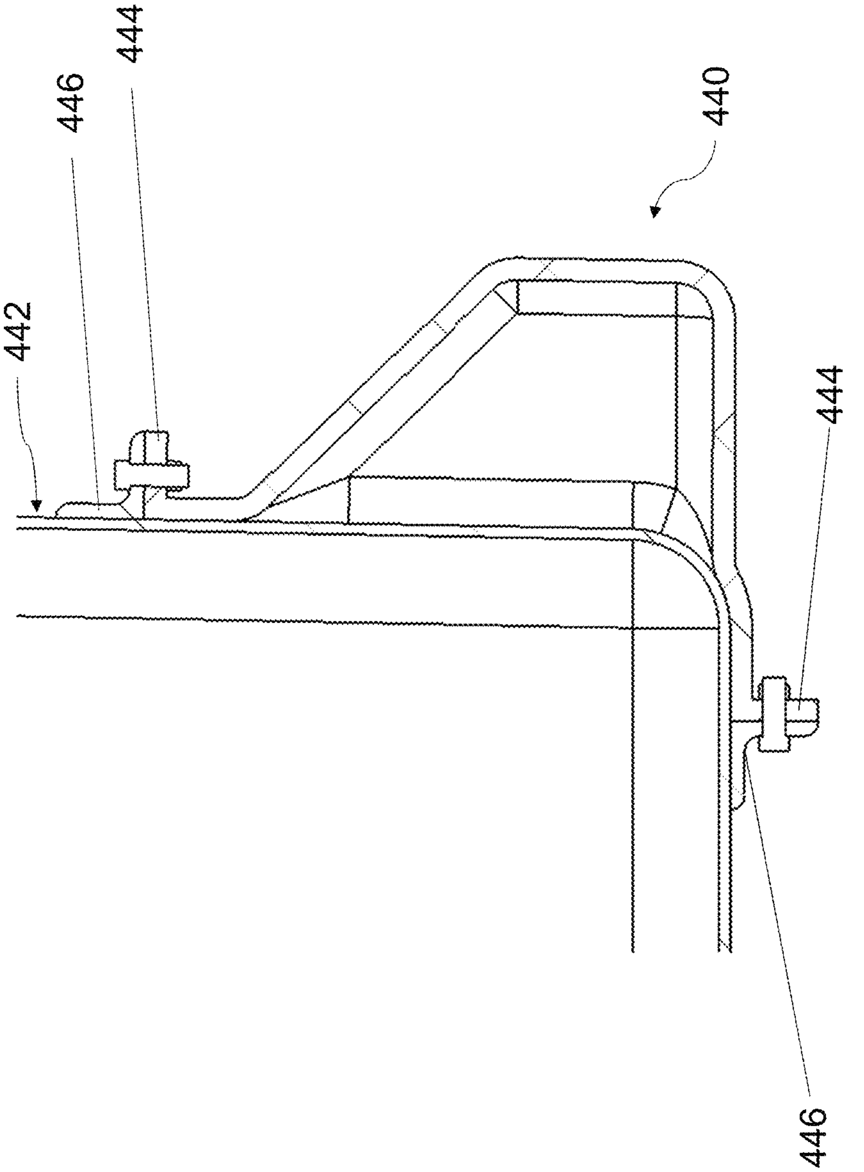
FIG. 44A is a side view of a bracketed toe space module attached to a bracketed platform via a first set of brackets.
Figure 44B:
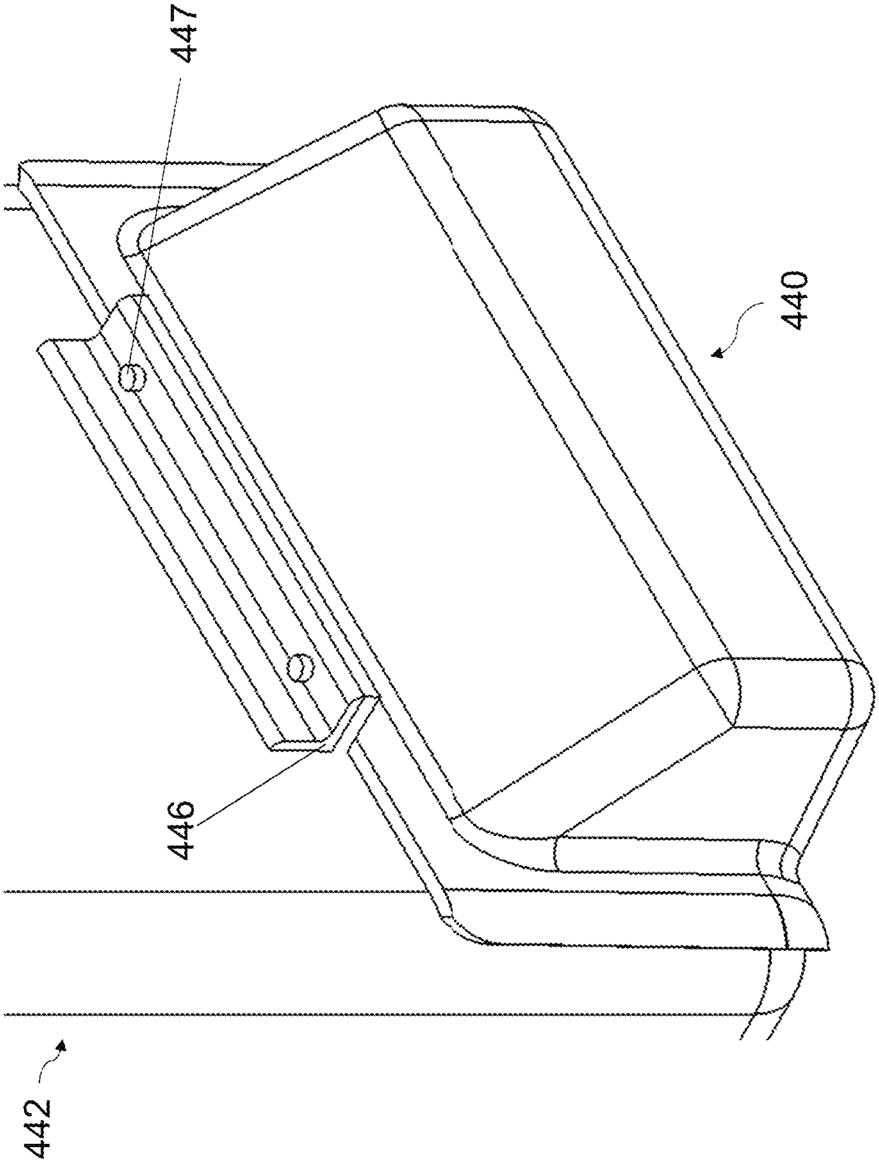
FIG. 44B is a front perspective view of a bracketed toe space module attached to a bracketed platform via a first set of brackets.
Figure 44C:
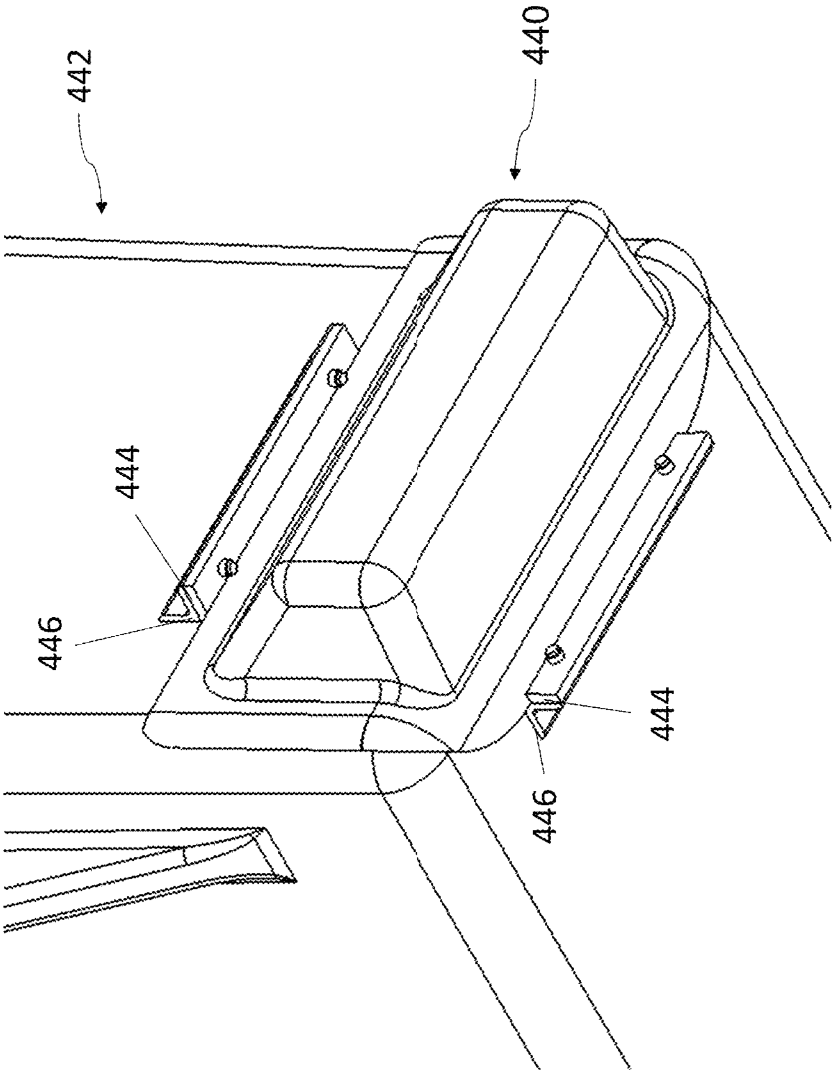
FIG. 44C is a bottom perspective view of a bracketed toe space module attached to a bracketed platform via a first set of brackets.
Figure 44D:
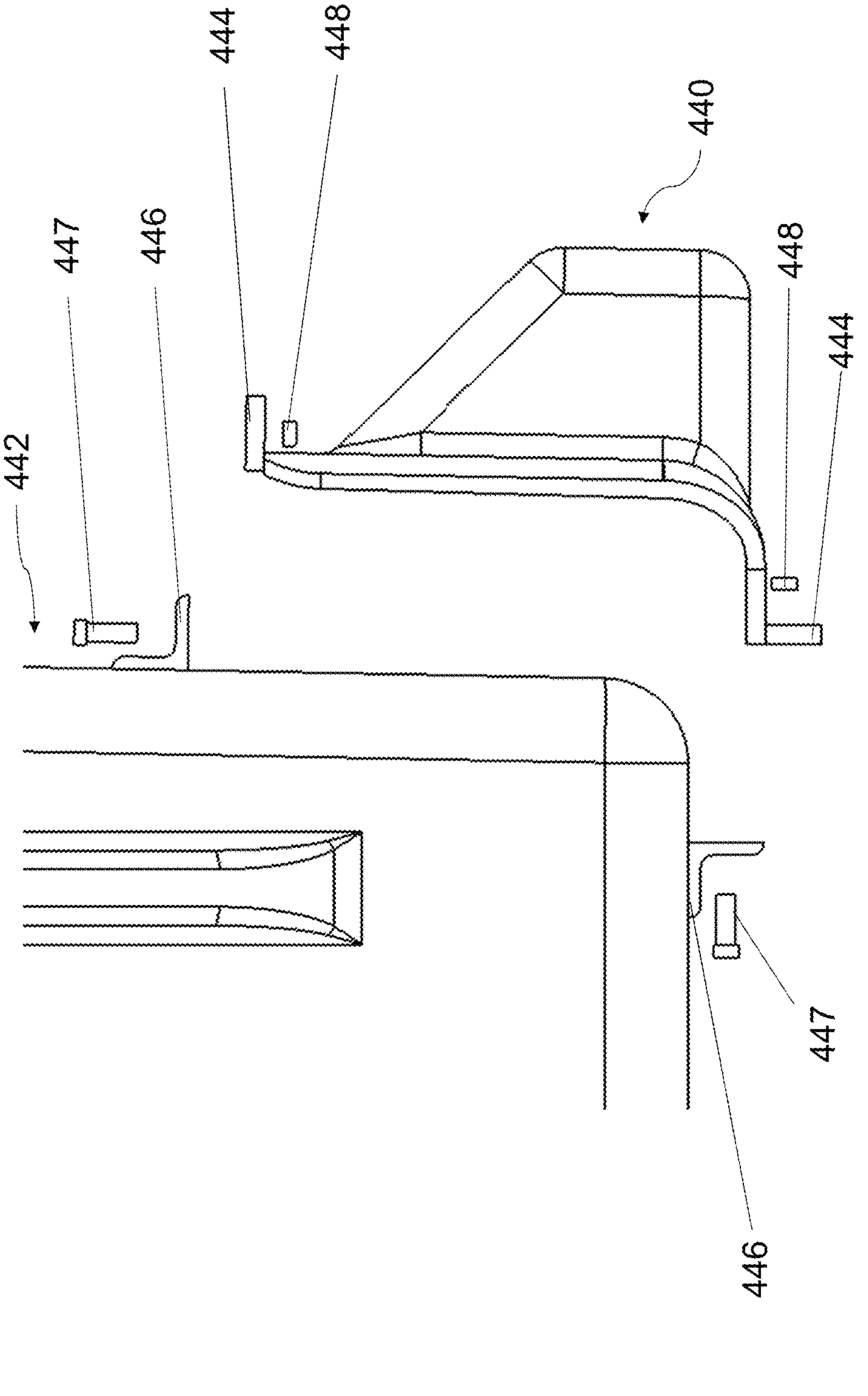
FIG. 44D is a side exploded view of a bracketed toe space module attached to a bracketed platform via a first set of brackets.

FIGS. 44A-D illustrate several views of a bracketed toe space module 440 attached to a bracketed platform 442 via a first set of brackets including toe space module brackets 444 and platform brackets 446. The brackets are integrally formed with the bracketed toe space module 440 and the bracketed platform 442 in one embodiment. Alternatively, the brackets are manufactured separately and are attached to the bracketed toe space module 440 and the bracketed platform 442. FIG. 44D is a side exploded view of the bracketed toe space module 440, the bracketed platform 442, and the first fasteners 447 and second fasteners 448 used to join the bracketed platform 442 to the bracketed toe space module 440. Preferably, the first fasteners 447 are bolts and the second fasteners 448 are nuts. Alternatively, the first fasteners 447 and the second fasteners are any set of connectors. The first fasteners 447 and the second fasteners 448 are constructed out of the same material as the toe space module and/or the platform in one embodiment. Alternatively, the first fasteners 447 and the second fasteners 448 are constructed out of insulating materials. Preferred embodiments for the fasteners includes one or more composites such as fiberglass. Alternatively, metal such as steel, alloy steel, iron, brass, aluminum, chrome, and silicon bronze are used for the fasteners. In another embodiment, no fasteners are utilized and the brackets are attached via adhesive, welding, chemical bonding, physical bonding, welding including metal welding and/or plastic welding such as hot gas welding, ultrasonic welding, spin welding, vibration welding, contact welding, laser welding, hot plate welding, etc., magnetism, vacuum, and any other method of attachment recited for attaching other components in the present application.

Figure 44E:
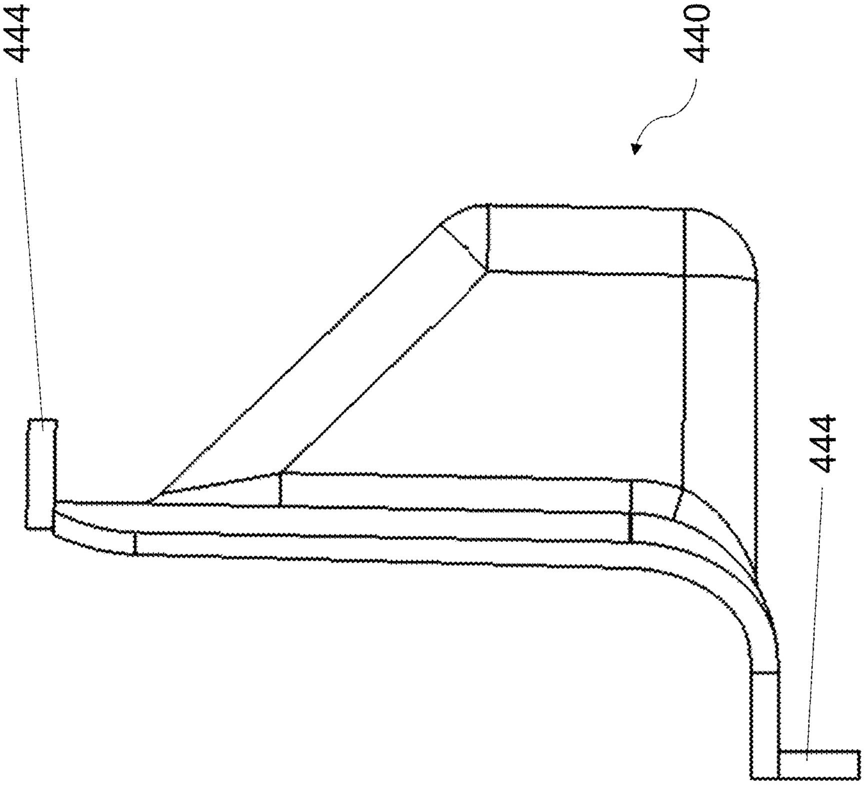
FIG. 44E is a side view of a bracketed toe space module with the toe space module brackets of the first set of brackets.
Figure 44F:
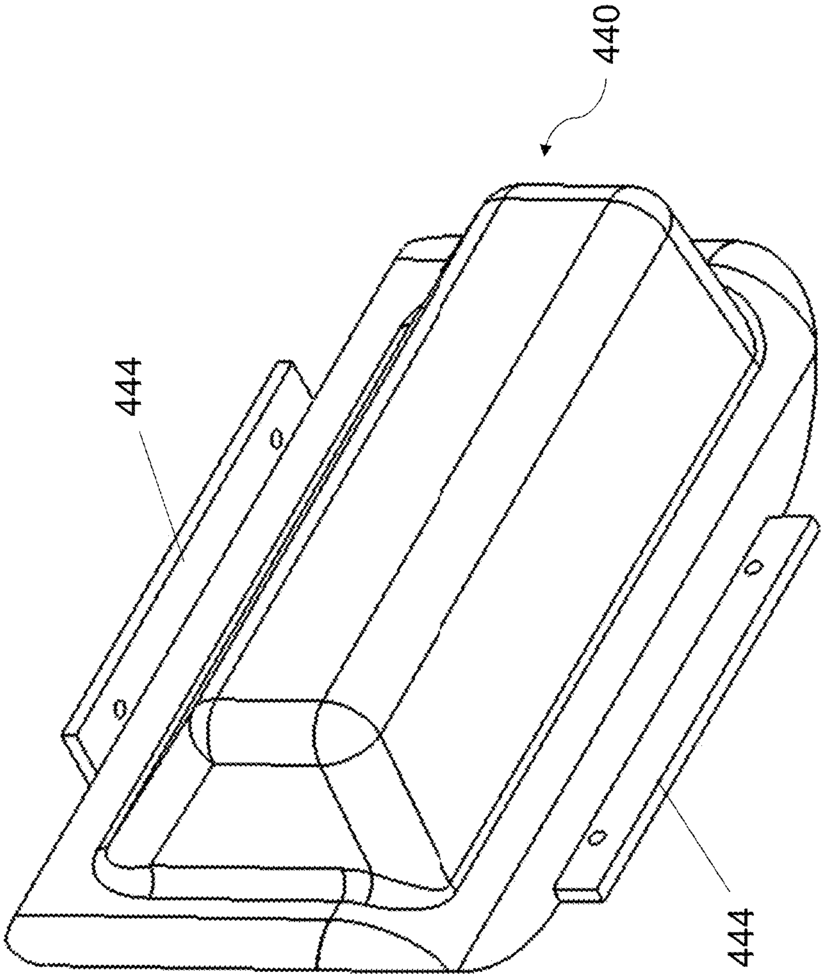
FIG. 44F is a bottom perspective view of a bracketed toe space module with the toe space module brackets of the first set of brackets.
Figure 44G:
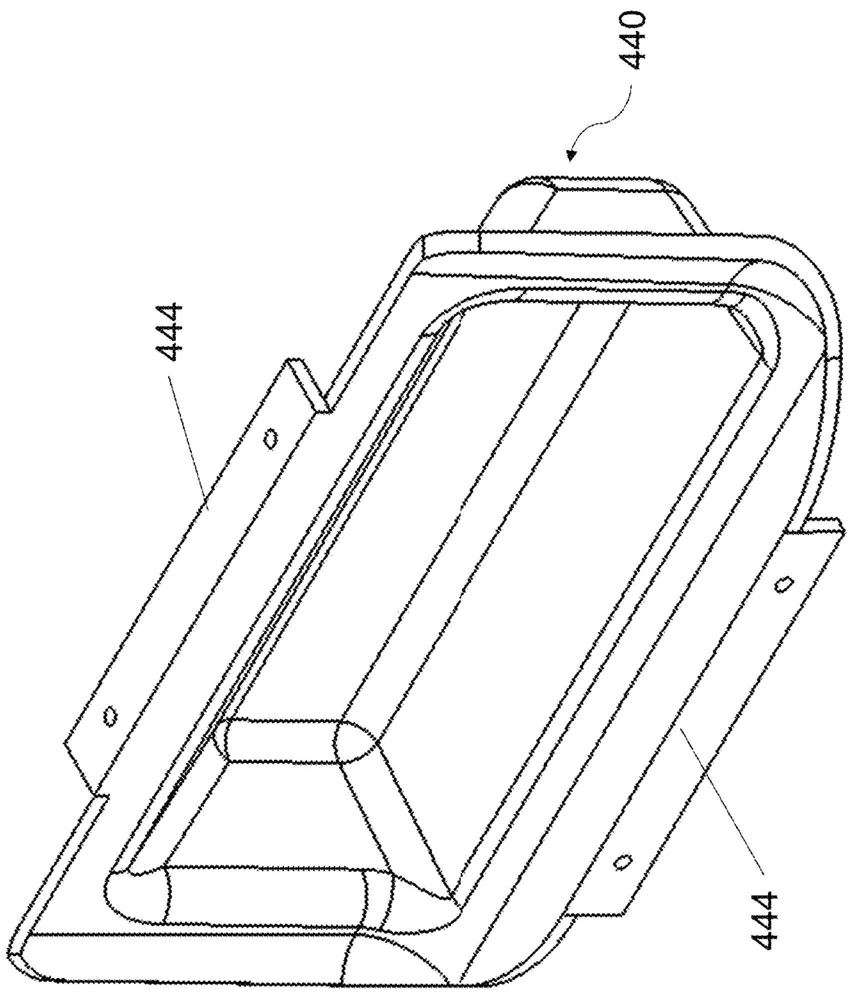
FIG. 44G is a rear perspective view of a bracketed toe space module with the toe space module brackets of the first set of brackets.

FIGS. 44E-44G illustrate several views of the bracketed toe space module 440. The toe space module brackets 444 include holes for securing the bracketed toe space module 440 to the brackets 446 of the bracketed platform 442.

Figure 45A:
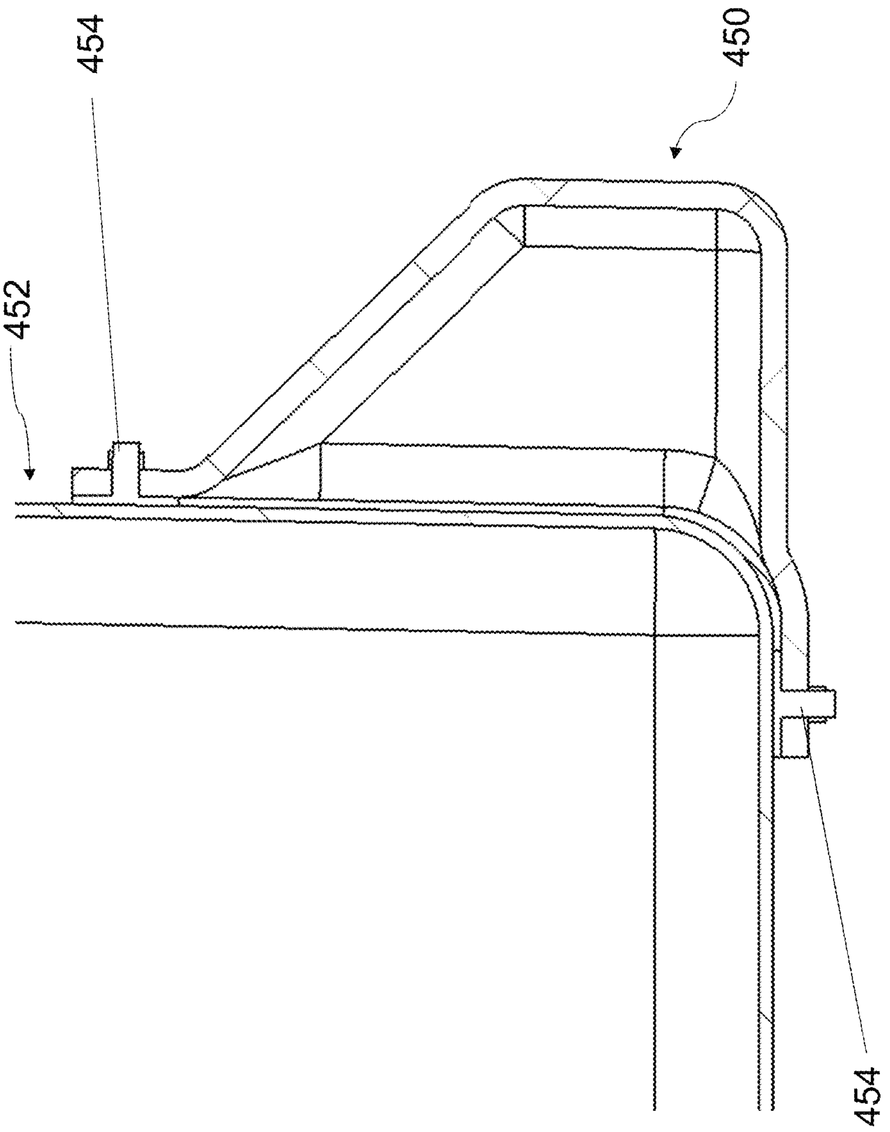
FIG. 45A is a side view of a toe space module with holes and slots attached to a bracketed fastener platform via bracketed fasteners.
Figure 45B:
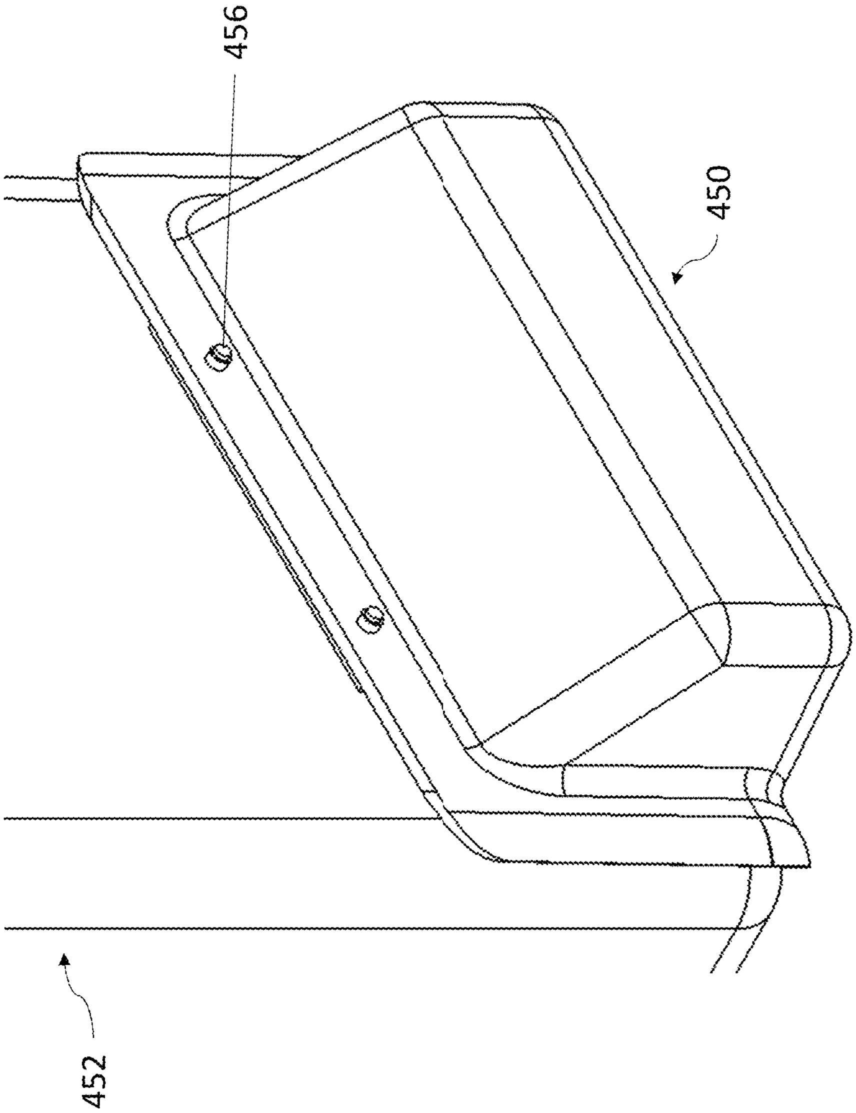
FIG. 45B is a front perspective view of a toe space module with holes and slots attached to a bracketed fastener platform via bracketed fasteners.
Figure 45C:
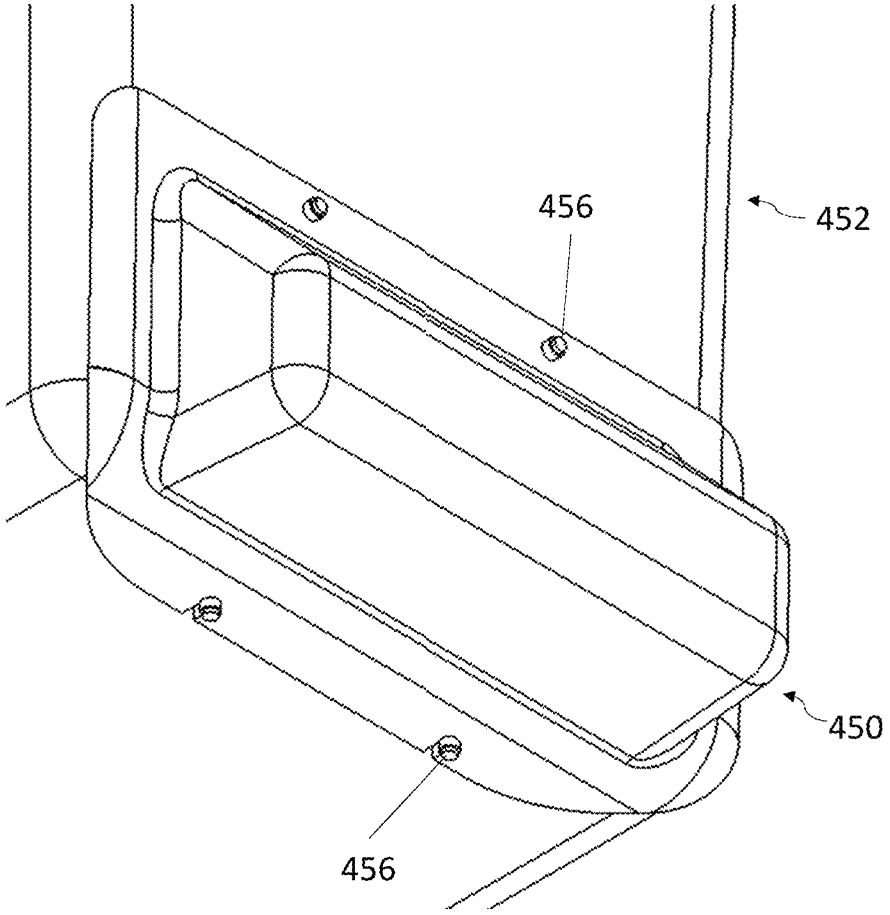
FIG. 45C is a bottom perspective view of a toe space module with holes and slots attached to a bracketed fastener platform via bracketed fasteners.
Figure 45D:
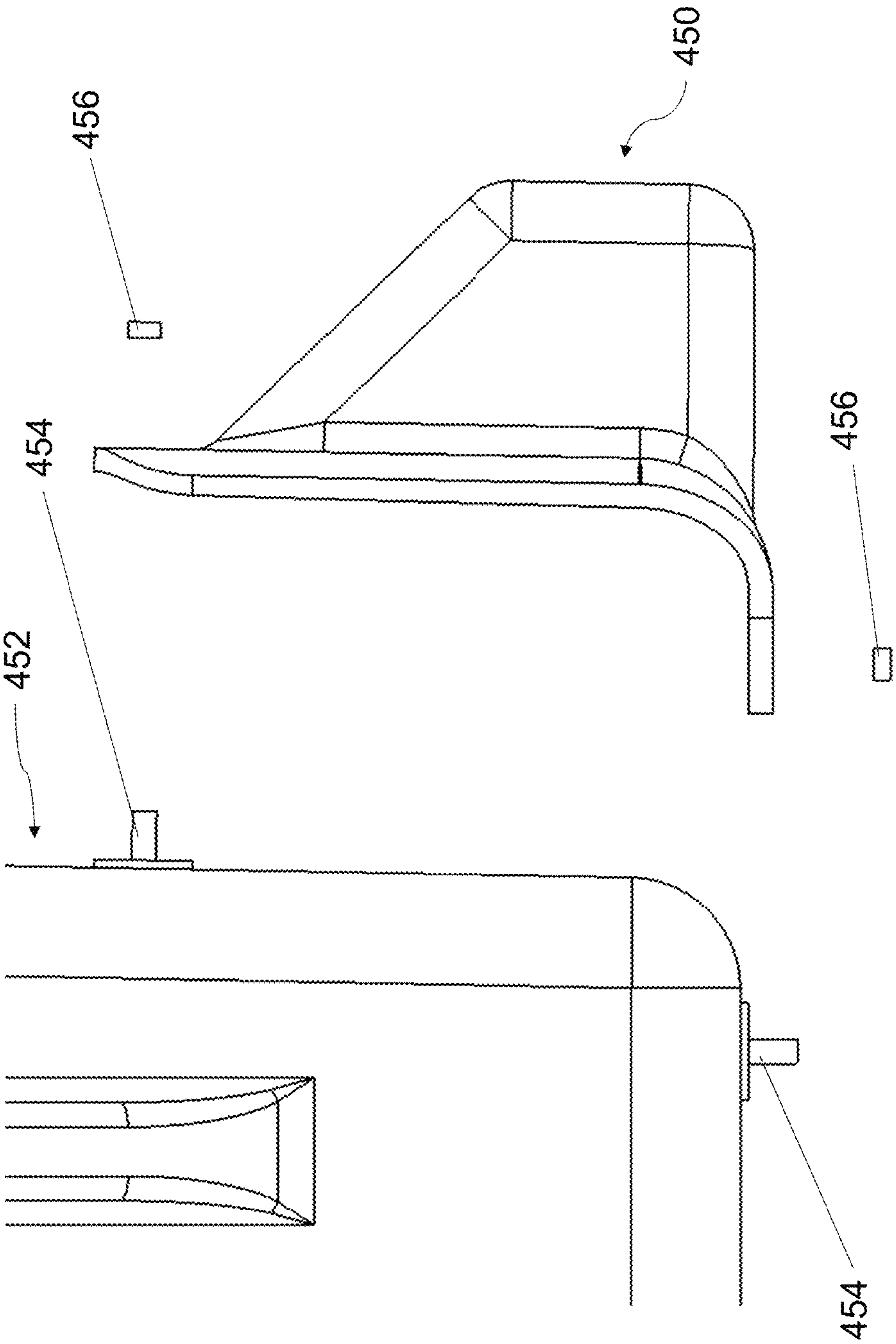
FIG. 45D is a side exploded view of a toe space module with holes and slots attached to a bracketed fastener platform via bracketed fasteners.

FIGS. 45A-D illustrate several views of a toe space module with holes and slots 450 attached to the bracketed fastener platform 452 via bracketed fasteners 454. The holes of the toe space module with holes and slots 450 are formed in the flange or tabs formed around the recess of the toe space module. FIG. 45D is a side exploded view of the toe space module with holes and slots 450, the bracketed fastener platform 452, the bracketed fasteners 454, and detachable fasteners 456. The bracketed fasteners 454 are attached to the bracketed fastener platform via a fastener component of the bracketed fasteners 454 in one embodiment. Alternatively, the bracketed fasteners are attached to the bracketed fastener platform 452 via a bracket component of the bracketed fasteners, and the bracketed fasteners 454 are integrally formed with the platform or are attached by welding, adhesive, or any other form of attachment recited for any components in the present specification. The fasteners of the bracketed fasteners 454 and the detachable fasteners are preferably nuts and bolts but alternatively are any other type of fastener or fasteners.

Figure 45E:
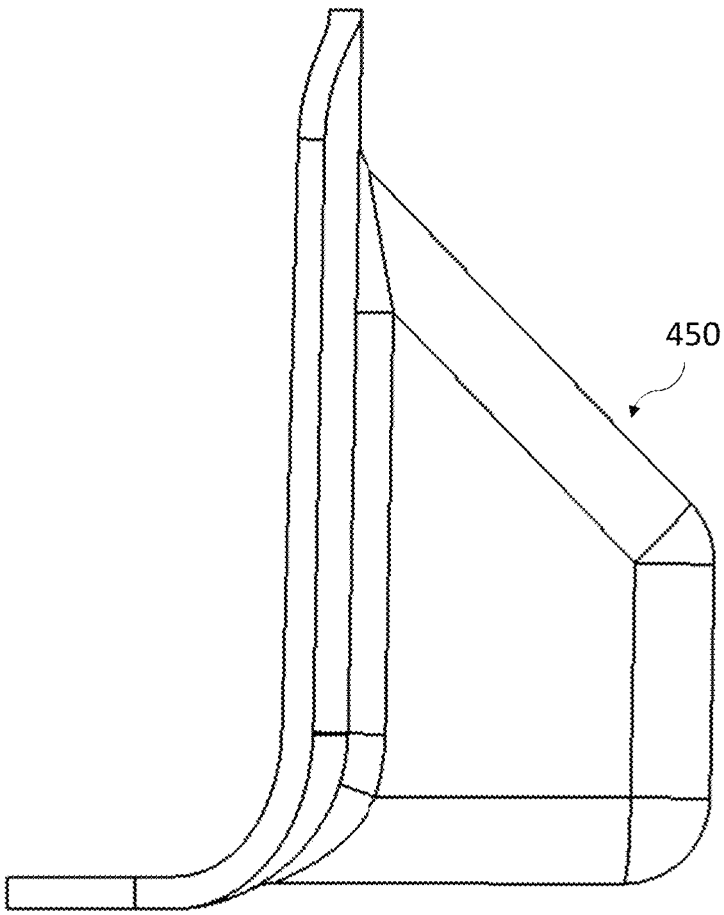
FIG. 45E is a side view of a toe space module with holes and slots.
Figure 45F:
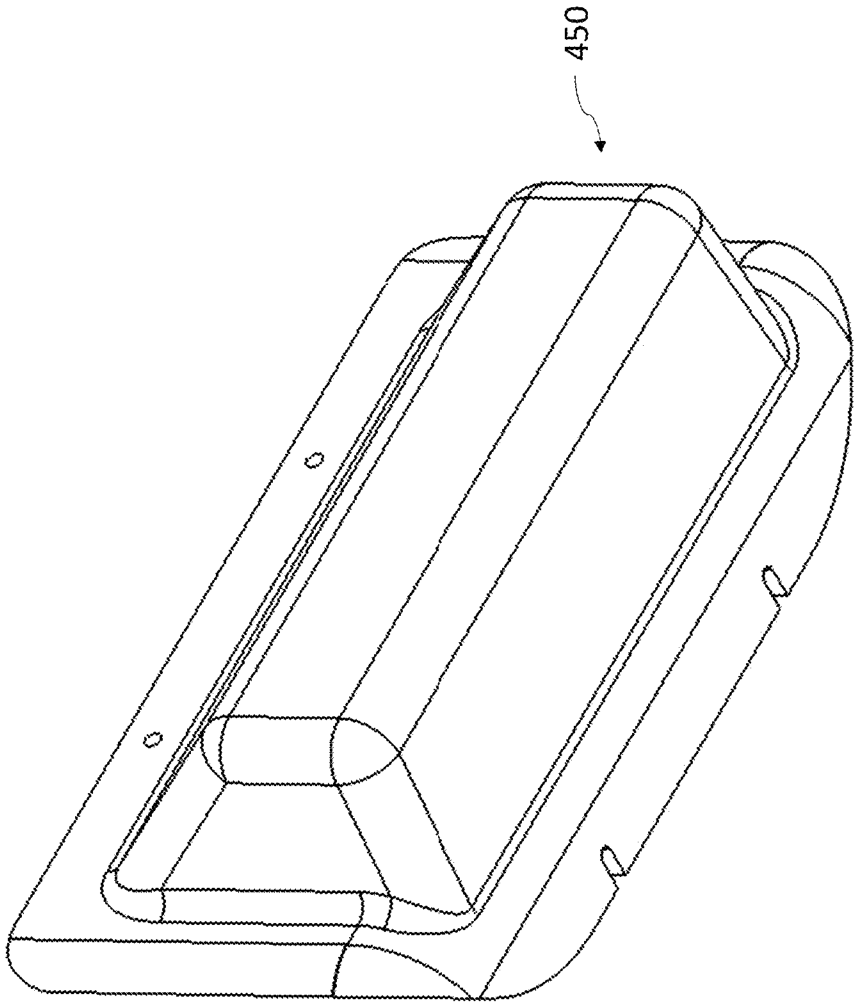
FIG. 45F is a bottom perspective view of a toe space module with holes and slots.
Figure 45G:
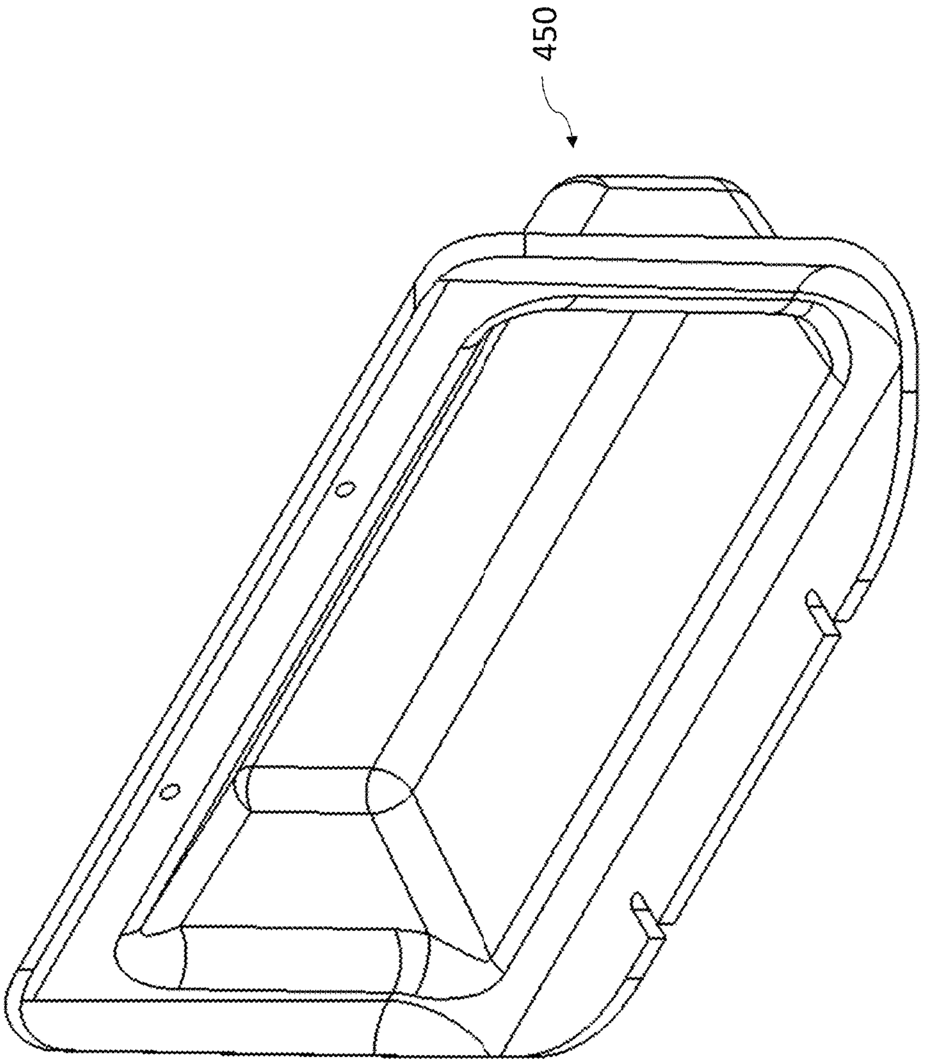
FIG. 45G is a rear perspective view of a toe space module with holes and slots.

FIGS. 45E-45G illustrate several views of the toe space module with holes and slots 450. The holes and slots are sized such that one of the fasteners is operable to penetrate the holes and slots to fasten the toe space module with holes and slots 450 to the bracketed fastener platform 452. Alternatively, the toe space module includes only holes or only slots.

FIGS. 46A-D illustrate several views of a stepped bracket platform 462 attached to a sized flange toe space module 460 with a sized flange 461 and a sized tab 463 sized to fit in the stepped brackets 464 of the stepped bracket platform 462. The stepped brackets 464 of the stepped bracket platform 462 are located on the bottom and side of the platform and are sized such that the sized flange 461 and/or sized tab 463 matingly fits into the stepped brackets 464. Alternatively, the sized flange 461 and/or the sized tab 463 are held under tension by the stepped brackets 464. The stepped bracket platform 462 and sized flange toe space module 460 advantageously do not require fasteners for assembly. In one embodiment, the stepped brackets 464 are integrally formed with the stepped bracket platform. In another embodiment, the stepped brackets 464 are attached to the stepped bracket platform 460 via welding, adhesive, or any other method of attachment referred to for joining components in the present specification.

Figure 46A:
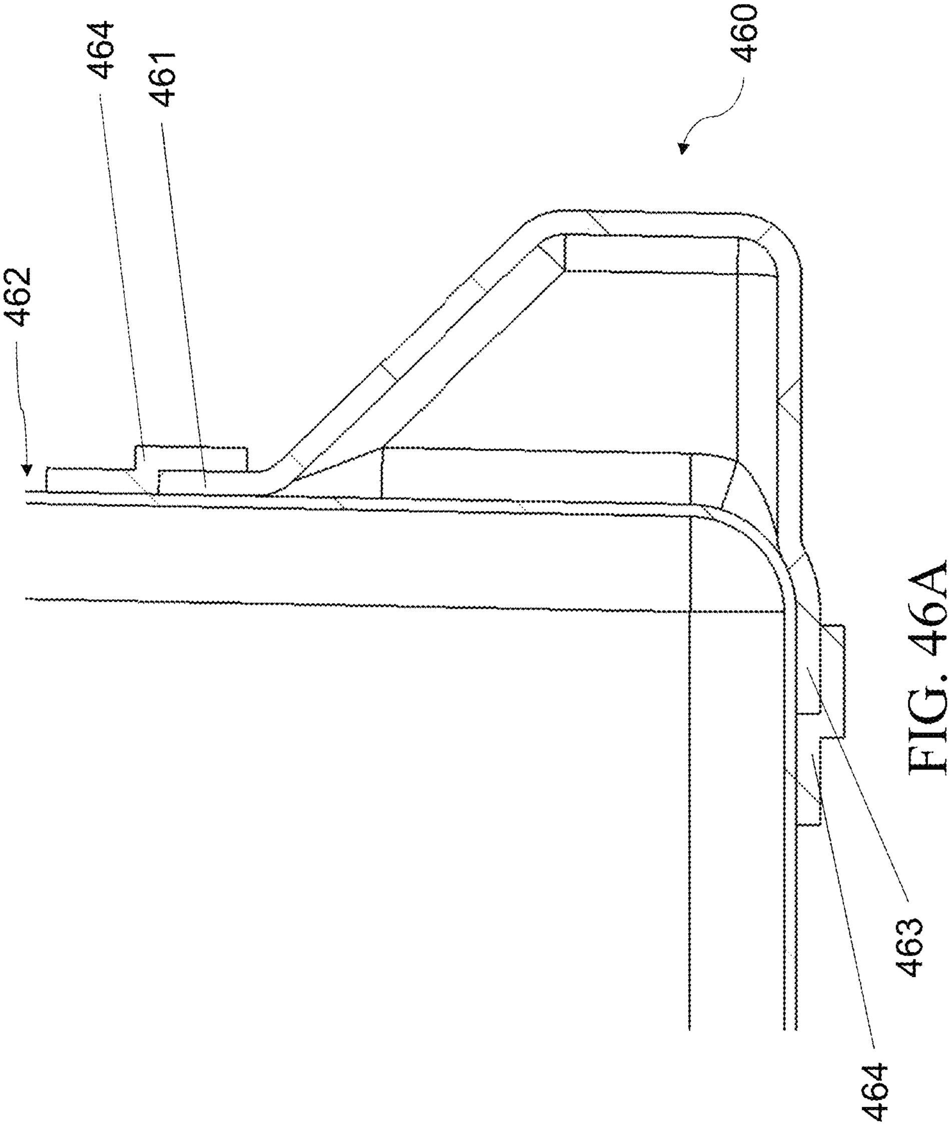
FIG. 46A is a side view of a sized flange toe space module attached to a stepped bracket platform.
Figure 46B:
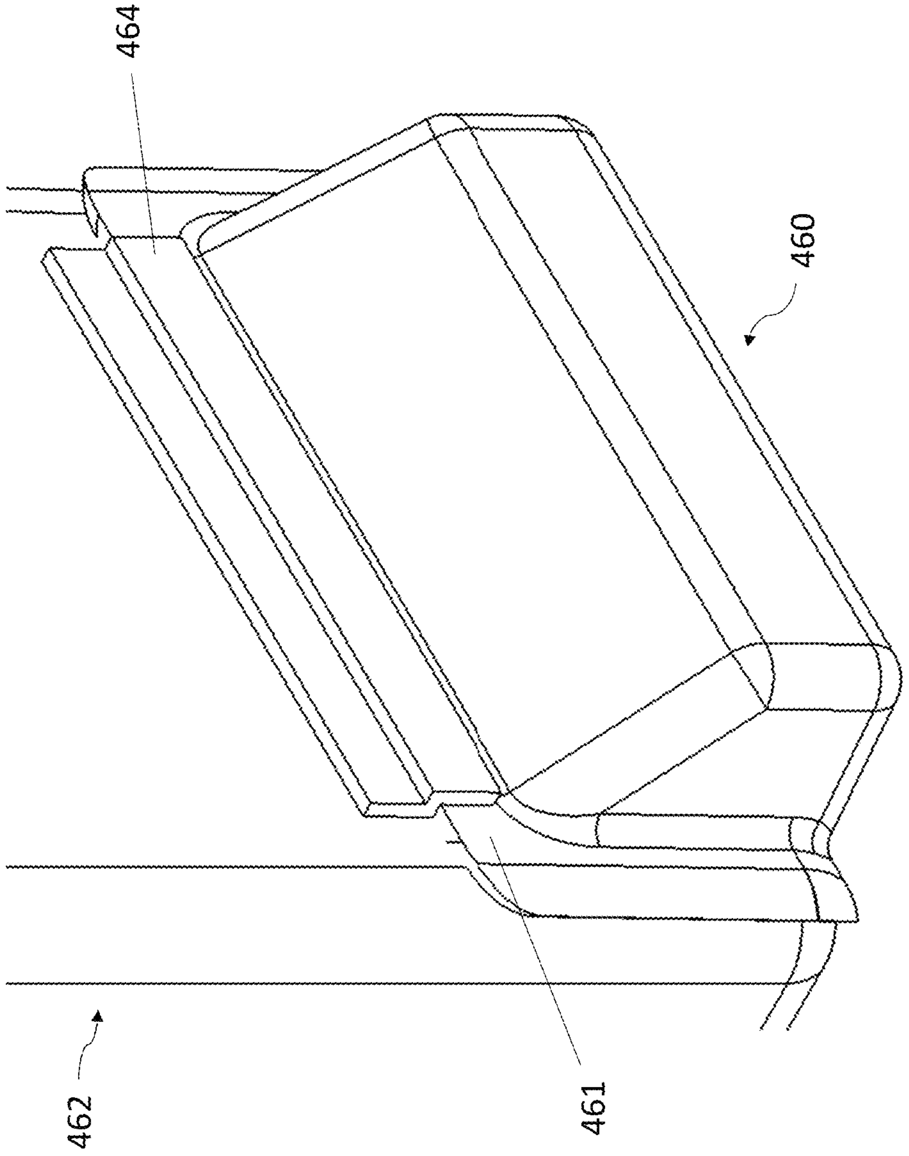
FIG. 46B is a front perspective view of a sized flange toe space module attached to a stepped bracket platform.
Figure 46C:
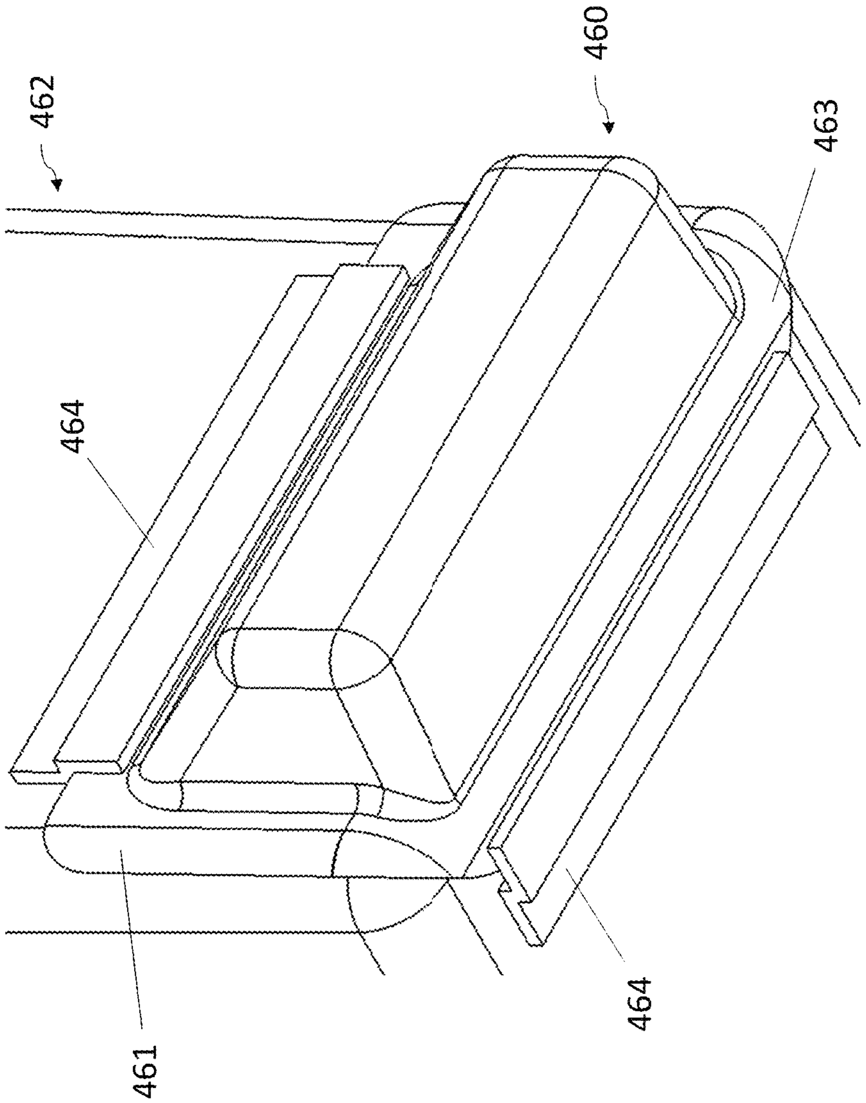
FIG. 46C is a bottom perspective view of a sized flange toe space module attached to a stepped bracket platform.
Figure 46D:
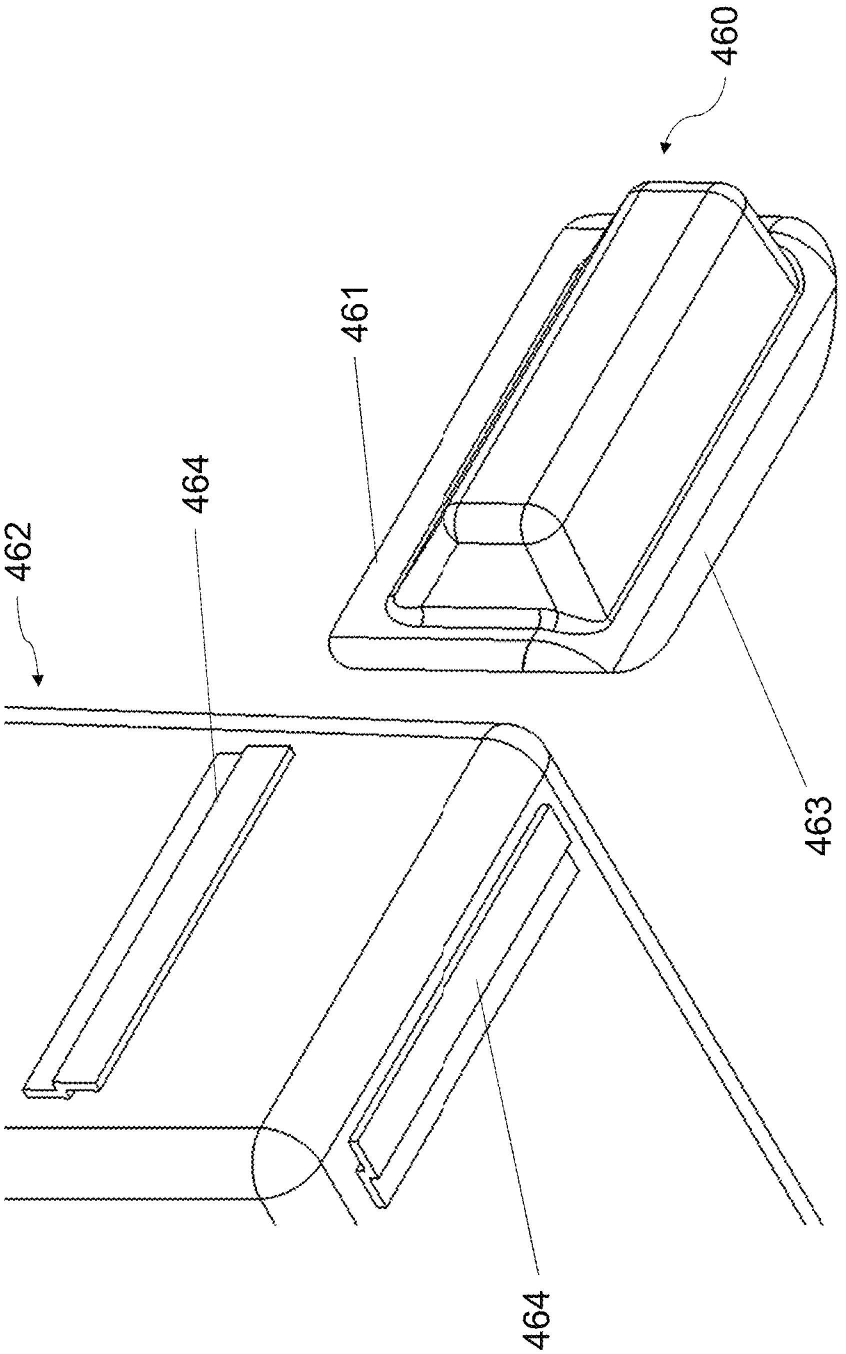
FIG. 46D is a bottom exploded view of a sized flange toe space module attached to a stepped bracket platform.

FIG. 46D is a side exploded view of the stepped bracket platform 462 attached to the sized flange toe space module 460 with the sized flange 461 and the sized tab 463. Alternatively, the sized flange 461 and the sized tab 463 are integrally formed as one piece around the body of the toe space module.

FIGS. 47A-D illustrate several views of an embedded stepped bracket platform 472 attached to a sized flange toe space module 470 with a sized flange 471 and a sized tab 473 sized to fit in the embedded stepped brackets 474 of the embedded stepped bracket platform 472. The embedded stepped brackets 474 of the embedded stepped bracket platform 472 are located on the bottom and side of the platform and are sized such that the sized flange 471 and/or sized tab 473 matingly fits into the embedded stepped brackets 474. Alternatively, the sized flange 471 and/or the sized tab 473 are held under tension by the embedded stepped brackets 474. The embedded stepped bracket platform 472 and sized flange toe space module 470 advantageously do not require fasteners for assembly. In one embodiment, the embedded stepped brackets 474 are integrally formed with the embedded stepped bracket platform. In another embodiment, the embedded stepped brackets 474 are attached to the embedded stepped bracket platform 470 via welding, adhesive, or any other method of attachment referred to for joining components in the present specification. The embedded stepped bracket platform includes slots or openings to receive the stepped brackets in one embodiment.

Figure 47A:
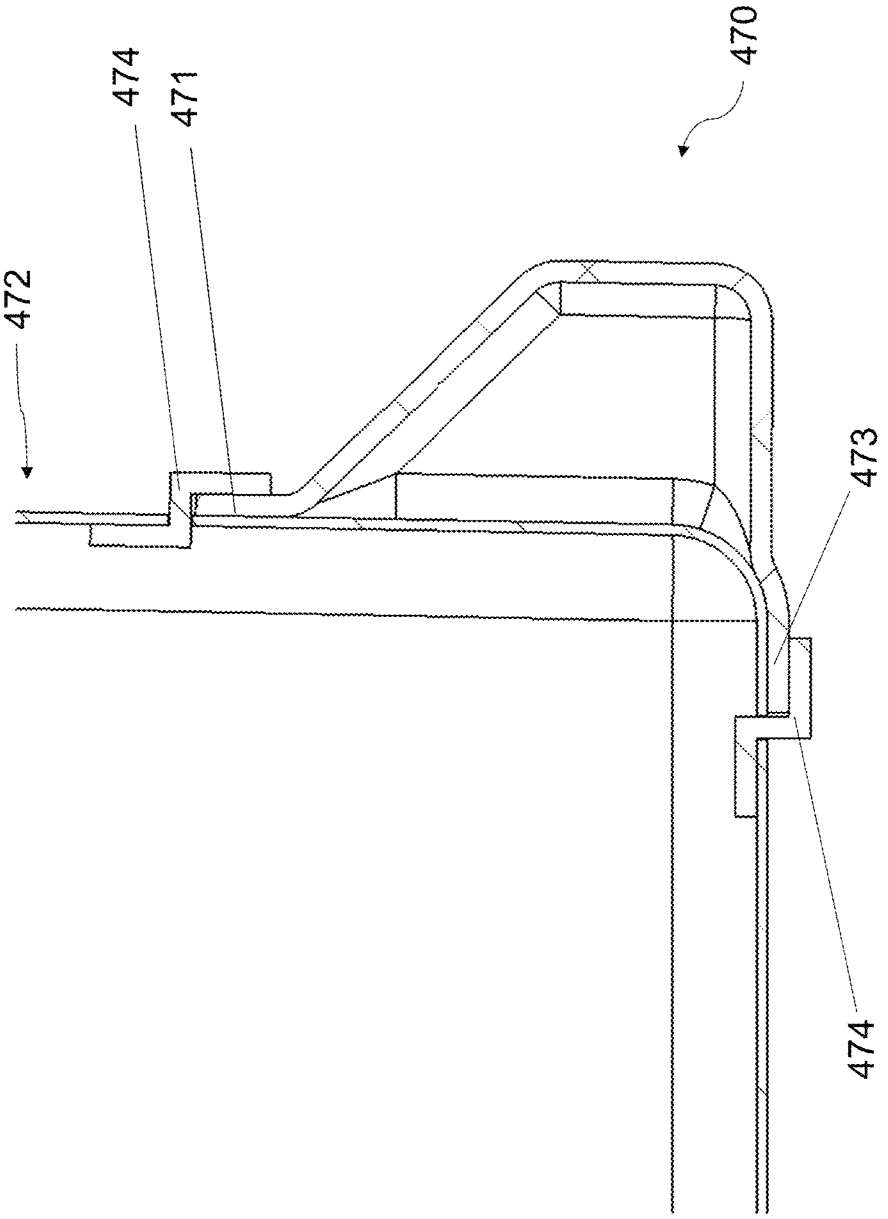
FIG. 47A is a side view of a sized flange toe space module attached to an embedded stepped bracket platform.
Figure 47B:
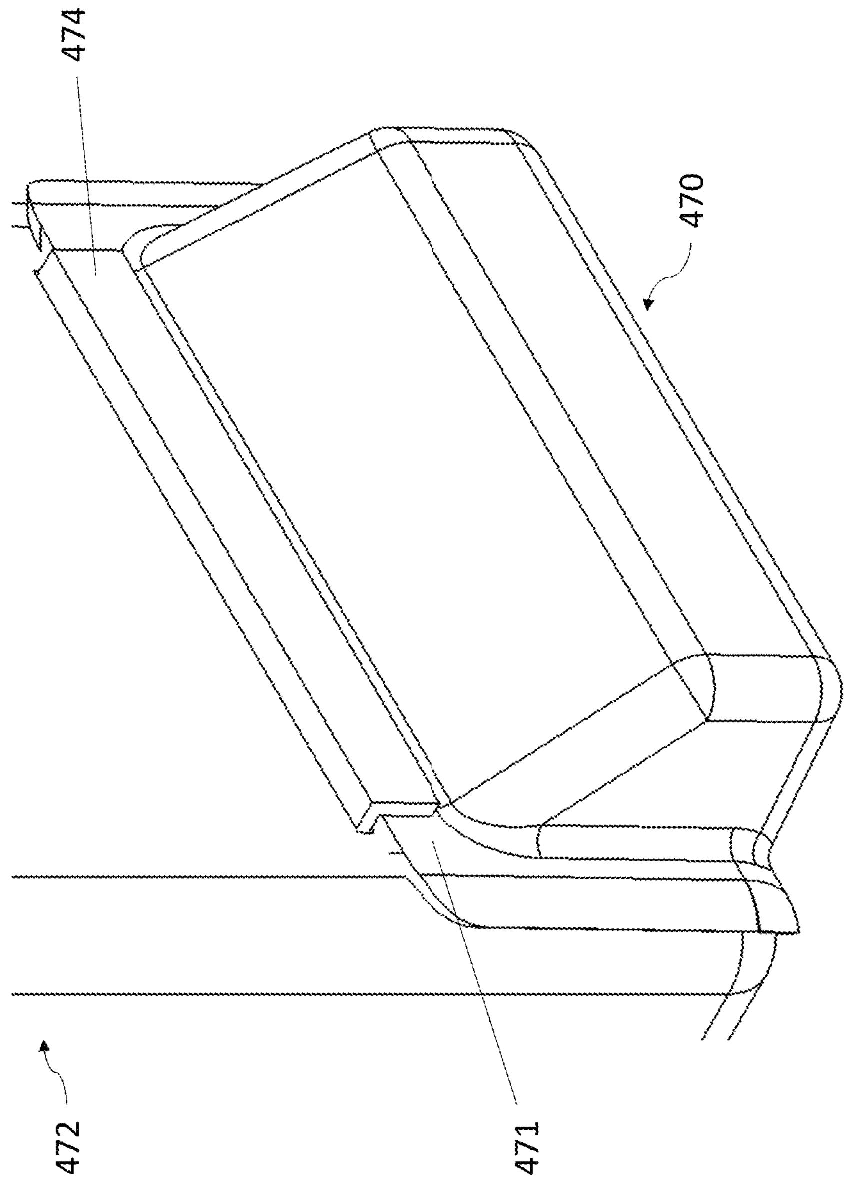
FIG. 47B is a front perspective view of a sized flange toe space module attached to an embedded stepped bracket platform.
Figure 47C:
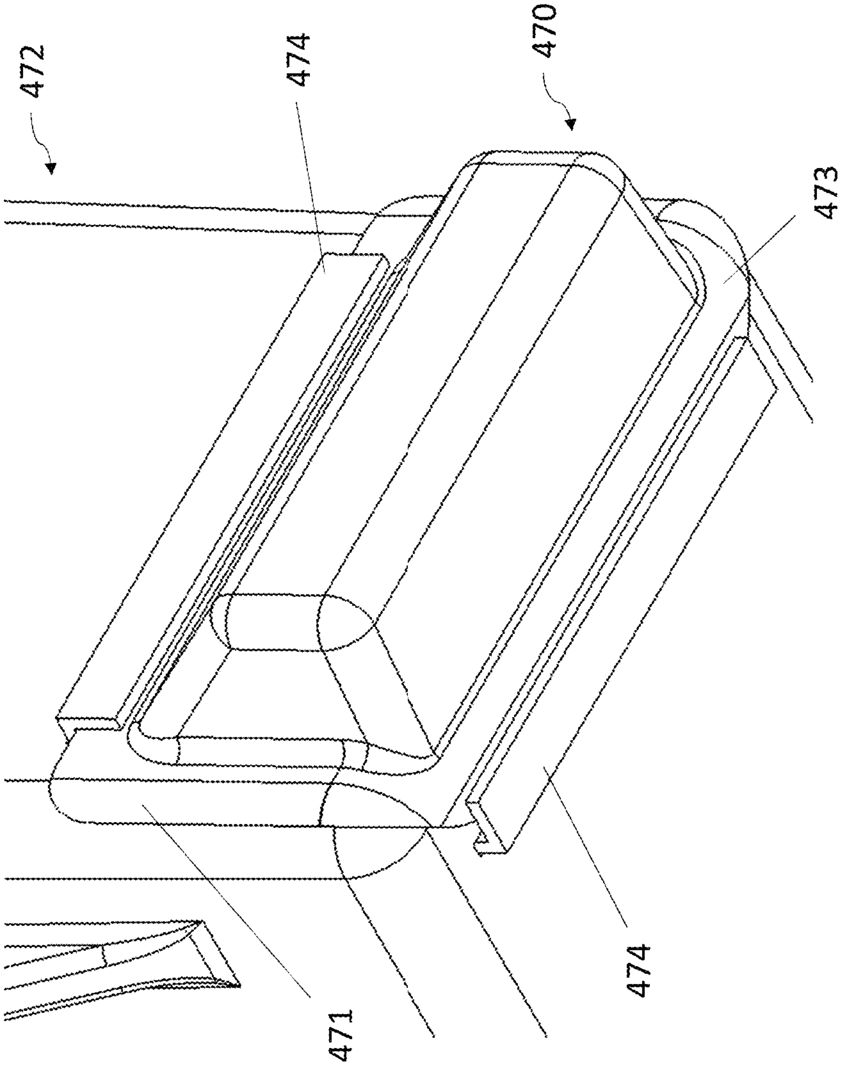
FIG. 47C is a bottom perspective view of a sized flange toe space module attached to an embedded stepped bracket platform.
Figure 47D:
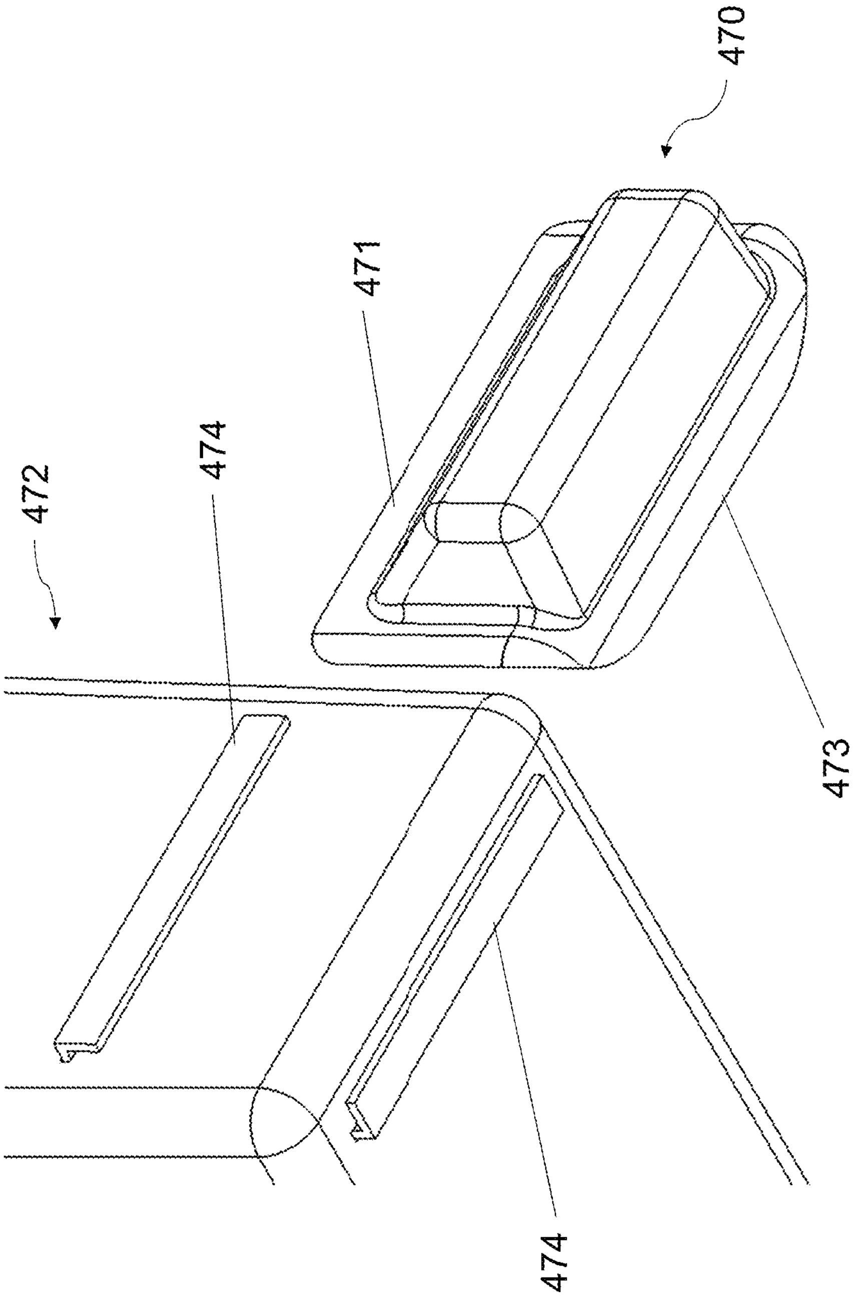
FIG. 47D is a side exploded view of a sized flange toe space module attached to an embedded stepped bracket platform.
Figure 47E:
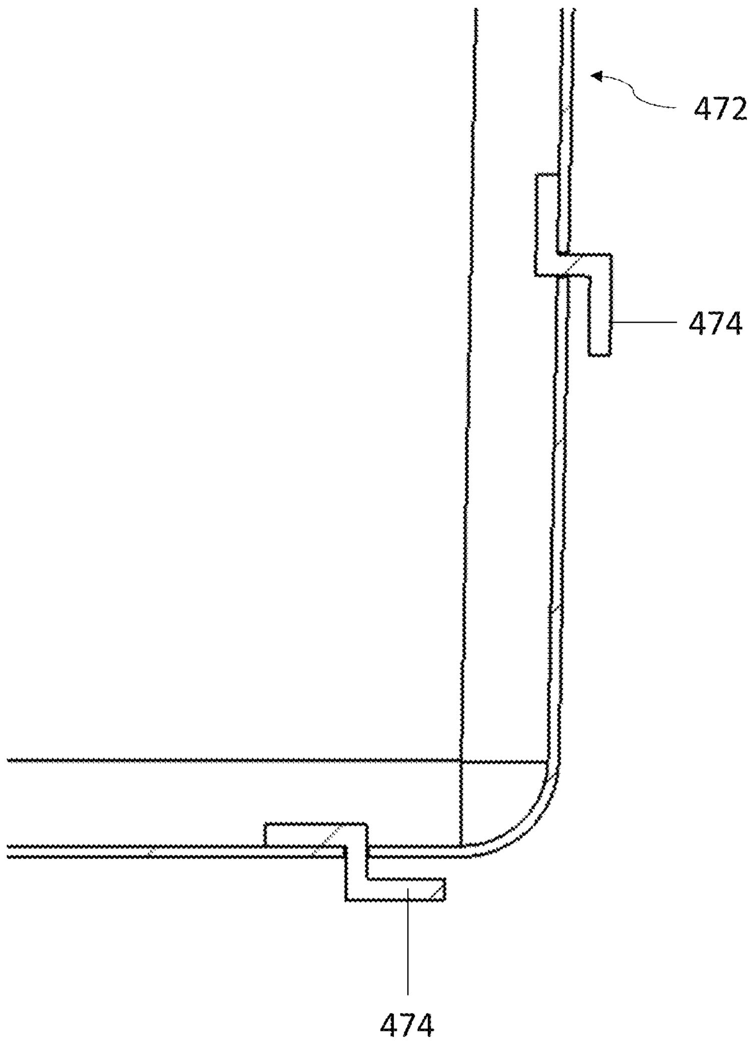
FIG. 47E is a side view of an embedded stepped bracket platform.

FIG. 47D is a side exploded view of the embedded stepped bracket platform 472 attached to the sized flange toe space module 470 with the sized flange 471 and the sized tab 473. Alternatively, the sized flange 471 and the sized tab 473 are integrally formed as one piece around the body of the toe space module.

Figure 19A:
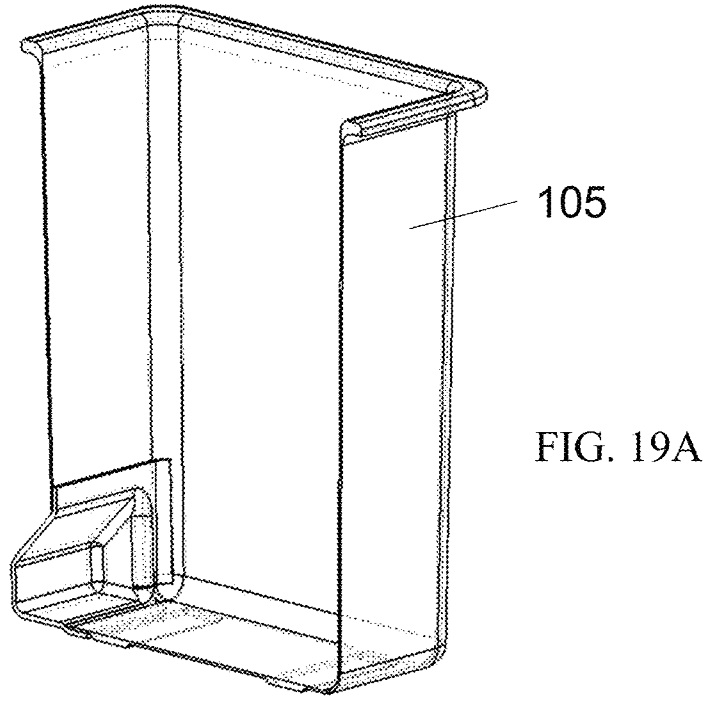
FIGS. 19A-B illustrate the toe space module of FIGS. 18A-D installed in a platform.
Figure 19B:
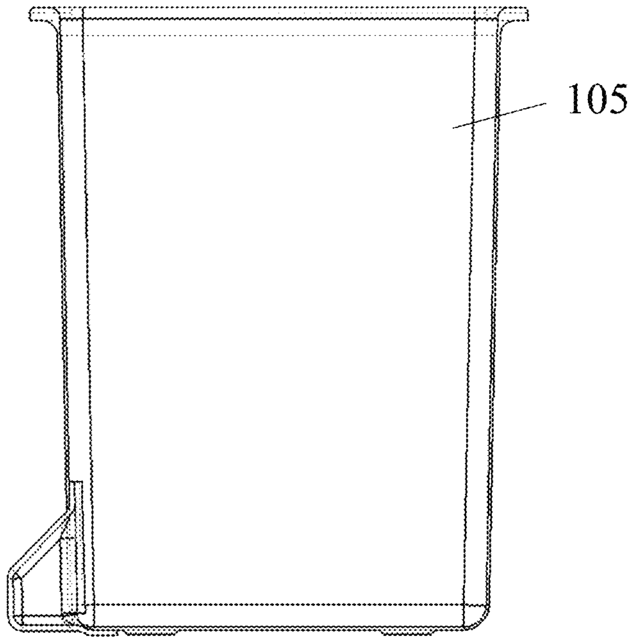
Figure 20A:
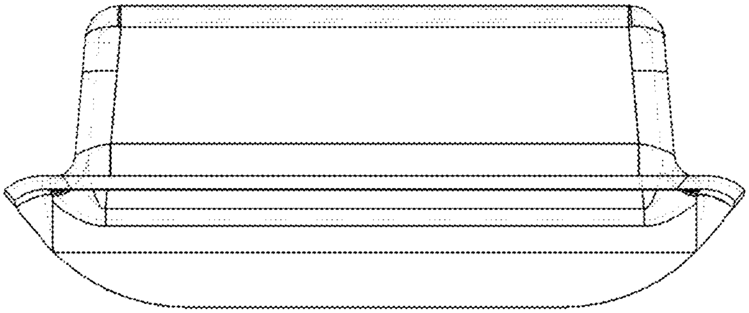
FIGS. 20A-D illustrate a combination step and toe space module.
Figure 20B:
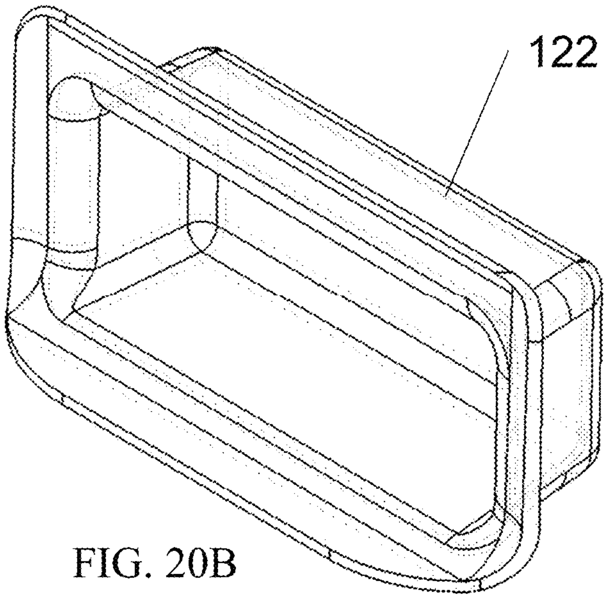
Figure 20C:
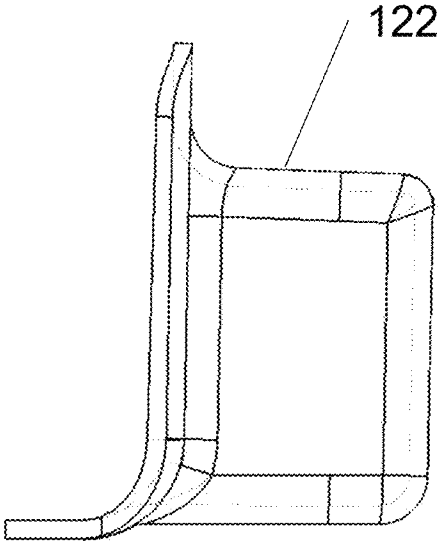
Figure 20D:
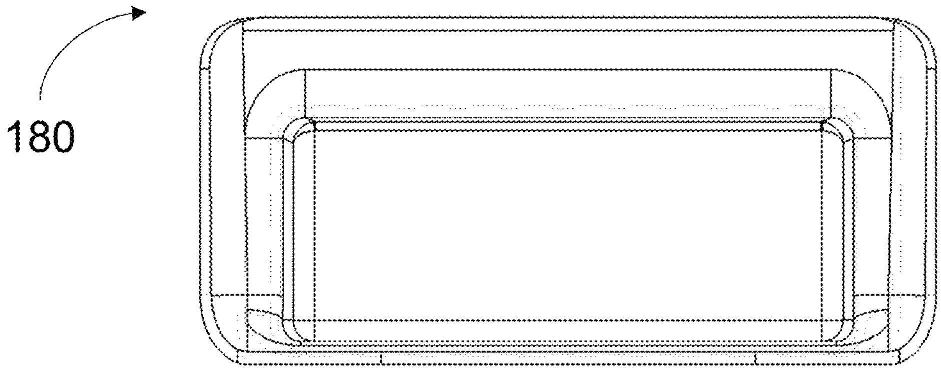

FIGS. 18A-D illustrate a compression toe space module that is configured to be installed such that the side and top flanges and/or tabs are on the inside of the platform, and the bottom tab is outside the platform. This configuration provides for the interior contact surfaces between the module and platform to be under compression when a load is applied to the module's top surface 121. FIGS. 19A-B are cross-sectional views of the compression toe space module installed in a platform.

Toe Space Step

The present invention also provides for the incorporation of a step into the toe space module. As shown in FIGS. 2, 3, 17A-D, 20A-24B, a step and toe space module 180 is formed with a horizontal or nearly horizontal top surface 122 that provides support for a user stepping into or out of the platform. The top surface of the step and toe space module is preferably non-slip. FIGS. 17A-D illustrate a step and toe space module with no side tabs. FIGS. 20A-D illustrate a step and toe space module with half-tabs.

The module must meet certain design requirements in order to be used as a step. Specifically, the von Mises stress of the part when subjected to a representative test must be below the material limit. For the present invention, the initial embodiment was configured as shown in FIG. 21 (Rev 01), and the initial stress maximum was 8,959 psi (9,200 psi was the allowable limit).

Figure 22:
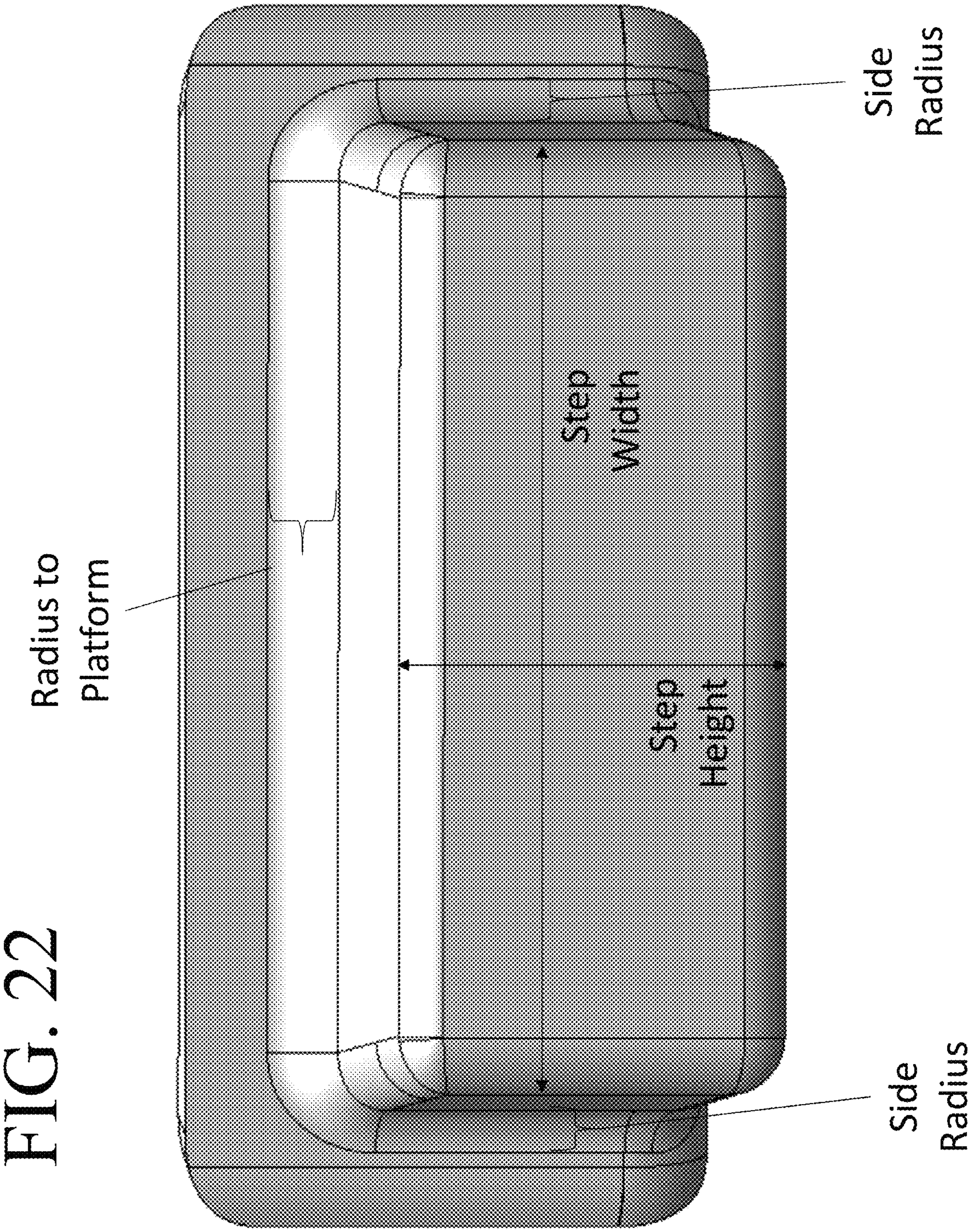
FIG. 22 illustrates the location of the radius to platform, side radius, height, width and bond distance of a step according to the present invention.

Subsequently, different parameters were varied in an attempt to reduce the stress maximum below the limit, including increasing the radius to platform, increasing the bond distance, and increasing the side radius (FIG. 21 Rev 01-Rev 06 and FIG. 22). However, while these changes reduced the stress maximum to an acceptable value for 3 inch wide steps, increasing the step width to 3.5 inches while maintaining the same radius to platform, bond distance, side radius and thickness caused the stress maximum to increase above the acceptable limit.

For the new step width, a more severe test was performed and the thickness of the material was increased. Consequently, the stress maximum increased and moved from the exterior of the step where the load is applied to the interior of the step in the area of contact with the platform sidewall (FIGS. 23 and 24).

Figure 24:
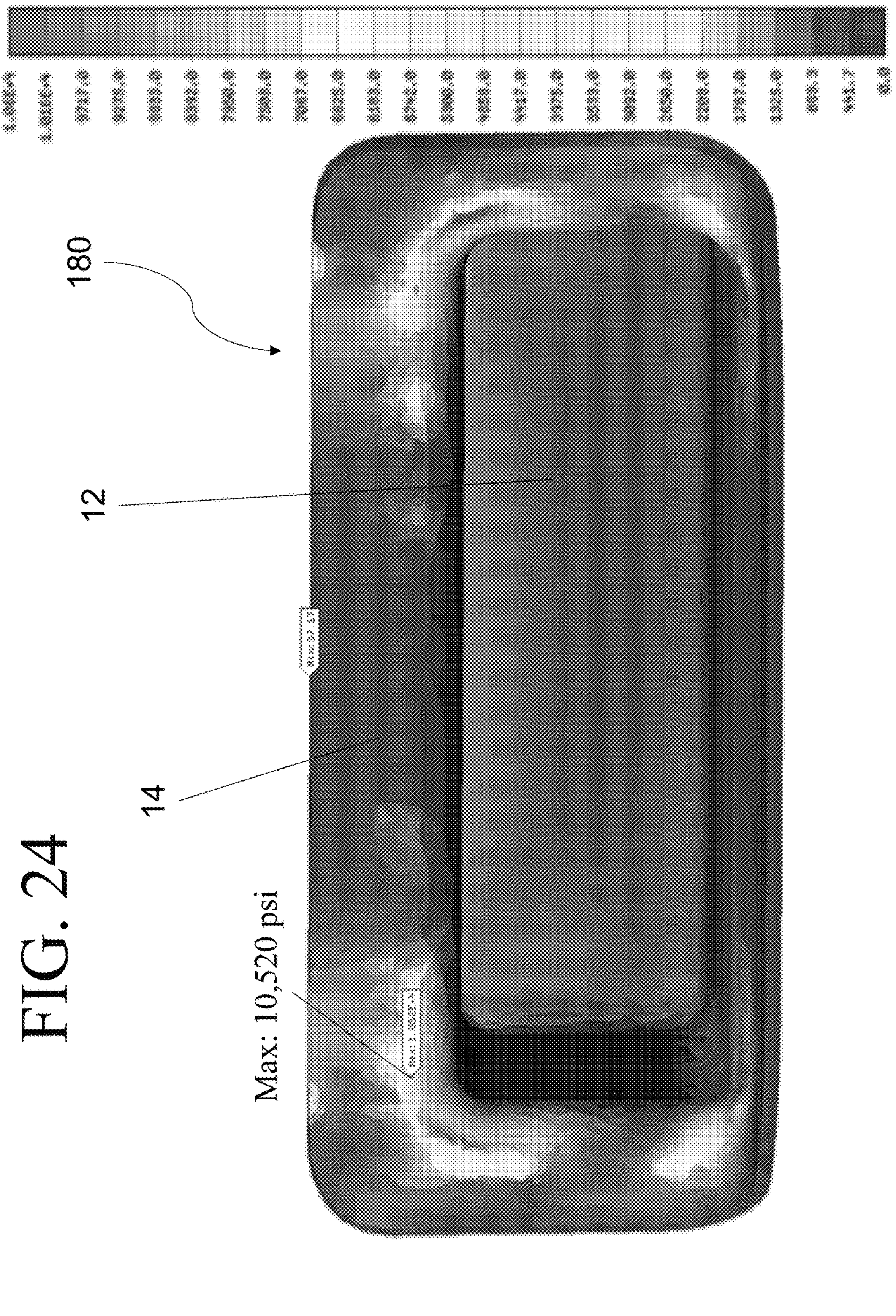
FIG. 24 illustrates the results of a tension stress test for step module Rev 07 of FIG. 23 which has a stress maximum of over 10,500 psi.

FIG. 24 illustrates the results of the tensile stress test for the combination step and toe space module with increased thickness (Rev 07). This figure is a view of the step and toe space module from the interior of the platform, showing the recess 12 that provides space for the user's feet, and a flange 14 that is used to adhere the module to the platform. The figure shows the stress maximum of over 10,500 psi when subjected to test loading that would allow the use of the top surface of the toe pod as a step. This maximum exceeded the allowable maximum stress of the polycarbonate material used.

Figure 25:
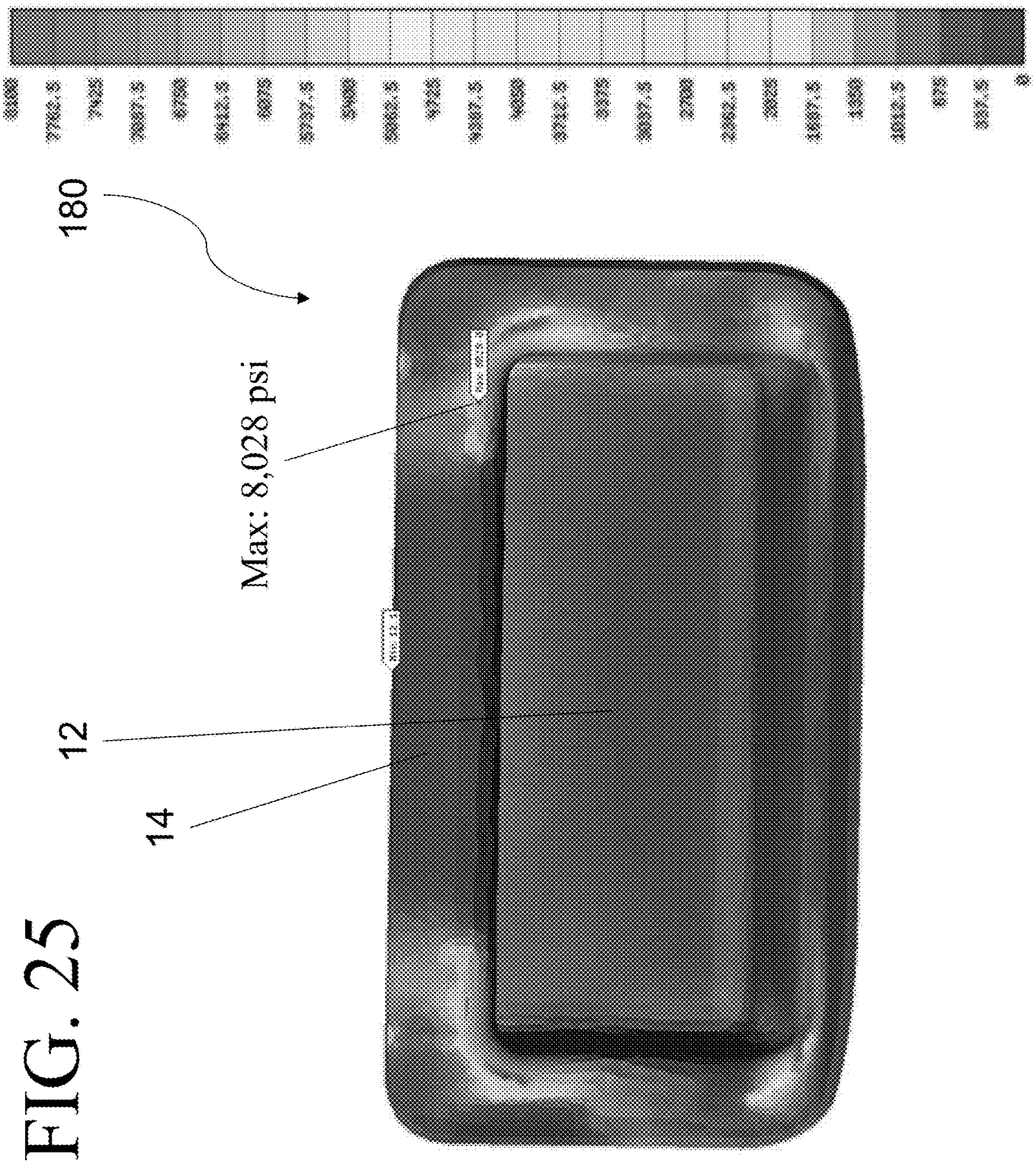
FIG. 25 illustrates the results of a tension stress test for another toe space module according to the present invention. The figure shows a second design (Rev 08, FIG. 23) wherein the stress maximum is reduced to about 8,000 psi.
Figure 26A:
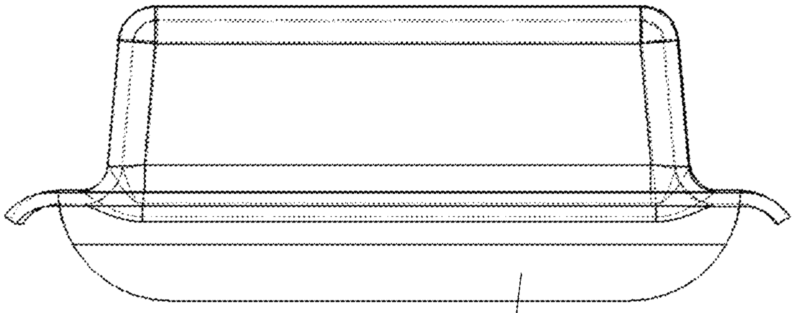
FIGS. 26A-D illustrate a combination step and toe space module that inserts from the interior of the platform.
Figure 26B:
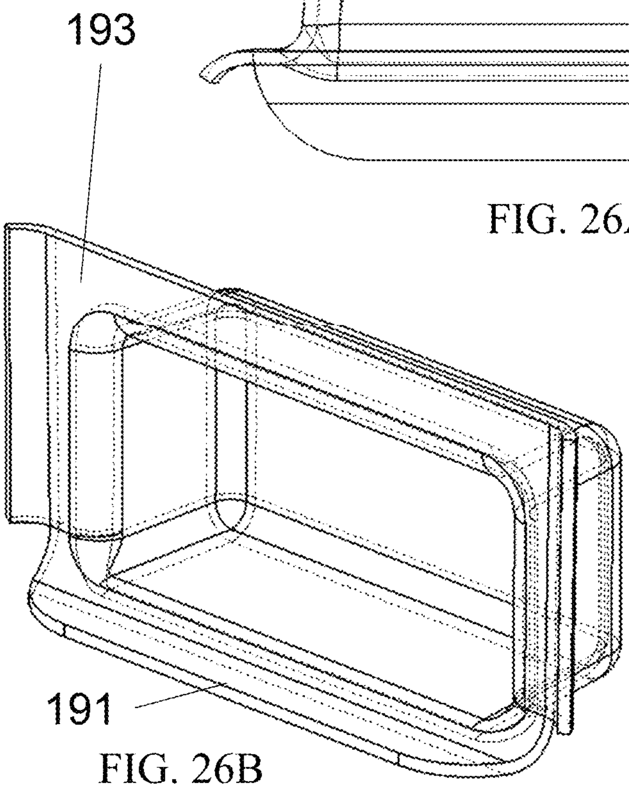
Figure 26C:
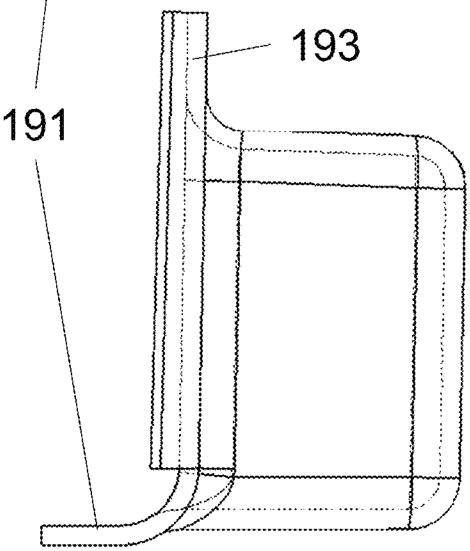
Figure 26D:
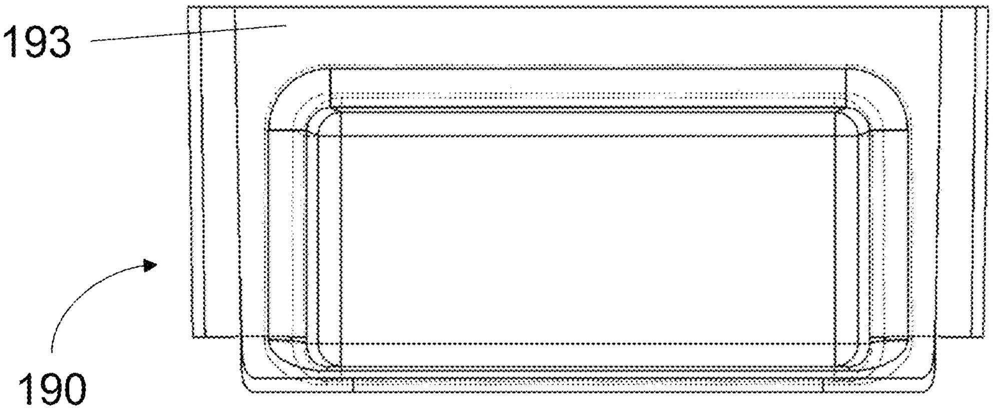

Then, surprisingly, increasing the height of the step dramatically reduced the stress maximum to an acceptable level (Rev 08 in FIG. 23, FIG. 25).

Paradoxically, decreasing the height from 7.175 inches to 4.5 inches reduced the stress maximum from about 8,028 psi to about 7,746 psi (FIG. 23). Even more surprisingly, increasing the step height from 4.5 inches to 5.0 inches reduced the stress maximum even more, from 7,746 psi to 7,097 psi. Thus, it was surprisingly discovered that the step height strongly influences the stress maximum of the module, but that the stress performance is not linearly affected by the height. For the present example embodiment, it was discovered that a height of about 5 inches is the approximate height that minimizes the stress maximum.

Compression Toe Space Step

The present invention also provides for a compression-locking system for a step as described in U.S. patent application Ser. No. 15/619,174 filed Jun. 9, 2017 for a Step System of Elevating Platform, which is incorporated herein by reference in its entirety.

A step and toe space module with a compression locking system, generally shown as 190 in FIGS. 26A-27B, includes a first flange zone 191 and a second flange zone 193 that provide contact surfaces with the platform sidewall when the module is inserted into a cutout in the platform sidewall. The first flange zone 191 is configured to contact an outer surface of the platform sidewall when the second flange zone 193 contacts an inner surface of the platform sidewall, thereby placing the second flange zone 193 under compression against the platform sidewall when force is applied to the step.

Figure 27A:
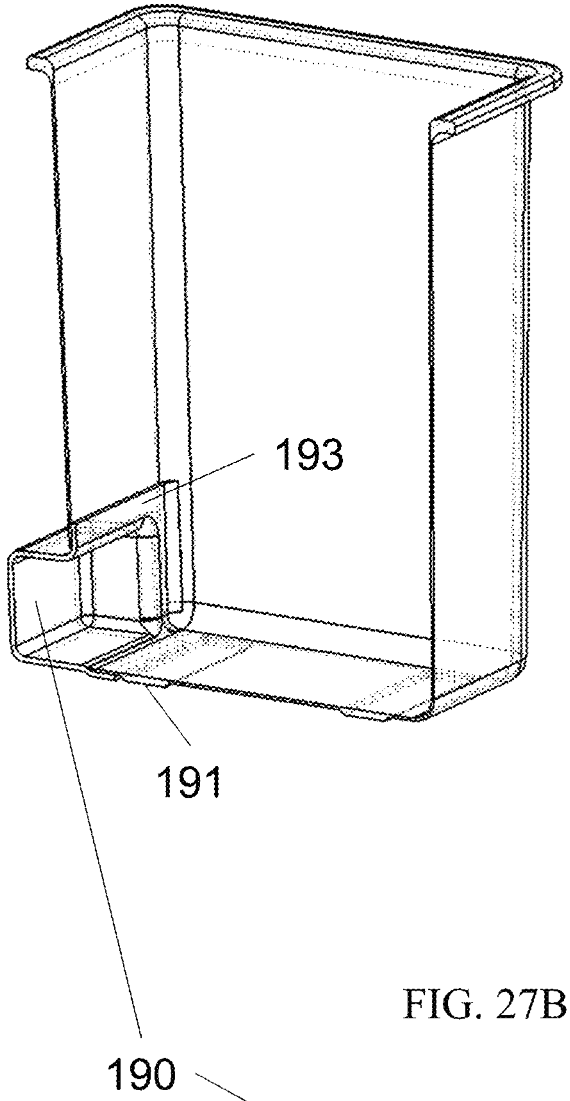
FIG. 27A is a cross-sectional view of the module of FIGS. 26A-D installed in a platform.
Figure 27B:
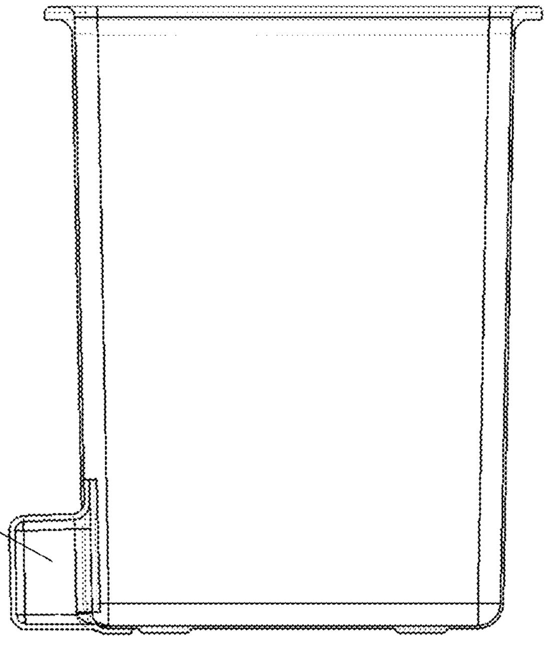
FIG. 27B is another cross-sectional view of the module.
Figure 28A:
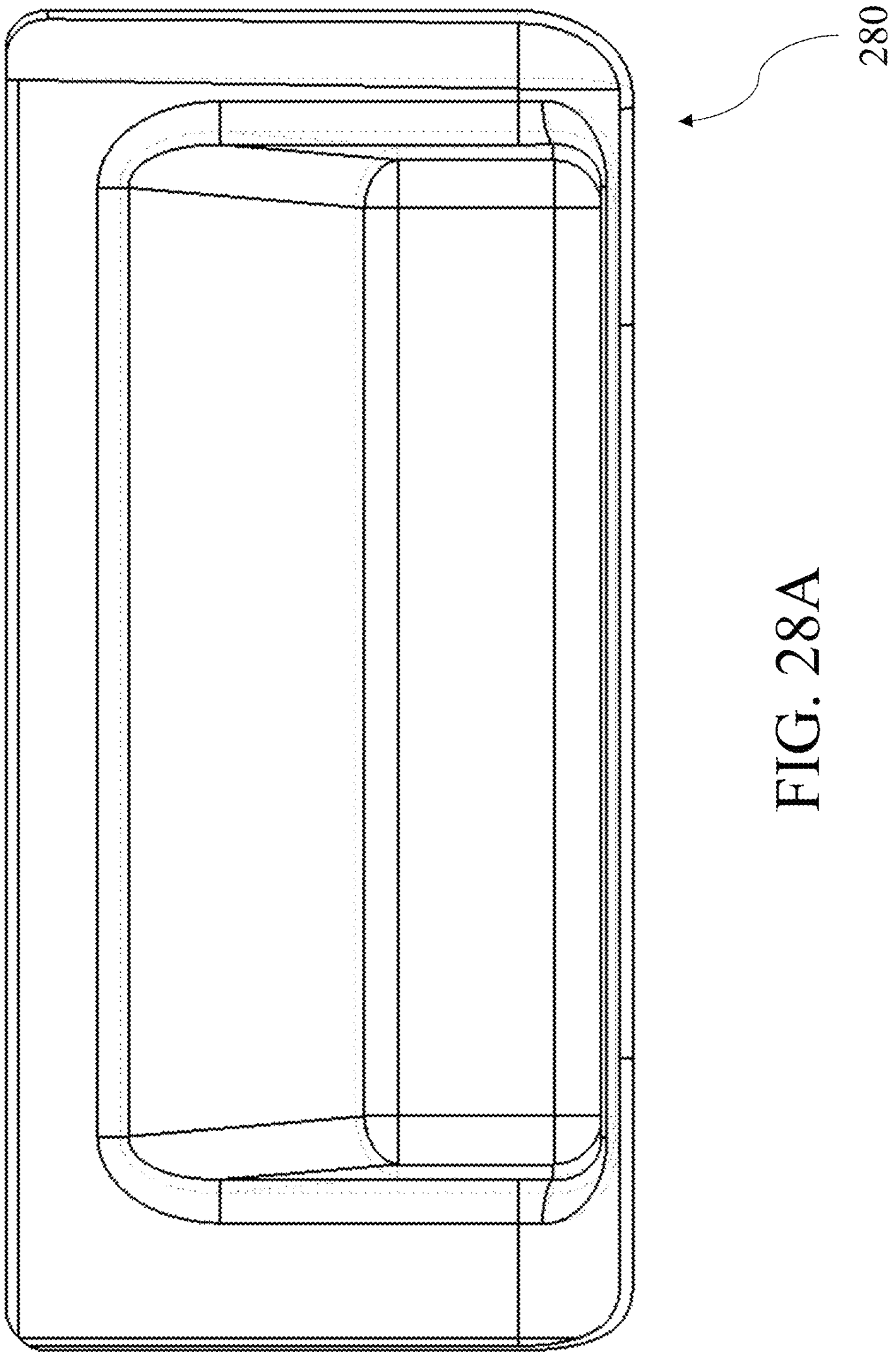
FIG. 28A is a front view of an asymmetric toe space module with a flange and tabs that are asymmetric about the toe space body.
Figure 28B:
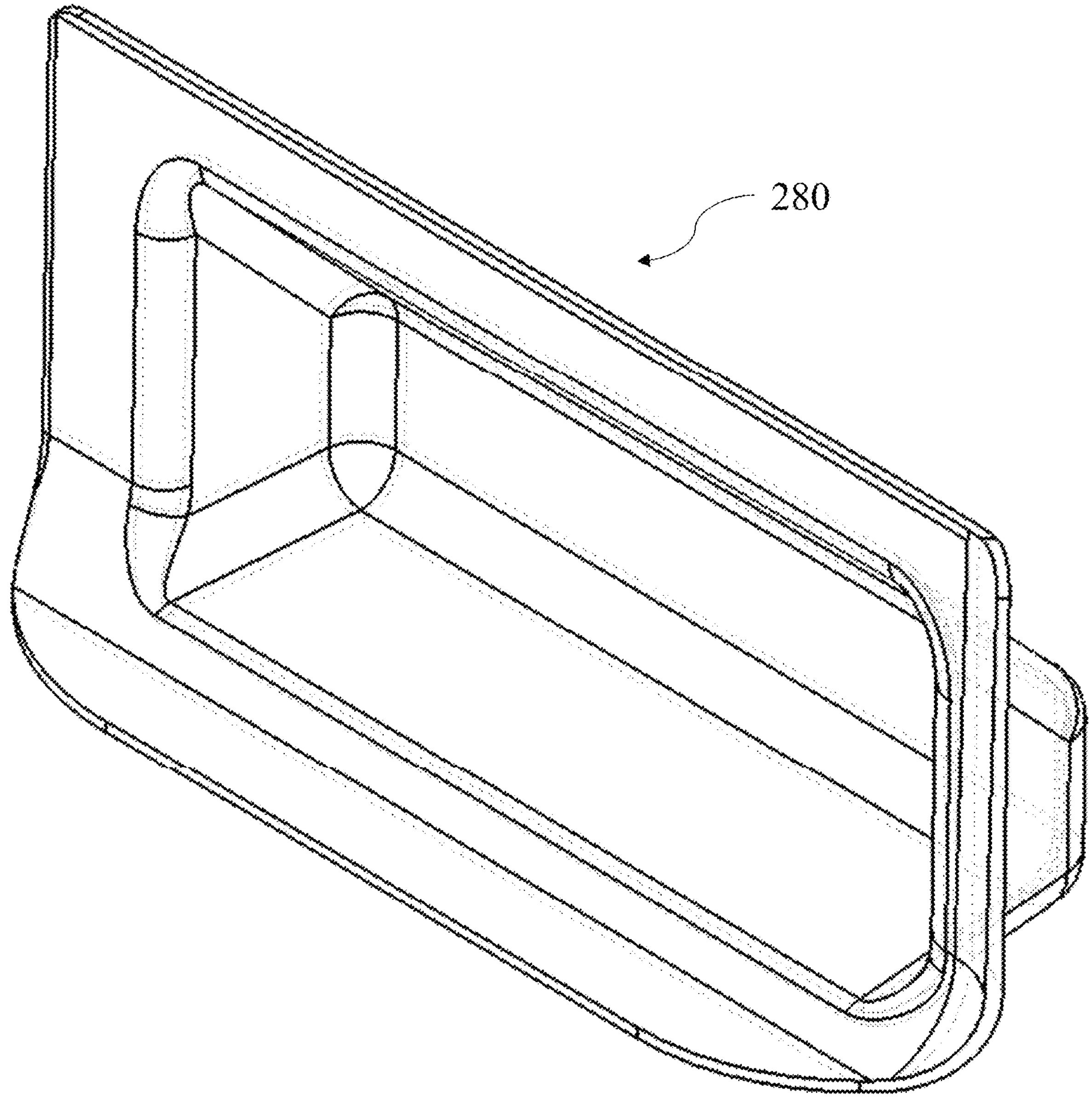
FIG. 28B is an isometric view of the asymmetric toe space module.
Figure 28C:
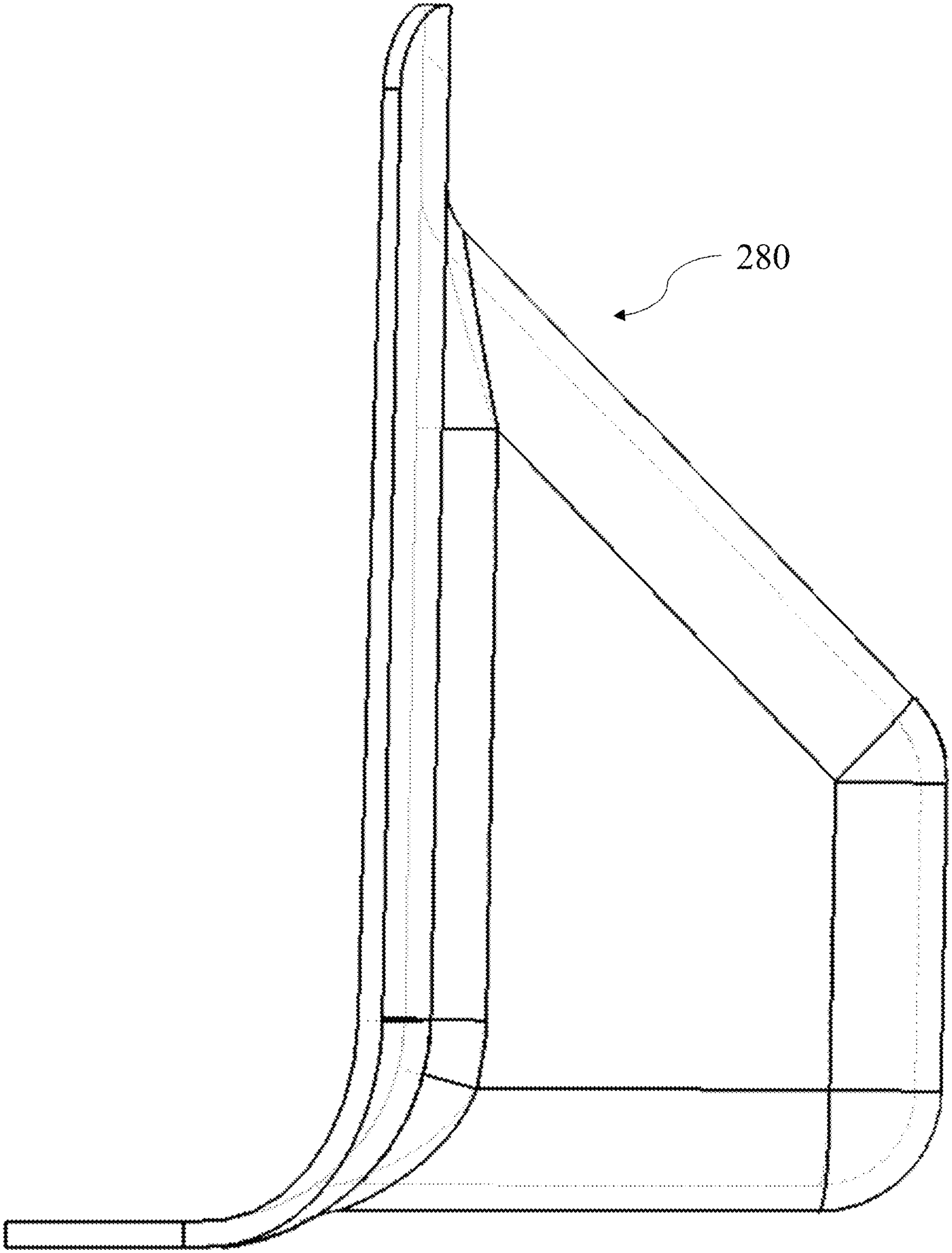
FIG. 28C is a front view of the asymmetric toe space module.
Figure 28D:
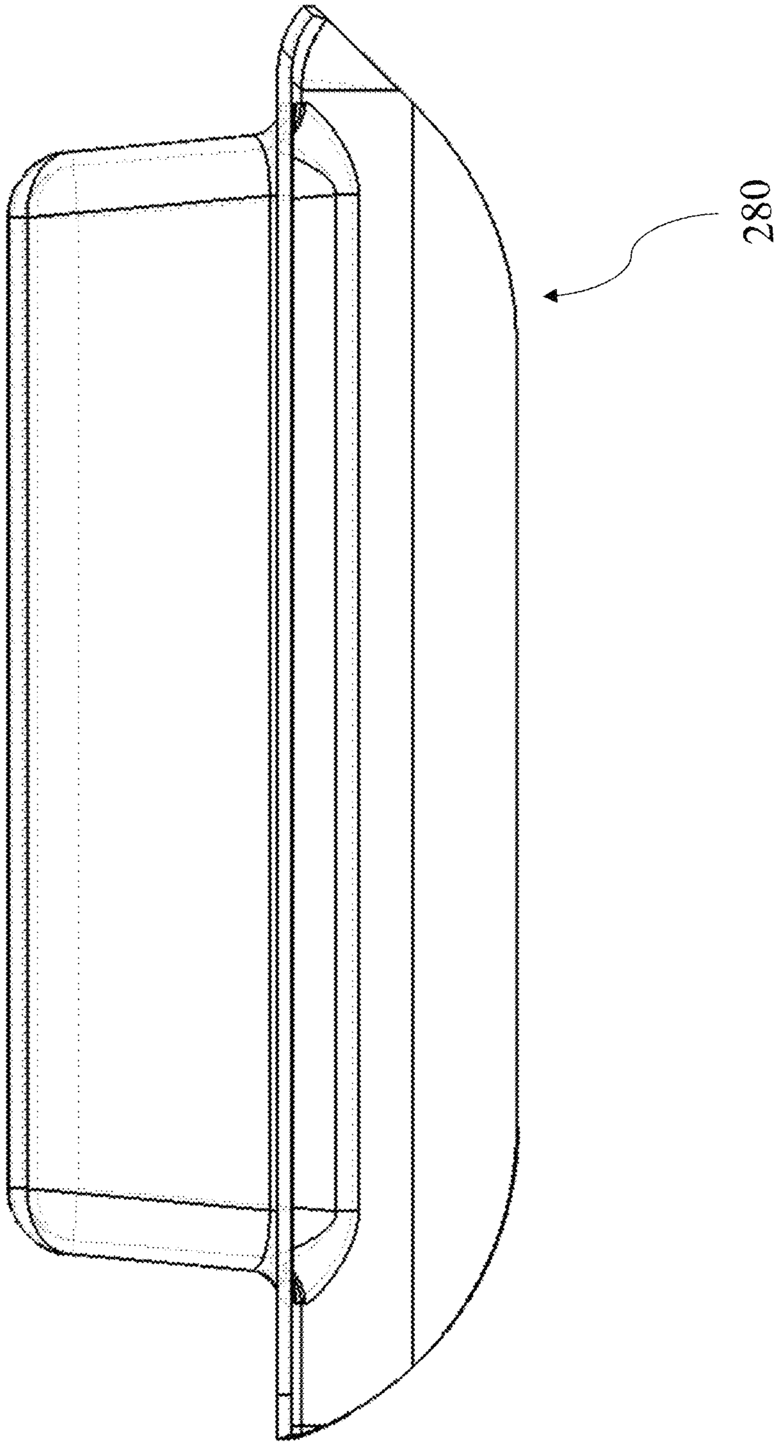
FIG. 28D is a top view of the asymmetric toe space module.

FIGS. 26A-D illustrate an example of a combination compression step and toe space module that is configured to be installed such that the bottom tab (first flange zone) is outside the platform side, whereas the top and side tabs (second flange zone) are inside the platform. This configuration provides for the interior contact surfaces between the module and platform sidewall to be under compression when a load is applied to the module's top surface 122. FIGS. 27A-B are cross-sectional views of the compression step installed in a platform.

FIGS. 28A-D illustrate an example of an asymmetric toe space module 280 with a flange and tabs that are asymmetric about the toe space body. Advantageously, the toe space module is customizable such that the configuration and dimensions of the flange and/or tabs is provided based on the platform dimensions and other components of the platform. The flange and/or tabs are wider for portions of the toe space module that will be bonded to larger surfaces of the platform. Additionally, one side tab of the toe space module is flat or substantially flat and the opposite side tab is curved or substantially curved to fit around an edge and/or a surface between two sides of the platform in FIGS. 28A-D.

FIGS. 40A-F illustrate a ribbed toe space module 410 including integrated support ribs that are oriented vertically 412. The integrated support ribs are preferably included in a toe space module formed via injection molding. The integrated support ribs are operable to be constructed out of any material used for the toe space module, including but not limited to reinforced thermosets, unreinforced thermosets, reinforced thermoplastics, and/or unreinforced thermoplastics. Similarly, methods of manufacture of the integrated support ribs include all methods of manufacture for the toe space module, and also include casting such as low pressure casting, thermoforming, additive manufacturing, and subtractive manufacturing.

FIGS. 41A-D illustrate ribbed toe space modules including support ribs which extend into the flange. Alternatively, the support ribs extend into at least one tab of the toe space module. The support ribs are operable to be curved to match the curvature of the flange or of the at least one tab. This orientation provides additional support and strength for the toe space module.

Figure 43A:
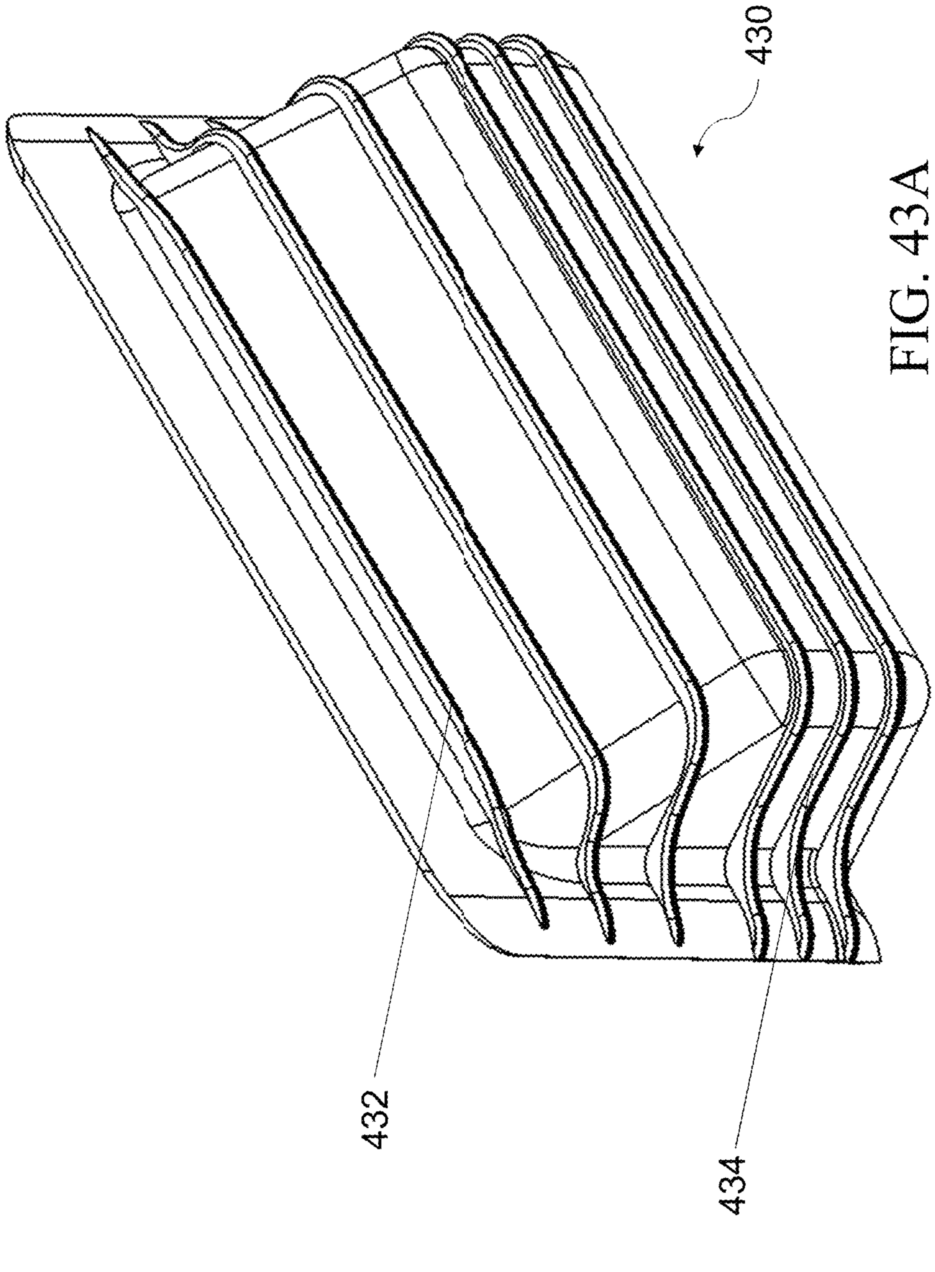
FIG. 43A is a front perspective view of a ribbed toe space module including angled and/or horizontal integrated support ribs which extend into the flange of the toe space module.
Figure 43B:
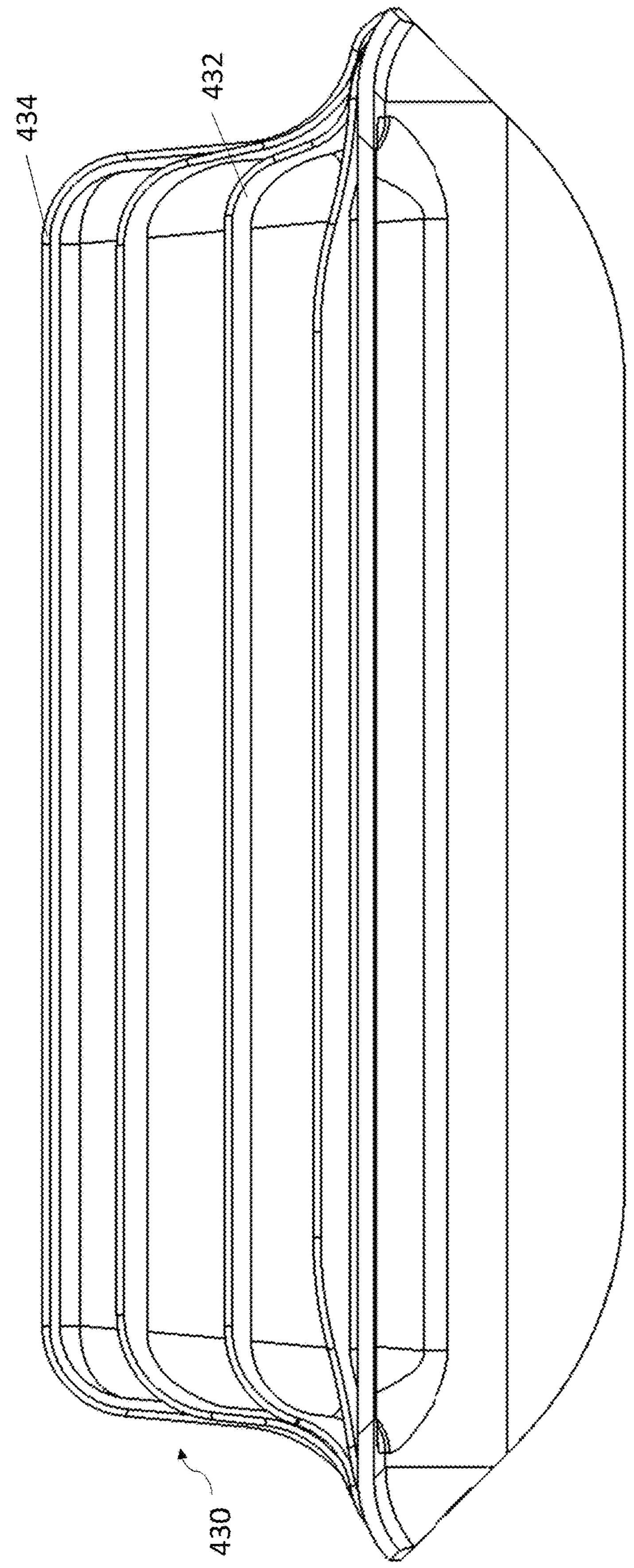
FIG. 43B is a top perspective view of a ribbed toe space module including angled and horizontal integrated support ribs which extend into the flange of the toe space module.
Figure 43C:
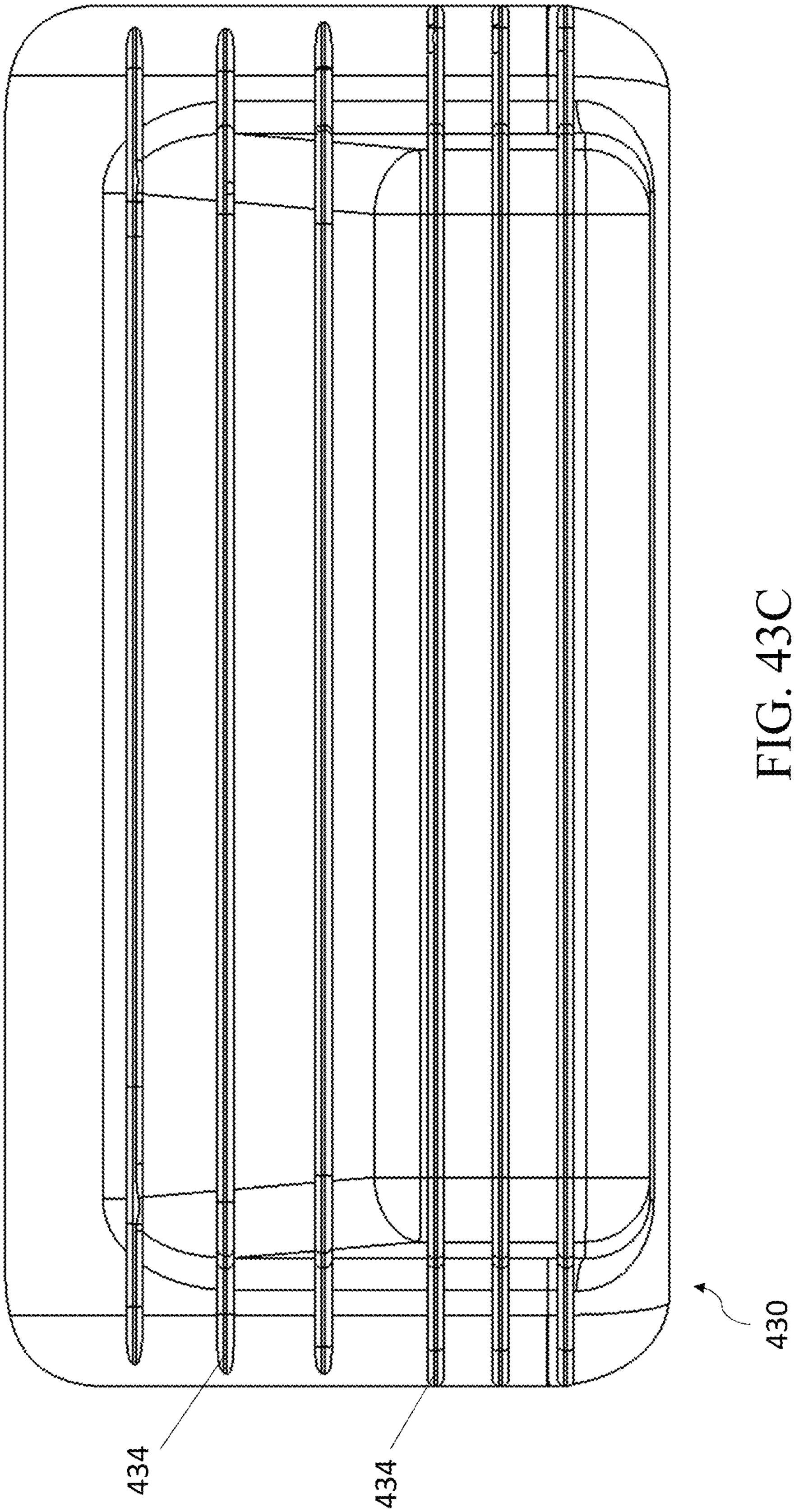
FIG. 43C is a front view of a ribbed toe space module including horizontal integrated support ribs which extend into the flange of the toe space module.
Figure 43D:
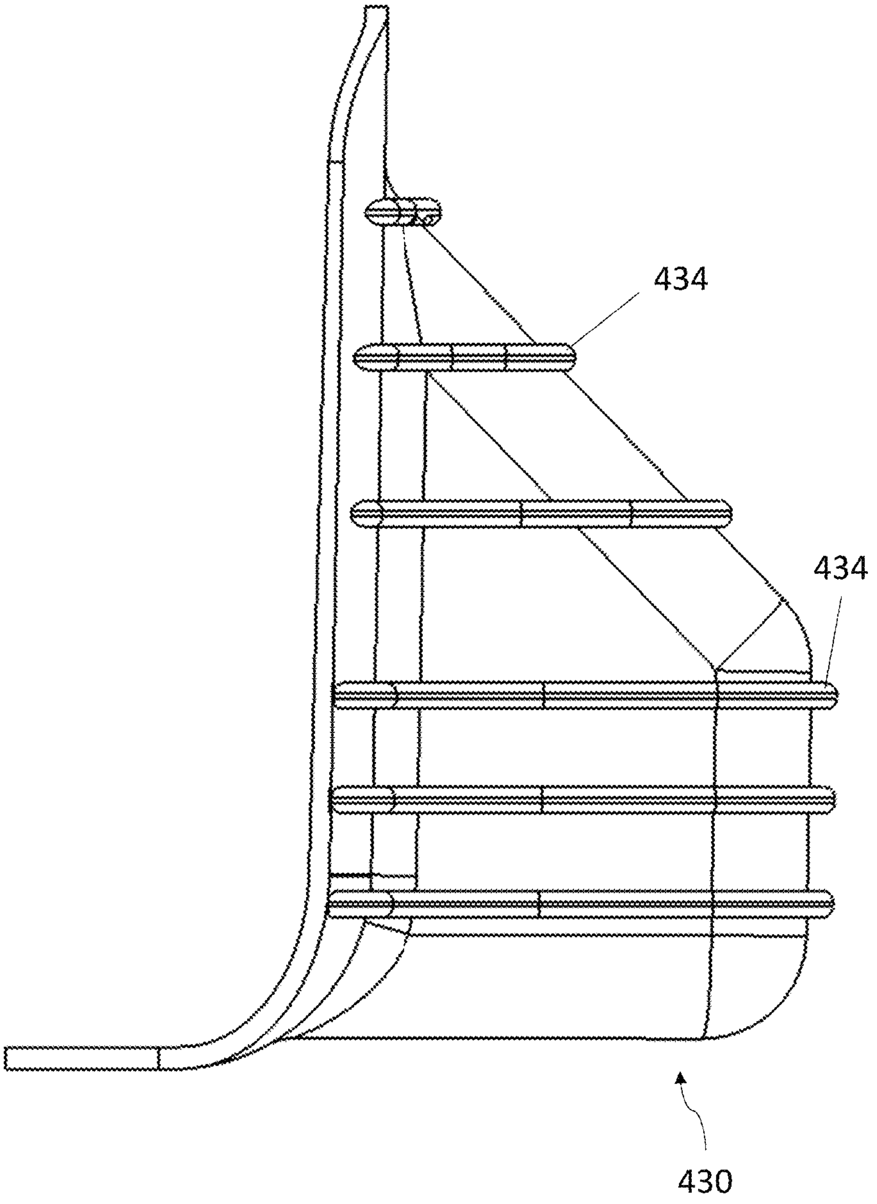
FIG. 43D is a side view of a ribbed toe space module including horizontal integrated support ribs which extend into the flange of the toe space module.

FIGS. 42A-D illustrate a ribbed toe space module 420 including angled and/or horizontal support ribs. The angled support ribs 422 are aligned with the top sloped portion of the toe space module body and the horizontal support ribs 424 are aligned with the front portion of the toe space module body. FIGS. 43A-B illustrate a ribbed toe space module 430 including angled support ribs 432 and horizontal support ribs 434. FIGS. 43C-D illustrate a ribbed toe space module 430 including horizontal support ribs 434. Alternatively, the support ribs extend into at least one tab of the toe space module. The support ribs are operable to be curved to match the curvature of the flange or of the at least one tab. This orientation provides additional support and strength for the toe space module.

Alternatively, the toe space module includes diagonal integrated support ribs. In another embodiment, the support ribs are oriented in any direction. In yet another embodiment, the toe space module includes a combination of vertical support ribs, horizontal support ribs, diagonal support ribs, and/or support ribs oriented in any direction. The support ribs are operable to protrude from any surface of the toe space module.

Advantageously, the integrated support ribs are operable to be constructed out of a different material than the toe pod module; however, the material used for the integrated support ribs is preferably at least as stiff as the toe space module material to provide structural support for the toe space module. The integrated support ribs are shaped to track the profile of the toe space module and oriented vertically to provide stiffness and/or traction to the toe space module in one embodiment. Alternatively, the integrated support ribs are oriented horizontally, at a 45 degree angle to the surface of the toe space module in which the ribs are integrated, at a 30 degree angle to the surface of the toe space module in which the ribs are integrated, at a 60 degree angle to the surface of the toe space module in which the ribs are integrated, or at any other angle or configuration to provide support for the toe pod module and/or traction for a user of the toe pod module. The thickness and/or width of the integrated support ribs varies based on the use of the integrated support ribs.

Figure 29A:
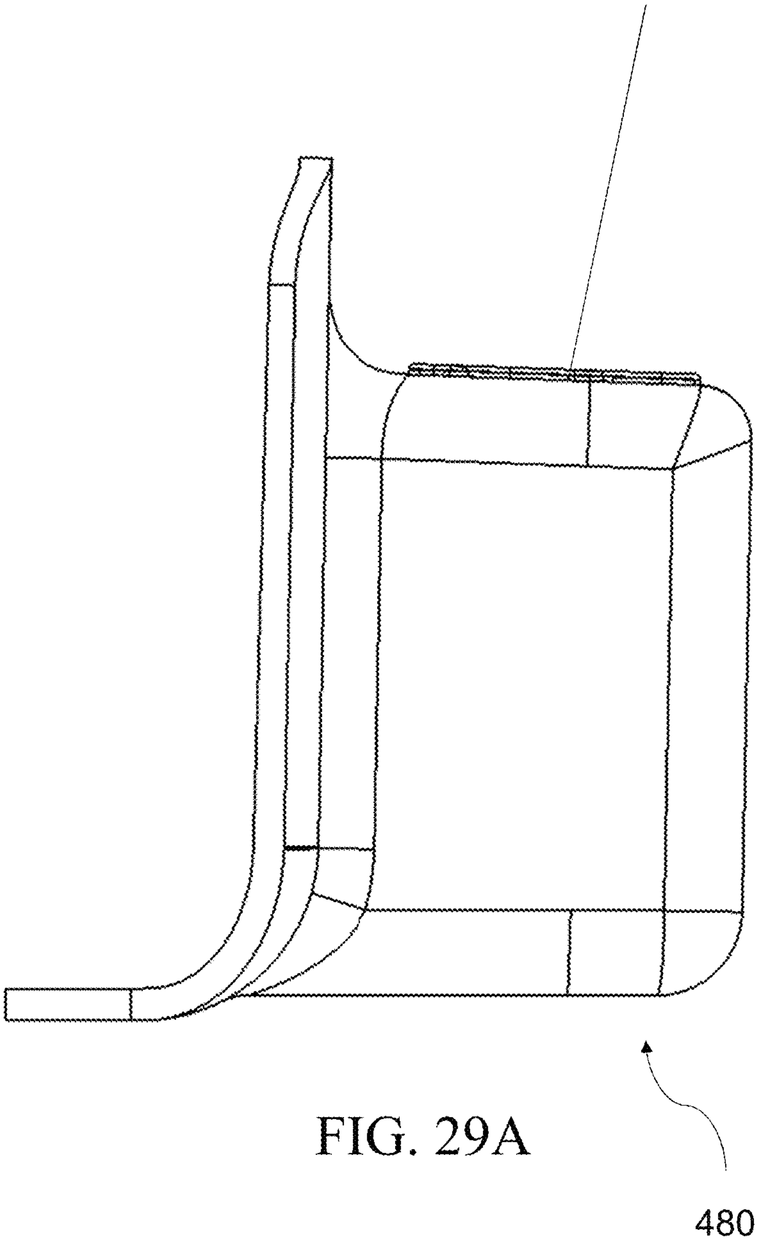
FIG. 29A is a side view of a toe space module with diamond ribs on a top exterior surface of the toe space module.
Figure 29B:
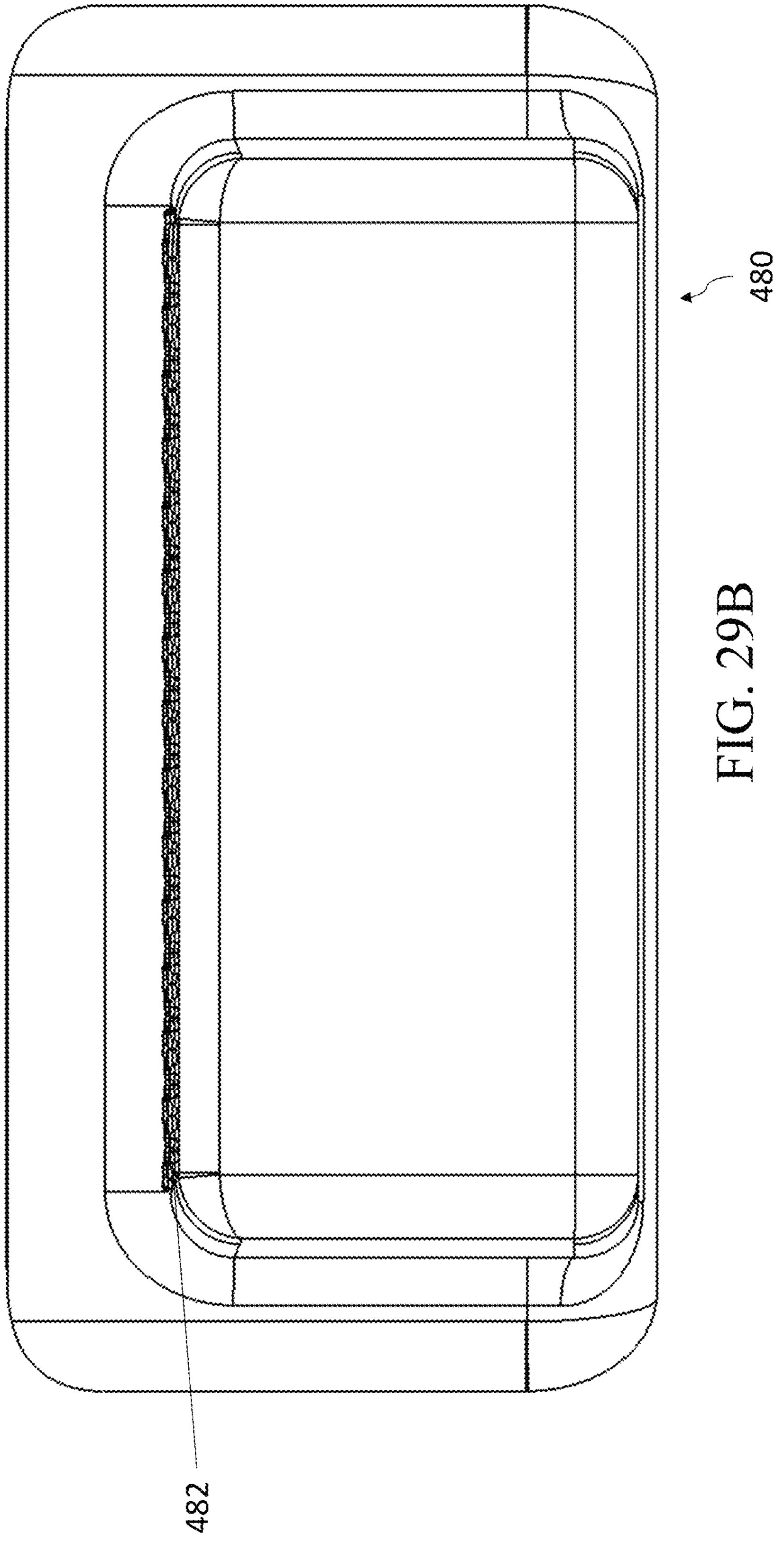
FIG. 29B is a front view of a toe space module with diamond ribs on a top exterior surface of the toe space module.
Figure 29C:
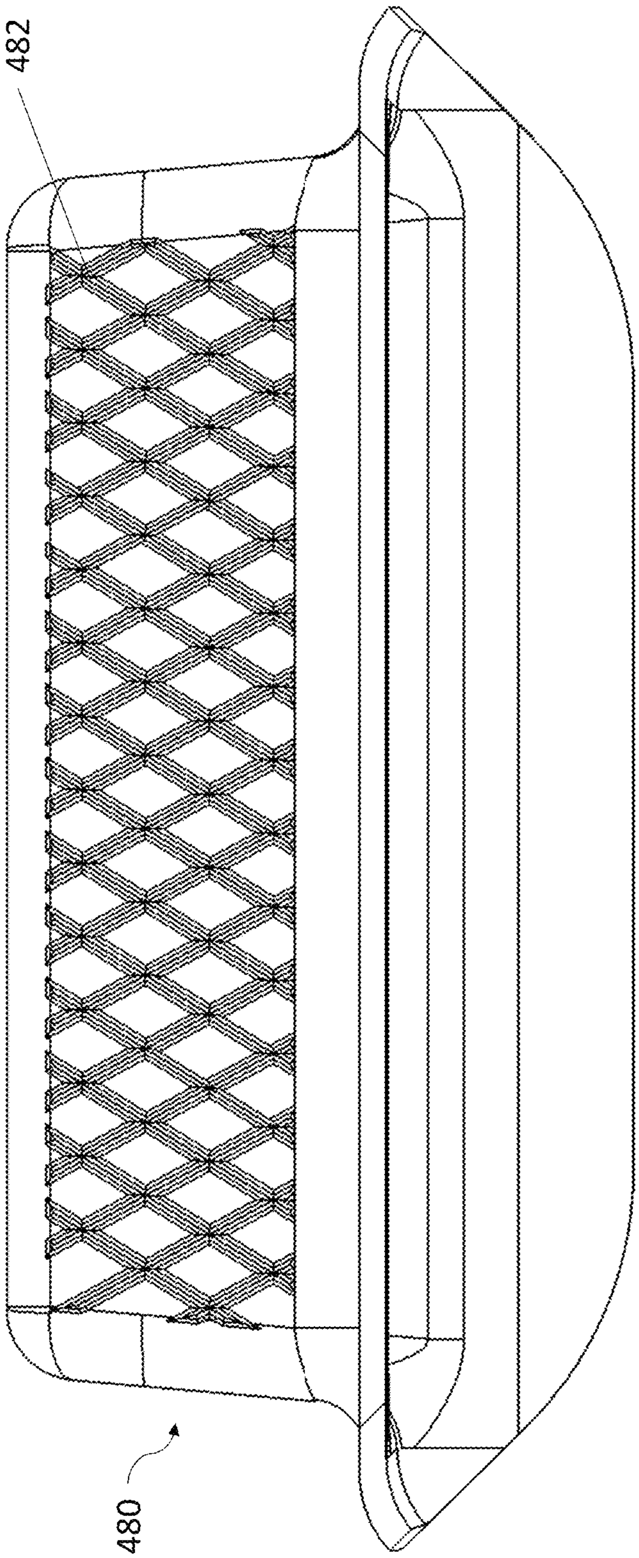
FIG. 29C is a top perspective view of a toe space module with diamond ribs on a top exterior surface of the toe space module.
Figure 29D:
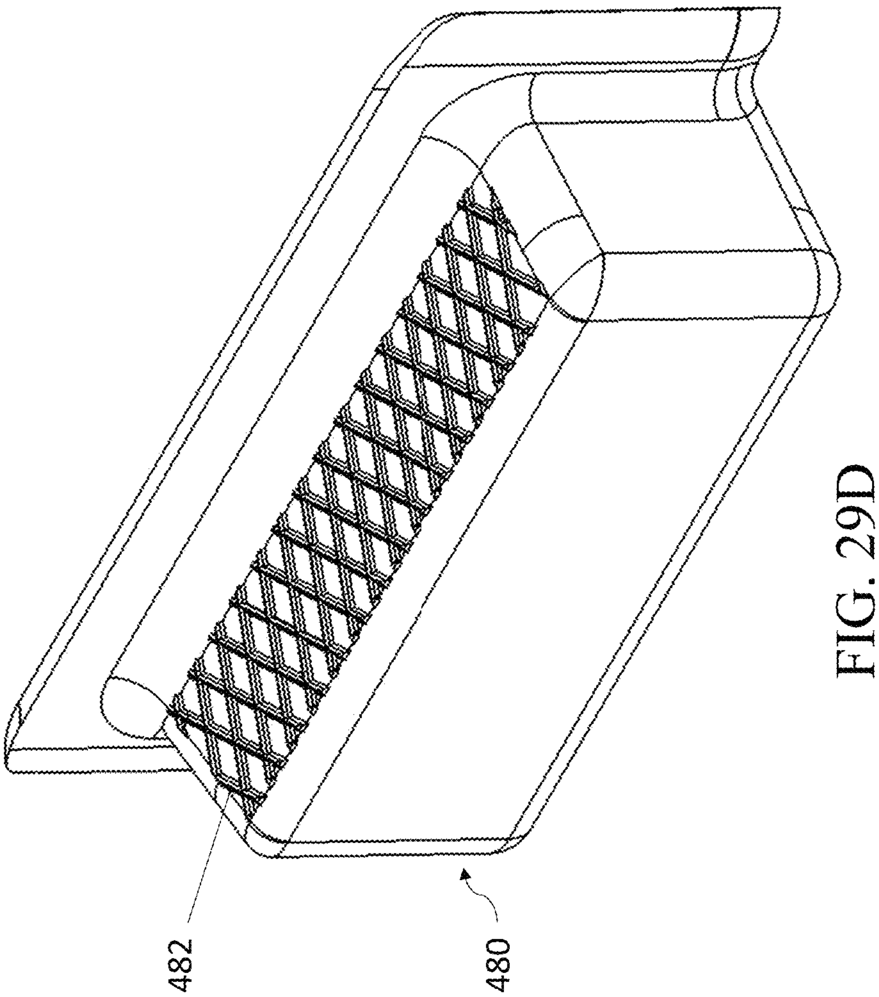
FIG. 29D is a side perspective view of a toe space module with diamond ribs on a top exterior surface of the toe space module.
Figure 29E:
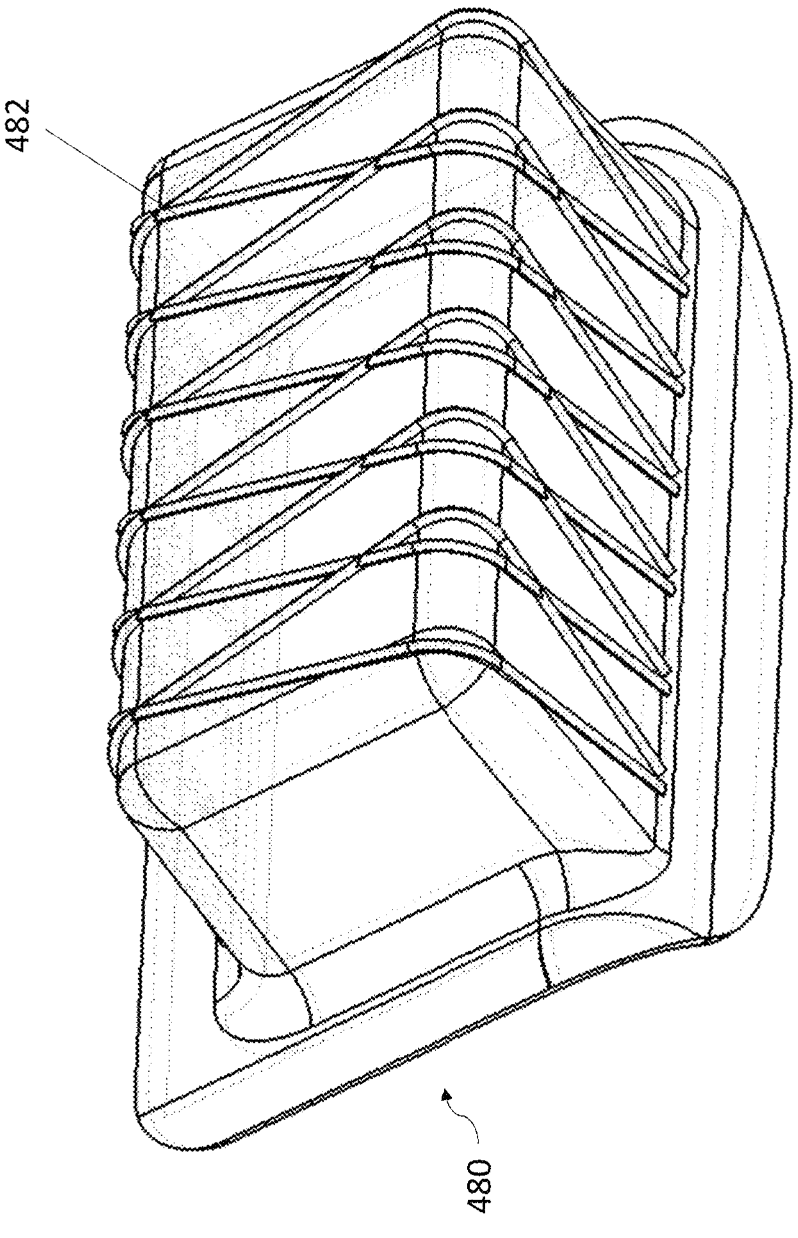
FIG. 29E is a bottom perspective view of a toe space module with diamond ribs on a top exterior surface of the toe space module, a front exterior surface of the toe space module, and a bottom exterior surface of the toe space module.
Figure 29F:
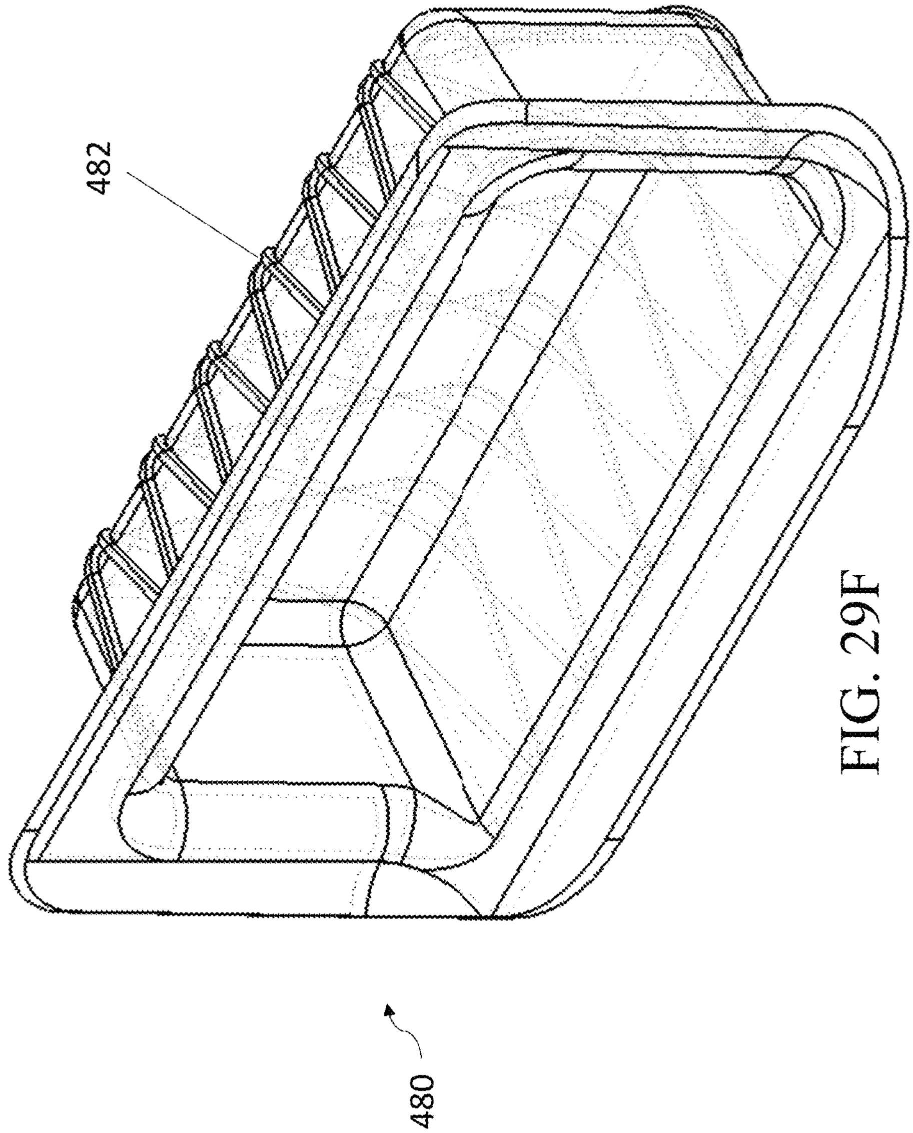
FIG. 29F is a rear perspective view of a toe space module with diamond ribs on a top exterior surface of the toe space module, a front exterior surface of the toe space module, and a bottom exterior surface of the toe space module.
Figure 30A:
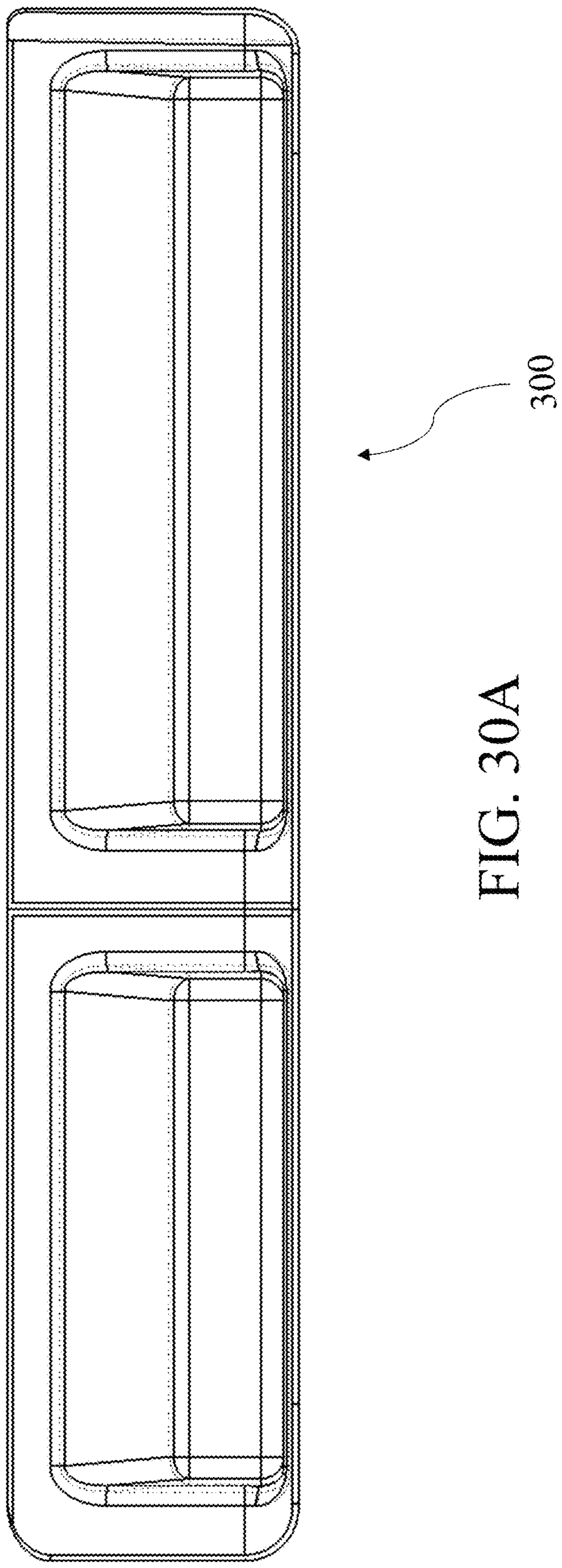
FIG. 30A is a front view of one embodiment of an asymmetrically split toe space module.
Figure 30B:
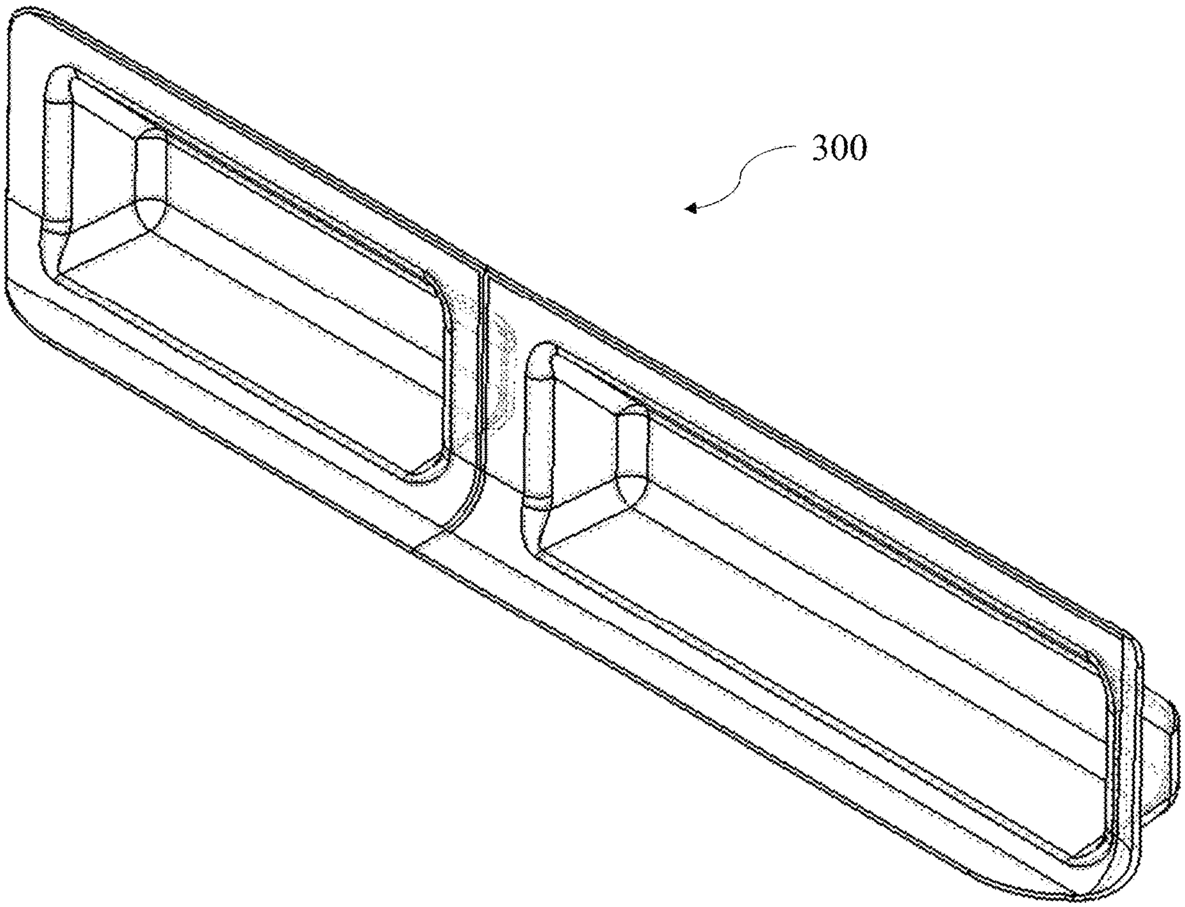
FIG. 30B is an isometric view of one embodiment of an asymmetrically split toe space module.
Figure 30C:
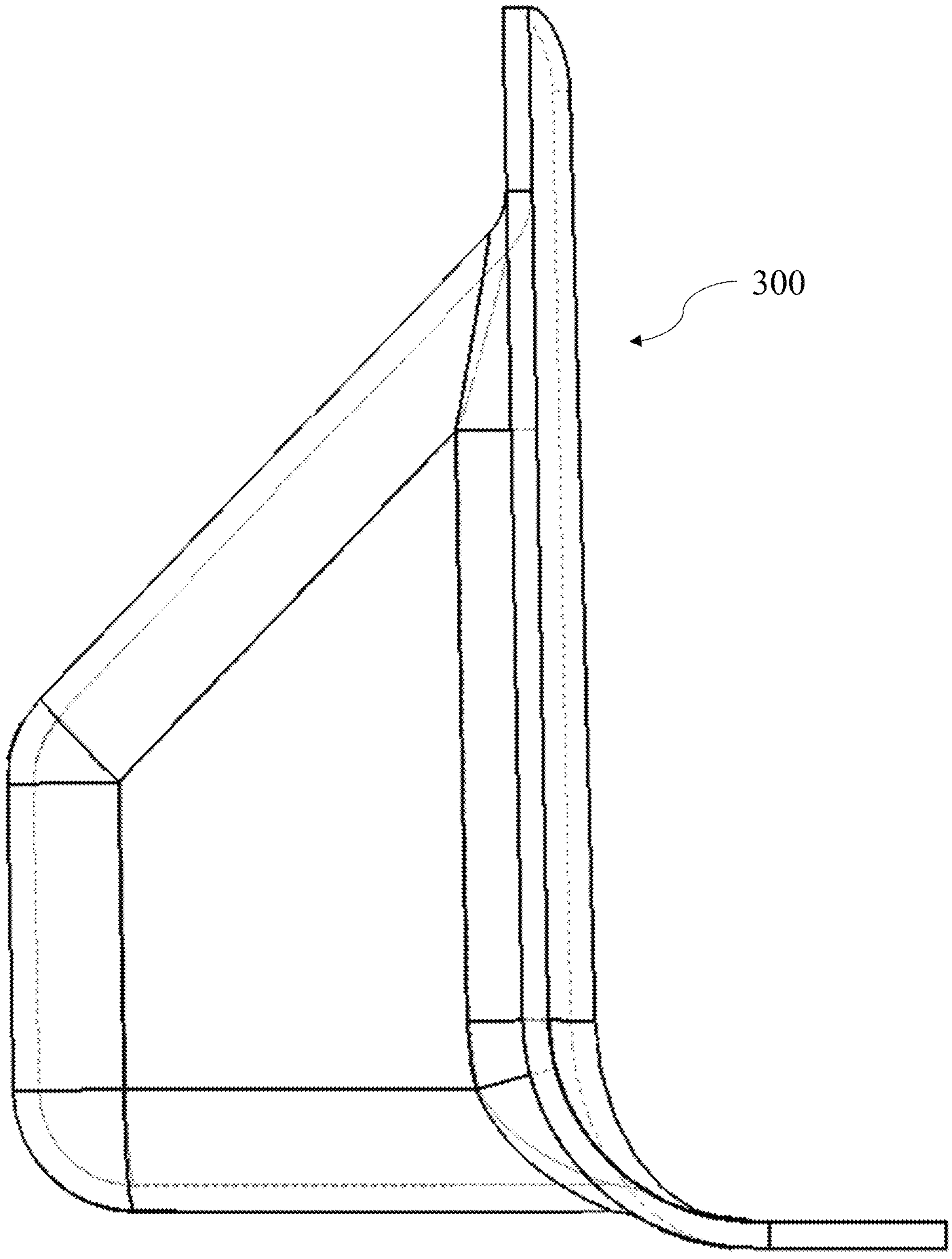
FIG. 30C is a left side view of one embodiment of an asymmetrically split toe space module.
Figure 30D:
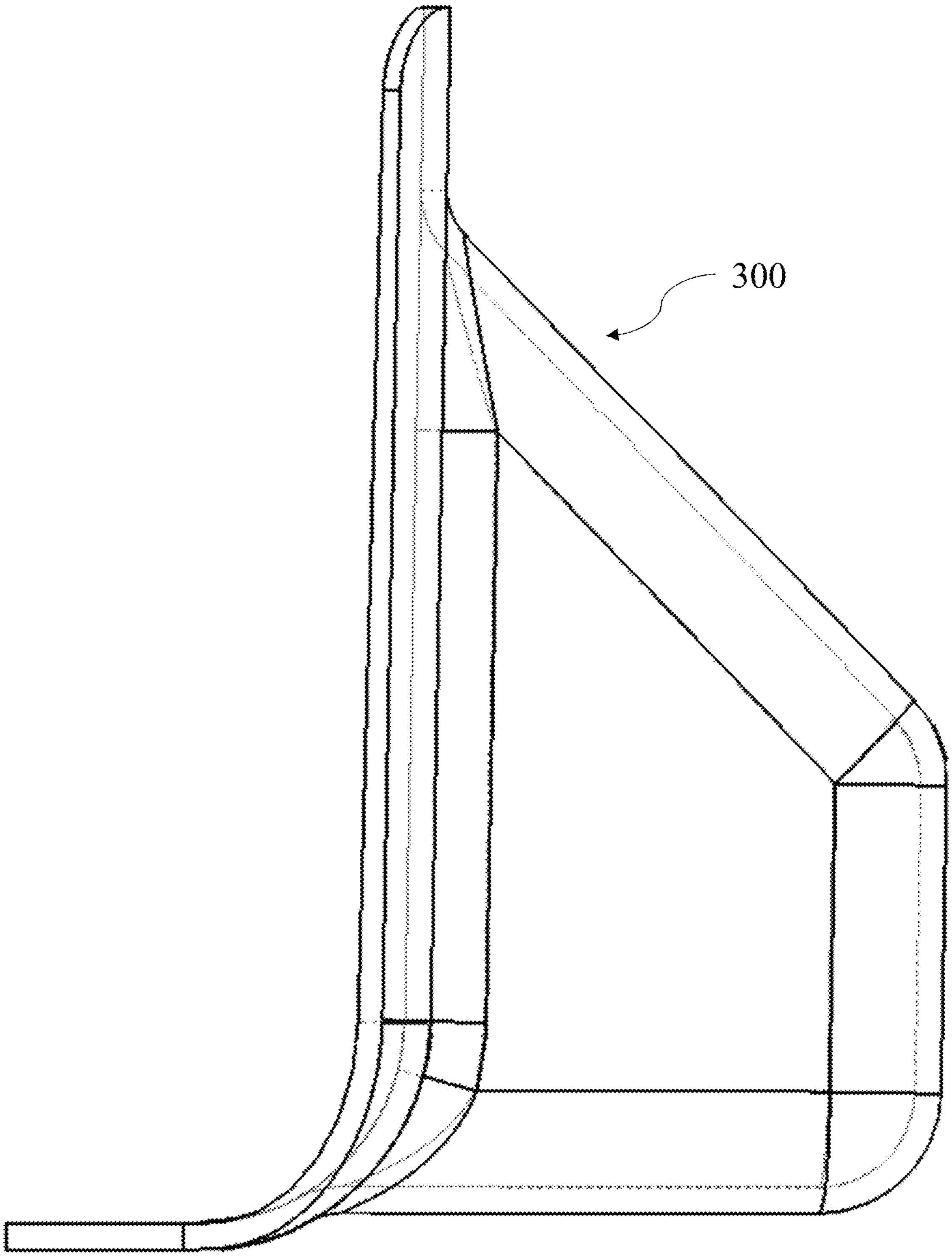
FIG. 30D is a right side view of one embodiment of an asymmetrically split toe space module.
Figure 30E:
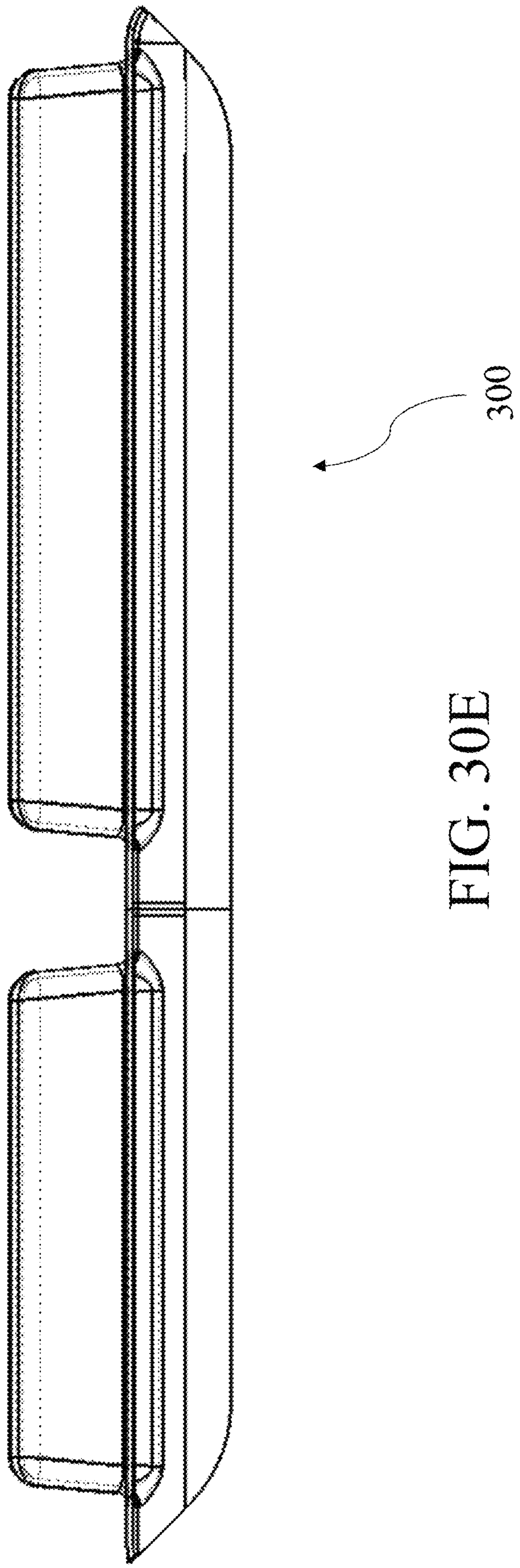
FIG. 30E is a top view of one embodiment of an asymmetrically split toe space module.

The percentage encapsulation of the integrated support ribs in the toe space module varies based on the proposed functionality for the toe space module. Similarly, the protrusion depth of the integrated support ribs in the toe space module is based on the stiffness requirements of the toe space module and the proposed functionality for the toe space module. For example, in one embodiment, the integrated support ribs protrude from the exterior surface of the toe space module to provide traction as a step. In this embodiment, the integrated support ribs or a protruding portion of the integrated support ribs are preferably flat and/or textured to provide traction. Examples of textured surfaces utilized in the integrated support ribs include diamond plated designs, ribbed designs, designs with rough surfaces, etc. In one embodiment, these textured surfaces are created through injection molding. FIGS. 29A-D illustrate a toe space module with diamond ribs on a top exterior surface of the toe space module. FIG. 29A is a side view of a textured toe space module 480 with diamond ribs 482 on a top exterior surface of the toe space module. The diamond ribs 482 are integrally formed with the textured toe space module 480 in one embodiment. Alternatively, the diamond ribs 482 are manufactured separately from the toe space module and are attached to the top exterior surface of the toe space module. Advantageously, the diamond ribs 482 can be attached to any surface of the toe space module or integrally formed (for example, via injection molding) with any surface of the toe space module to provide traction/tread and stiffness for that surface. FIG. 29E-F illustrate two views of a toe space module with diamond ribs on a top exterior surface of the toe space module, a front exterior surface of the toe space module, and a bottom exterior surface of the toe space module. Notably, the spacing of the diamond ribs is as close or as wide as needed for the desired stiffness and/or tread/traction of the toe space module. Similarly, the number of the diamond ribs included in the toe space module varies based on the stiffness and/or tread/traction desired for the toe space module.

The integrated support ribs protrude from the exterior surface of the toe space module in locations that are not part of the step in another embodiment. Alternatively, the integrated support ribs do not protrude from the exterior surface of the toe space module for embodiments in which the toe space module is used as a step. Similarly, the integrated support ribs protrude from the interior surface of the toe space module to provide traction for an operator, or alternatively do not protrude from the interior surface of the toe space module on a surface that an operator places his or her feet.

Figure 48A:
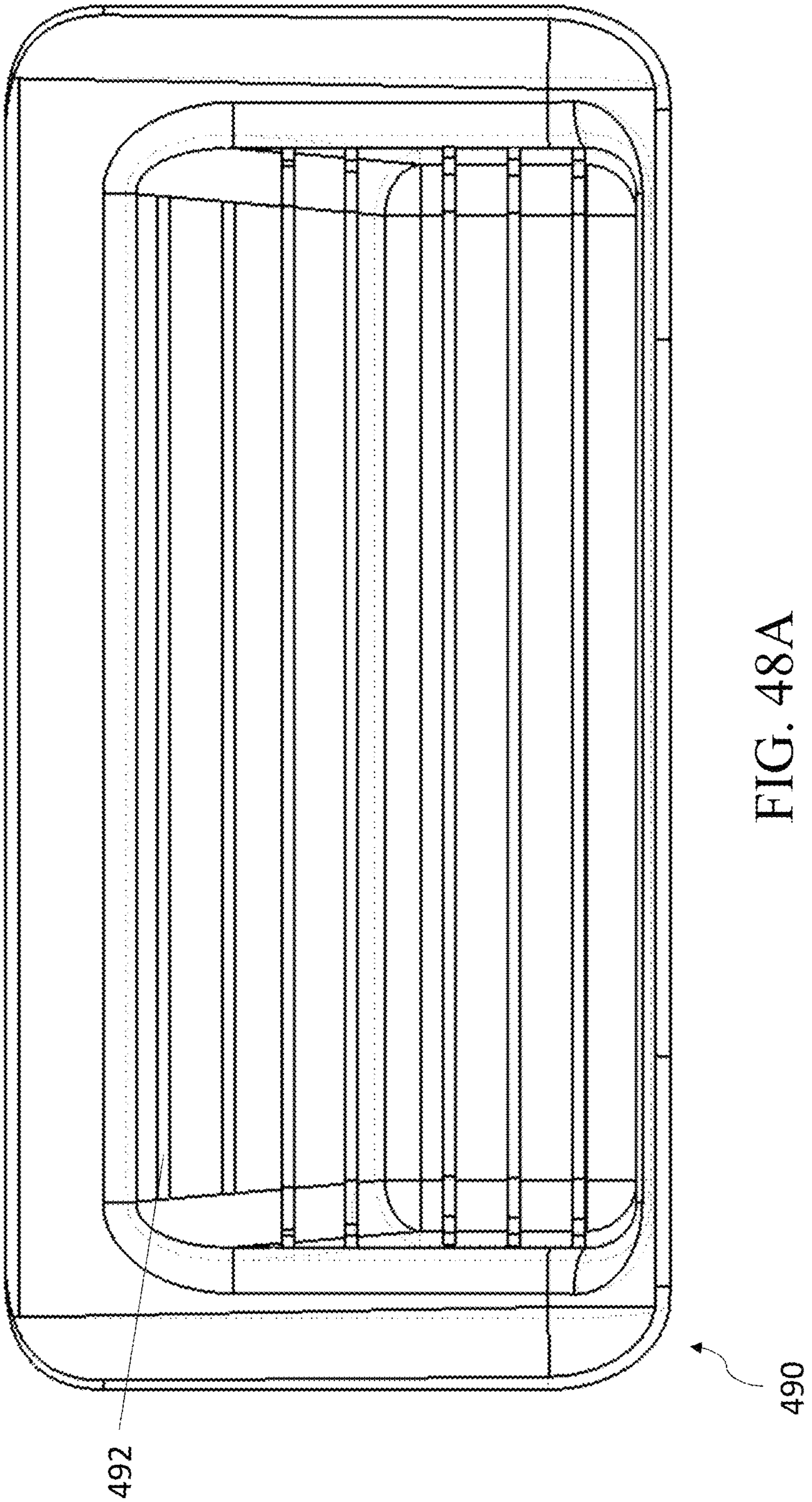
FIG. 48A is a front view of a toe space module with integrated support ribs that protrude on the internal surface of the toe space module.
Figure 48B:
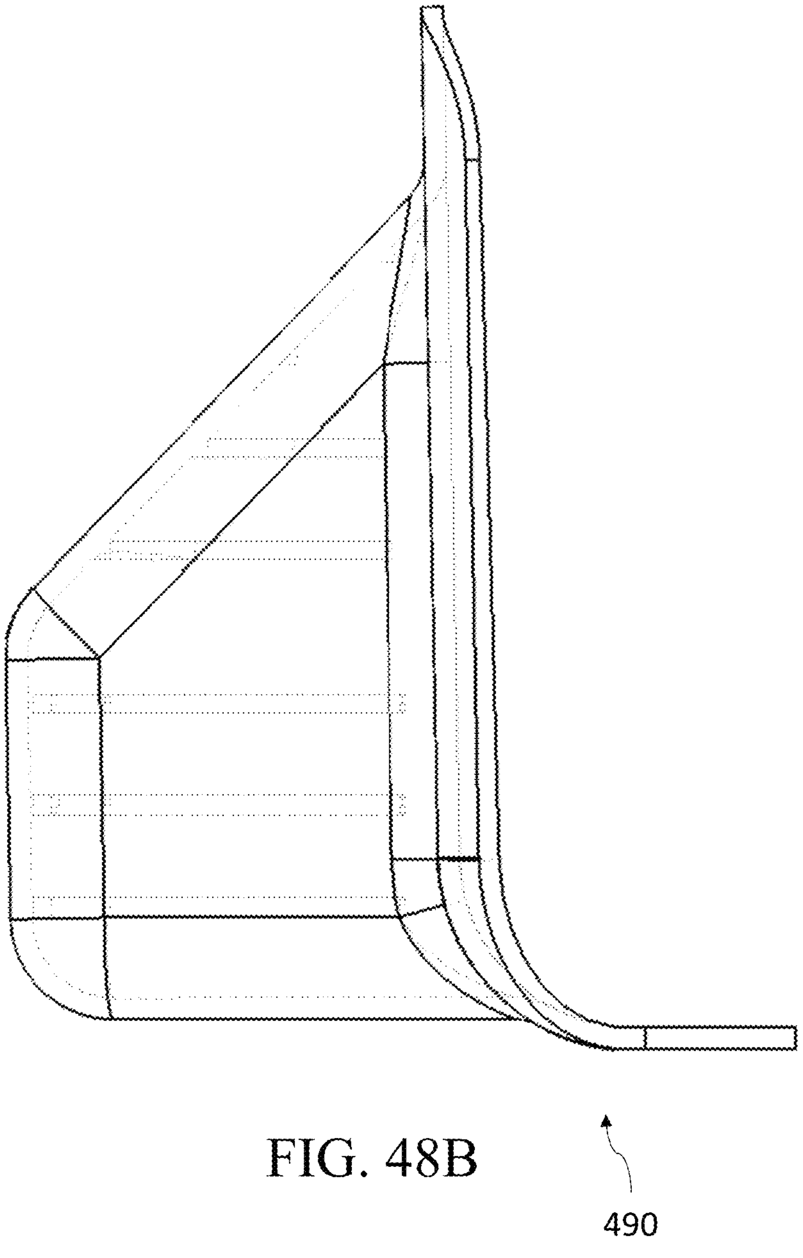
FIG. 48B is a side view of a toe space module with integrated support ribs that protrude on the internal surface of the toe space module.
Figure 48C:
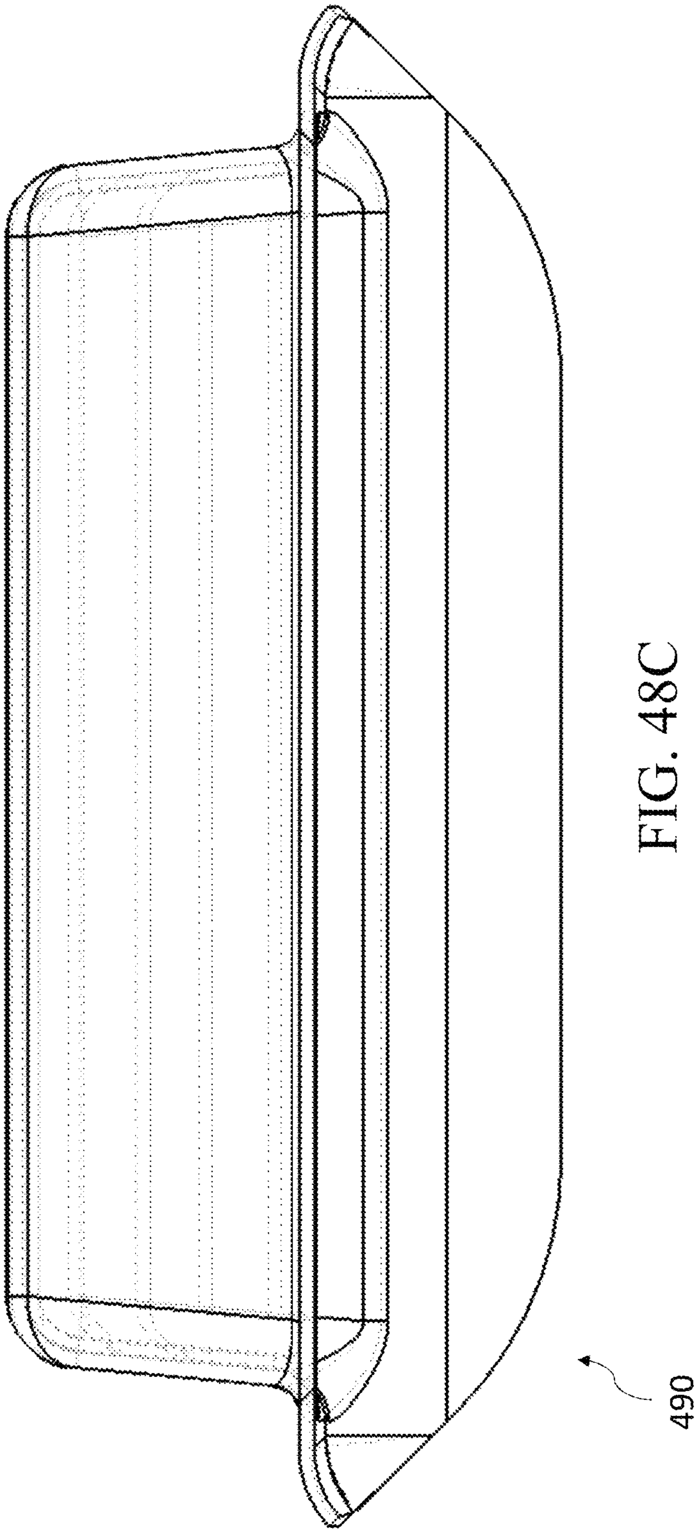
FIG. 48C is a top view of a toe space module with integrated support ribs that protrude on the internal surface of the toe space module.

In a further embodiment, the integrated support ribs protrude from the interior surface of the toe space module in one or more locations where the operator does not place his or her feet. Furthermore, any of the foregoing examples of interior surface protrusion and/or exterior surface protrusion of the integrated support ribs are combined based on design considerations such as strength, stiffness, and uses of the toe space module. For example, the interior support ribs protrude from any of the following locations, singularly or in combination: an interior surface of the top portion of the toe space module, from an exterior surface of the top portion of the toe space module, from an exterior surface of the bottom portion of the toe space module, from an interior surface of the bottom portion of the toe space module, from one or more interior surfaces of one or more side portions of the toe space module, and/or from one or more exterior surfaces of one or more side portions of the toe space module. In another embodiment, the thickness of the integrated support ribs varies such that the integrated support ribs protrude intermittently from the toe space module in any configuration described above. In another embodiment, the integrated support ribs do not protrude at all from the toe space module and are fully encapsulated in the toe space module. FIGS. 48A-C illustrate several views of a toe space module with integrated support ribs that protrude on the internal surface 492 of the toe space module 490.

The toe space module is manufactured from any suitable material. In a preferred embodiment, the material is plastic, including reinforced thermosets, unreinforced thermosets, reinforced thermoplastics, and/or unreinforced thermoplastics. The material is opaque, translucent, transparent and combinations thereof.

A method for manufacturing the present invention includes creating a toe space module, creating cutouts in a platform and bonding the toe space module to the platform. The toe space module is attached to the platform by chemical bonding, physical bonding, welding including plastic welding, magnetism, vacuum, and/or mechanical fastening. Advantageously, the toe space module is operable to be attached to the platform permanently or non-permanently. Methods of non-permanent attachment include mechanical interlocking, mechanical fasteners, magnetism, and reversible adhesives such as adhesives operable to be reversed via radiation such as microwaves. Alternatively, the platform is formed with cutouts.

Additionally, any component recited in the present specification, including the platform, toe space modules, flanges of the toe space modules, tabs of the toe space modules, brackets, integrated support ribs, external support ribs, textured surfaces including diamond textured surfaces, fasteners, and any other component of a toe space module or platform or attached to a toe space module or platform is operable to made our of unreinforced and/or reinforced thermoplastics and/or thermosets. Alternatively, those components are operable to be manufactured out of nylon and/or fiberglass, including pultruded fiberglass. Additionally, these components are operable to be manufactured via thermoforming (including twin sheet thermoforming), injection molding, casting such as low pressure casting, vacuum forming, compression molding, light resin transfer molding, resin transfer molding, vacuum infusion, hand layup, 3D printing, and squish molding. The components are also operable to be manufactured integrally (i.e. manufactured at the same time or around the same time such that the components are integrally formed) or manufactured separately and then attached to other components or identical components via physical bonding, chemical bonding such as adhesives including permanent and nonpermanent adhesives, welding including metal welding and/or plastic welding such as hot gas welding, ultrasonic welding, spin welding, vibration welding, contact welding, laser welding, hot plate welding, magnetism, vacuum, and/or mechanical attachment including mechanical interlocking and mechanical fasteners.

The above-mentioned examples are provided to serve the purpose of clarifying the aspects of the invention, and it will be apparent to one skilled in the art that they do not serve to limit the scope of the invention. The above-mentioned examples are just some of the many configurations that the mentioned components can take on. All modifications and improvements have been deleted herein for the sake of conciseness and readability but are properly within the scope of the present invention.

What is claimed is:

1. A toe space module on a platform, comprising:
- a toe space body including at least one recess and a bottom surface;
- at least one flange formed around at least a portion of a perimeter of the toe space body, comprising:
  - a plurality of tabs comprising at least one side tab, at least one top tab, and at least one bottom tab,
  - wherein the at least one side tab and the at least one top tab contact at least one external surface of the platform, and
  - wherein the at least one bottom tab contacts the at least one external surface of the platform, the at least one external surface includes an external vertical surface;
- wherein the at least one flange includes at least one vertical surface,
- wherein the at least one vertical surface of the at least one flange attaches the toe space module to the external vertical surface of a vertical side of the platform at an opening in the vertical side of the platform,
- wherein the external vertical surface is parallel to the vertical side,
- wherein the bottom surface of the toe space body is substantially continuous and coplanar with a surface of a platform bottom of the platform, and
- wherein the toe space body is distinct from the platform.

2. The toe space module of claim 1,
- wherein the at least one bottom tab includes notches for receiving at least one support rib.

3. The toe space module of claim 1,
- wherein at least one tab of the plurality of tabs is operable to partially wrap around at least one side, at least one corner or the platform bottom, or wherein the at least one tab is operable to wrap fully around the at least one side or the at least one corner.

4. The toe space module of claim 1,
- wherein a top surface of the toe space body is substantially parallel with the bottom surface of the toe space body,
- wherein the top surface of the toe space body provides a step for entering or exiting the platform.

5. The toe space module of claim 1, further comprising a textured surface on at least one of a top surface of the toe space body or the bottom surface of the toe space body, wherein the textured surface is configured to provide traction for an operator of the toe space module.

6. The toe space module of claim 1,
- wherein the toe space body includes integrated ribs,
- wherein the integrated ribs run horizontally, vertically, or diagonally across the toe space body.

7. The toe space module of claim 6, wherein the integrated ribs extend into the at least one flange.

8. The toe space module of claim 1,
- wherein the toe space module does not include a dielectric liner and
- wherein the toe space module has a dielectric rating of at least 50 kV.

9. The toe space module of claim 1, wherein the plurality of tabs is integrally formed with the at least one flange, or wherein the plurality of tabs is coupled to the at least one flange.

10. An elevating platform system, comprising:
- a platform, comprising:
  - an external vertical surface on a vertical side;
  - an opening on the vertical side and extending through the vertical side; and
  - a platform bottom;
- at least one external surface of the platform including the external vertical surface;
- at least one toe space module that is distinct from the platform, comprising:
  - a toe space body including at least one recess and a bottom surface;

at least one flange formed around at least a portion of a perimeter of the toe space body, comprising:

a plurality of tabs comprising at least one side tab, at least one top tab, and at least one bottom tab, wherein the at least one side tab and the at least one top tab contact the at least one external surface of the platform, and wherein the at least one bottom tab contacts the at least one external surface of the platform, wherein the at least one flange includes at least one vertical surface, and wherein the at least one flange is parallel to and contacts the external vertical surface of the vertical side of the platform, and wherein the bottom surface of the toe space body is substantially continuous and coplanar with a surface of the platform bottom.

11. The elevating platform system of claim 10, wherein the at least one side tab contacts the at least one external surface of the platform at the vertical side of the platform, and wherein the at least one bottom tab contacts the at least one external surface of the platform at the platform bottom.

12. The elevating platform system of claim 10, wherein at least one tab of the plurality of tabs is configured to at least partially wrap around at least one side of the platform, at least one corner of the platform, or the platform bottom.

13. The elevating platform system of claim 10, wherein the at least one toe space module is attached to the platform via at least one of chemical bonding, welding, magnetism, vacuum, or mechanical attachment.

14. The elevating platform system of claim 10, wherein the at least one toe space module does not include a dielectric liner, and wherein the at least one toe space module has a dielectric rating of at least 70 kV.

15. A multiple toe space module and a platform, comprising:

at least two toe space modules, each of the at least two toe space modules distinct from the platform and comprising:

a toe space body including at least one recess and a bottom surface; and at least one flange formed around at least a portion of a perimeter of the toe space body, wherein the at least one flange includes at least one vertical surface; and the platform for receiving the at least two toe space modules, comprising:

at least two openings extending through the platform; and an outer vertical surface on a vertical side of the platform;

wherein the at least two toe space modules attach to the platform at the at least two openings, wherein the at least one vertical surface of the at least one flange is parallel to and directly attaches the toe space body to the outer vertical surface of the platform, wherein the bottom surface of the toe space body of each of the at least two toe space modules is substantially continuous and coplanar with the outer vertical a bottom surface of the vertical side of the platform.

16. The multiple toe space module and the platform of claim 15, wherein the toe space body of at least one of the at least two toe space modules and the at least one flange are integrally formed.

17. The multiple toe space module and the platform of claim 15, wherein the at least two toe space modules include a first toe space module and a second toe space module, and wherein the first toe space module is on an opposite side of the platform from the second toe space module.

18. The multiple toe space module and the platform of claim 15, wherein the at least two toe space modules include a first toe space module and a second toe space module, and wherein the first toe space module is on a first side of the platform and the second toe space module is on a second side of the platform adjacent to the first side of the platform.

19. The multiple toe space module and the platform of claim 15, wherein the at least two toe space modules include at least three toe space modules.

20. The elevating platform system of claim 10, wherein at least one tab of the plurality of tabs is operable to wrap fully around at least one side of the platform or at least one corner of the platform.

* * * * *